(12) United States Patent
Satori

(10) Patent No.: US 7,885,013 B2
(45) Date of Patent: Feb. 8, 2011

(54) ZOOM LENS AND IMAGE PICKUP APPARATUS EQUIPPED WITH SAME

(75) Inventor: Tomoyuki Satori, Kawagoe (JP)

(73) Assignee: Olympus Imaging Corp., Tokyo (JP)

( * ) Notice: Subject to any disclaimer, the term of this patent is extended or adjusted under 35 U.S.C. 154(b) by 46 days.

(21) Appl. No.: 12/319,073

(22) Filed: Dec. 31, 2008

(65) Prior Publication Data
US 2009/0174952 A1 Jul. 9, 2009

(30) Foreign Application Priority Data

| Jan. 8, 2008 | (JP) | 2008-001619 |
| Jan. 8, 2008 | (JP) | 2008-001640 |
| Jan. 8, 2008 | (JP) | 2008-001649 |
| Jan. 8, 2008 | (JP) | 2008-001661 |
| Nov. 5, 2008 | (JP) | 2008-284814 |

(51) Int. Cl.
*G02B 15/14* (2006.01)

(52) U.S. Cl. ....... 359/687; 359/690

(58) Field of Classification Search ........ 359/676, 359/687, 690, 682, 753, 766
See application file for complete search history.

(56) References Cited

U.S. PATENT DOCUMENTS

| 6,028,717 | A | 2/2000 | Kohno et al. |
| 6,606,200 | B1 | 8/2003 | Nakayama et al. |
| 6,791,762 | B2 | 9/2004 | Yamada |
| 7,151,638 | B2 | 12/2006 | Ohashi |
| 2006/0098301 | A1 | 5/2006 | Miyajima |

FOREIGN PATENT DOCUMENTS

| JP | 8-271788 | 10/1996 |
| JP | 11-006958 | 1/1999 |
| JP | 11-052244 | 2/1999 |
| JP | 2003-241097 | 8/2003 |
| JP | 2005-326743 | 11/2005 |
| JP | 2006-078979 | 3/2006 |
| JP | 2006-171055 | 6/2006 |

*Primary Examiner*—Alicia M Harrington
(74) *Attorney, Agent, or Firm*—Kenyon & Kenyon LLP

(57) ABSTRACT

A zoom lens includes, in order from the object side thereof, a first lens unit G1 having a positive refracting power, a second lens unit G2 having a negative refracting power, and a third lens unit G3 having a positive refracting power, wherein zooming is performed by changing distances between the lens units, the second lens unit has two negative lens elements and one positive lens element, and the lens element located closest to the object side is a negative lens element. The zoom lens satisfies the following conditions:

$$0.60 < \Sigma d_{2G}/I_{mw} < 1.95 \quad (1\text{-}1)$$

and $$1.830 < N_{2ave} < 2.000 \quad (1\text{-}2),$$

where the term "lens element" refers to an optical member that satisfies $0.1 < L/I_{mw}$.

116 Claims, 50 Drawing Sheets

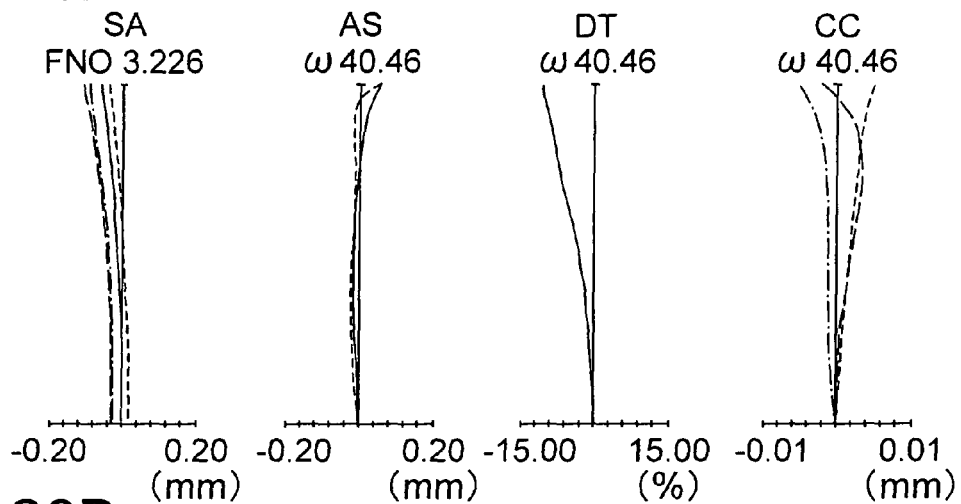
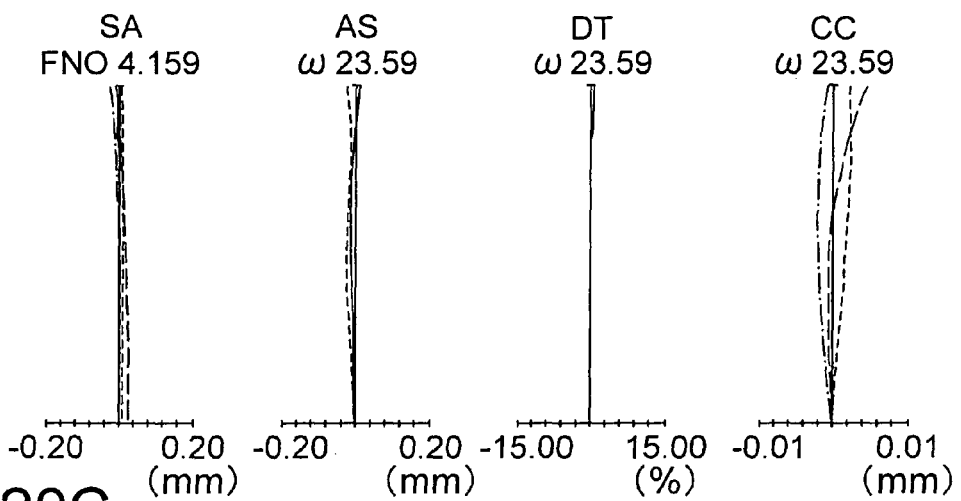
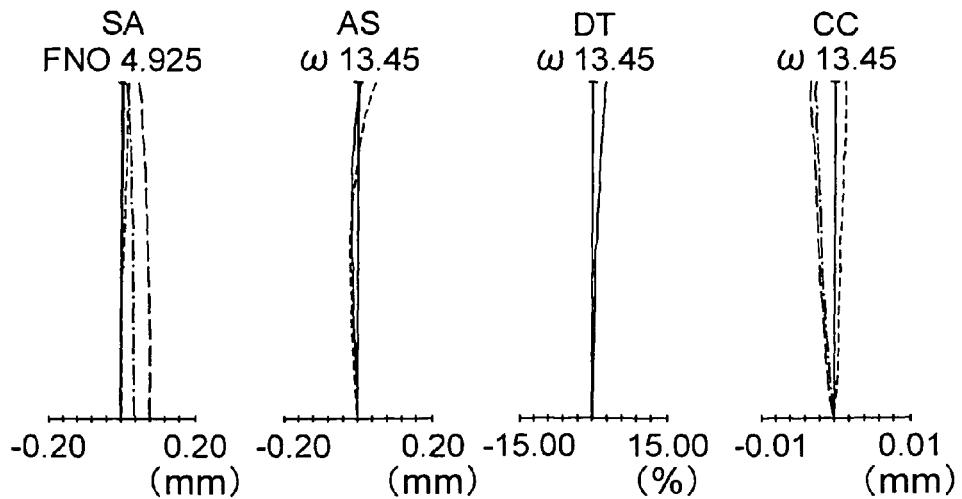

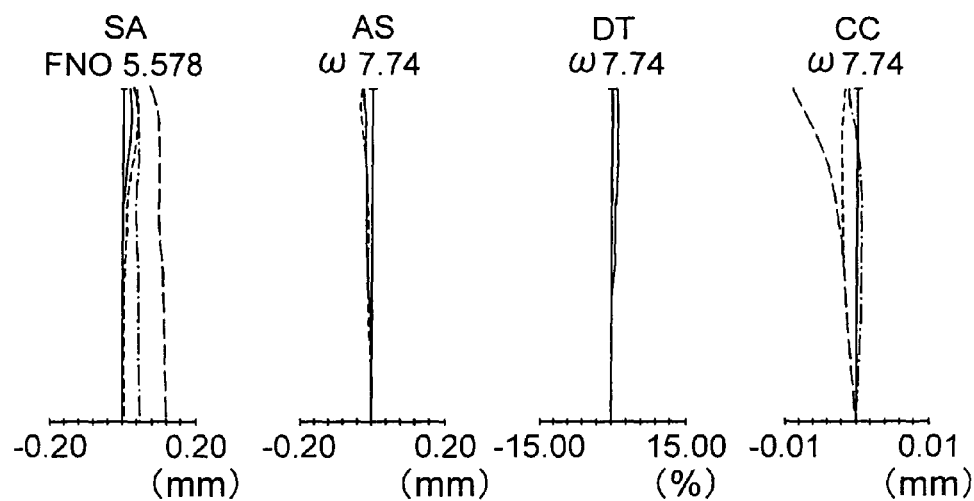
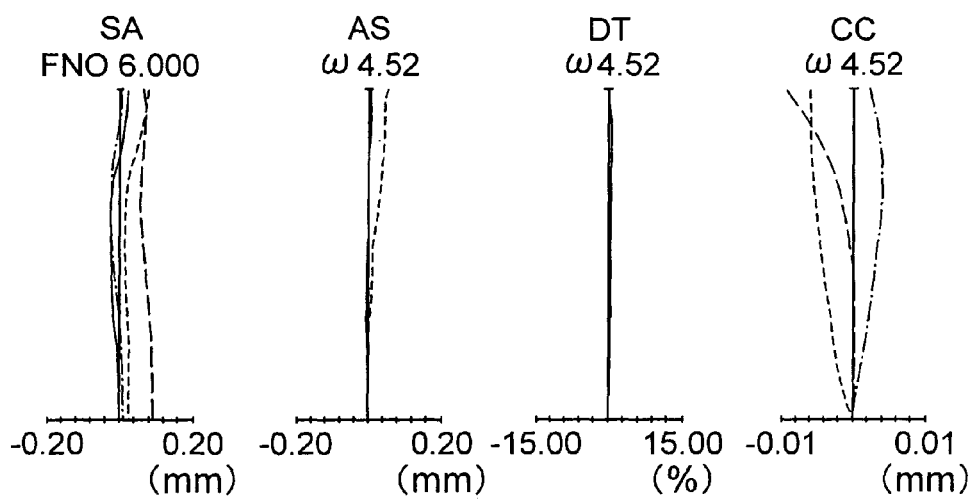

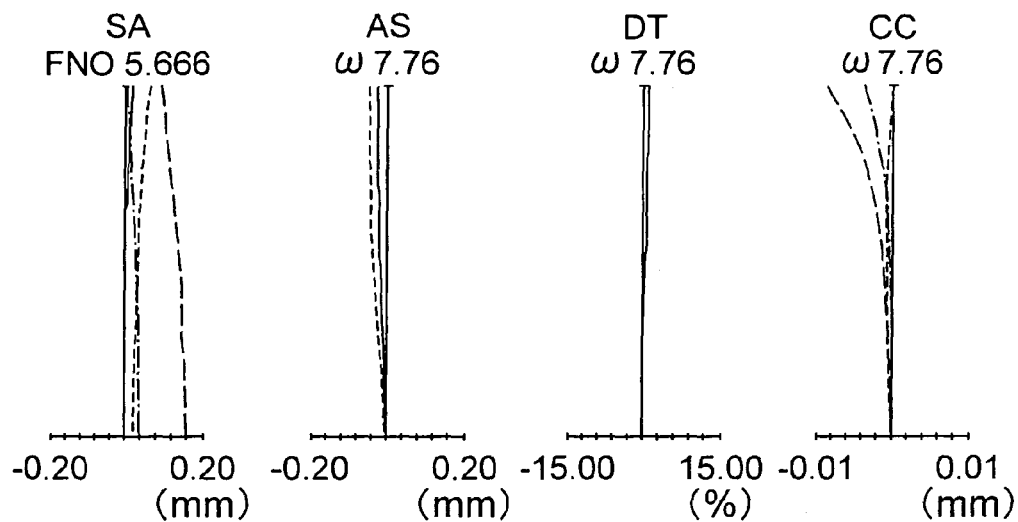
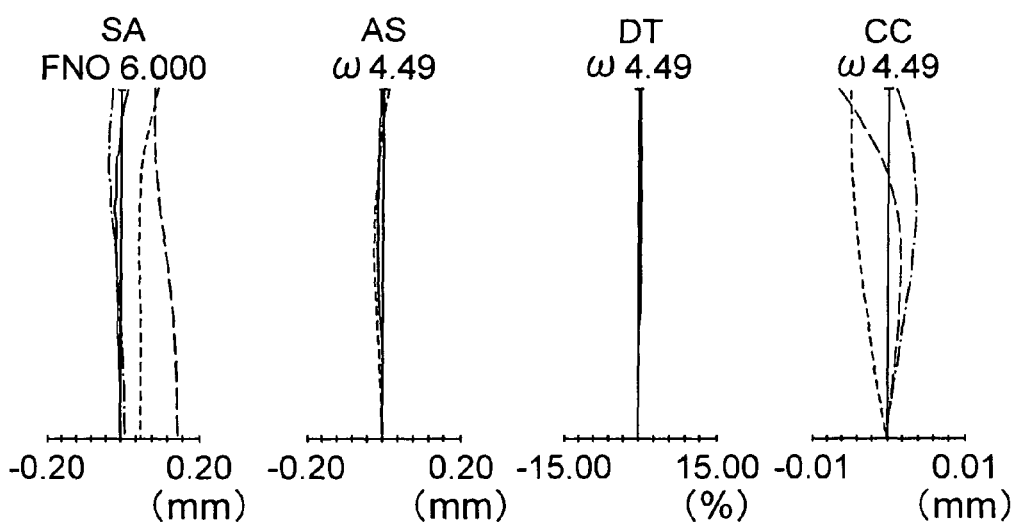

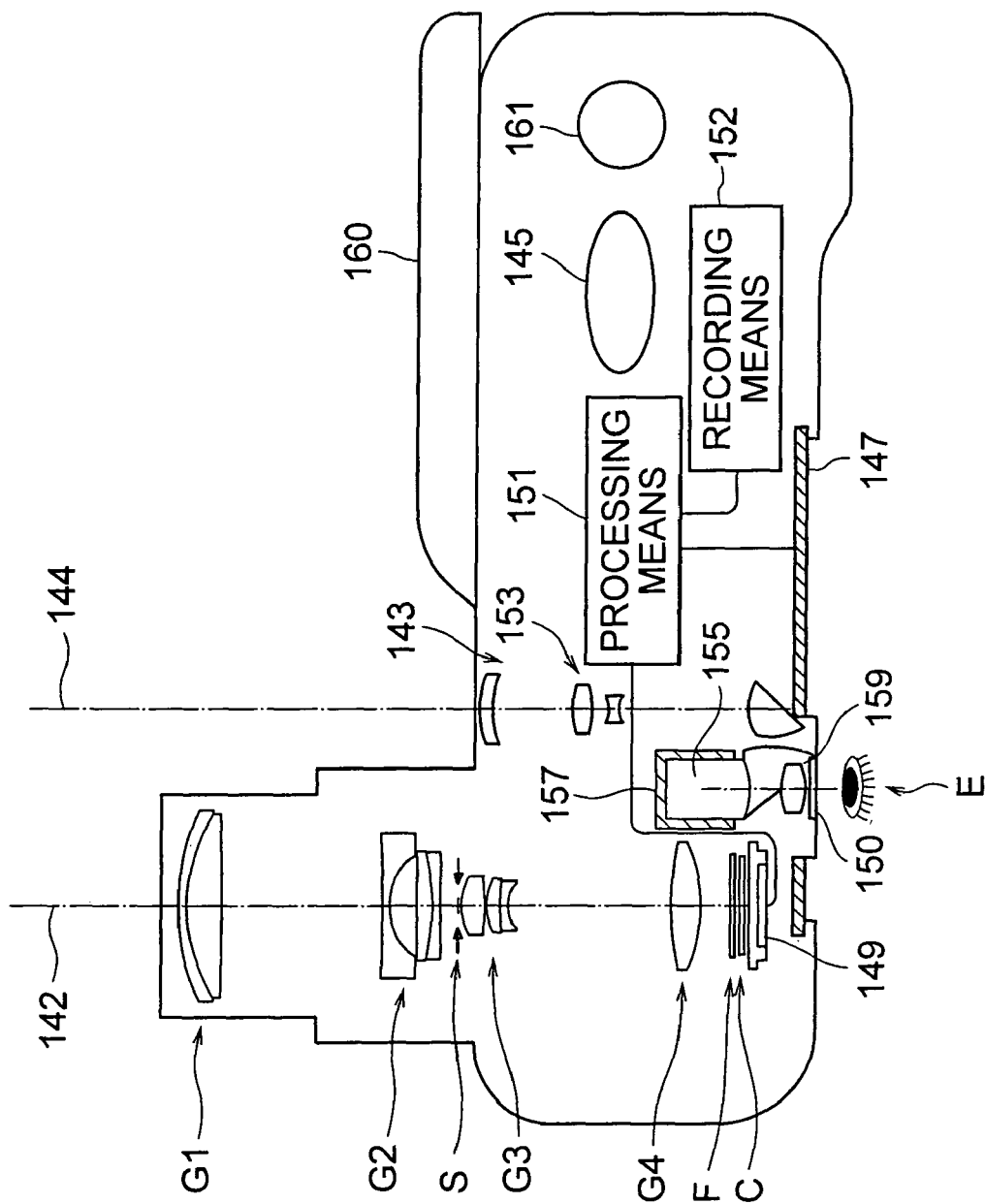

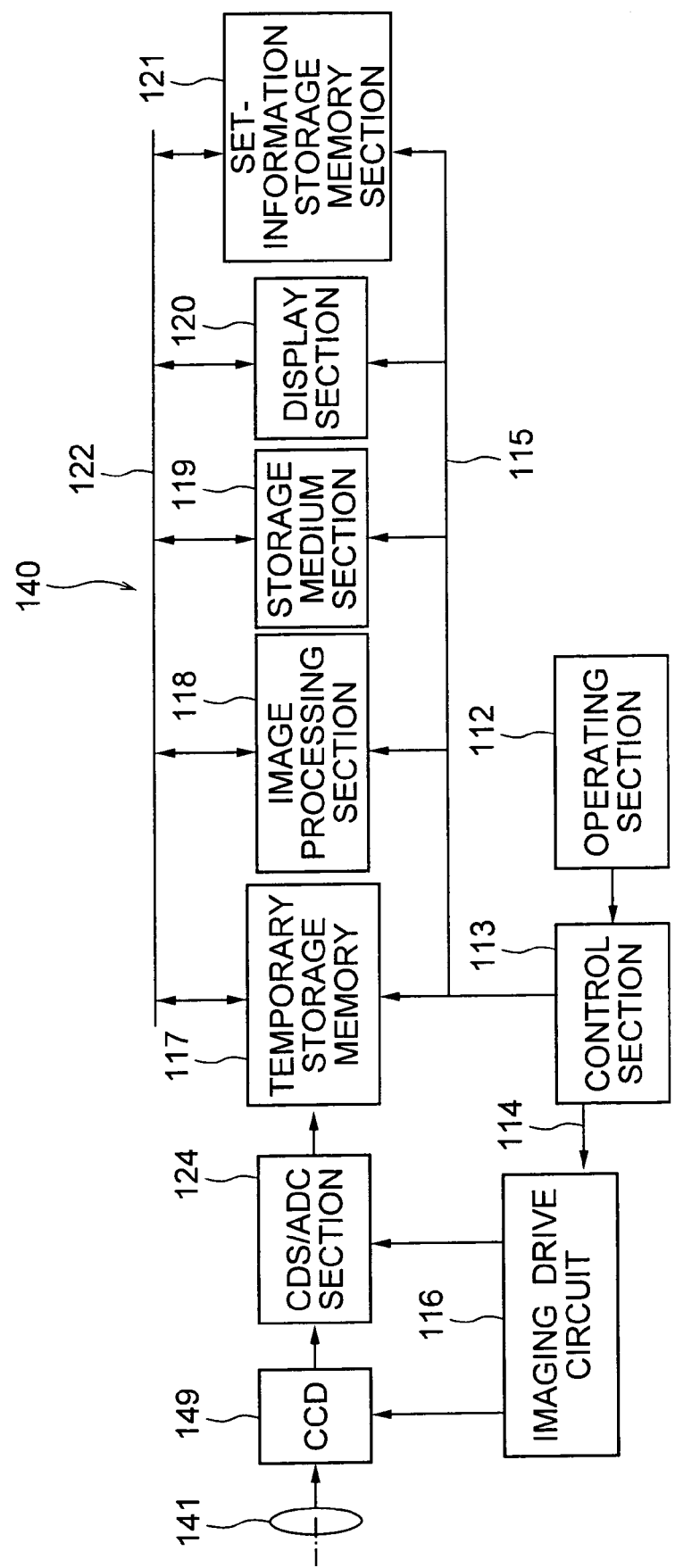

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application Nos. 2008-001619 filed on Jan. 8, 2008, 2008-001640 filed on Jan. 8, 2008, 2008-001649 filed on Jan. 8, 2008, 2008-001661 filed on Jan. 8, 2008, 2008-284814 filed on Nov. 5, 2008; the entire contents of which are incorporated herein by reference.

BACKGROUND OF THE INVENTION

1. Field of the Invention

The present invention relates to a zoom lens and an image pickup apparatus equipped with the same.

2. Description of the Related Art

In recent years, digital cameras that pick up an image of an object using an image pickup element such as a CCD or CMOS sensor have replaced film cameras to become the mainstream. Furthermore, various categories of digital cameras ranging from popular-priced compact type cameras to advanced type cameras for professionals have been developed. The present invention focuses, in particular, on the category of popular-priced compact type cameras.

Users of such popular-priced digital cameras generally wish to enjoy easy and simple shooting in various photographing area (shooting situations) anywhere at any time. For this reason, such users favor small size digital cameras, especially cameras that are small with respect to the thickness direction and can be conveniently carried in a pocket of clothes or a bag. Therefore, a further reduction in the size of the taking lens system is demanded. On the other hand, the number of pixels of the image pickup elements have been increasing, and higher optical performance commensurate with the increased number of pixels of the image pickup element is required. In addition, in order to facilitate mass production, it is necessary that the sensitivity of deterioration in optical performance to manufacturing errors occurring during manufacturing and assembling the lens be made small. Zoom lenses having high zoom ratios of 5 to 7 or more have become popular, since they can be used in a wider variety of photographing area. While there is a demand for further increases in the zoom ratio, there also is a demand for increases in the angle of field. To meet such demands, various types of zoom lens systems have been developed.

As prior arts, there is a known type of compact zoom lenses having relatively high zoom ratios, that is, a zoom lens including, in order from the object side thereof, a first lens unit having a positive refracting power, a second lens unit having a negative refracting power, a third lens unit having a positive refracting power and a fourth lens unit having a positive refracting power. Zoom lenses of this type are disclosed in the following patent documents.

Patent Document 1: Japanese Patent Application Laid-open No. 2006-171055,
Patent Document 2: Japanese Patent Application Laid-open No. 11-52244,
Patent Document 3: Japanese Patent Application Laid-open No. 11-6958,
Patent Document 4: Japanese Patent Application Laid-open No. 8-271788,
Patent Document 5: Japanese Patent Application Laid-open No. 2005-326743, and
Patent Document 6: Japanese Patent Application Laid-open No. 2005-78979.

SUMMARY OF THE INVENTION

A first type zoom lens according to the present invention comprises, in order from the object side thereof:
a first lens unit having a positive refracting power;
a second lens unit having a negative refracting power; and
a third lens unit having a positive refracting power, wherein zooming is performed by changing distances between the lens units,
the second lens unit comprises two negative lens elements and one positive lens element, and the lens element closest to the object side in the second lens unit is a negative lens element, and
the zoom lens satisfies the following conditional expressions:

$$0.60 < \Sigma d_{2G}/I_{mw} < 1.95 \tag{1-1}$$

$$1.830 < N_{2ave} < 2.000 \tag{1-2}$$

where $\Sigma d_{2G}$ is the thickness of the second lens unit on the optical axis, $I_{mw}$ is the maximum image height at the wide angle end of the zoom lens, and $N_{2ave}$ is the average of the refractive indices for the d-line of all the lens elements in the second lens unit, wherein the term "lens element" refers to an optical member that satisfies $0.1 < L/I_{mw}$, where L is a thickness of the optical member in the second lens unit on the optical axis.

A second type zoom lens according to the present invention comprises, in order from the object side thereof:
a first lens unit having a positive refracting power;
a second lens unit having a negative refracting power; and
a third lens unit having a positive refracting power, wherein zooming is performed by changing distances between the lens units,
the first lens unit comprises one negative lens element and at least one positive lens element, and
the zoom lens satisfies the following conditional expressions:

$$2.00 < nd_{1n} < 2.30 \tag{2-1}$$

$$13.0 < vd_{1n} < 30.0 \tag{2-2}$$

where $nd_{1n}$ is the refractive index for the d-line of the negative lens element in the first lens unit, and $vd_{1n}$ is the Abbe number of the negative lens element in the first lens unit.

A third type zoom lens according to the present invention comprises, in order from the object side thereof:
a first lens unit having a positive refracting power;
a second lens unit having a negative refracting power; and
a third lens unit having a positive refracting power, wherein zooming is performed by changing distances between the lens units, and
the second lens unit includes at least one positive lens elements that satisfies the following conditional expressions:

$$-0.50 < f_2/f_t < -0.03 \tag{3-1}$$

$$2.00 < nd_{2p} < 2.30 \tag{3-2}$$

$$13.0 < vd_{2p} < 30.0 \tag{3-3}$$

where $f_2$ is the focal length of the second lens unit, $f_t$ is the focal length of the entire zoom lens system at the telephoto end, $nd_{2p}$ is the refractive index for the d-line of the positive lens element in the second lens unit, and $vd_{2p}$ is the Abbe number of the positive lens element in the second lens unit.

A fourth type zoom lens according to the present invention comprises, in order from the object side thereof:

a first lens unit having a positive refracting power;
a second lens unit having a negative refracting power; and
a third lens unit having a positive refracting power, wherein zooming is performed by changing distances between the lens units, the first lens unit consists of one negative lens element and one positive lens element, and the zoom lens satisfies the following conditional expressions:

$$0.1 < f_1/f_t < 1.05 \qquad (4\text{-}1)$$

$$1.70 < nd_{1p} < 2.20 \qquad (4\text{-}2)$$

where $f_1$ is the focal length of the first lens unit, $f_t$ is the focal length of the entire zoom lens system at the telephoto end, and $nd_{1p}$ is the refractive index for the d-line of the positive lens element in the first lens unit.

BRIEF DESCRIPTION OF THE DRAWINGS

FIGS. 20A, 20B, and 20C are aberration diagrams of the zoom lens according to the third embodiment in the state in which the zoom lens is focused on an object point at infinity;

FIGS. 31D and 32E are further aberration diagrams of the zoom lens according to the eighth embodiment in the state in which the zoom lens is focused on an object point at infinity;

FIGS. 37D and 37E are further aberration diagrams of the zoom lens according to the eleventh embodiment in the state in which the zoom lens is focused on an object point at infinity;

FIGS. 43D and 43E are further aberration diagrams of the zoom lens according to the fourteenth embodiment in the state in which the zoom lens is focused on an object point at infinity;

FIG. 49 is a cross sectional view of the digital camera; and

FIG. 50 is a block diagram of an internal circuit of a principal portion of the digital camera.

DETAILED DESCRIPTION OF THE INVENTION

Figure 1A:
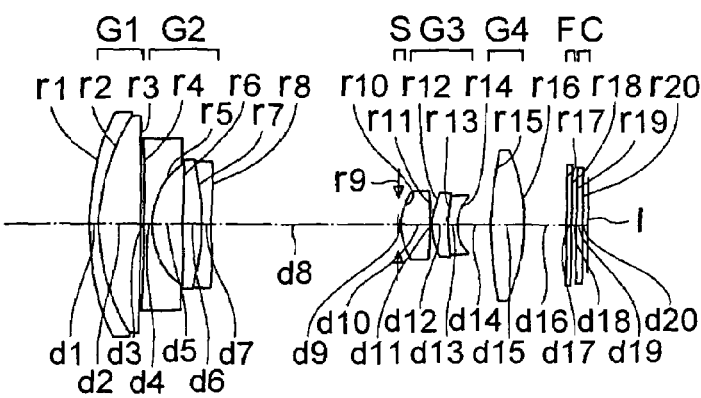
FIGS. 1A to 1E are cross sectional views of a zoom lens according to a first embodiment of the present invention in the state in which the zoom lens is focused on a object point at infinity respectively at the wide angle end (FIG. 1A), in a first intermediate focal length state (FIG. 1B), in a second intermediate zoom state (FIG. 1C), in a third intermediate zoom state (FIG. 1D), and at the telephoto end (FIG. 1E)
Figure 1B:
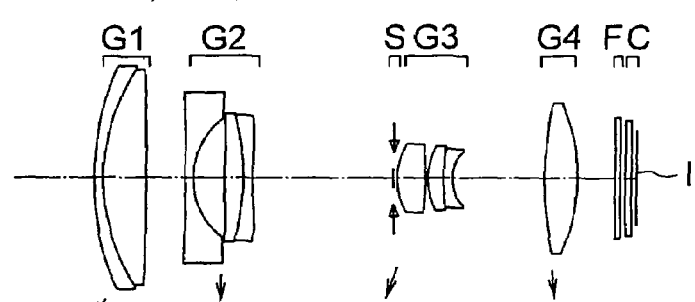
Figure 1C:
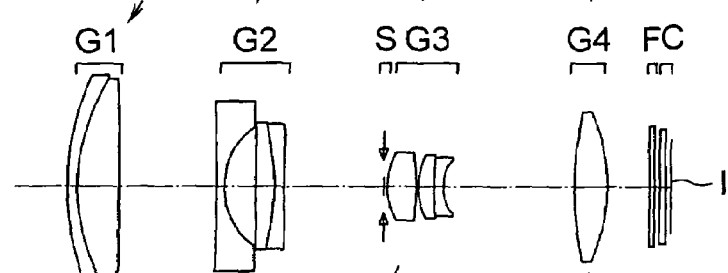
Figure 1D:
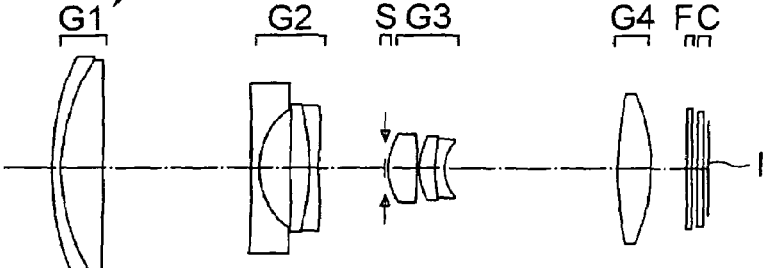
Figure 1E:
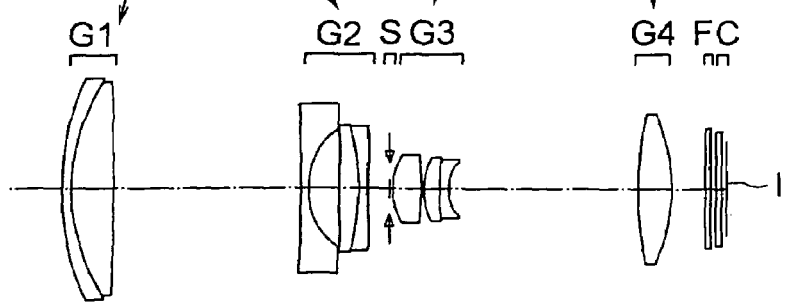
Figure 2A:
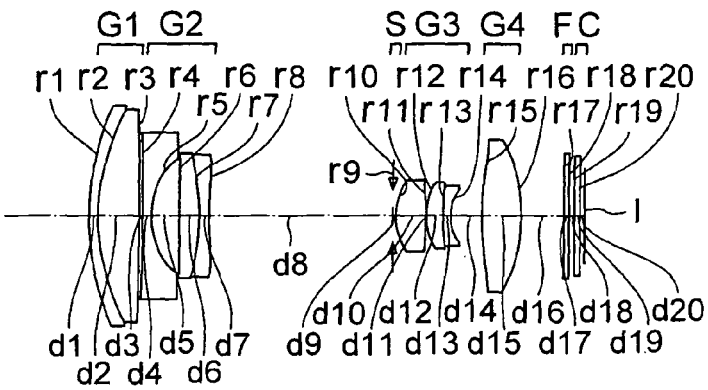
FIGS. 2A to 2E are cross sectional views similar to FIGS. 1A to 1E showing a zoom lens according to a second embodiment of the present invention.
Figure 2B:
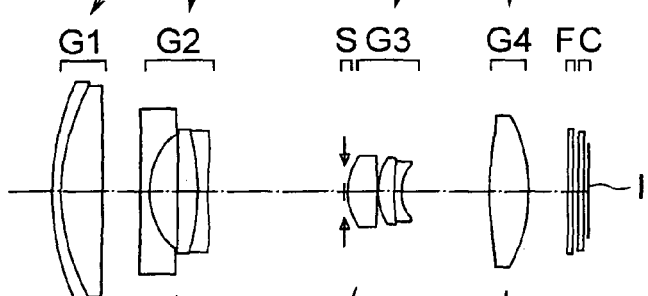
Figure 2C:
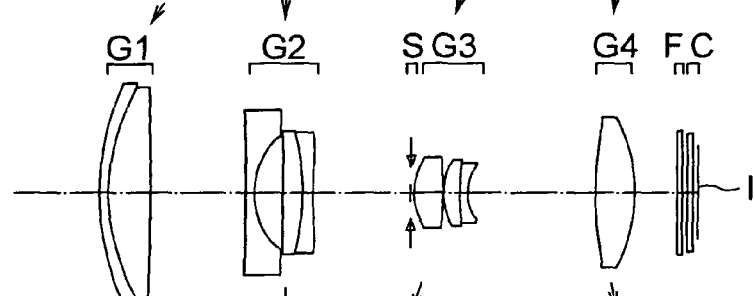
Figure 2D:
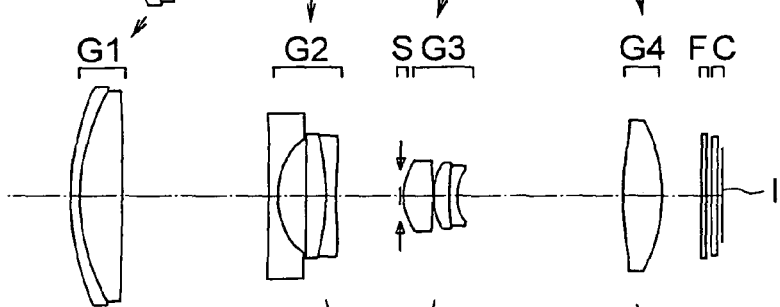
Figure 2E:
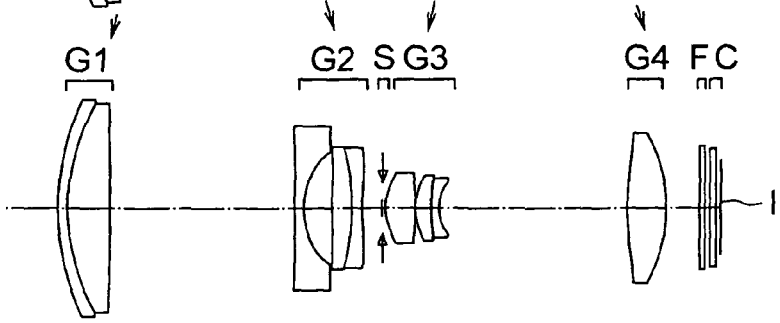
Figure 3A:
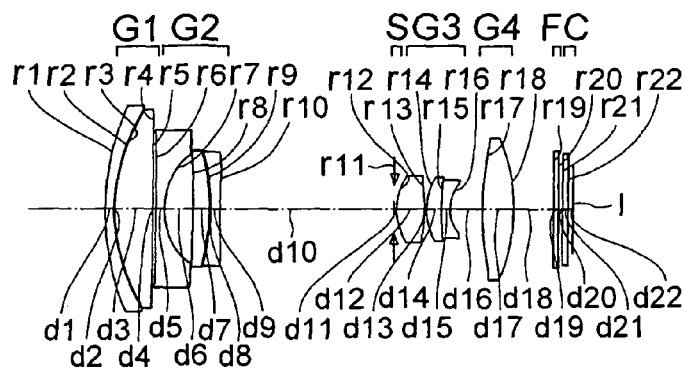
FIGS. 3A to 3E are cross sectional views similar to FIGS. 1A to 1E showing a zoom lens according to a third embodiment of the present invention.
Figure 3B:
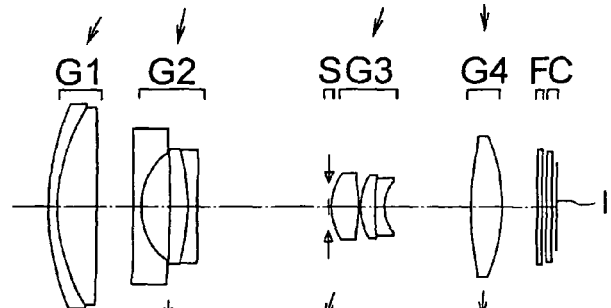
Figure 3C:
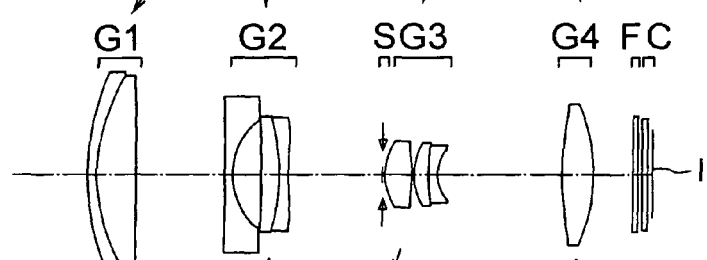
Figure 3D:
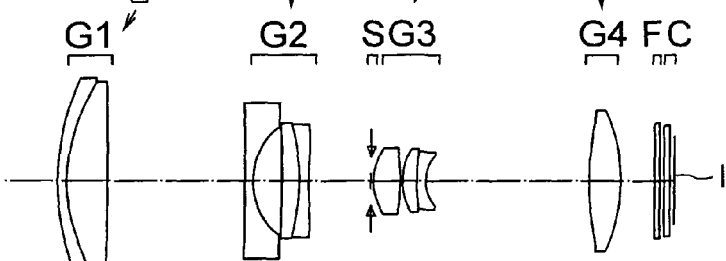
Figure 3E:
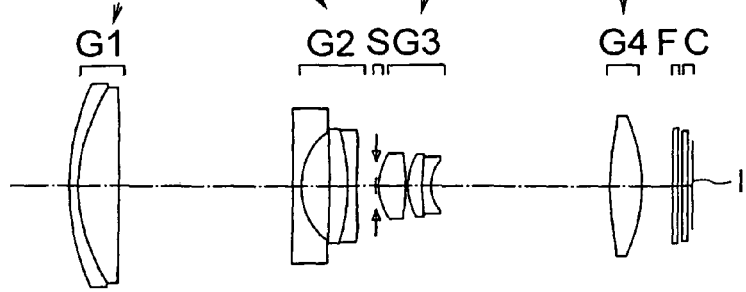
Figure 4A:
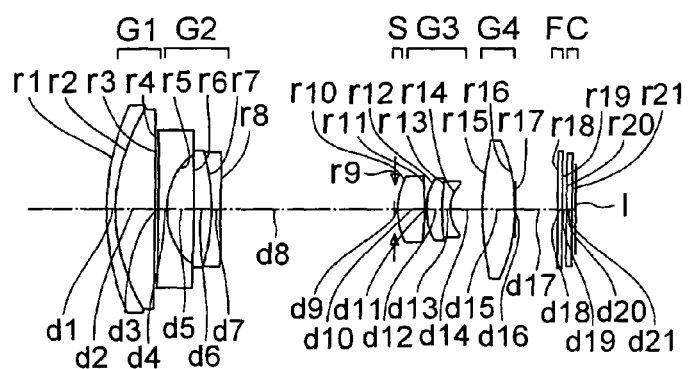
FIGS. 4A to 4E are cross sectional views similar to FIGS. 1A to 1E showing a zoom lens according to a fourth embodiment of the present invention.
Figure 4B:
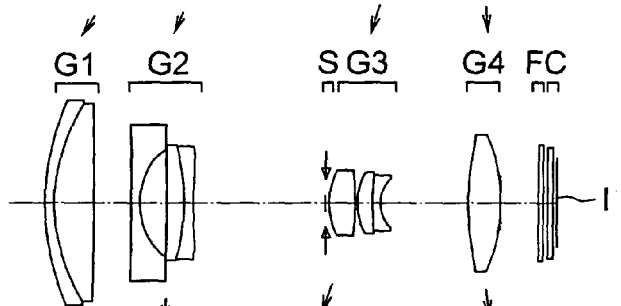
Figure 4C:
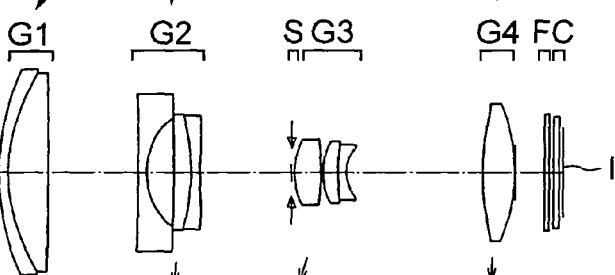
Figure 4D:
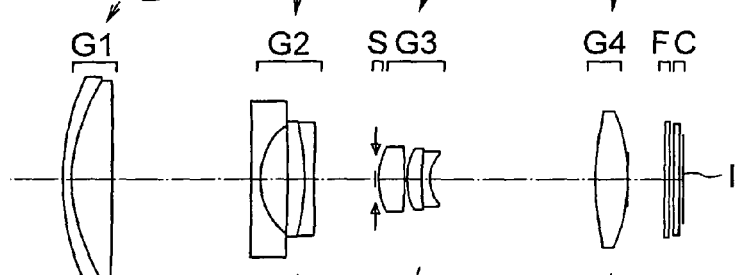
Figure 4E:
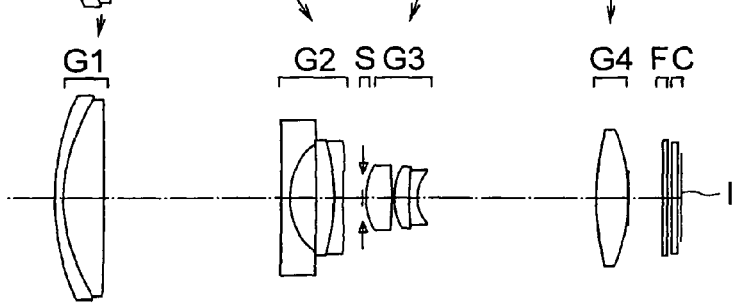
Figure 5A:
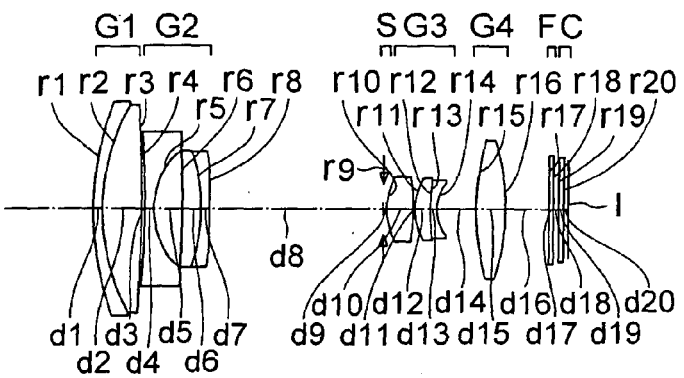
FIGS. 5A to 5E are cross sectional views similar to FIGS. 1A to 1E showing a zoom lens according to a fifth embodiment of the present invention.
Figure 5B:
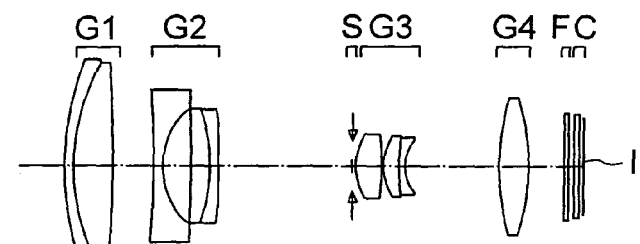
Figure 5C:
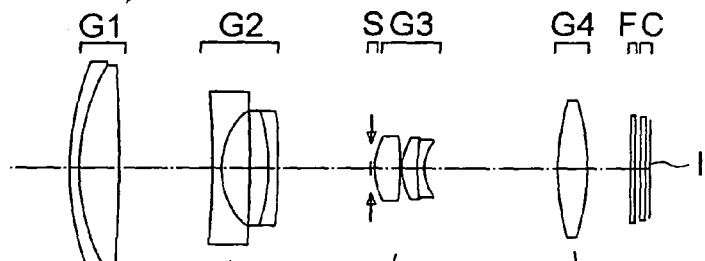
Figure 5D:
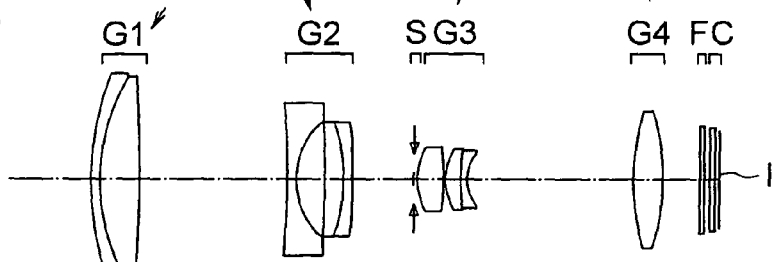
Figure 5E:
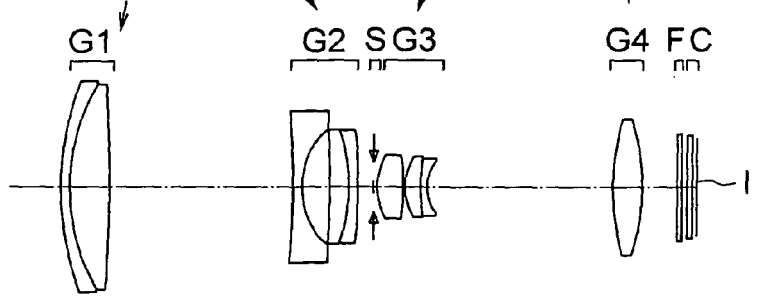
Figure 6A:
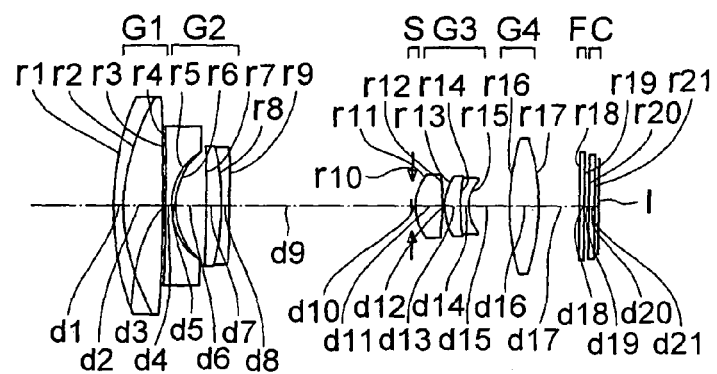
FIGS. 6A to 6E are cross sectional views similar to FIGS. 1A to 1E showing a zoom lens according to a sixth embodiment of the present invention.
Figure 6B:
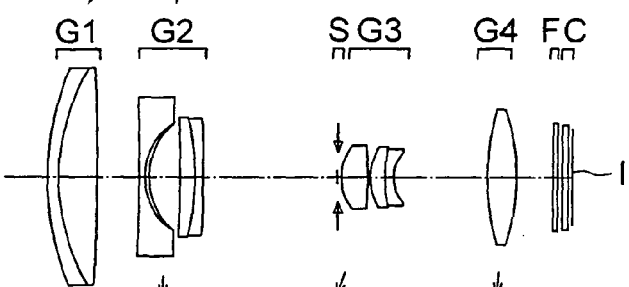
Figure 6C:
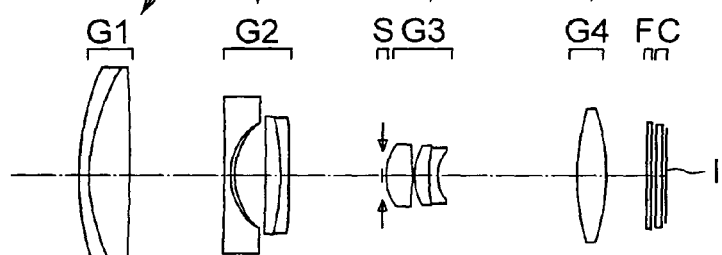
Figure 6D:
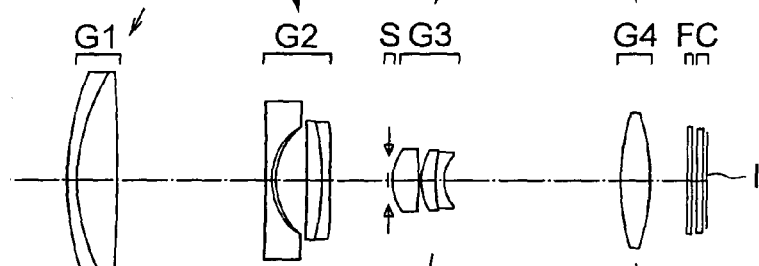
Figure 6E:
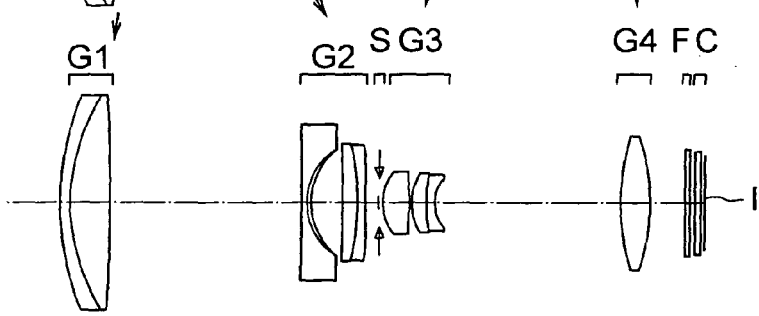
Figure 7A:
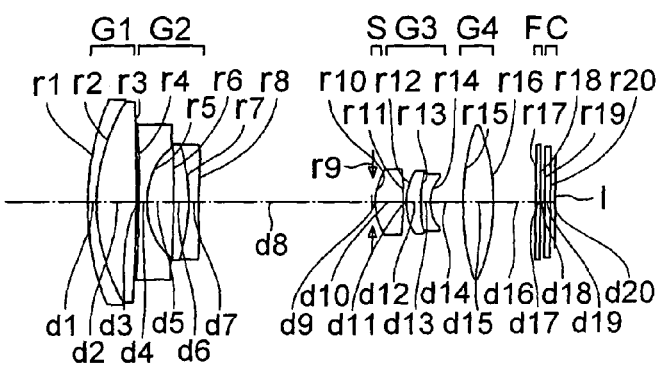
FIGS. 7A to 7E are cross sectional views similar to FIGS. 1A to 1E showing a zoom lens according to a seventh embodiment of the present invention.
Figure 7B:
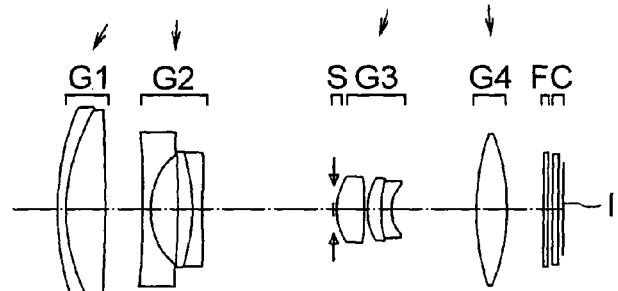
Figure 7C:
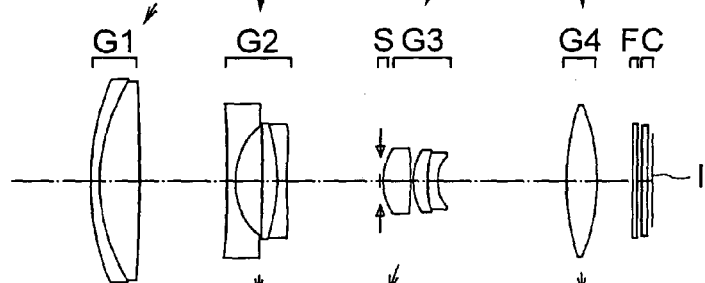
Figure 7D:
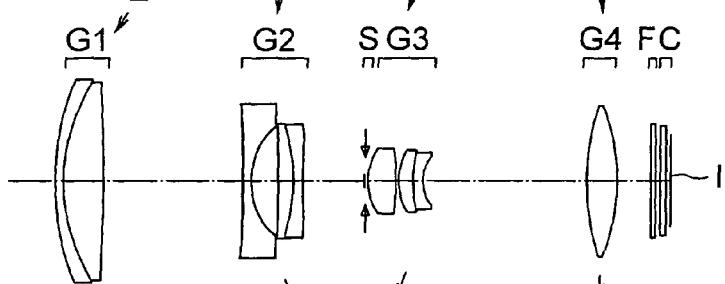
Figure 7E:
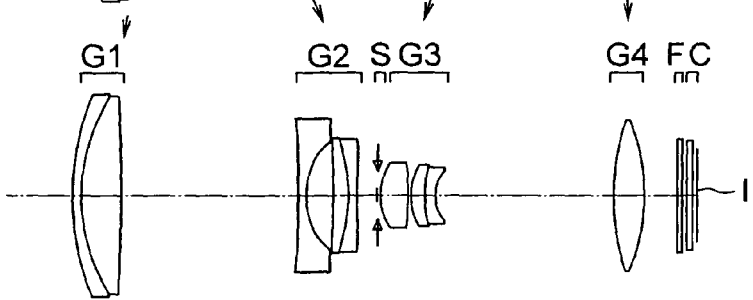
Figure 8A:
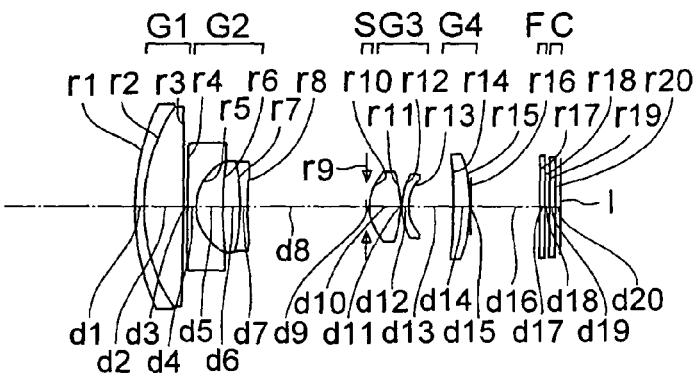
FIGS. 8A to 8E are cross sectional views similar to FIGS. 1A to 1E showing a zoom lens according to a eighth embodiment of the present invention.
Figure 8B:
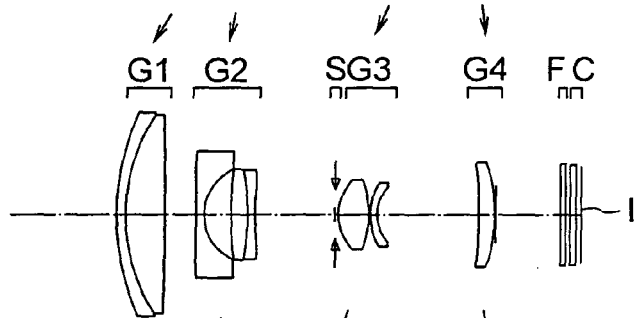
Figure 8C:
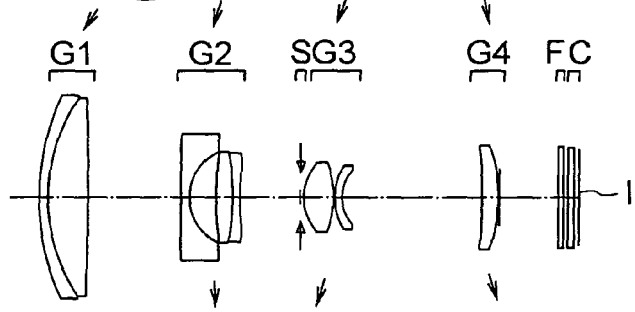
Figure 8D:
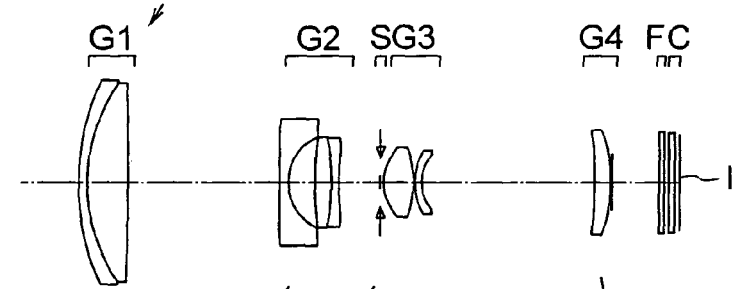
Figure 8E:
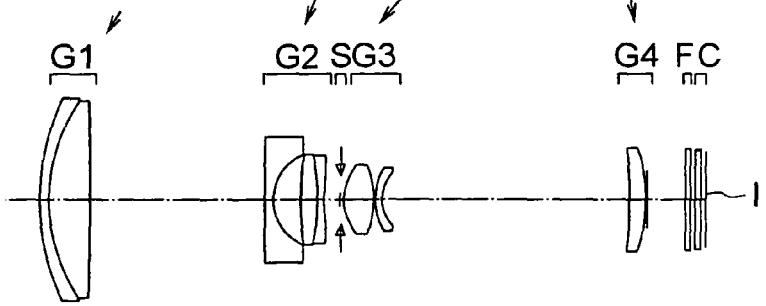
Figure 9A:
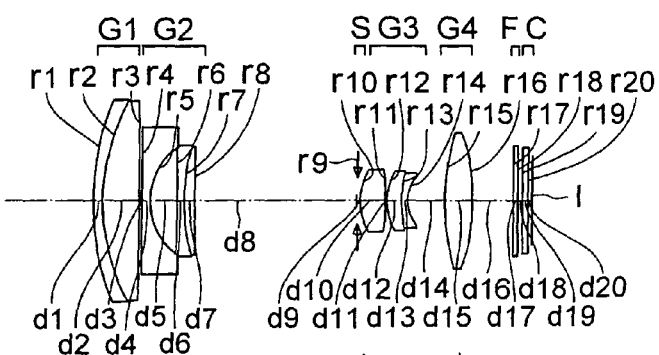
FIGS. 9A to 9E are cross sectional views similar to FIGS. 1A to 1E showing a zoom lens according to a ninth embodiment of the present invention.
Figure 9B:
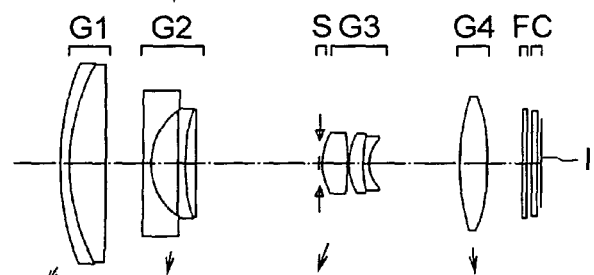
Figure 9C:
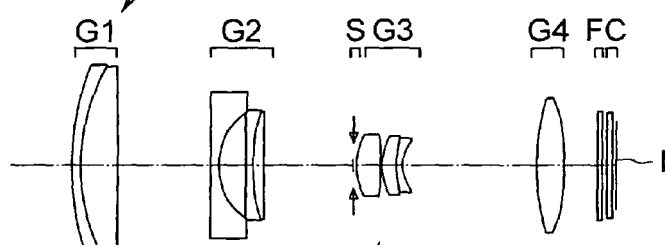
Figure 9D:
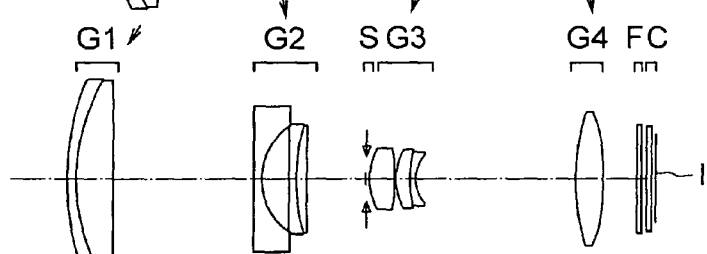
Figure 9E:
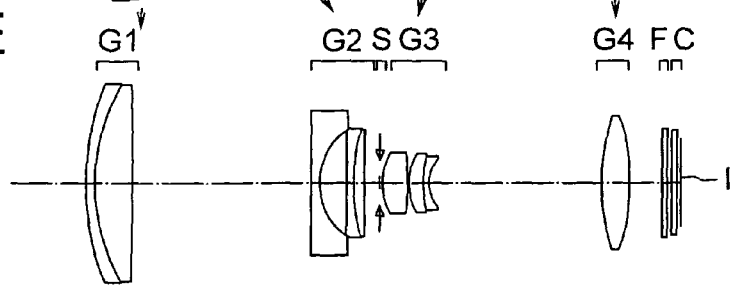
Figure 10A:
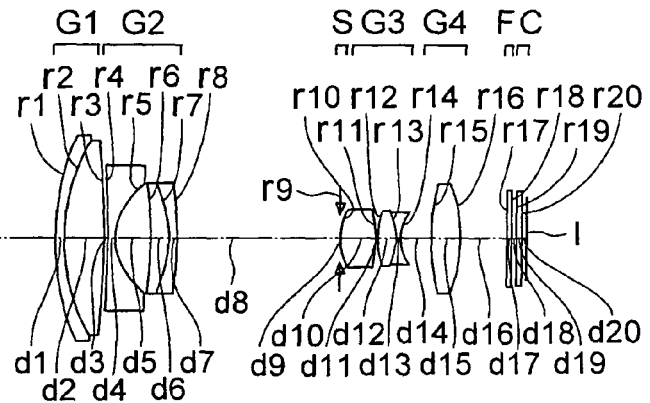
FIGS. 10A to 10E are cross sectional views similar to FIGS. 1A to 1E showing a zoom lens according to a tenth embodiment of the present invention.
Figure 10B:
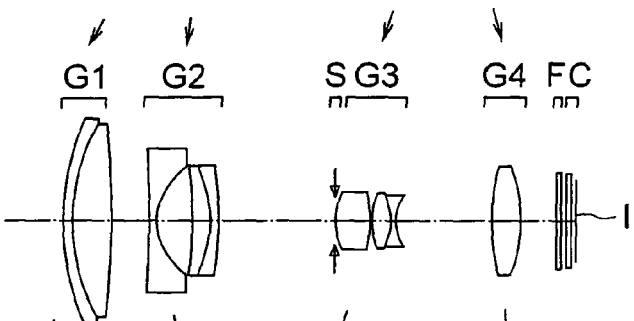
Figure 10C:
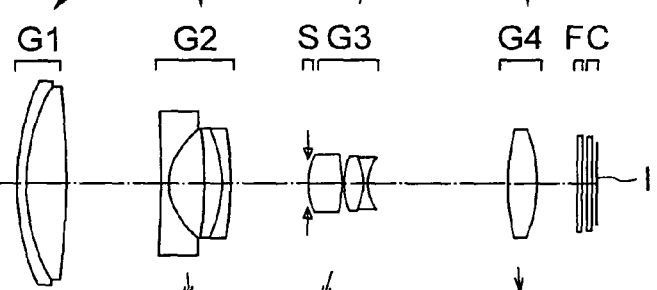
Figure 10D:
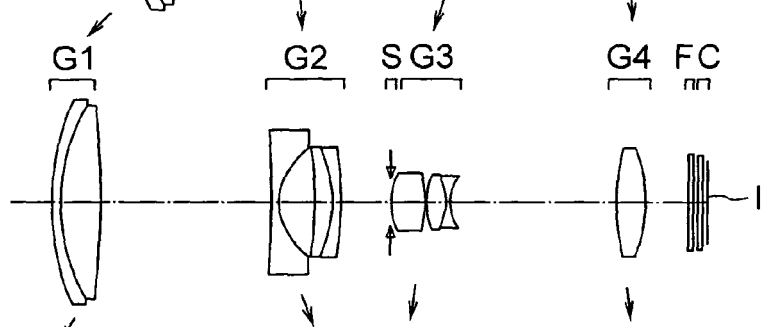
Figure 10E:
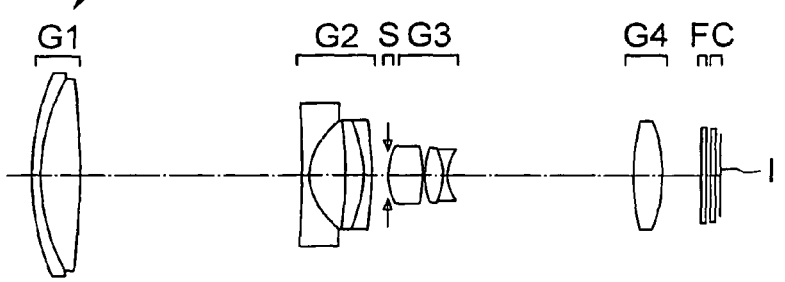
Figure 11A:
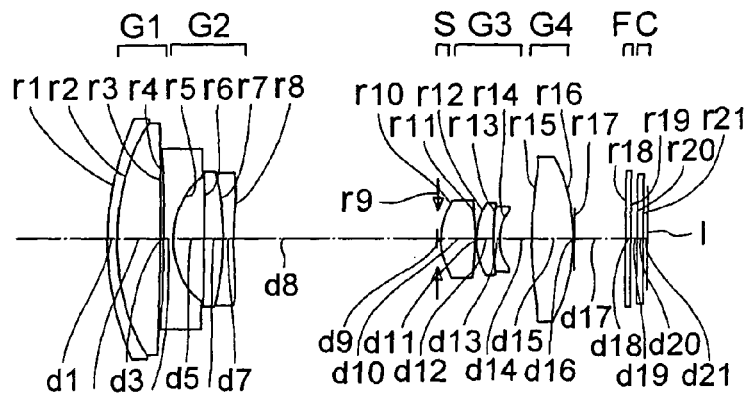
FIGS. 11A to 11E are cross sectional views similar to FIGS. 1A to 1E showing a zoom lens according to a eleventh embodiment of the present invention.
Figure 11B:
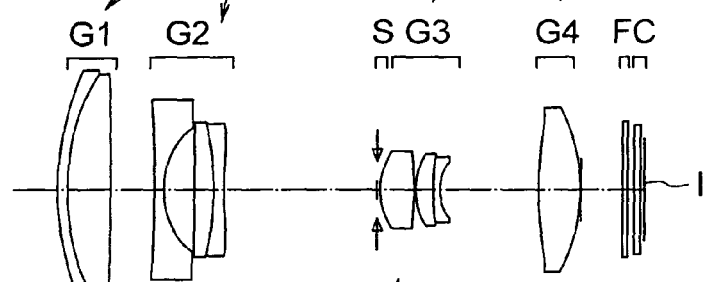
Figure 11C:
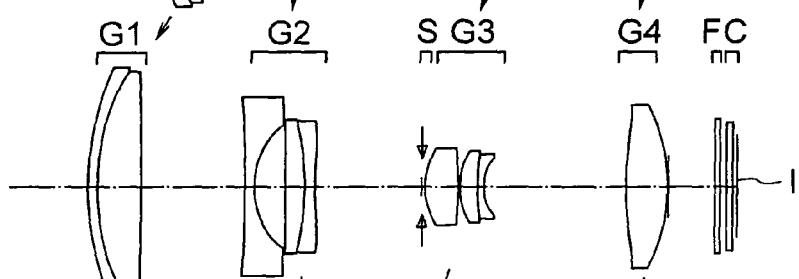
Figure 11D:
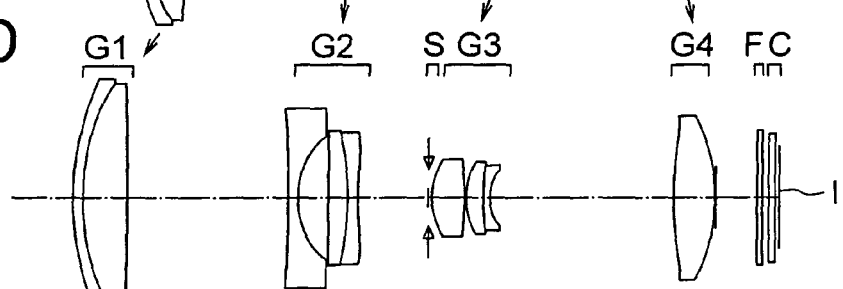
Figure 11E:
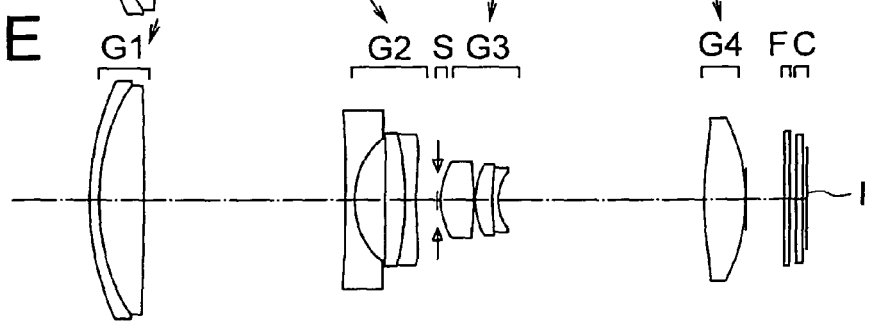
Figure 12A:
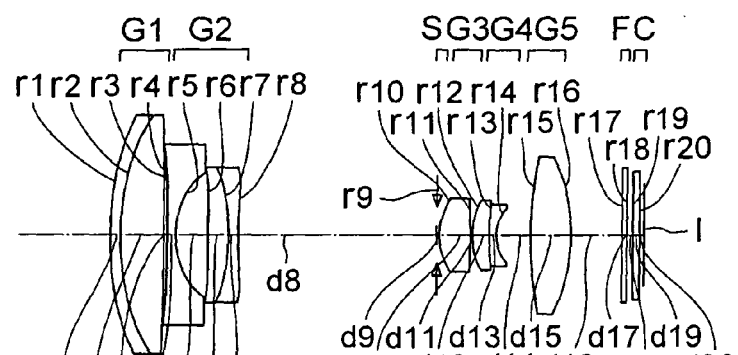
FIGS. 12A to 12E are cross sectional views similar to FIGS. 1A to 1E showing a zoom lens according to a twelfth embodiment of the present invention.
Figure 12B:
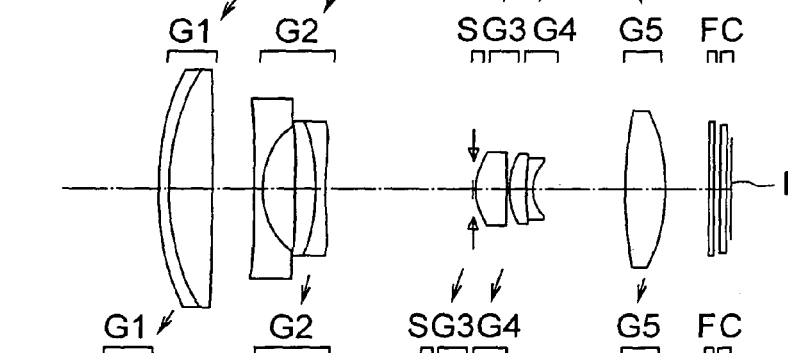
Figure 12C:
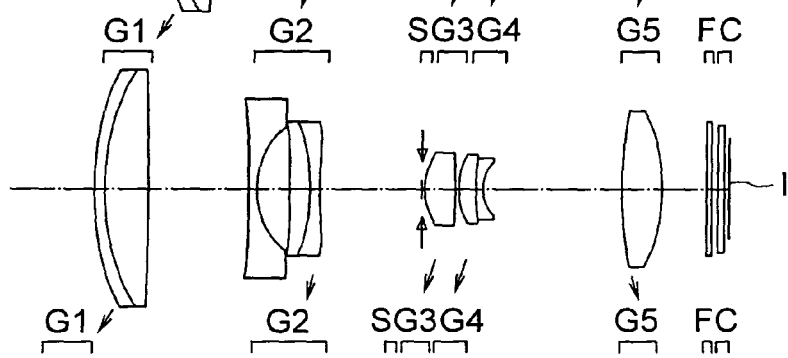
Figure 12D:
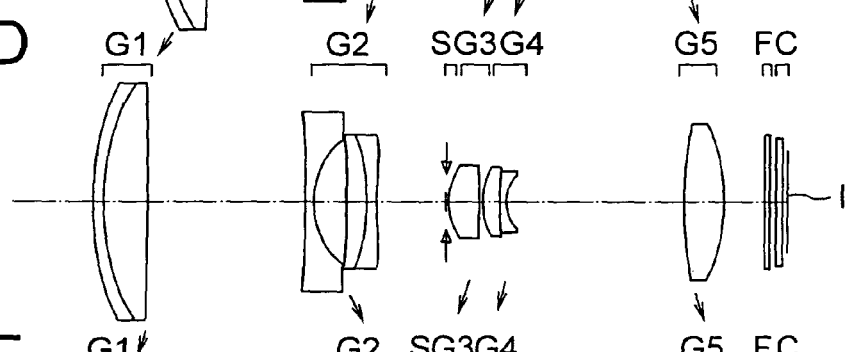
Figure 12E:
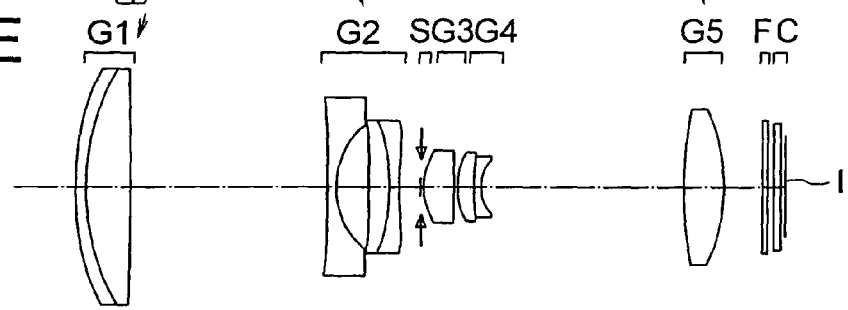
Figure 13A:
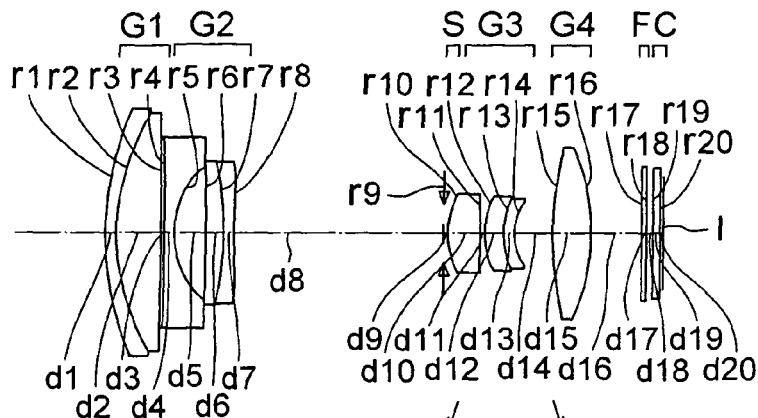
FIGS. 13A to 13E are cross sectional views similar to FIGS. 1A to 1E showing a zoom lens according to a thirteenth embodiment of the present invention.
Figure 13B:
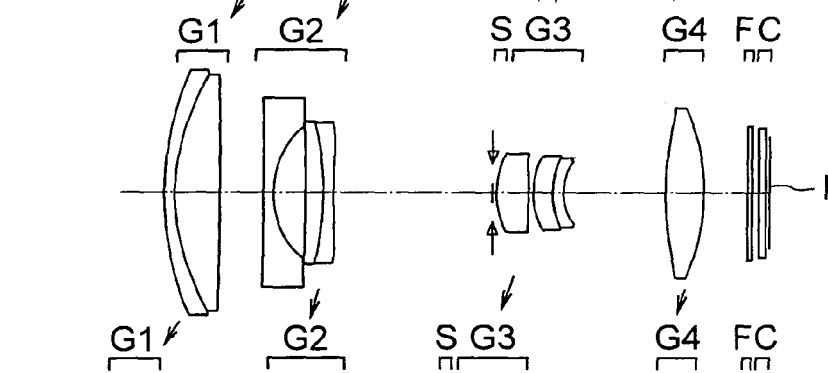
Figure 13C:
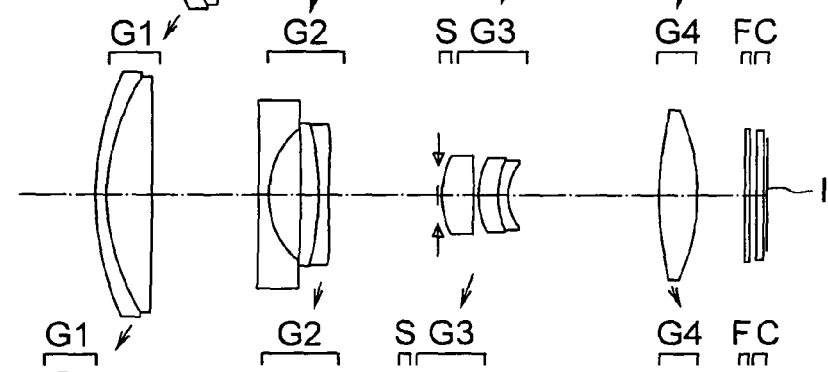
Figure 13D:
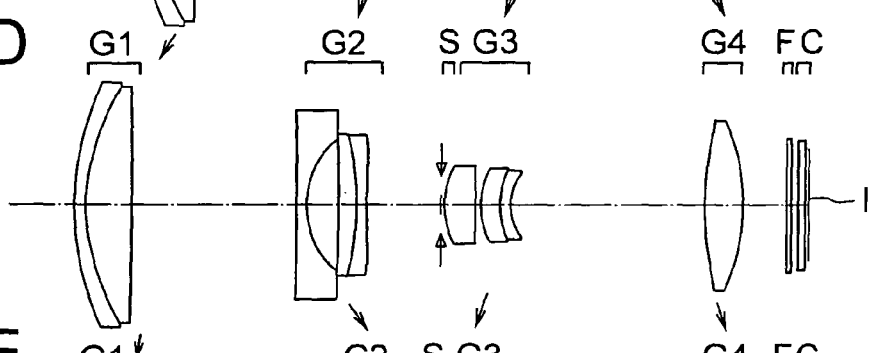
Figure 13E:
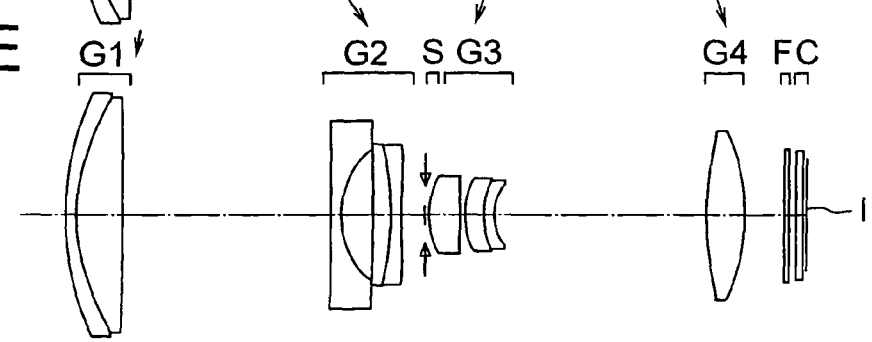
Figure 14A:
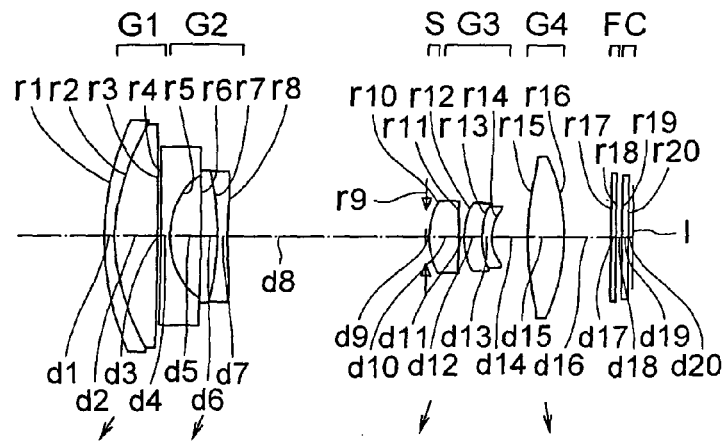
FIGS. 14A to 14E are cross sectional views similar to FIGS. 1A to 1E showing a zoom lens according to a fourteenth embodiment of the present invention.
Figure 14B:
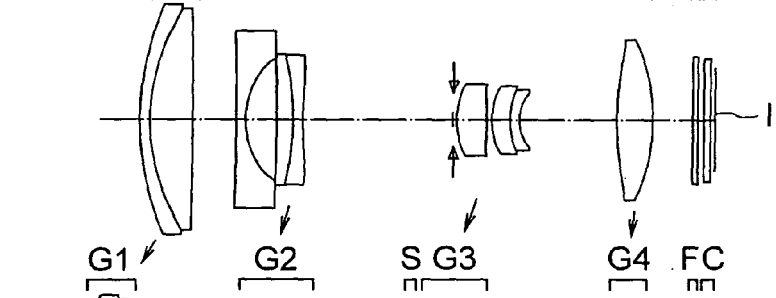
Figure 14C:
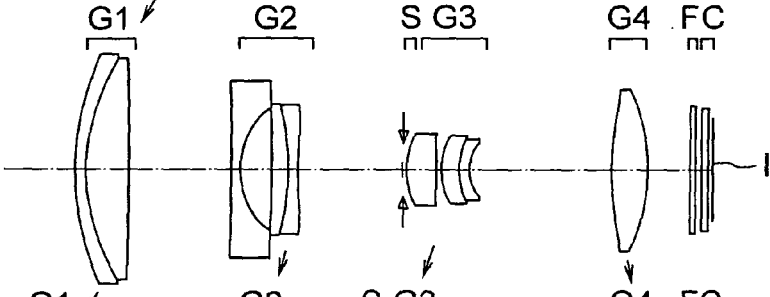
Figure 14D:
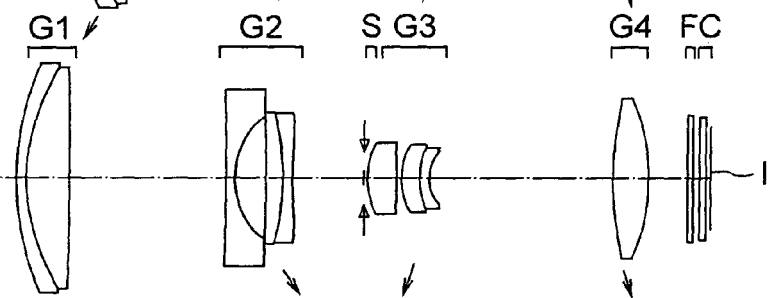
Figure 14E:
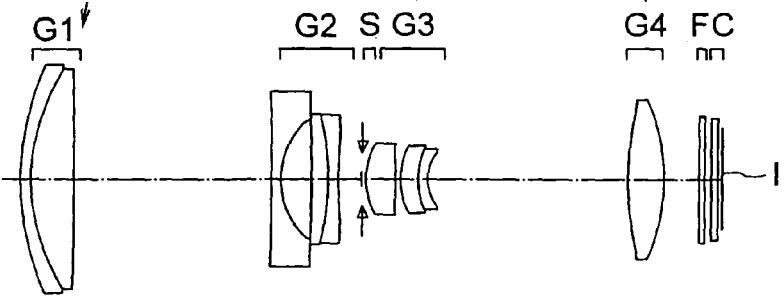
Figure 15A:
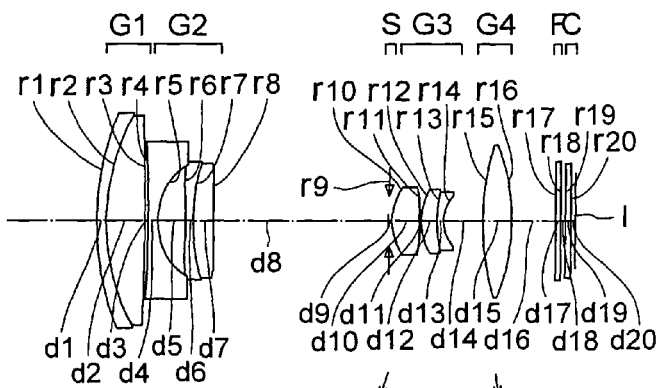
FIGS. 15A to 15E are cross sectional views similar to FIGS. 1A to 1E showing a zoom lens according to a fifteenth embodiment of the present invention.
Figure 15B:
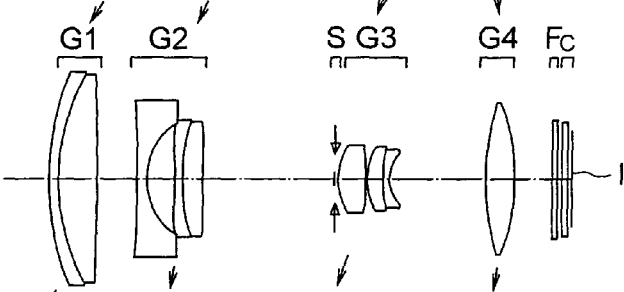
Figure 15C:
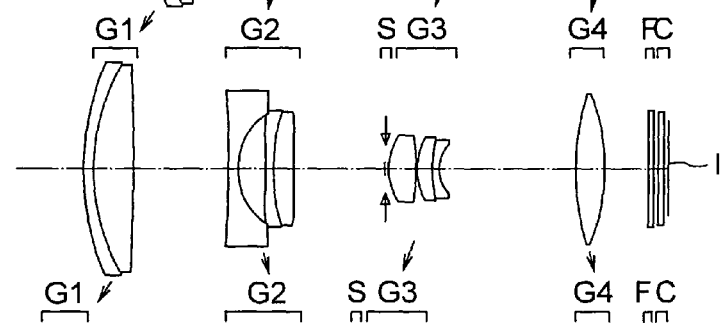
Figure 15D:
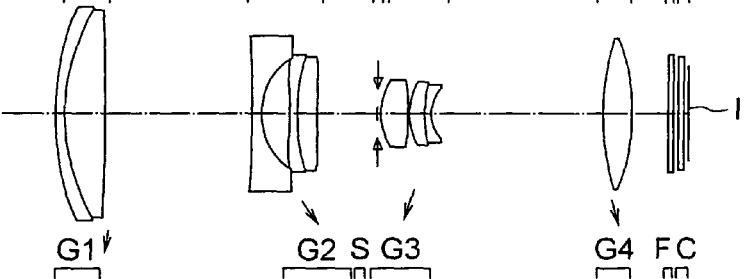
Figure 15E:
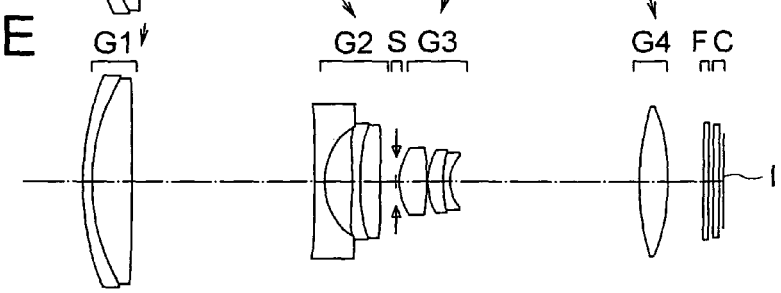
Figure 16A:
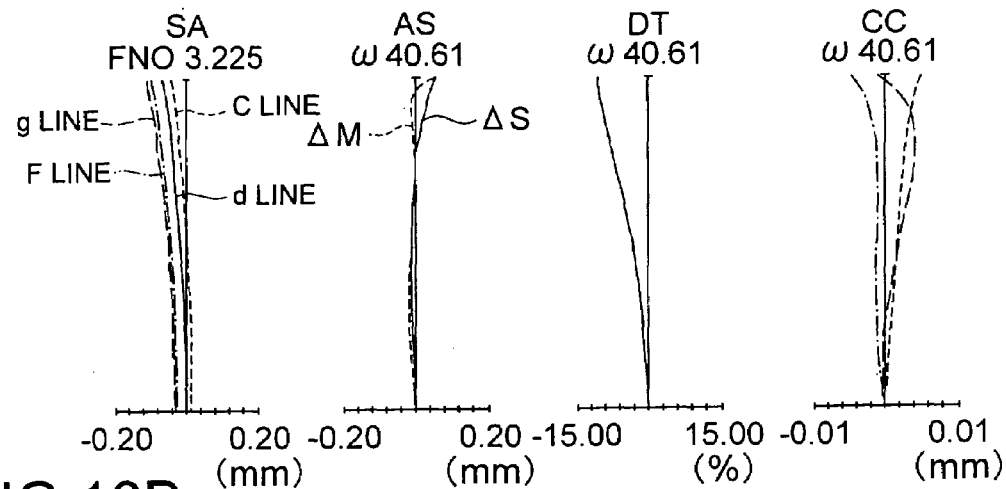
FIGS. 16A, 16B, and 16C are aberration diagrams of the zoom lens according to the first embodiment in the state in which the zoom lens is focused on an object point at infinity.
Figure 16B:
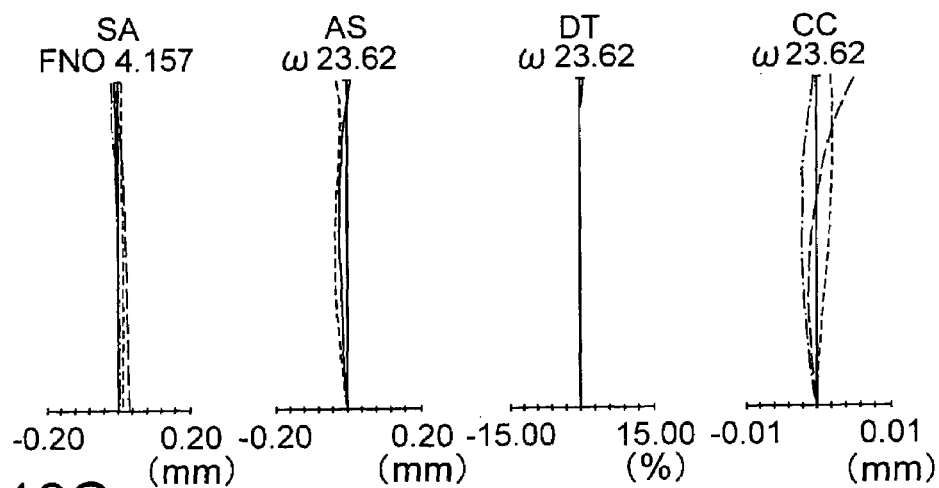
Figure 16C:
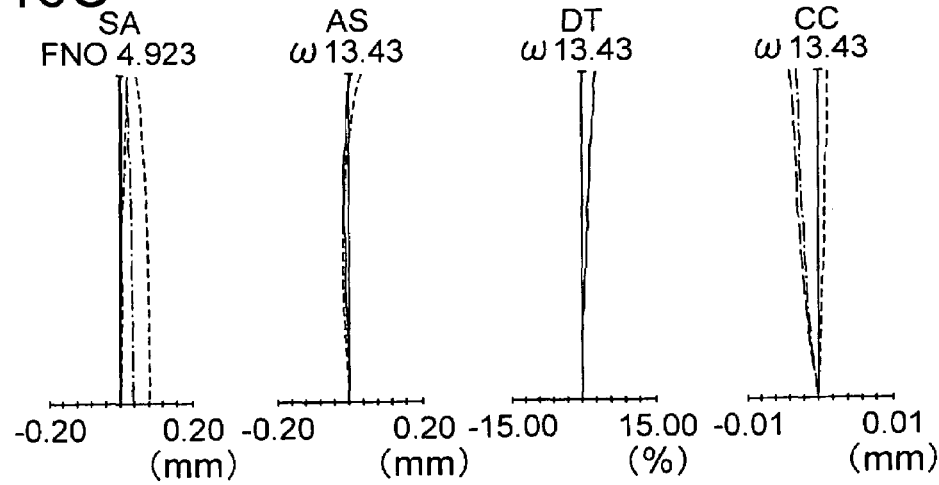
Figure 17D:
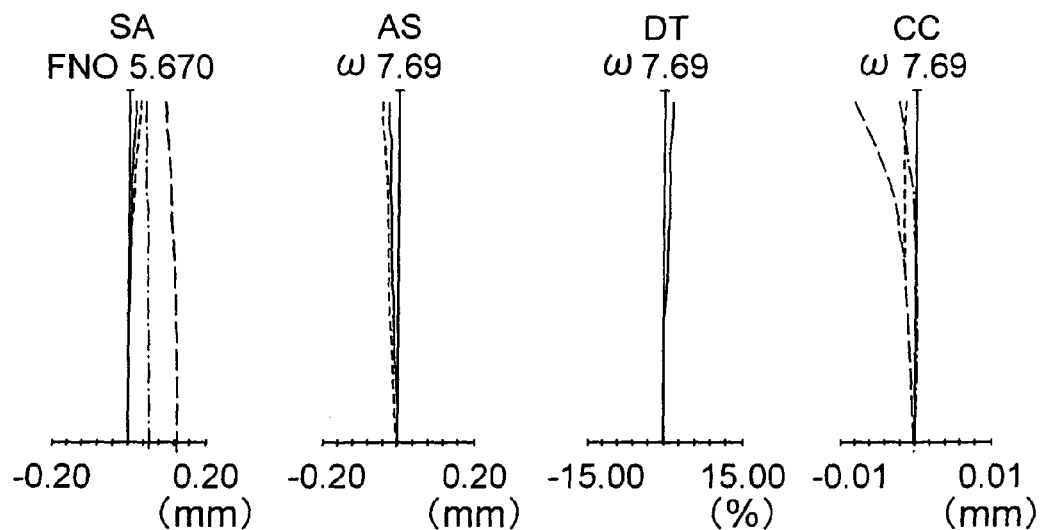
FIGS. 17D and 17E are further aberration diagrams of the zoom lens according to the first embodiment in the state in which the zoom lens is focused on an object point at infinity.
Figure 17E:
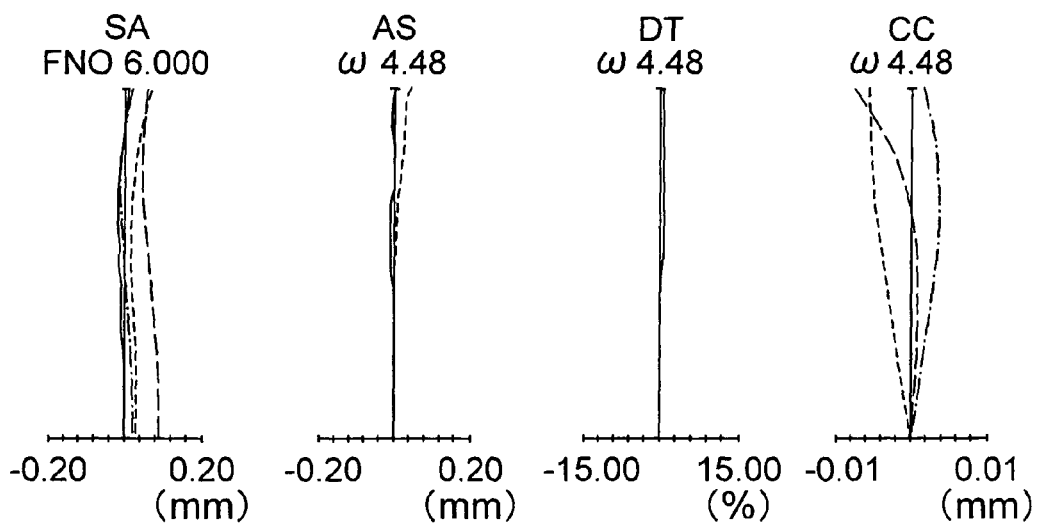
Figure 18A:
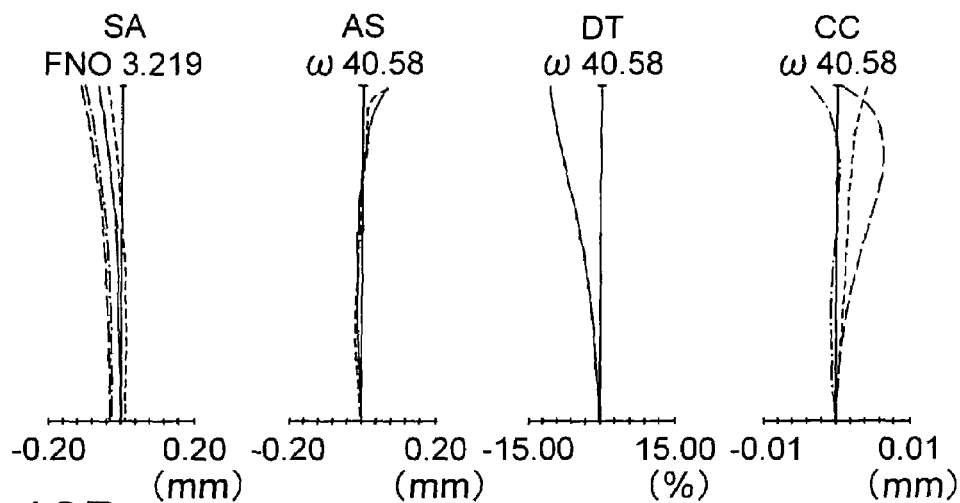
FIGS. 18A, 18B, and 18C are aberration diagrams of the zoom lens according to the second embodiment in the state in which the zoom lens is focused on an object point at infinity.
Figure 18B:
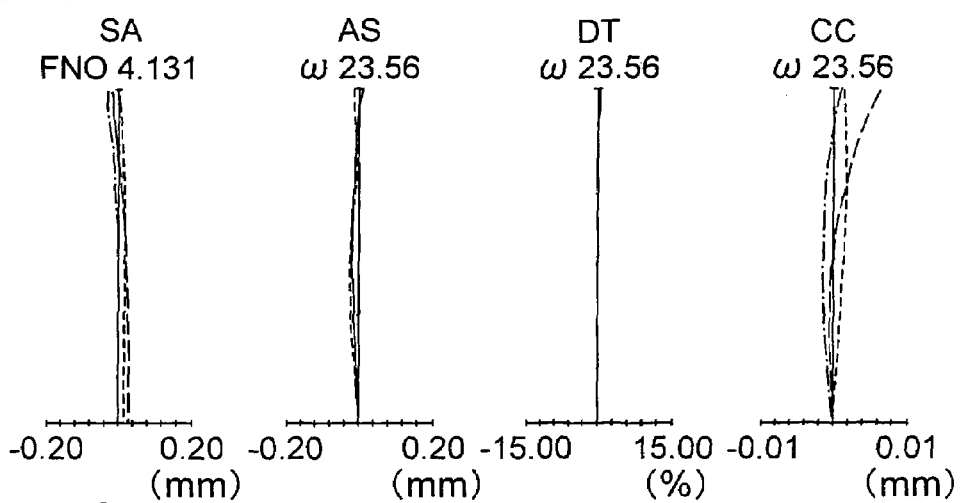
Figure 18C:
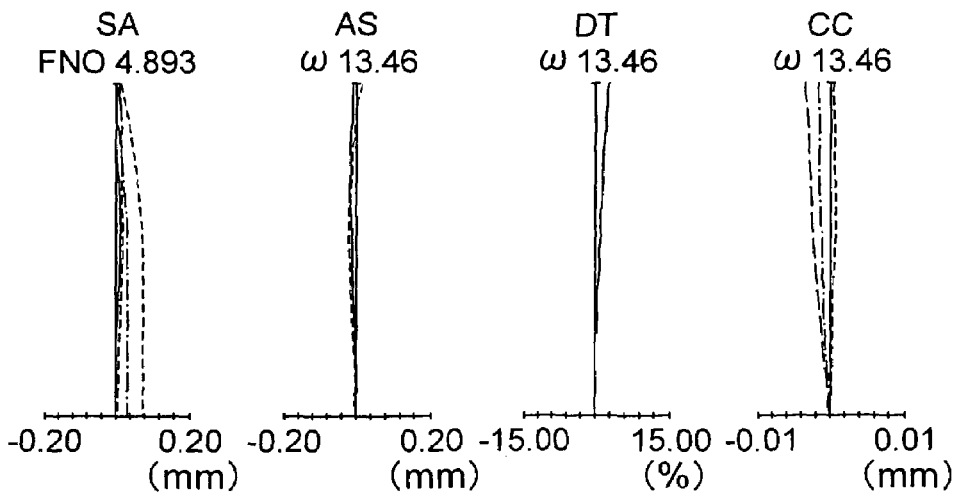
Figure 19D:
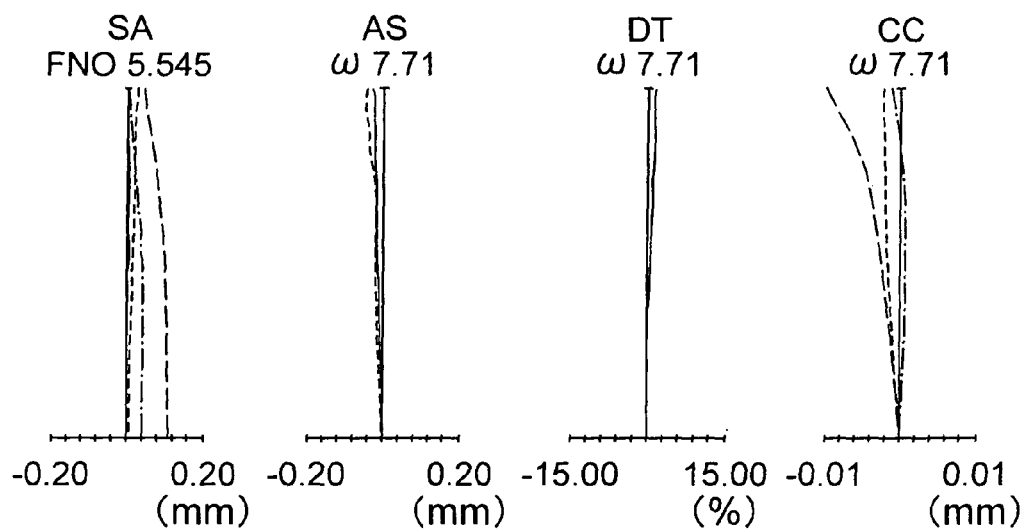
FIGS. 19D and 19E are further aberration diagrams of the zoom lens according to the second embodiment in the state in which the zoom lens is focused on an object point at infinity.
Figure 19E:
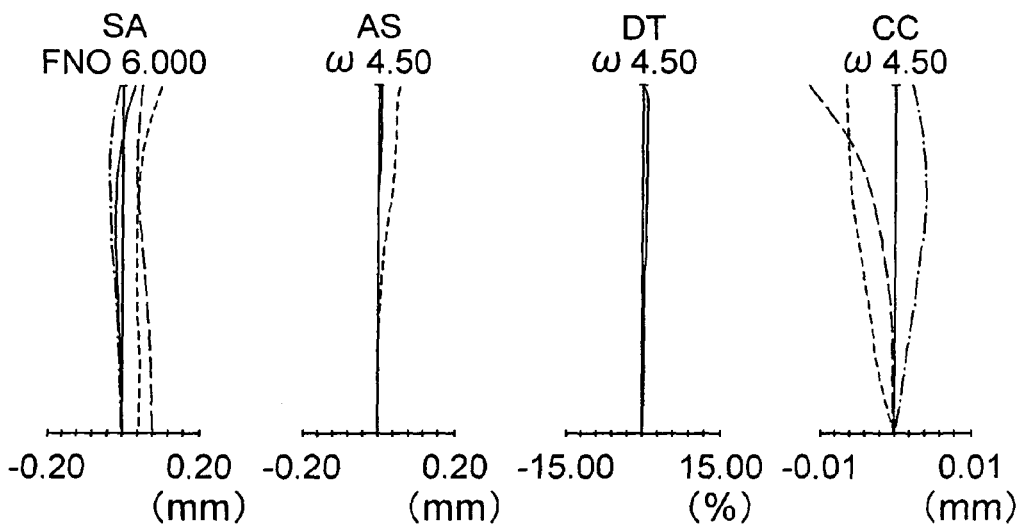
Figure 21D:
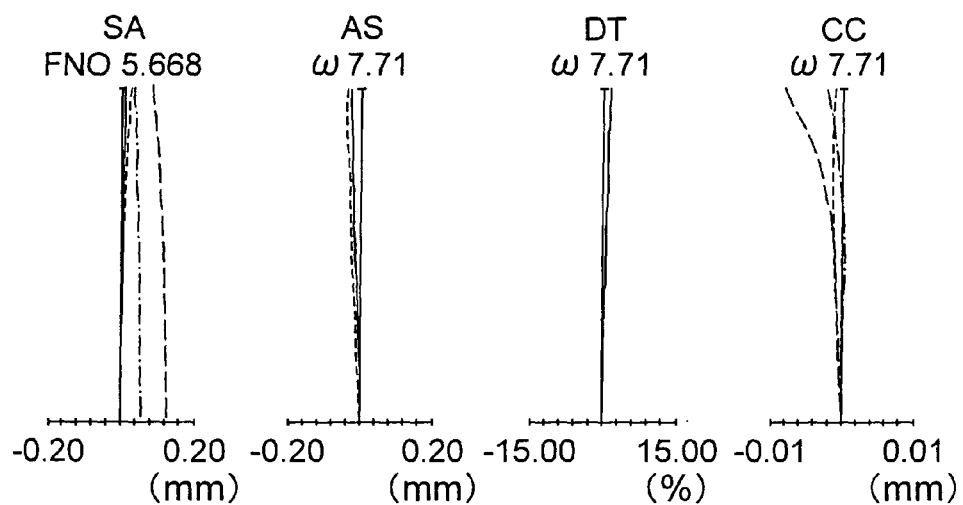
FIGS. 21D and 21E are further aberration diagrams of the zoom lens according to the third embodiment in the state in which the zoom lens is focused on an object point at infinity.
Figure 21E:
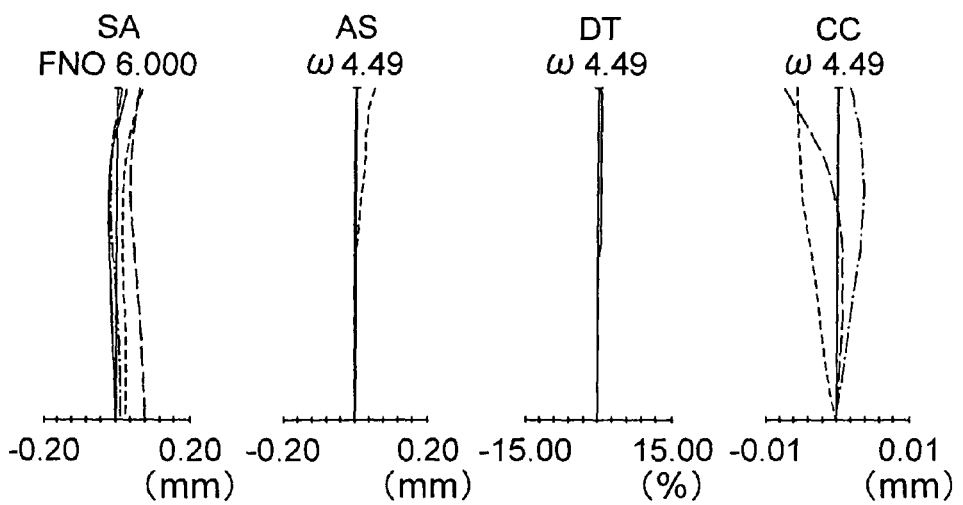
Figure 22A:
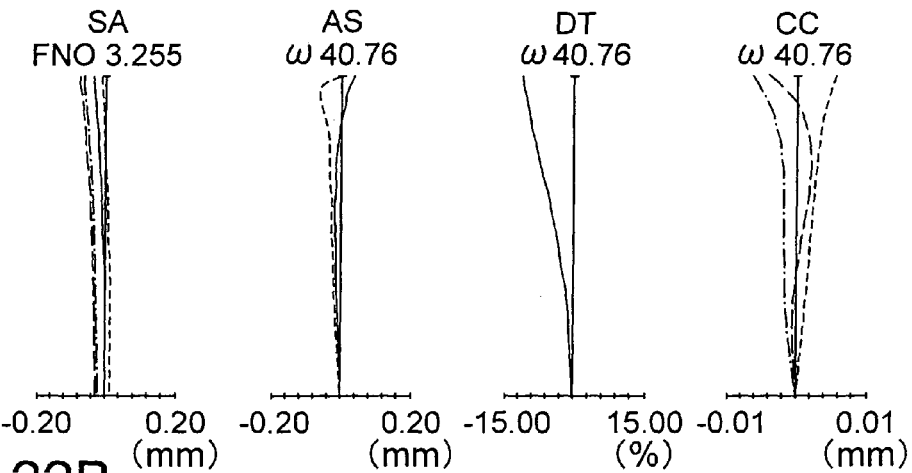
FIGS. 22A, 22B, and 22C are aberration diagrams of the zoom lens according to the fourth embodiment in the state in which the zoom lens is focused on an object point at infinity.
Figure 22B:
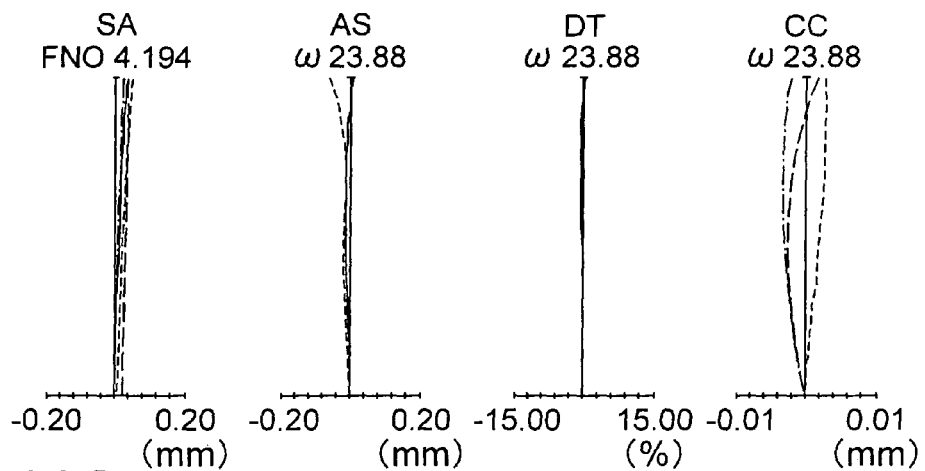
Figure 22C:
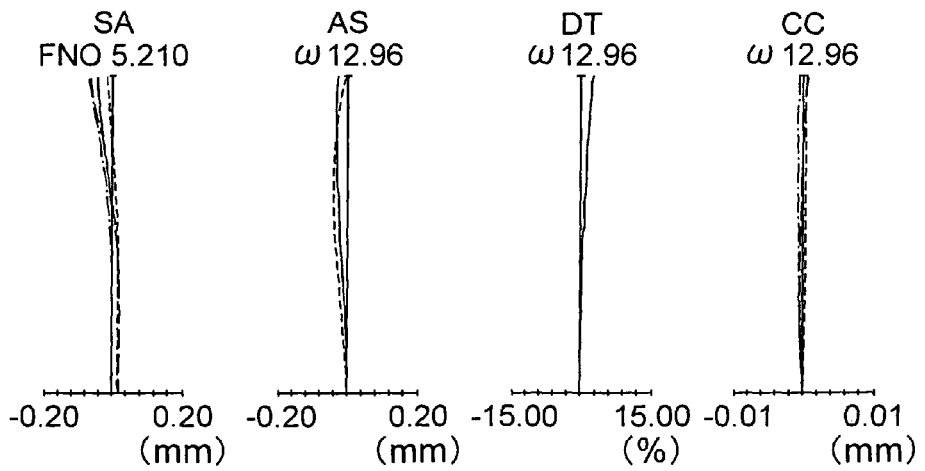
Figure 23D:
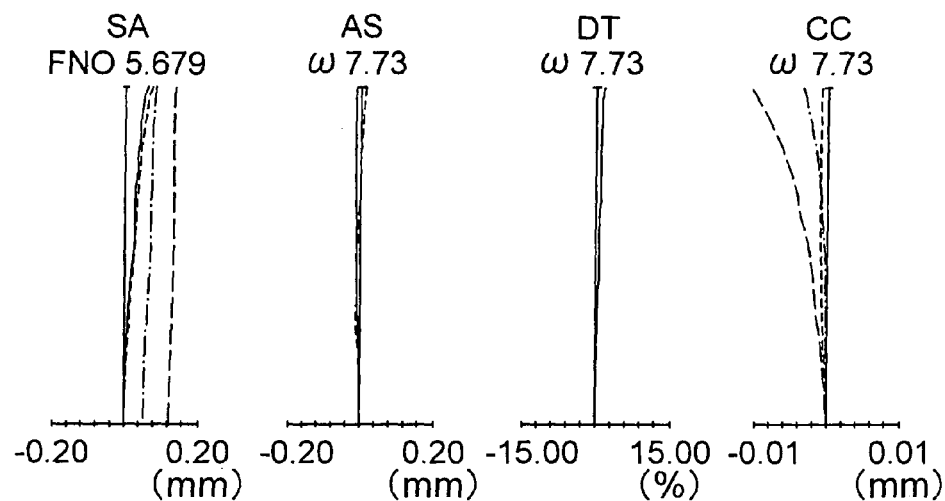
FIGS. 23D and 23E are further aberration diagrams of the zoom lens according to the fourth embodiment in the state in which the zoom lens is focused on an object point at infinity.
Figure 23E:
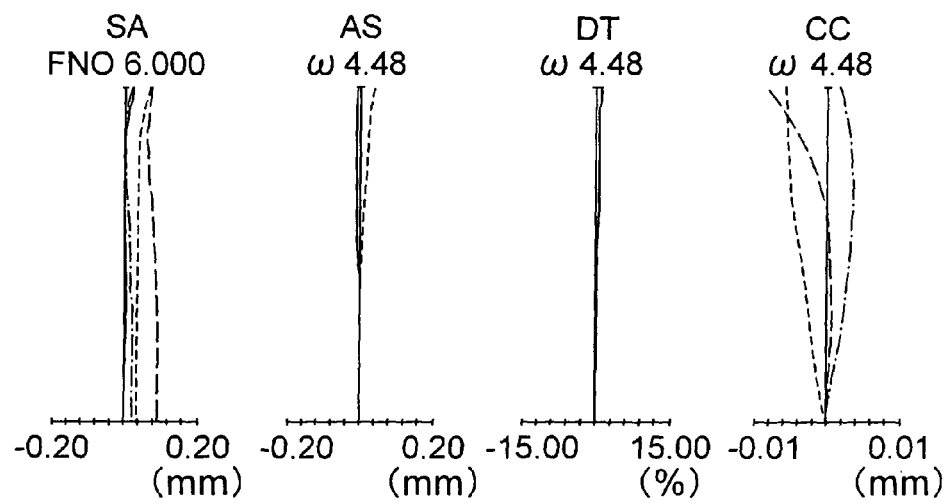
Figure 24A:
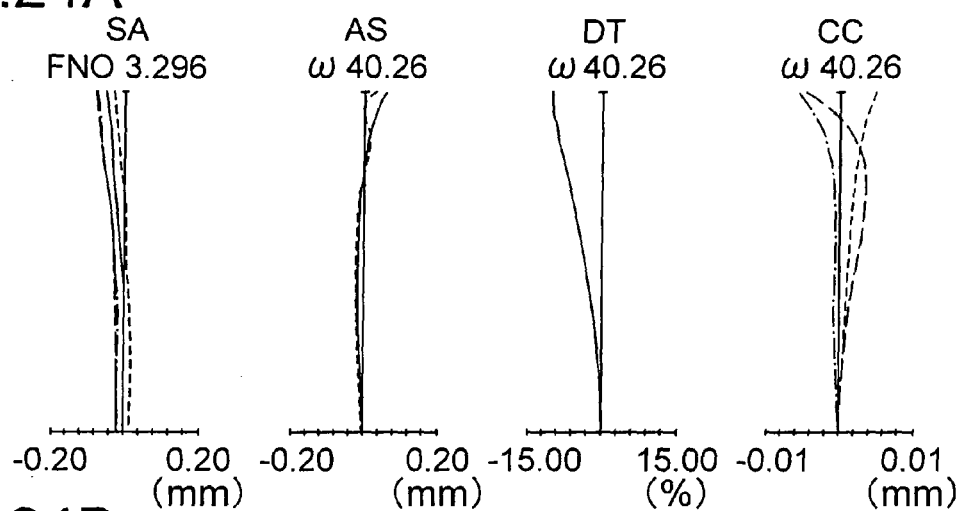
FIGS. 24A, 24B, and 24C are aberration diagrams of the zoom lens according to the fifth embodiment in the state in which the zoom lens is focused on an object point at infinity.
Figure 24B:
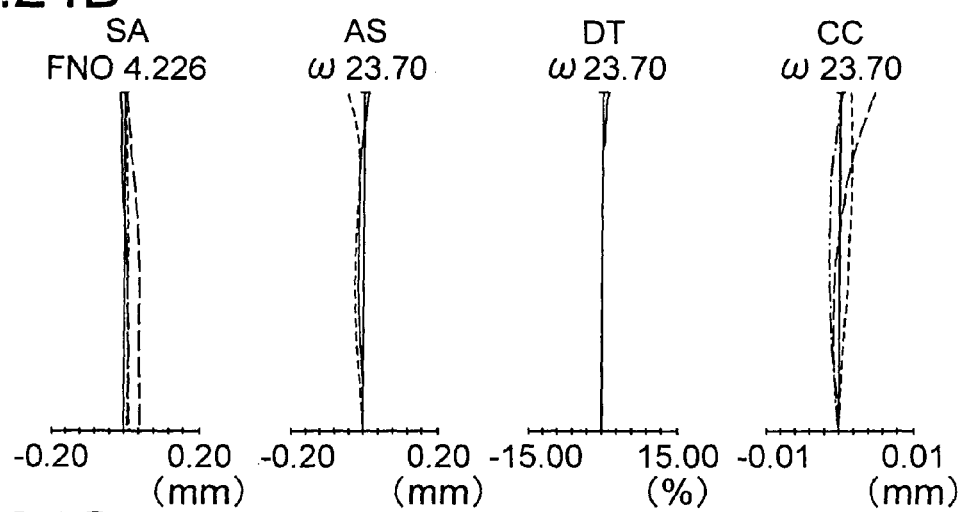
Figure 24C:
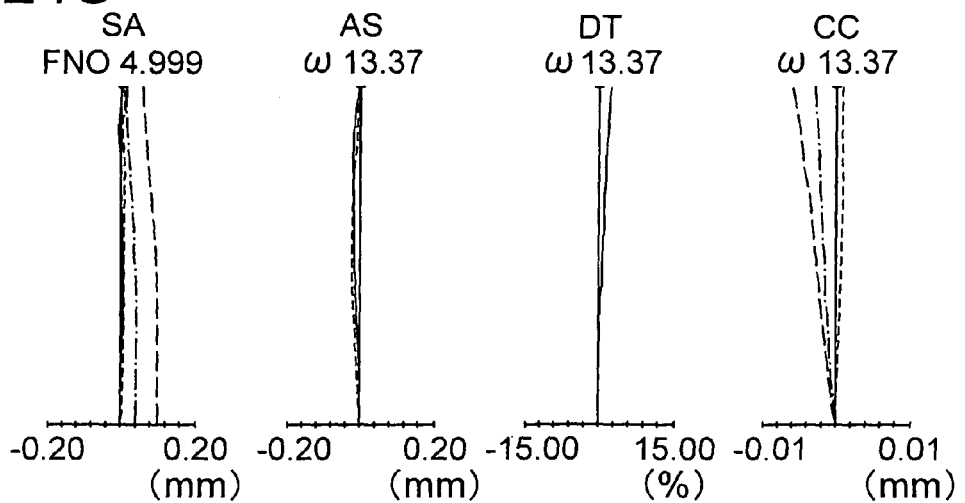
Figure 25D:
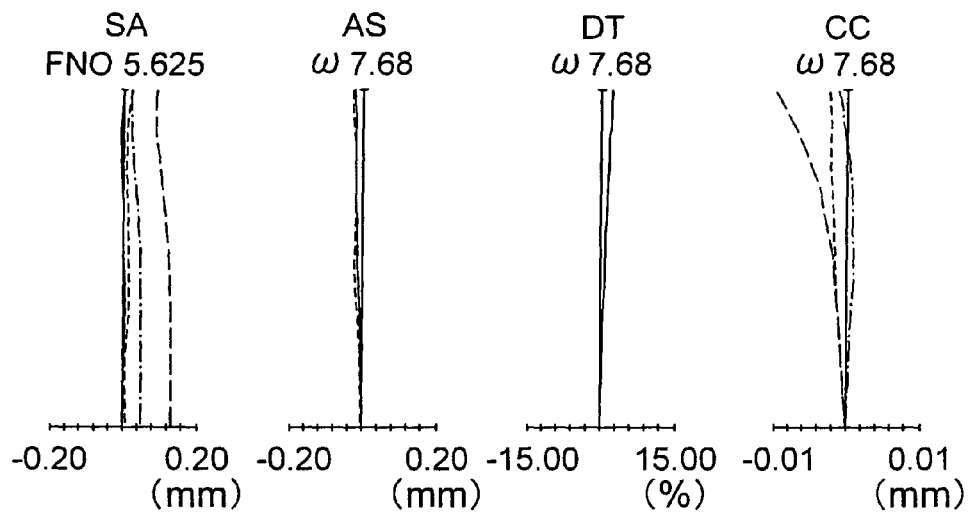
FIGS. 25D and 25E are further aberration diagrams of the zoom lens according to the fifth embodiment in the state in which the zoom lens is focused on an object point at infinity.
Figure 25E:
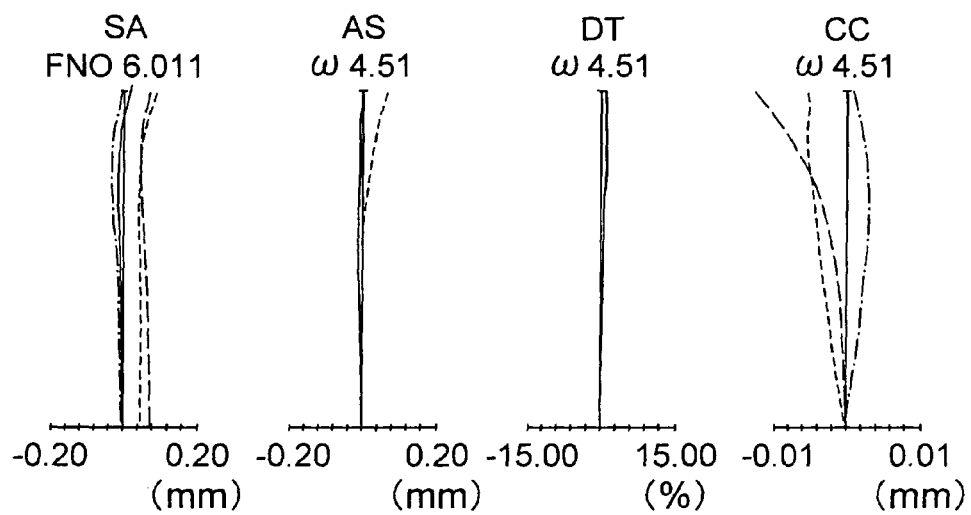
Figure 26A:
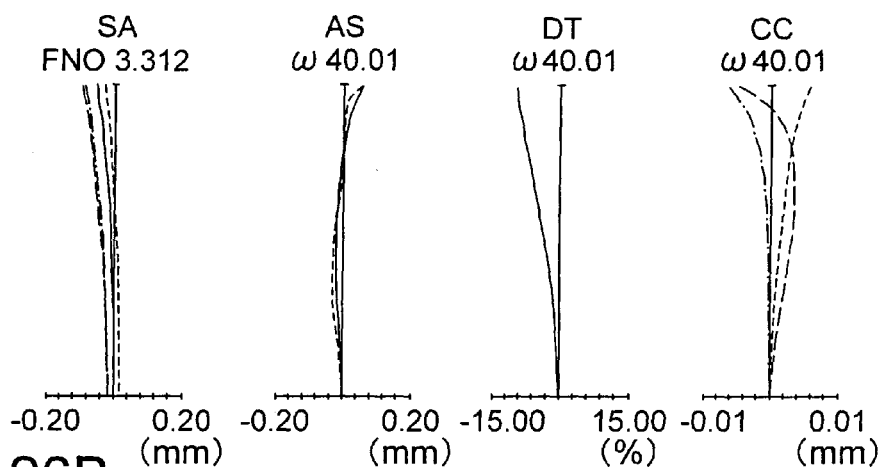
FIGS. 26A, 26B, and 26C are aberration diagrams of the zoom lens according to the sixth embodiment in the state in which the zoom lens is focused on an object point at infinity.
Figure 26B:
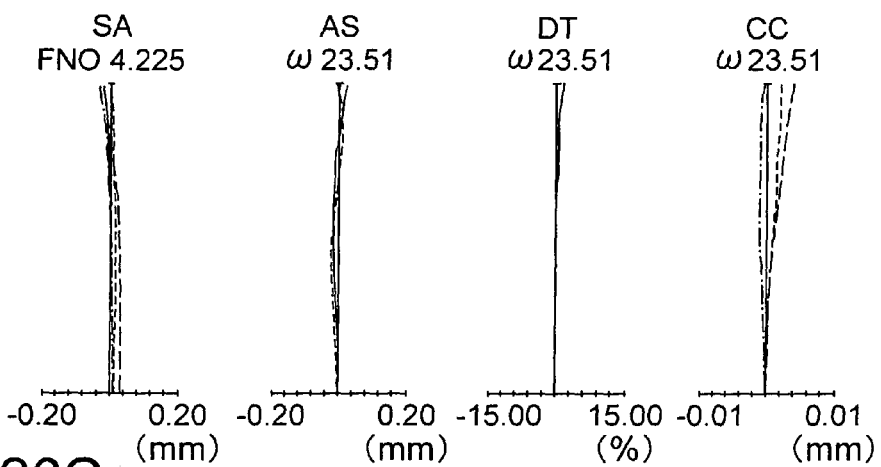
Figure 26C:
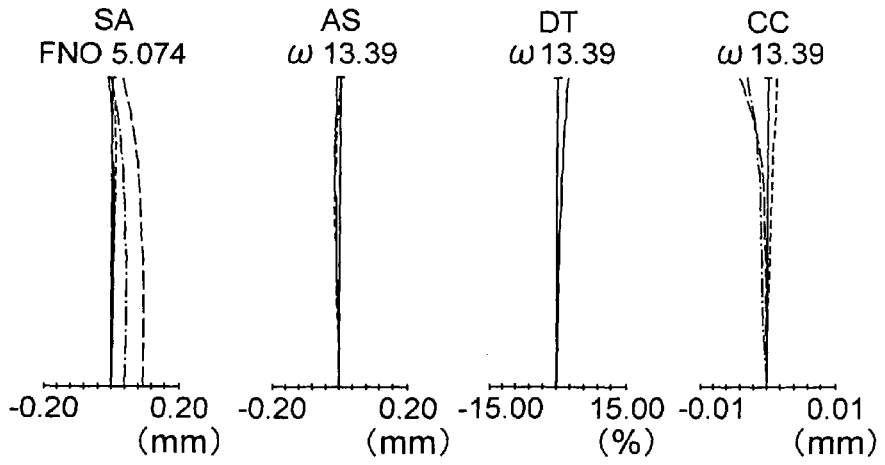
Figure 27D:
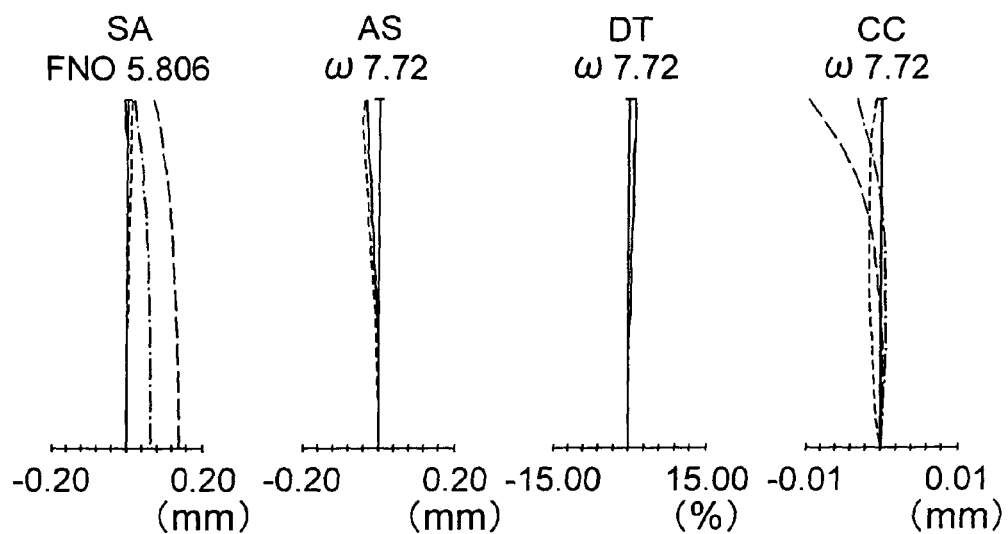
FIGS. 27D and 27E are further aberration diagrams of the zoom lens according to the sixth embodiment in the state in which the zoom lens is focused on an object point at infinity.
Figure 27E:
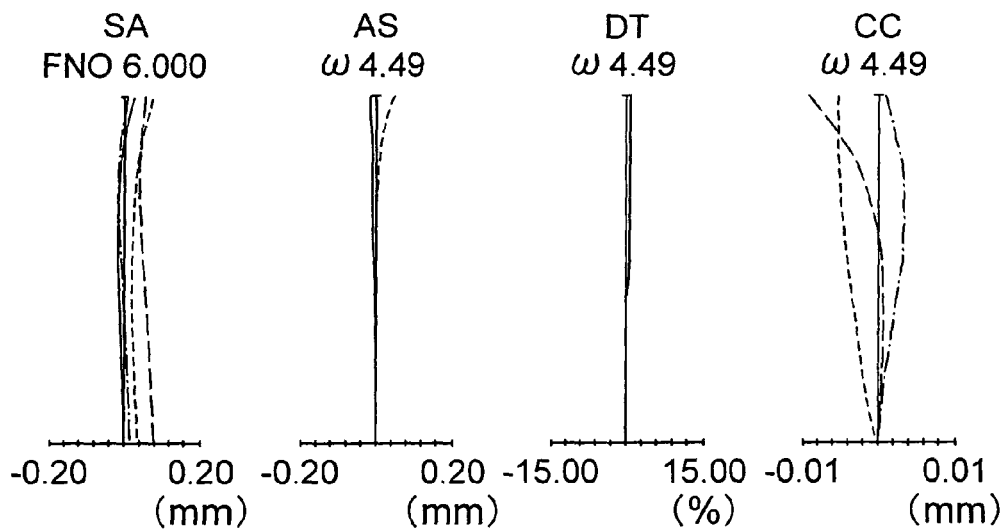
Figure 28A:
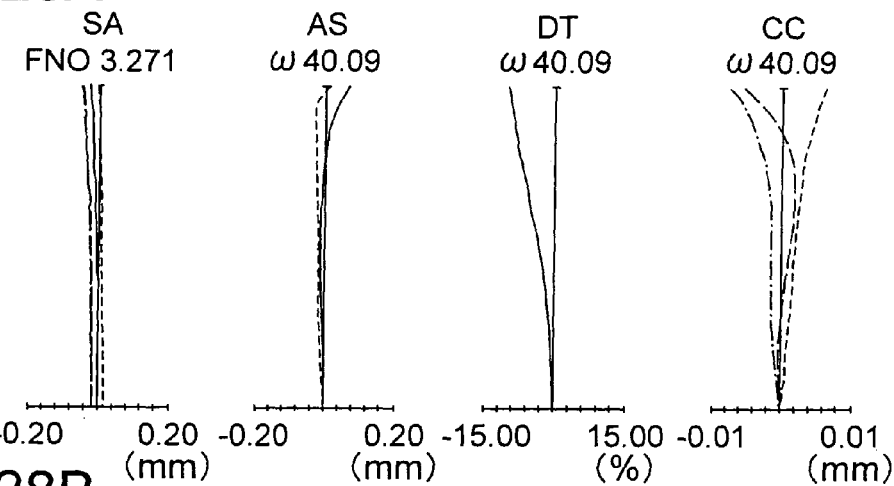
FIGS. 28A, 28B, and 28C are aberration diagrams of the zoom lens according to the seventh embodiment in the state in which the zoom lens is focused on an object point at infinity.
Figure 28B:
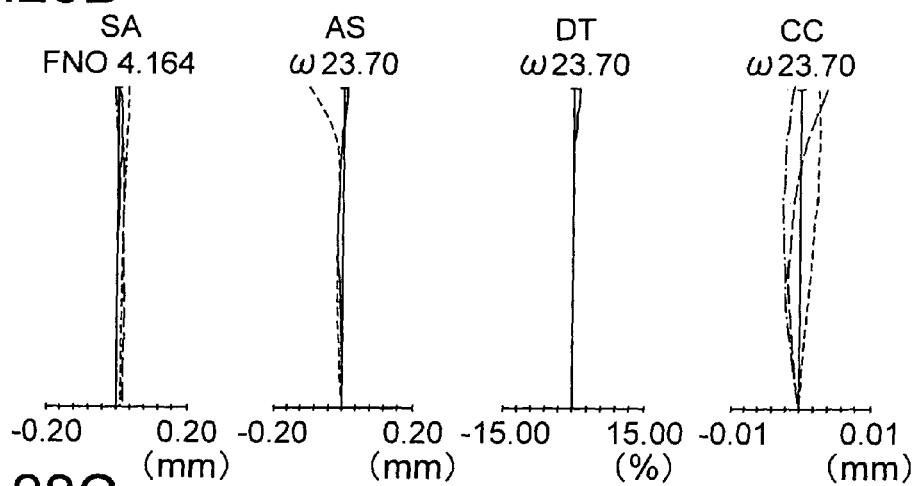
Figure 28C:
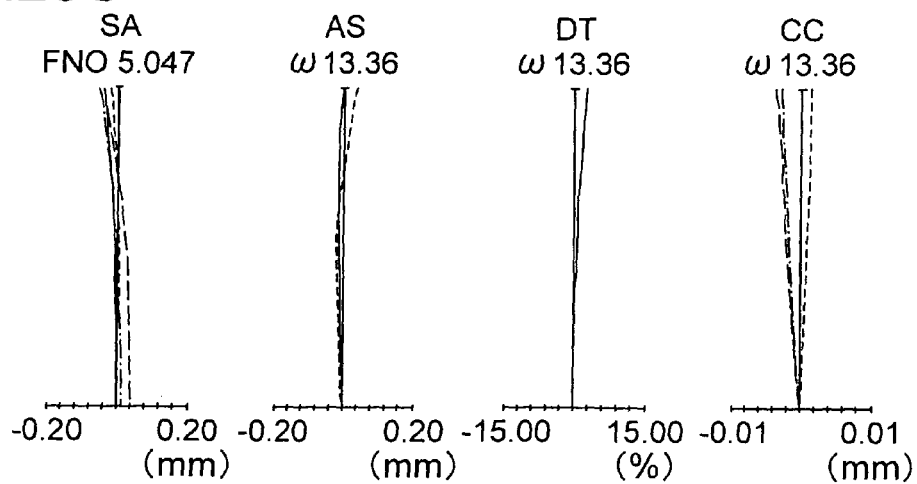
Figure 29D:
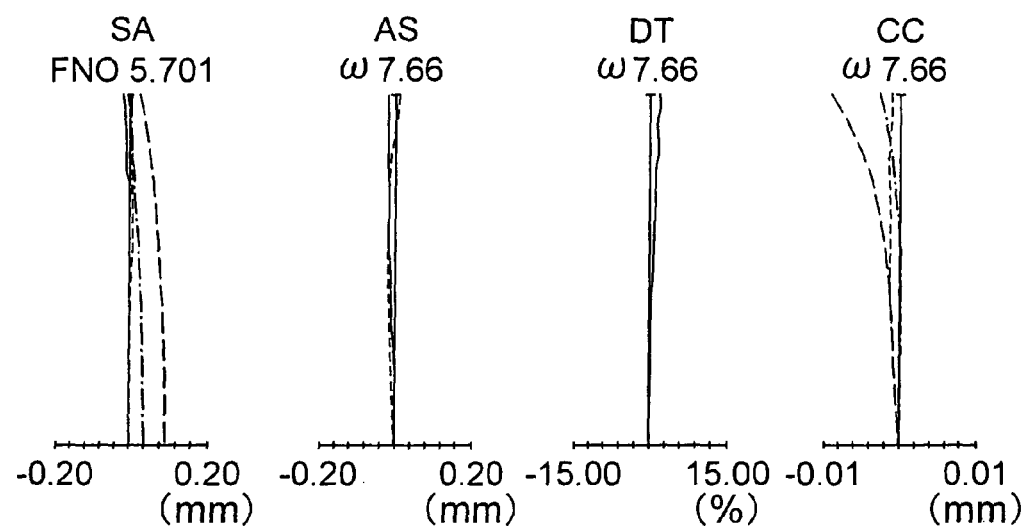
FIGS. 29D and 29E are further aberration diagrams of the zoom lens according to the seventh embodiment in the state in which the zoom lens is focused on an object point at infinity.
Figure 29E:
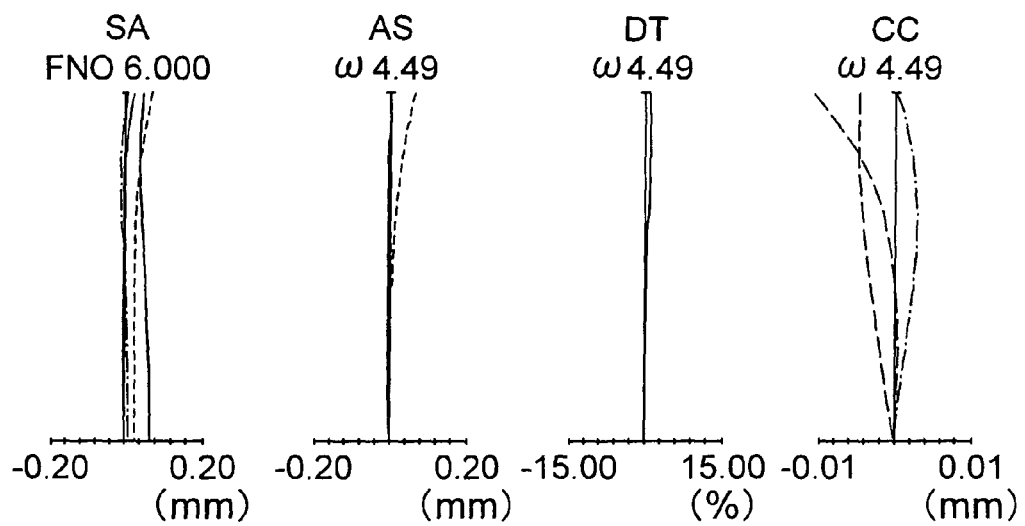
Figure 30A:
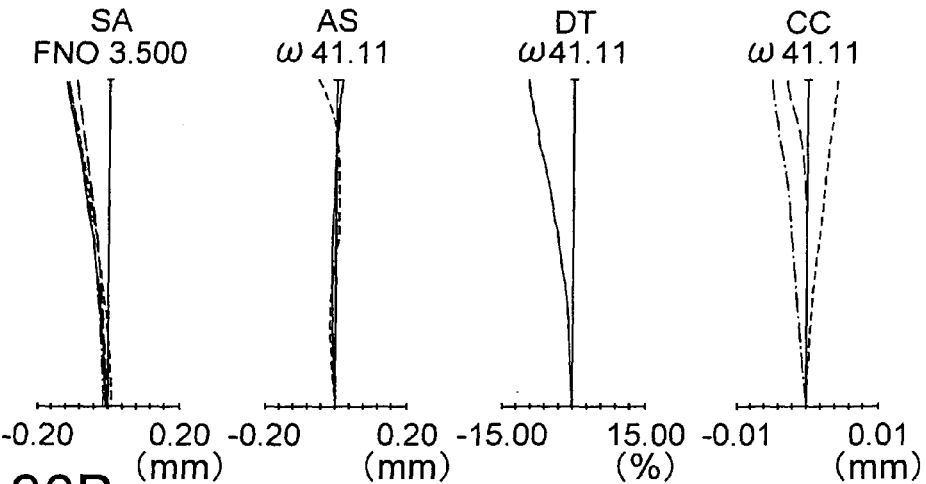
FIGS. 30A, 30B, and 30C are aberration diagrams of the zoom lens according to the eighth embodiment in the state in which the zoom lens is focused on an object point at infinity.
Figure 30B:
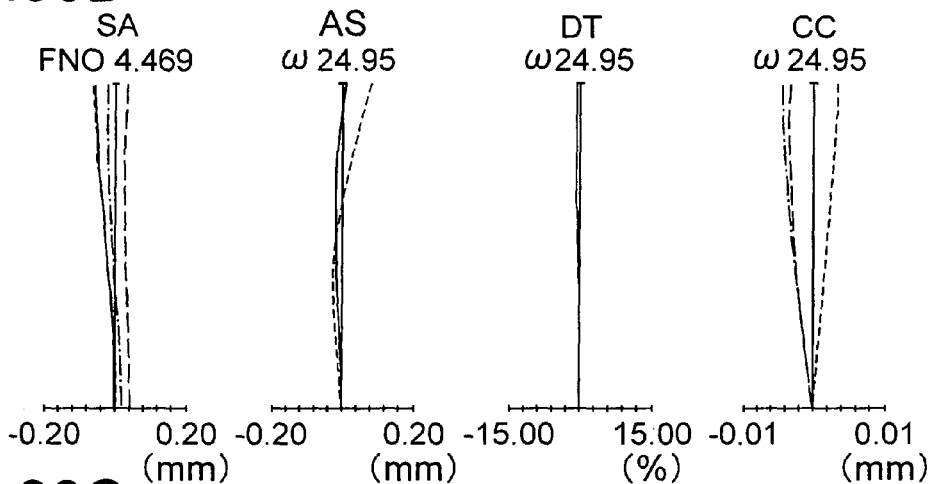
Figure 30C:
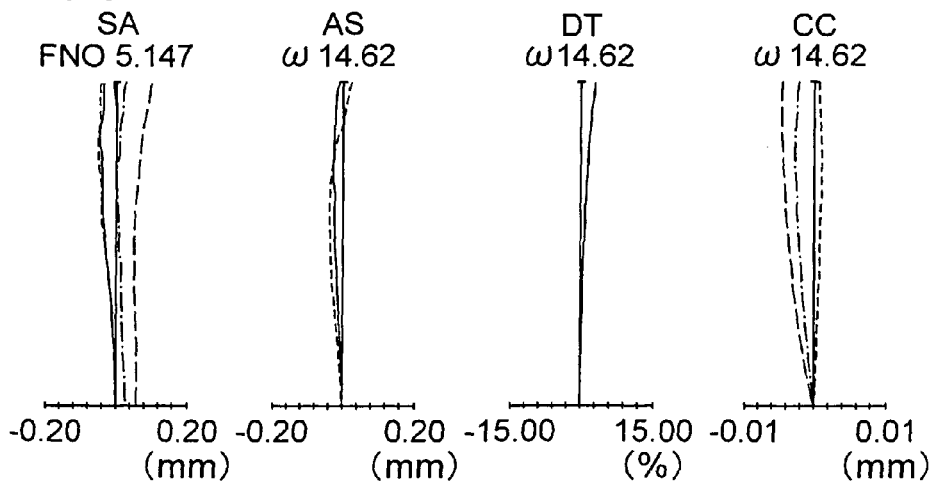
Figure 31D:
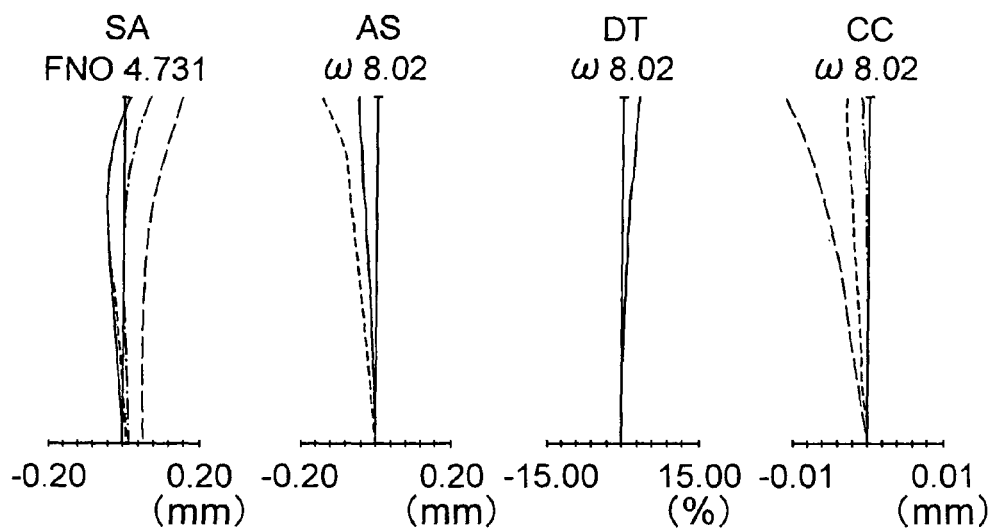
Figure 31E:
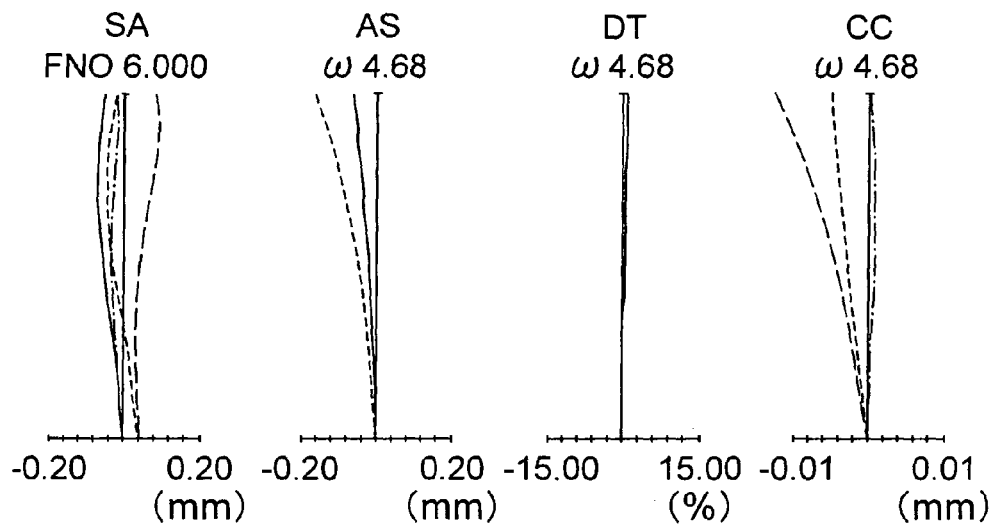
Figure 32A:
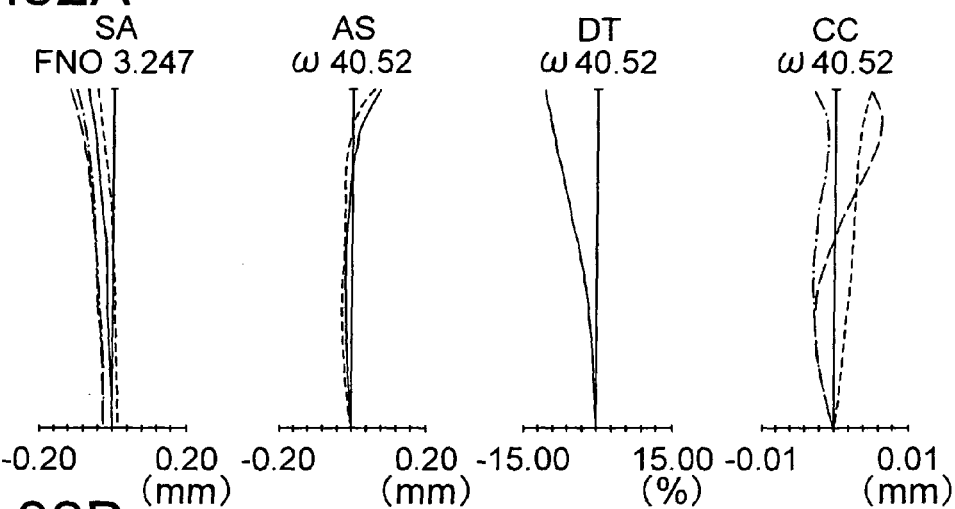
FIGS. 32A, 32B, and 32C are aberration diagrams of the zoom lens according to the ninth embodiment in the state in which the zoom lens is focused on an object point at infinity.
Figure 32B:
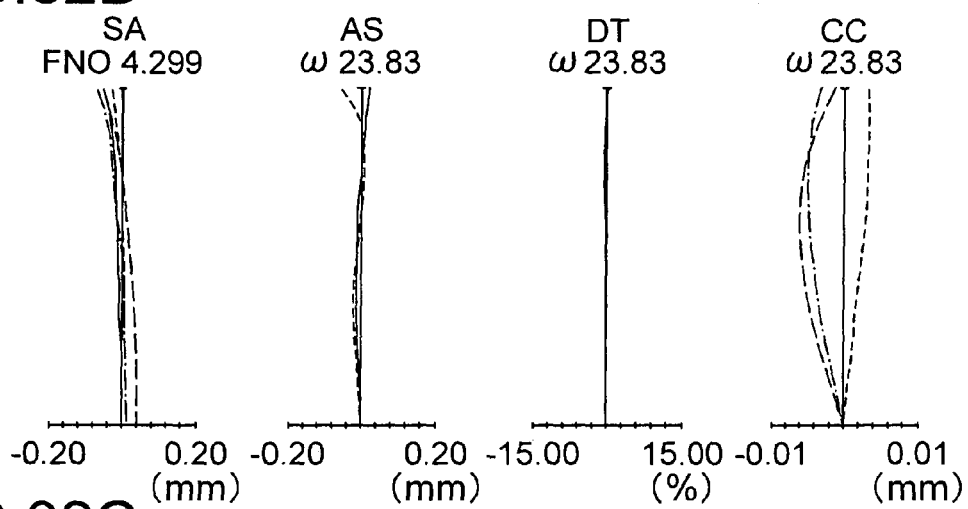
Figure 32C:
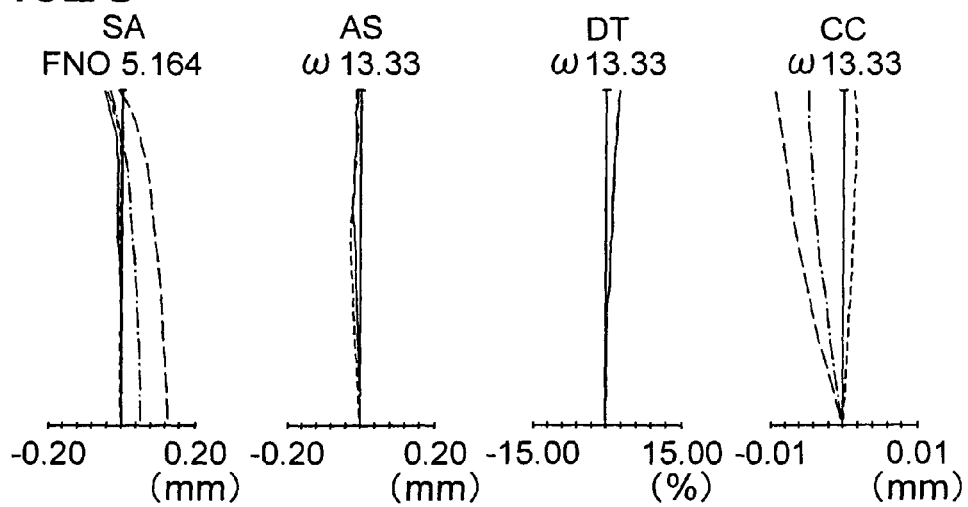
Figure 33D:
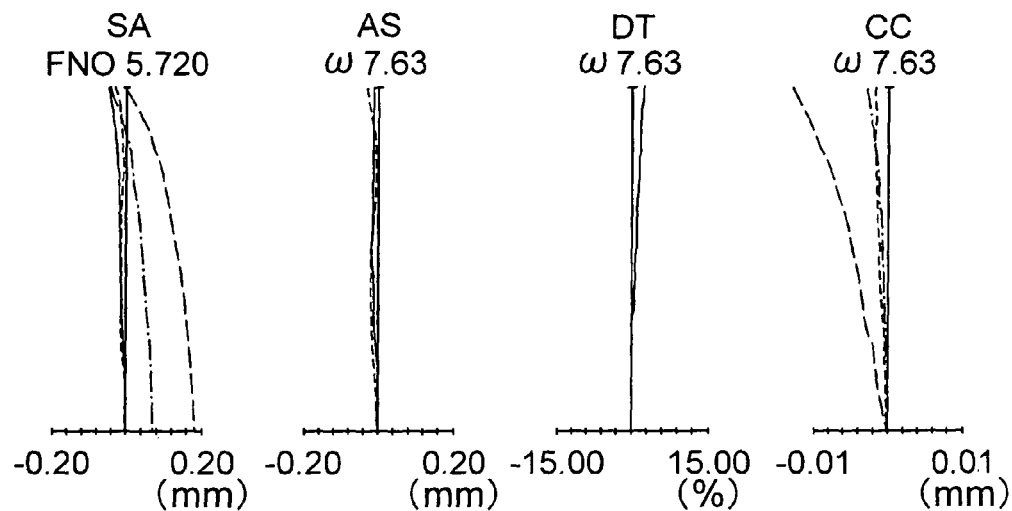
FIGS. 33D and 33E are further aberration diagrams of the zoom lens according to the ninth embodiment in the state in which the zoom lens is focused on an object point at infinity.
Figure 33E:
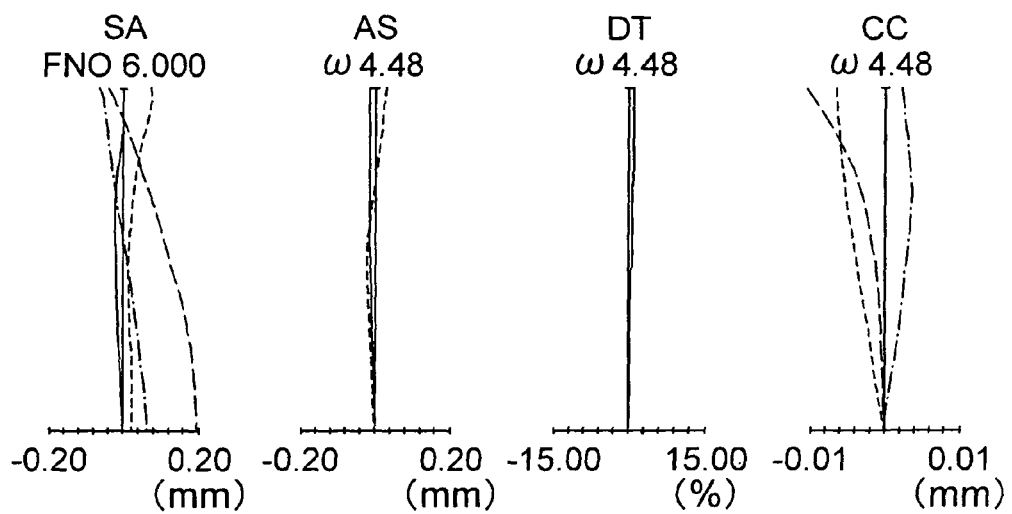
Figure 34A:
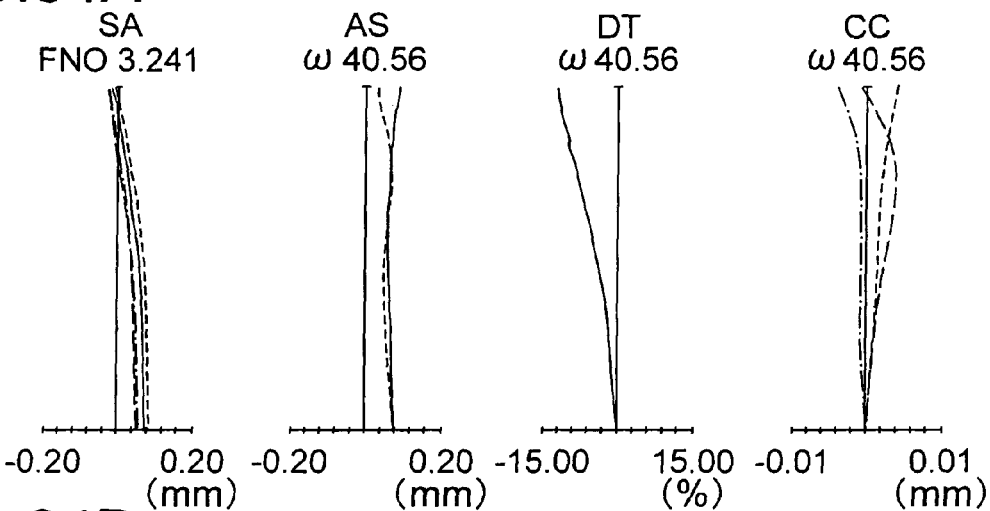
FIGS. 34A, 34B, and 34C are aberration diagrams of the zoom lens according to the tenth embodiment in the state in which the zoom lens is focused on an object point at infinity.
Figure 34B:
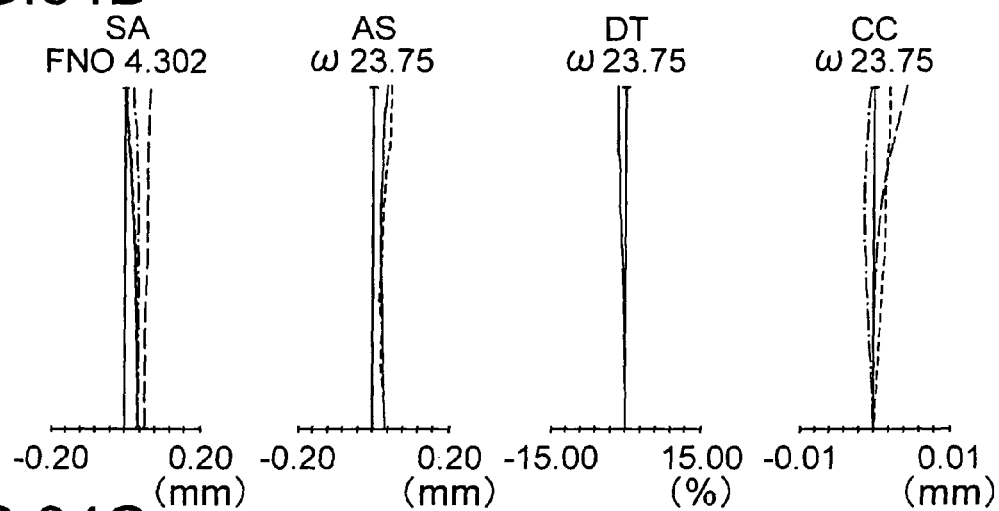
Figure 34C:
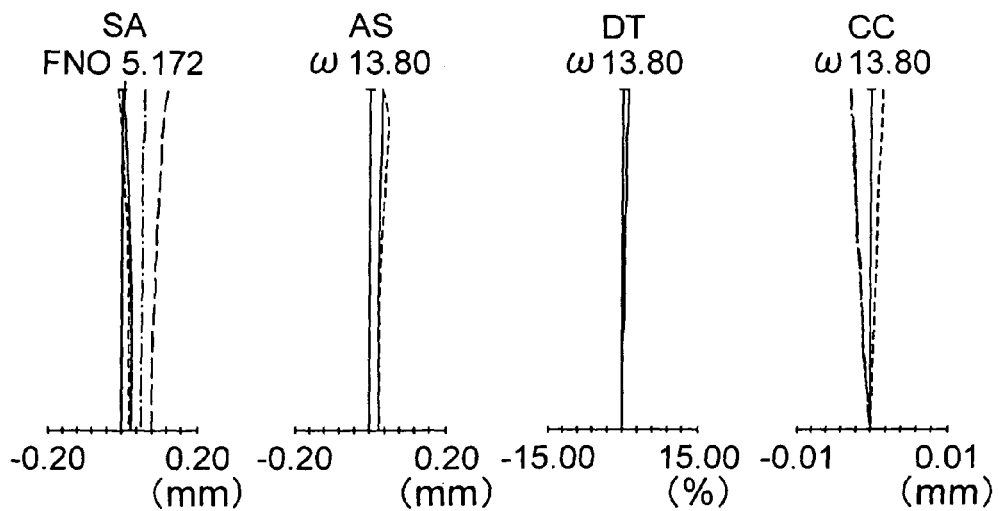
Figure 35D:
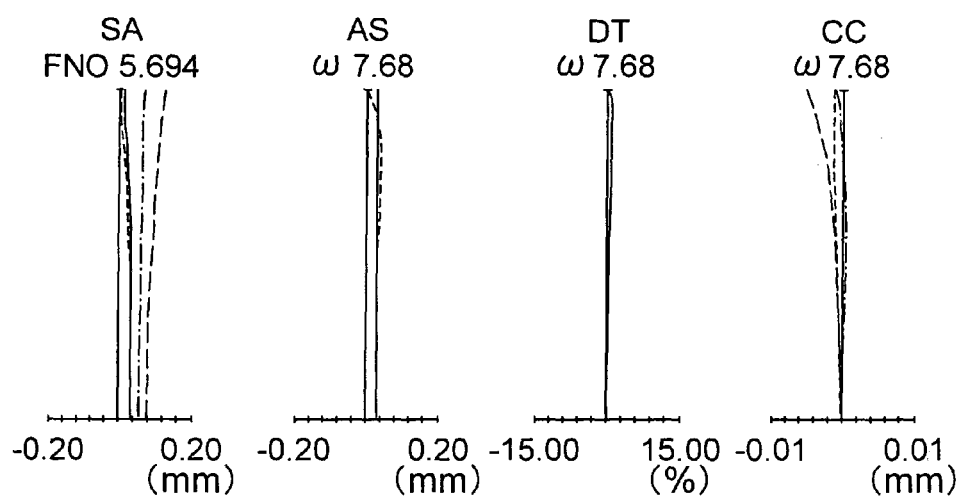
FIGS. 35D and 35E are further aberration diagrams of the zoom lens according to the tenth embodiment in the state in which the zoom lens is focused on an object point at infinity.
Figure 35E:
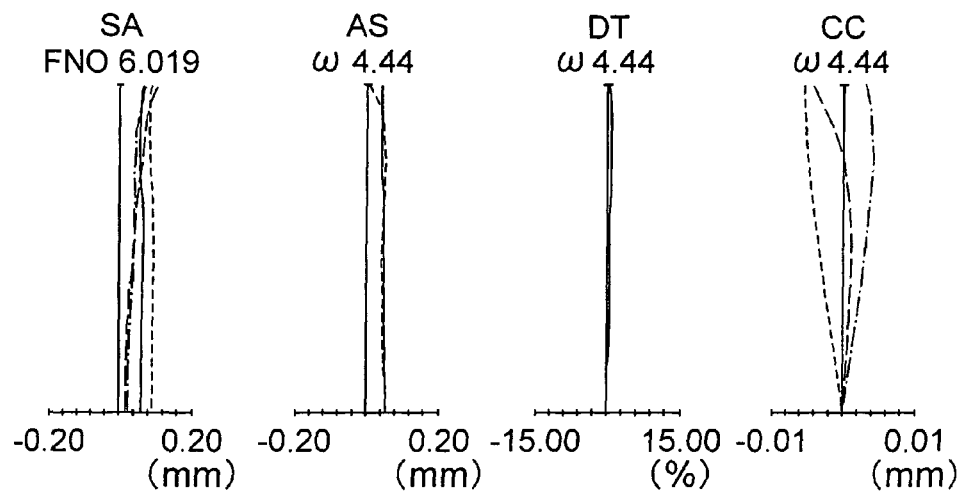
Figure 36A:
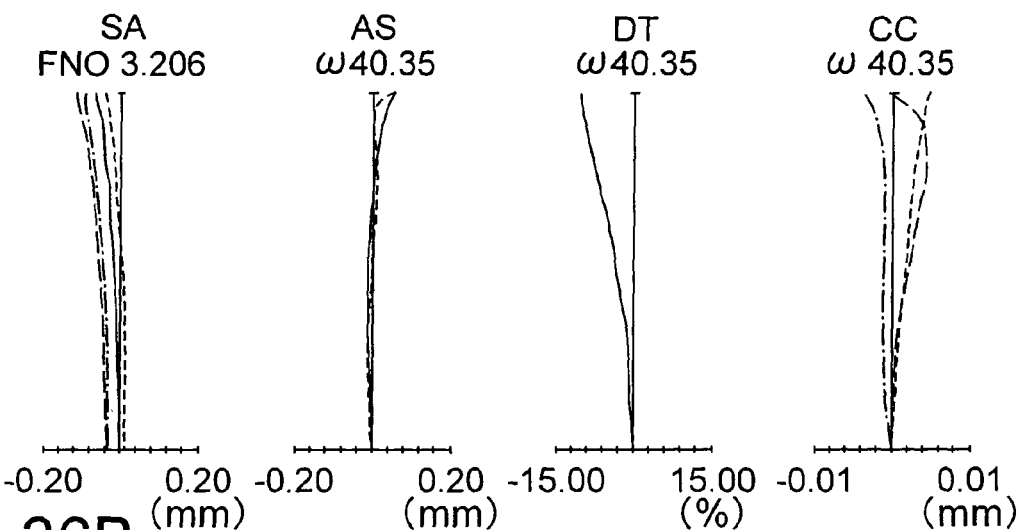
FIGS. 36A, 36B, and 36C are aberration diagrams of the zoom lens according to the eleventh embodiment in the state in which the zoom lens is focused on an object point at infinity.
Figure 36B:
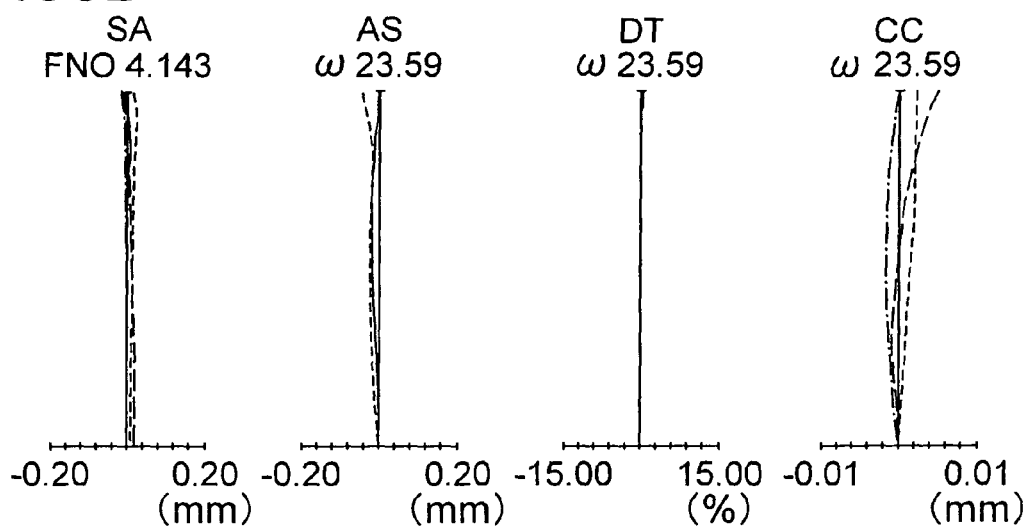
Figure 36C:
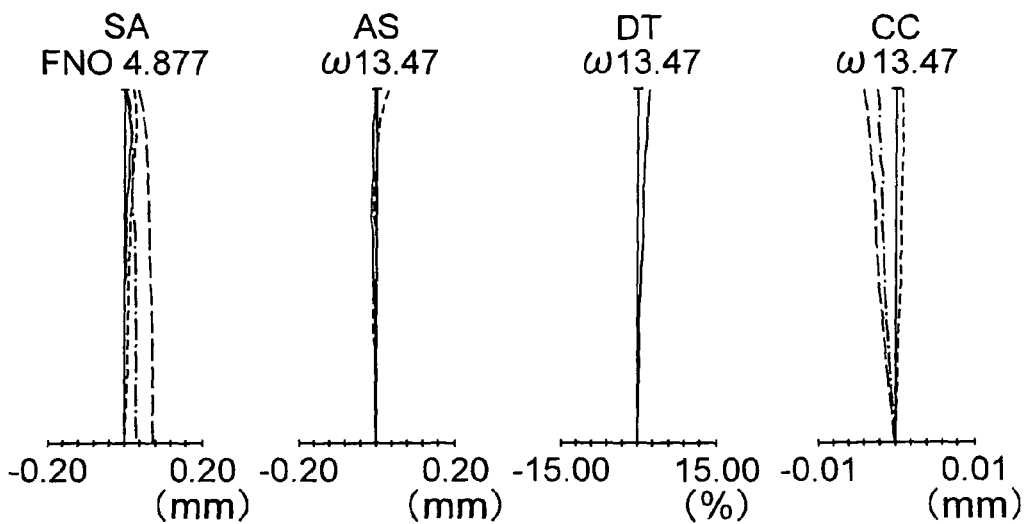
Figure 38A:
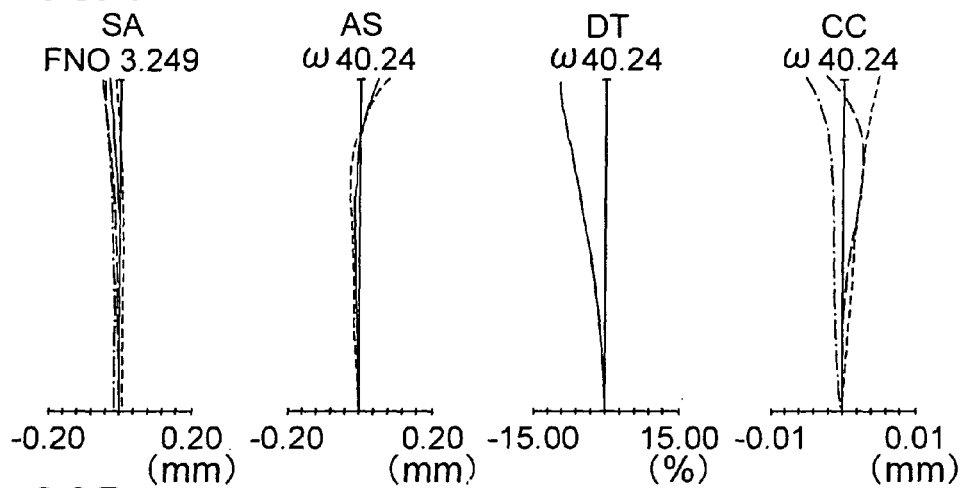
FIGS. 38A, 38B, and 38C are aberration diagrams of the zoom lens according to the twelfth embodiment in the state in which the zoom lens is focused on an object point at infinity.
Figure 38B:
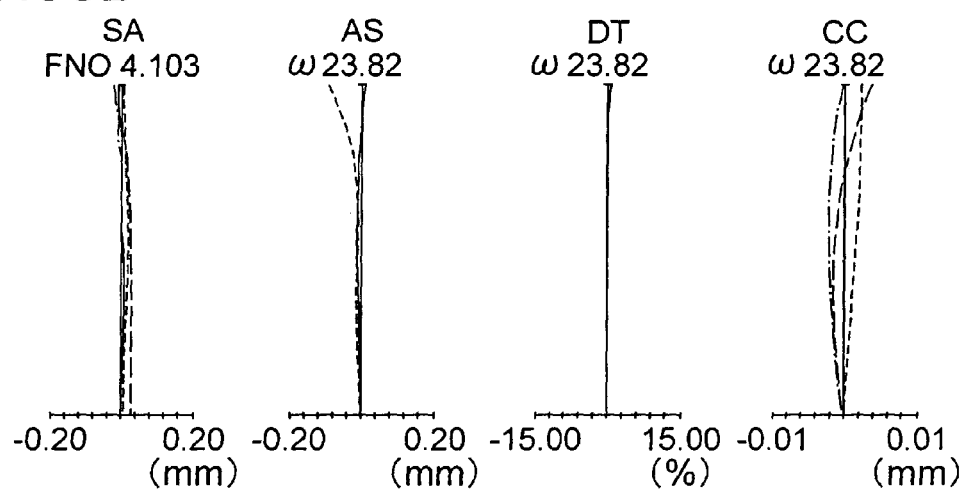
Figure 38C:
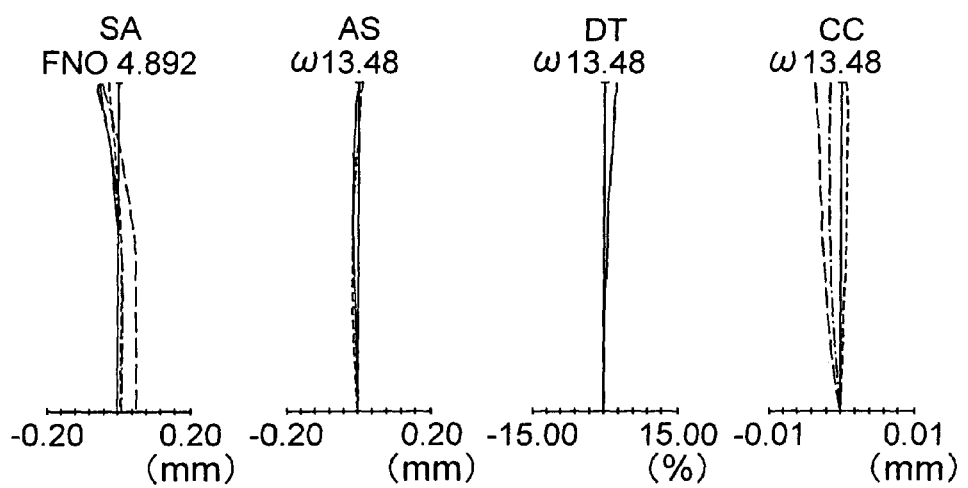
Figure 39D:
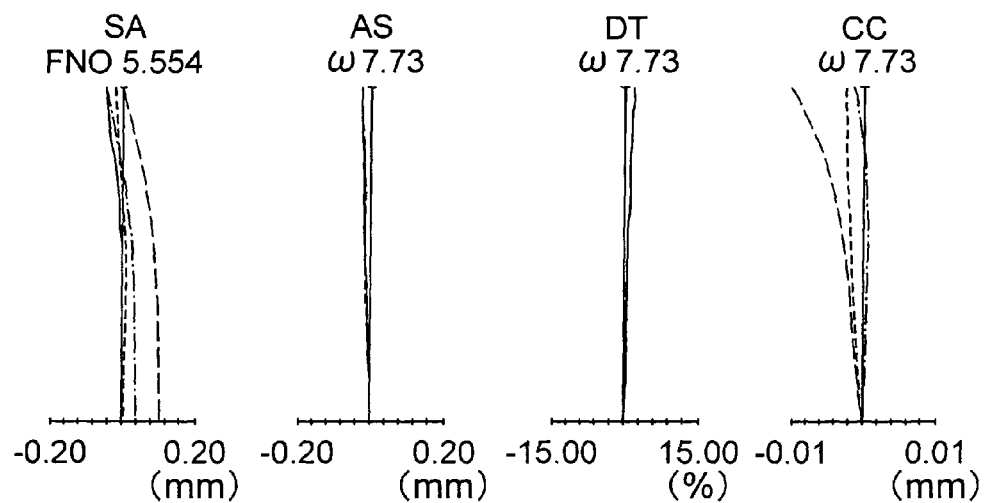
FIGS. 39D and 39E are further aberration diagrams of the zoom lens according to the twelfth embodiment in the state in which the zoom lens is focused on an object point at infinity.
Figure 39E:
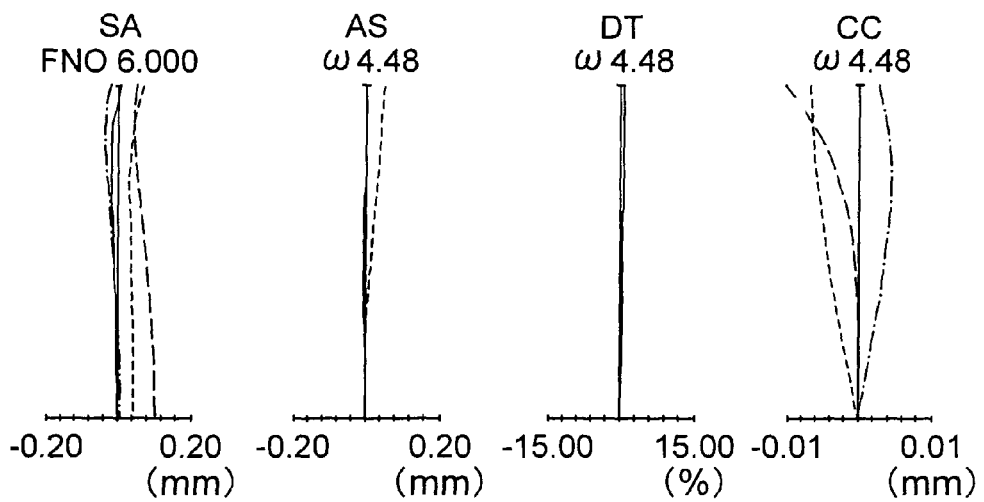
Figure 40A:
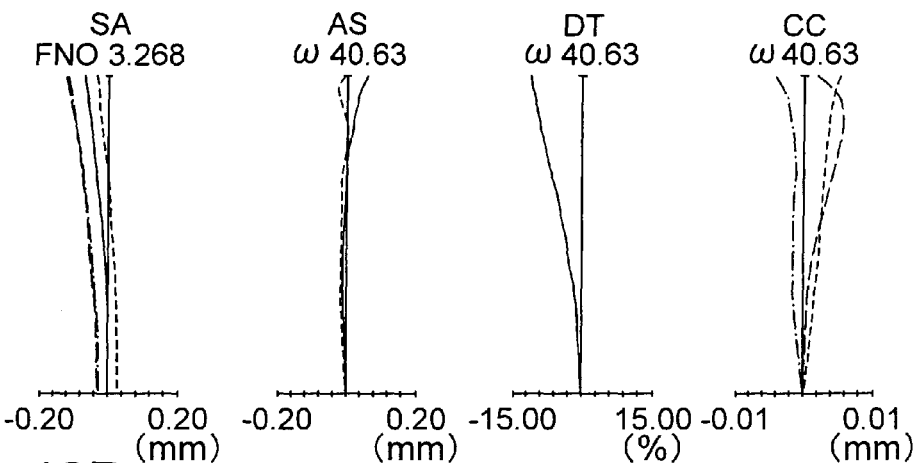
FIGS. 40A, 40B, and 40C are aberration diagrams of the zoom lens according to the thirteenth embodiment in the state in which the zoom lens is focused on an object point at infinity.
Figure 40B:
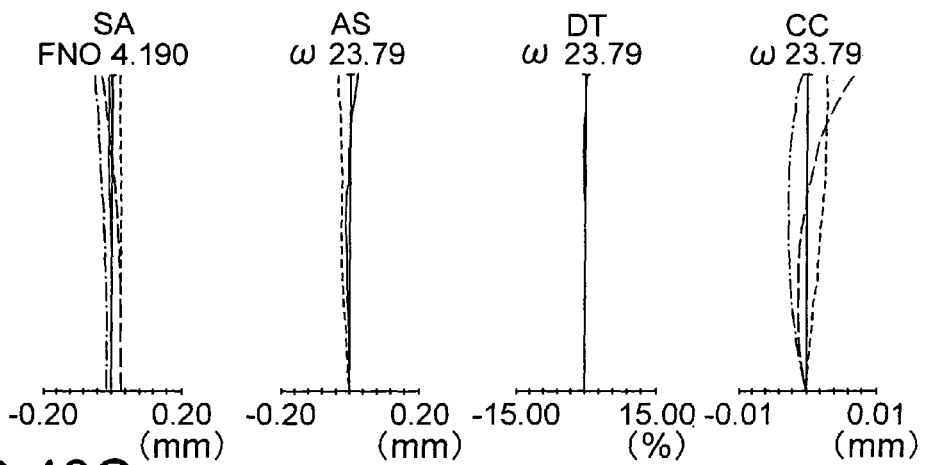
Figure 40C:
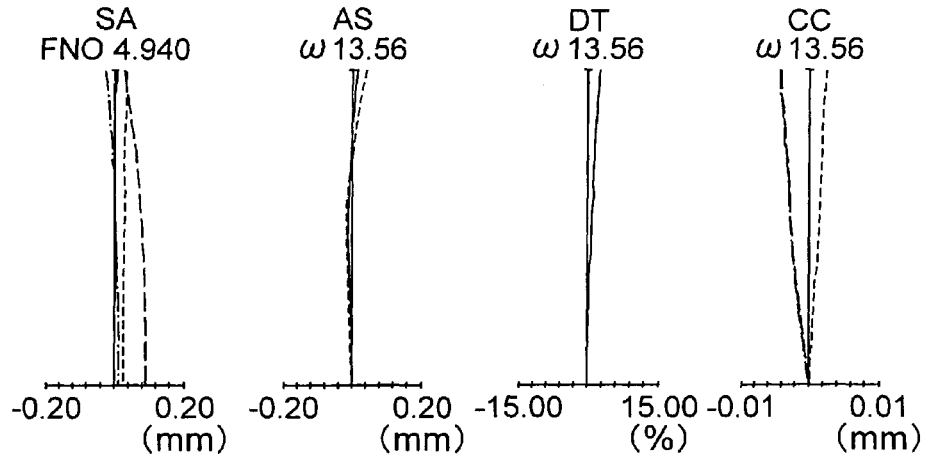
Figure 41D:
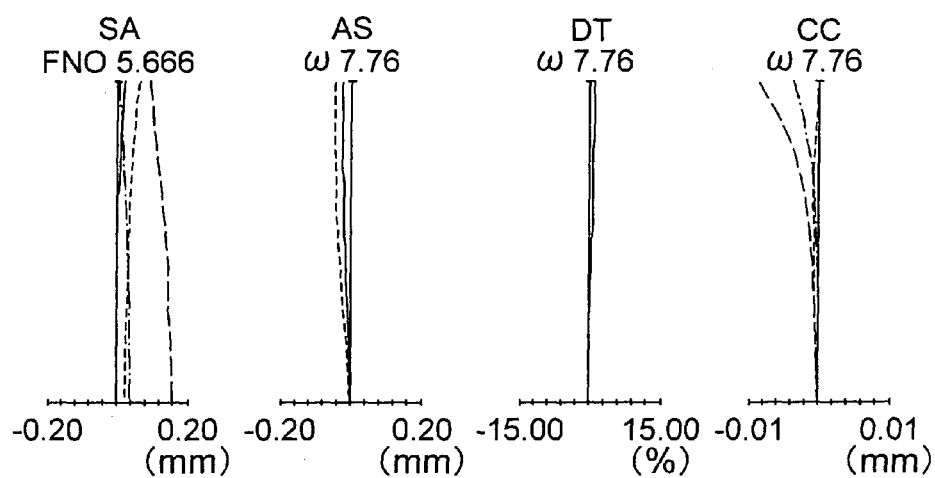
FIGS. 41D and 41E are further aberration diagrams of the zoom lens according to the thirteenth embodiment in the state in which the zoom lens is focused on an object point at infinity.
Figure 41E:
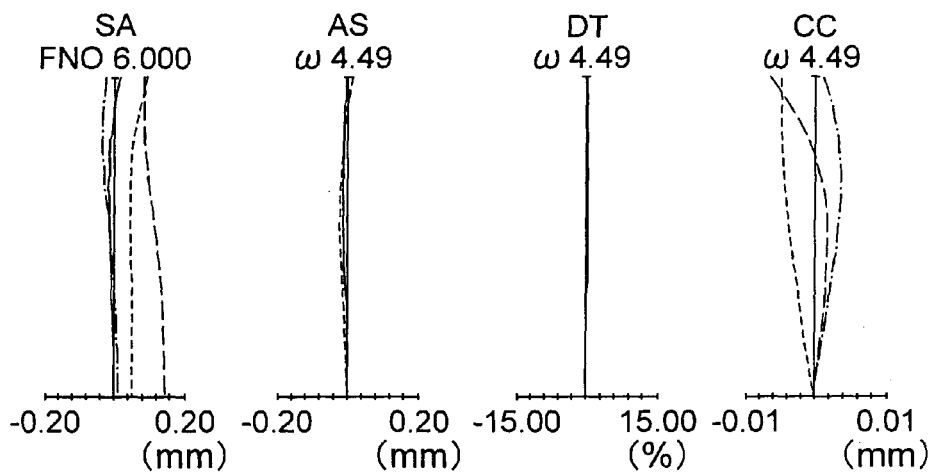
Figure 42A:
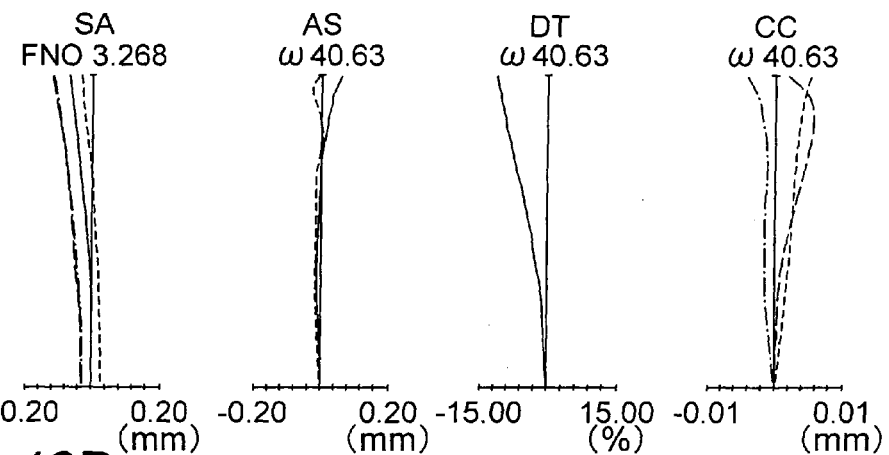
FIGS. 42A, 42B, and 42C are aberration diagrams of the zoom lens according to the fourteenth embodiment in the state in which the zoom lens is focused on an object point at infinity.
Figure 42B:
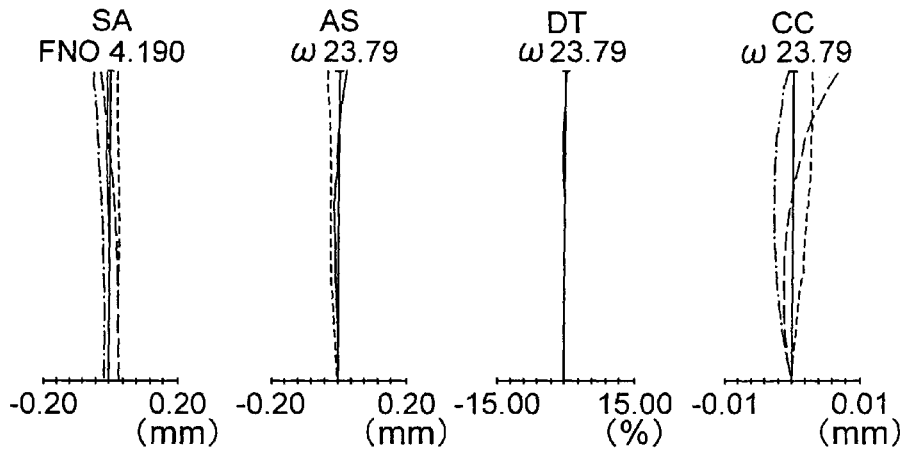
Figure 42C:
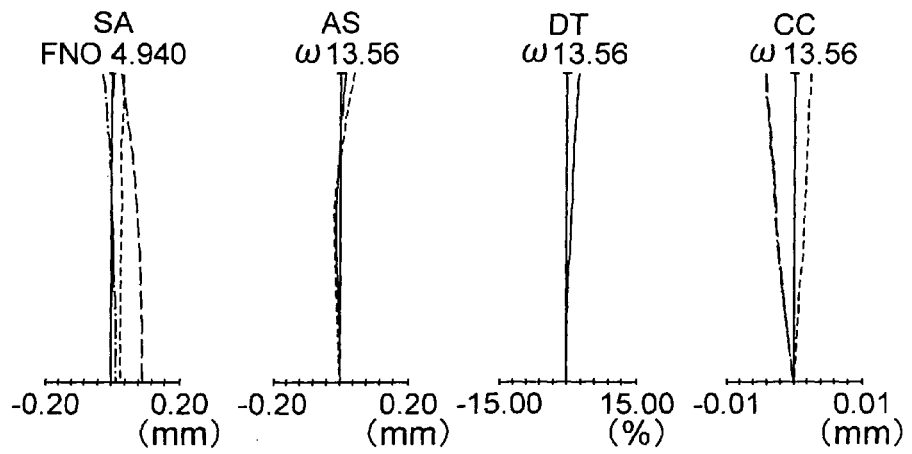
Figure 44A:
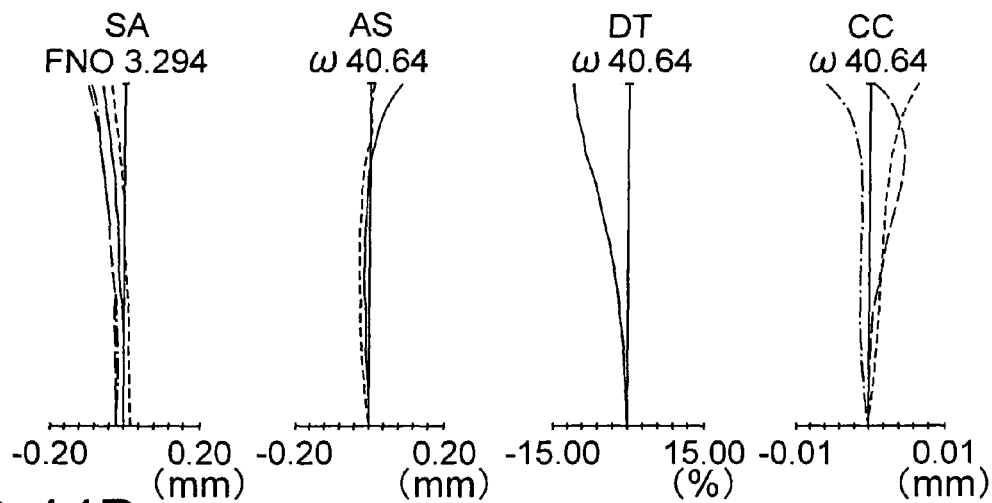
FIGS. 44A, 44B, and 44C are aberration diagrams of the zoom lens according to the fifteenth embodiment in the state in which the zoom lens is focused on an object point at infinity.
Figure 44B:
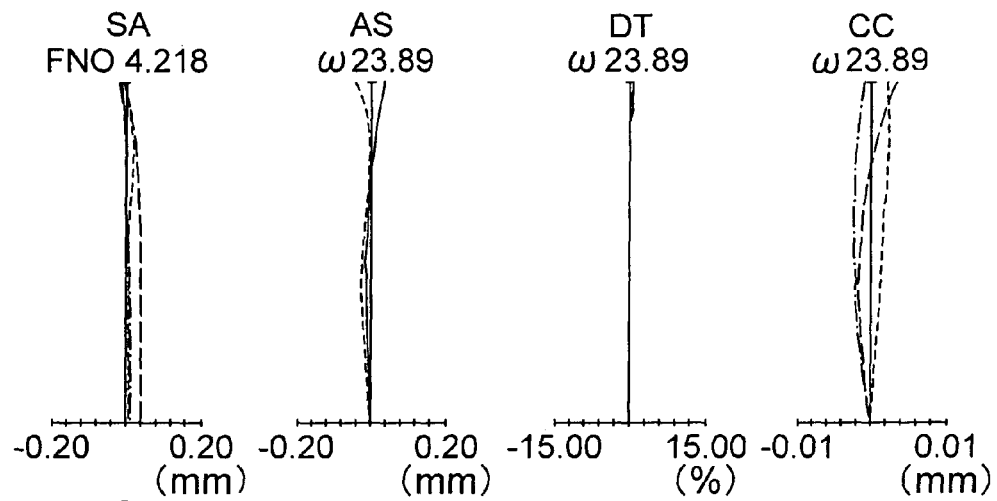
Figure 44C:
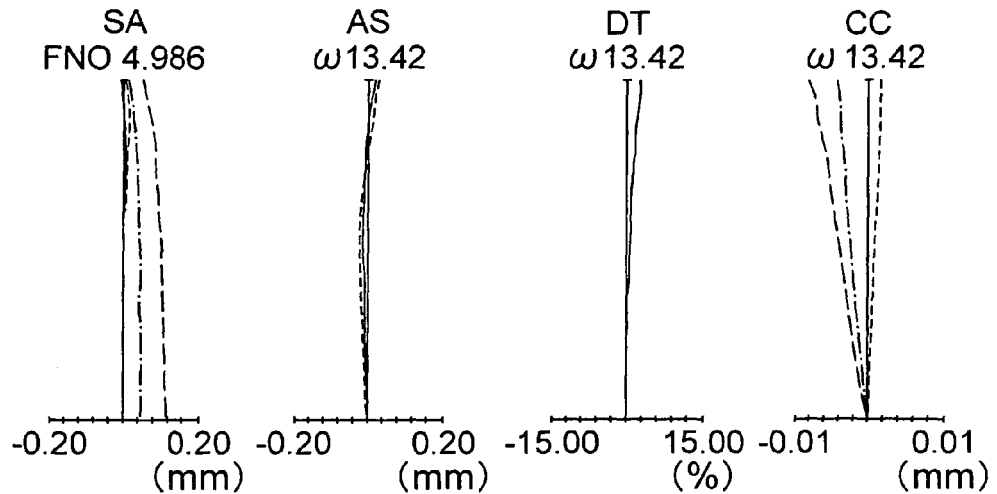
Figure 45D:
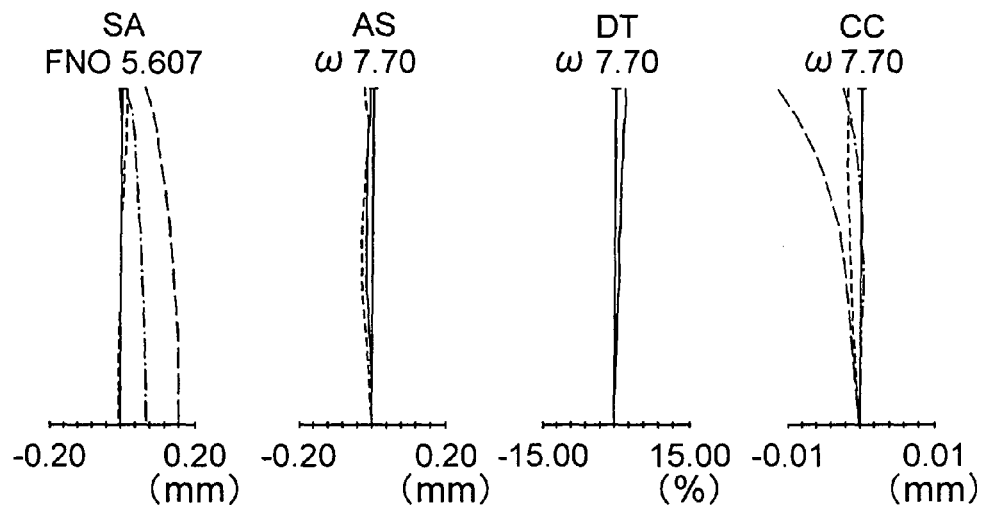
FIGS. 45D and 45E are further aberration diagrams of the zoom lens according to the fifteenth embodiment in the state in which the zoom lens is focused on an object point at infinity.
Figure 45E:
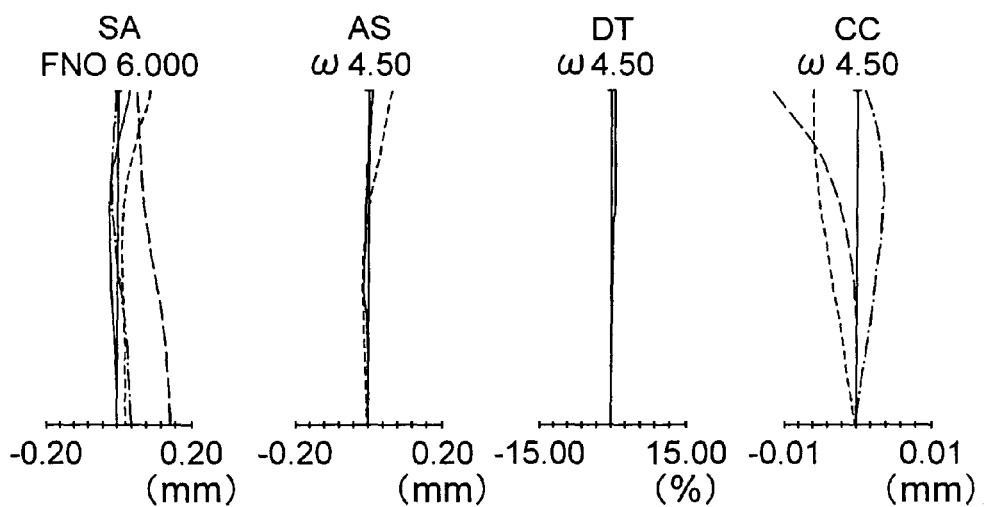

A zoom lens according to a first aspect of the present invention includes, in order from the object side thereof, a first lens unit having a positive refracting power, a second lens unit having a negative refracting power, a third lens unit having a positive refracting power, wherein zooming is performed by changing the distances between the lens units, the second lens unit has two negative lens elements and one positive lens element, the lens element located closest to the object side in the second lens unit is a negative lens element, and the zoom lens satisfies the following conditional expressions:

$$0.60 < \Sigma d_{2G}/I_{mw} < 1.95 \quad (1\text{-}1)$$

$$1.830 < N_{2ave} < 2.000 \quad (1\text{-}2)$$

where $\Sigma d_{2G}$ is the thickness of the second lens unit on the optical axis, $I_{mw}$ is the maximum image height at the wide angle end of the zoom lens, and $N_{2ave}$ is the average of the refractive indices for the d-line of all the lens elements in the second lens unit, wherein the term "lens element" refers to an optical member that satisfies $0.1 < L/I_{mw}$, where L is the thickness of the optical member in the second lens unit on the optical axis.

In the following, the reason why the above described configuration is adopted and advantages thereof will be described.

In the configuration adopted by the first aspect of the present invention, the zoom lens includes, in order from the object side, a first lens unit having a positive refracting power, a second lens unit having a negative refracting power and a third lens unit having a positive refracting power, and zooming is performed by changing the distances between the lens units. By this configuration, the magnification change is efficiently distributed (or divided) among the lens units, whereby variations in aberrations during zooming are made small. In addition, the amounts of movement of the respective lens units are prevented from becoming large, which makes the optical system compact.

Furthermore, by distributing the negative refracting power to the two negative lens elements, the second lens unit can be designed to have a relatively high negative refracting power.

In the zoom lens of a type in which the frontmost lens unit has a positive refracting power, the thickness, along the optical axis, of the second lens unit having a negative refracting power tends to be large. An increase in the thickness of the second lens unit on the optical axis is likely to necessitate an increase in the diameter of the first lens unit. In view of this, in order to make the lens units thinner with respect to the thickness direction and smaller with respect to the diametrical direction in the state in which the lens barrel is collapsed, it is very important to make the second lens unit as thin as possible. Specifically, it is preferred that conditional expression (1-1) be satisfied. If the upper limit of conditional expression (1-1) is not exceeded, the thickness of the second lens unit on the optical axis is prevented from becoming unduly large, which facilitates a reduction in the size of the lens system. If the lower limit of conditional expression (1-1) is not exceeded, the thickness of the lens is prevented from becoming unduly small, and therefore it becomes easy to provide a required refracting power. In addition, manufacturing (or machining) of the lens becomes easy, which enables a reduction in the manufacturing cost of the lens.

In the case of the zoom lens configuration including a first lens unit having a positive refracting power, a second lens unit having a negative refracting power and a third lens unit having a positive refracting power, if the angle of field is to be made large while the size is to be made small, the second lens unit is required to have a strong refracting power. On the other hand, to make the thickness of the second lens unit smaller, it is necessary to reduce the thickness of each lens element in the second lens unit and to make the paraxial radius of curvature of each lens surface larger. This, however, makes it difficult for the second lens unit to have a required refracting power. If the glass materials of the lens elements in the second lens unit are selected in such a way that conditional expression (1-2) is satisfied so that each lens element has a high refractive index, a reduction in the thickness and an adequate power are both achieved.

Increases in the negative refracting power of the second lens unit necessitate decreases in the paraxial radii of curvature of the negative lens elements. Decreases in the paraxial radii of curvature of the negative lens elements in the second lens unit lead to increases in on-axis and off-axis aberrations, in particular spherical aberration at the telephoto end and curvature of field and coma at the wide angle end, which is undesirable. The paraxial radii of curvature of the negative lens elements in the second lens unit can be increased by increasing the refractive index of the negative lens elements. In order to achieve good aberration characteristics by cancellation of aberration characteristics of the negative lens elements and the positive lens element, it is desirable that the glass material of the positive lens element be selected in such a way as to have a larger refractive index and a higher degree of dispersion than the glass material of the negative lens elements. In this context, if conditional expression (1-2) is satisfied, the paraxial radii of curvature of the negative lens elements in the second lens unit can be made large, and therefore, the amount of aberrations can be made minimum.

For the above described reasons, by designing the zoom lens in such a way that the conditional expression (1-2) is satisfied, a small size optical system having a wide angle of field, a high zoom ratio and good optical performance can be easily provided.

It is more preferred that conditional expression (1-1) presented above be modified into the following conditional expression (1-1') and this modified conditional expression (1-1') be satisfied:

$$0.90 < \Sigma d_{2G}/I_{mw} < 1.80 \tag{1-1'}$$

Furthermore, it is still more preferred that conditional expression (1-1) be modified into the following conditional expression (1-1") and this further modified conditional expression (1-1") be satisfied:

$$1.30 < \Sigma d_{2G}/I_{mw} < 1.60 \tag{1-1"}$$

Only the upper limit or the lower limit of conditional expression (1-1) may be replaced by the upper limit or the lower limit of conditional expression (1-1') or (1-1").

It is more preferred that conditional expression (1-2) presented above be modified into the following conditional expression (1-2') and this modified conditional expression (1-2') be satisfied:

$$1.840 < N_{2ave} < 1.965 \tag{1-2'}$$

Furthermore, it is still more preferred that conditional expression (1-2) be modified into the following conditional expression (1-2") and this further modified conditional expression (1-2") be satisfied:

$$1.855 < N_{2ave} < 1.930 \tag{1-2"}$$

Only the upper limit or the lower limit of conditional expression (1-2) may be replaced by the upper limit or the lower limit of conditional expression (1-2') or (1-2").

It is preferred that the power of the second lens unit be selected in such a way that the following conditional expression is satisfied:

$$0.02 < |f_2/f_t| < 0.05 \tag{1-3}$$

where $f_2$ is the focal length of the second lens unit, and $f_t$ is the focal length of the entire zoom lens system at the telephoto end.

This conditional expression relates to a balance or compromise between the size reduction and aberration correction.

If the upper limit of conditional expression (1-3) is not exceeded, the power of the second lens unit is prevented from becoming weak, and the size of the entire lens system is prevented from becoming large. If the lower limit of conditional expression (1-3) is not exceeded, the power of the second lens unit is prevented from becoming strong, which facilitate a reduction in off-axis aberrations generated at the wide angle end and spherical aberration generated at the telephoto end.

It is more preferred that conditional expression (1-3) presented above be modified into the following conditional expression (1-3') and this modified conditional expression (1-3') be satisfied:

$$0.05 < |f_2/f_t| < 0.31 \tag{1-3'}$$

Furthermore, it is still more preferred that conditional expression (1-3) be modified into the following conditional expression (1-3") and this further modified conditional expression (1-3") be satisfied:

$$0.09 < |f_2/f_t| < 0.16 \tag{1-3"}$$

Only the upper limit or the lower limit of conditional expression (1-3) may be replaced by the upper limit or the lower limit of conditional expression (1-3') or (1-3").

To make the size of the second lens unit small, it is preferred that the following conditional expressions (1-4) and (1-5) be satisfied:

$$-0.65 < f_2/R_{22f} < 0.35 \tag{1-4}$$

$$-0.65 < f_2/R_{23r} < 0.35 \tag{1-5}$$

where is $f_2$ is the focal length of the second lens unit, $R_{22f}$ is the paraxial radius of curvature of the object side surface of the lens element located second closest to the object side in the second lens unit, and $R_{23r}$ is the paraxial radius of curvature of the image side surface of the lens element located third closest to the object side in the second lens unit.

If the upper limit of conditional expression (1-4) is not exceeded, the paraxial curvature of the relevant lens surface is prevented from becoming large in the negative direction. Thus, the concavity of the lens does not become deep, and the thickness of the second lens unit is prevented from becoming large. In addition, deterioration of the Petzval sum can be prevented.

If the lower limit of conditional expression (1-4) is not exceeded, the paraxial curvature of the relevant lens surface is prevented from becoming large in the positive direction. In a case where this lens element is a positive lens element, the thickness of the lens element is prevented from becoming large in order to provide an adequate thickness at the lens edge, whereby the thickness of the second lens unit is prevented from becoming large. In a case where this lens element is a negative lens element, insufficiency in the negative refracting power is prevented, and an adequate refracting power is achieved.

If the upper limit of conditional expression (1-5) is not exceeded, the paraxial curvature of the relevant lens surface is prevented from becoming large in the negative direction. In a case where this lens element is a positive lens element, the thickness of the lens is prevented from becoming large in order to provide an adequate thickness at the lens edge, whereby the thickness of the second lens unit is prevented from becoming large. In a case where this lens element is a negative lens element, insufficiency in the negative refracting power is prevented, and an adequate refracting power is achieved. If the lower limit of conditional expression (1-5) is not exceeded, the paraxial curvature of the relevant lens surface is prevented from becoming large in the positive direction. Thus, the concavity of the lens does not become deep, and the thickness of the second lens unit is prevented from becoming large.

It is more preferred that conditional expression (1-4) presented above be modified into the following conditional expression (1-4') and this modified conditional expression (1-4') be satisfied:

$$-0.45 < f_2/R_{22f} < 0.19 \quad (1\text{-}4')$$

Furthermore, it is still more preferred that conditional expression (1-4) be modified into the following conditional expression (1-4") and this further modified conditional expression (1-4") be satisfied:

$$-0.2 < f_2/R_{22f} < 0.1 \quad (1\text{-}4'')$$

Only the upper limit or the lower limit of conditional expression (1-4) may be replaced by the upper limit or the lower limit of conditional expression (1-4') or (1-4").

It is more preferred that conditional expression (1-5) presented above be modified into the following conditional expression (1-5') and this modified conditional expression (1-5') be satisfied:

$$-0.45 < f_2/R_{23r} < 0.25 \quad (1\text{-}5')$$

Furthermore, it is still more preferred that conditional expression (1-5) be modified into the following conditional expression (1-5") and this further modified conditional expression (1-5") be satisfied:

$$-0.25 < f_2/R_{23r}| < -0.03 \quad (1\text{-}5'')$$

Only the upper limit or the lower limit of conditional expression (1-5) may be replaced by the upper limit or the lower limit of conditional expression (1-5') or (1-5").

It is necessary to design the shape of the negative lens element located closest to the object side in the second lens unit optimally in order to provide adequate refracting power by distributing the negative power to both the lens surfaces thereof with a good balance and to maintain a favorable state of aberrations. Specifically, it is preferred that the following conditional expression (1-6) be satisfied:

$$0.4 < SF_{21} < 1.5 \quad (1\text{-}6)$$

where $SF_{21}$ is defined by $SF_{21} = (R_{21f} + R_{21r})/(R_{21f} - R_{21r})$, $R_{21f}$ is the paraxial radius of curvature of the object side surface of the negative lens element located closest to the object side in the second lens unit, and $R_{21r}$ is the paraxial radius of curvature of the image side surface of the negative lens element located closest to the object side in the second lens unit.

If the upper limit of conditional expression (1-6) is not exceeded, an adequate negating power is achieved, and the amount movement of the second lens unit during zooming does not become unduly large, which is advantageous in making the size of the optical system small. Furthermore, the effect of refracting rays on the object side surface is not decreased. Thus, the ray height in the first lens unit is prevented from becoming large. This facilitates a reduction in the size with respect to the diametrical direction. If the lower limit of conditional expression (1-6) is not exceeded, the paraxial curvature is of the object side surface of this lens element is prevented from becoming large. This facilitates appropriate correction of curvature of field at the wide angle end.

It is more preferred that conditional expression (1-6) presented above be modified into the following conditional expression (1-6') and this modified conditional expression (1-6') be satisfied:

$$0.60 < SF_{21} < 1.20 \quad (1\text{-}6')$$

Furthermore, it is still more preferred that conditional expression (1-6) be modified into the following conditional expression (1-6") and this further modified conditional expression (1-6") be satisfied:

$$0.84 < SF_{21} < 0.96 \quad (1\text{-}6'')$$

Only the upper limit or the lower limit of conditional expression (1-6) may be replaced by the upper limit or the lower limit of conditional expression (1-6') or (1-6").

In order to achieve further improvement in the optical performance, it is preferred that at least one of the negative lens elements in the second lens unit have an aspheric surface. When the zoom lens is to be designed to have a small size, a high zoom ratio and a wide angle of field, the second lens unit is required to have a strong negative power, which leads to generation of a large amount of negative aberrations. If an aspherical surface is used in at least one of the negative lens elements in the second lens unit, aberrations can be corrected favorably. By using an aspheric surface in one or both of the object side surface and the image side surface of the negative lens element located closest to the object side in the second lens unit, coma and curvature of field at the wide angle end can be corrected favorably. In addition, by using an aspheric surface in the lens surface located closest to the image side in the second lens unit, spherical aberration and coma at the telephoto end can be corrected favorably. Thus, further improvement in the optical performance can be achieved.

The second lens unit may be composed of three lenses, which is the minimum number of lenses from the viewpoints of thinning of the lens and aberration correction. This facilitates a reduction in the size and the cost.

It is preferred that the first lens unit be composed of two or fewer lenses. By constituting the first lens unit by such a small number of lenses, compactness in the optical axis direction and the diametrical direction can be achieved. It is preferred that the first lens unit have a negative lens element and a positive lens element.

The negative lens element and the positive lens element in the first lens unit may be cemented to each other. Use of such a cemented lens is advantageous in effectively correcting on-axis chromatic aberration, which aberration can be detrimental when the focal length at the telephoto end is increased with an increase in the zoom ratio. In addition, use of the cemented lens enables a reduction of deterioration in the optical performance due to relative decentering of the lens elements caused by assembly error, and therefore contributes to improvement in the throughput and cost reduction.

The negative lens element and the positive lens element in the first lens unit may be independent (or separate) lens elements that are not cemented to each other. This configuration is advantageous in correcting distortion and coma at the wide angle end and coma at the telephoto end more effectively.

It is preferred that the refracting power of the first lens unit be selected in such a way that the following conditional expression is satisfied:

$$0.2 < f_1/f_t < 1.6 \quad (1\text{-}7)$$

where $f_1$ is the focal length of the first lens unit, and $f_t$ is the focal length of the entire zoom lens system at the telephoto end.

If the upper limit of conditional expression (1-7) is not exceeded, the first lens unit can have an adequate refracting power. This is advantageous in making the entire length of the zoom lens short and in making the lens barrel small. If the lower limit of conditional expression (1-7) is not exceeded, the refracting power is prevented from becoming strong. This is advantageous in reducing generation of spherical aberration and coma at the telephoto end to achieve good optical performance.

It is more preferred that conditional expression (1-7) presented above be modified into the following conditional expression (1-7') and this modified conditional expression (1-7') be satisfied:

$$0.40<f_1/f_t<0.95 \tag{1-7'}$$

Furthermore, it is still more preferred that conditional expression (1-7) be modified into the following conditional expression (1-7") and this further modified conditional expression (1-7") be satisfied:

$$0.62<f_1 f_t<0.68 \tag{1-7"}$$

Only the upper limit or the lower limit of conditional expression (1-7) may be replaced by the upper limit or the lower limit of conditional expression (1-7') or (1-7").

The zoom lens according to the first aspect of the present invention may be composed of the following four lens units arranged in order from the object side; a first lens unit having a positive refracting power, a second lens unit having a negative refracting power, a third lens unit having a positive refracting power, and a fourth lens unit having a positive refracting power. In this case, it is preferred that an aperture stop be provided in the zoom lens optical system, and during zooming from the wide angle end to the telephoto end, the first lens unit move in such a way that it is located closer to the object side at the telephoto end than at the wide angle end, the second lens unit move, the third lens unit move in such a way that it is located closer to the object side at the telephoto end than at the wide angle end, the fourth lens unit move, and the aperture stop move.

The zoom lens according to the first aspect of the present invention may be composed of the following five lens units arranged in order from the object side; a first lens unit having a positive refracting power, a second lens unit having a negative refracting power, a third lens unit having a positive refracting power, a fourth lens unit having a negative refracting power, and a fifth lens unit having a positive refracting power. In this case, it is preferred that an aperture stop be provided in the zoom lens optical system, and during zooming from the wide angle end to the telephoto end, the first lens unit move in such a way that it is located closer to the object side at the telephoto end than at the wide angle end, the second lens unit move, the third lens unit move in such a way that it is located closer to the object side at the telephoto end than at the wide angle end, the fourth lens unit move, the fifth lens unit move, and the aperture stop move.

By moving all the lens units as described above, it is possible to effectively provide each lens unit with a magnification changing function, and therefore excellent performance can be achieved even when the angle of field and the zoom ratio are increased. Moving the aperture stop enables not only effective correction of chromatic aberration of magnification and distortion to provide advantages in performance but also appropriate control of the position of the entrance pupil and the position of the exit pupil. Thus, a good balance between the ray height of off-axis beams at the wide angle end and the ray height of off-axis beams at the telephoto end can be achieved, and the outer diameter of the first lens unit and the outer diameter of the lens unit closest to the image side can be made small with a good balance. In particular, a reduction in the outer diameter of the first lens unit advantageously leads to a reduction in the size of the lens with respect to the thickness direction (i.e. the direction along the optical axis). Furthermore, since variations in the position of the exit pupil during zooming can be controlled or made small, the angle of incidence of rays on the CCD or CMOS sensor or the like can be kept within an appropriate range, and brightness falloff (or shading) in the peripheral region of the picture area can be prevented from occurring. This is advantageous when the zoom lens is used with an electronic image pickup element.

It is preferred that the zoom lens according to the first aspect of the present invention be composed of nine or fewer lens elements. Increases in the number of lens elements will lead to increases in the cost and the size of the zoom lens.

It is preferred that the zoom lens according to the first aspect of the present invention satisfy the following conditional expression:

$$4.0<f_t/f_w<20.0 \tag{1-8}$$

where $f_t$ is the focal length of the entire zoom lens system at the telephoto end, and $f_w$ is the focal length of the entire zoom lens system at the wide angle end.

If the upper limit of conditional expression (1-8) is exceeded, it is difficult to achieve adequate optical performance by adopting the configuration according to the first aspect of the present invention. If the lower limit of conditional expression (1-8) is exceeded, the object of the present invention can be achieved with a simpler configuration, and therefore advantages in terms of the size and cost associated with the configuration according to the first aspect of the present invention cannot be enjoyed.

It is more preferred that conditional expression (1-8) presented above be modified into the following conditional expression (1-8') and this modified conditional expression (1-8') be satisfied:

$$5.5<f_t/f_w<15.0 \tag{1-8'}$$

Furthermore, it is still more preferred that conditional expression (1-8) be modified into the following conditional expression (1-8") and this further modified conditional expression (1-8") be satisfied:

$$7.0<f_t/f_w<12.0 \tag{1-8"}$$

Only the upper limit or the lower limit of conditional expression (1-8) may be replaced by the upper limit or the lower limit of conditional expression (1-8') or (1-8").

It is preferred that the zoom lens according to the first aspect of the present invention satisfy the following conditional expression:

$$0.50<I_{mw}/f_w<1.00 \tag{1-9}$$

where $I_{mw}$ is the maximum image height at the wide angle end of the zoom lens, and $f_w$ is the focal length of the entire zoom lens system at the wide angle end.

If the upper limit of conditional expression (1-9) is exceeded, it is difficult to achieve adequate optical performance by adopting the configuration according to the first aspect of the present invention. If the lower limit of conditional expression (1-9) is exceeded, the object of the present invention can be achieved with a simpler configuration, and therefore advantages in terms of size and cost associated with the configuration according to the first aspect of the present invention cannot be enjoyed.

It is more preferred that conditional expression (1-9) presented above be modified into the following conditional expression (1-9') and this modified conditional expression (1-9') be satisfied:

$$0.60<I_{mw}/f_w<0.95 \tag{1-9'}$$

Furthermore, it is still more preferred that conditional expression (1-9) be modified into the following conditional expression (1-9") and this further modified conditional expression (1-9") be satisfied:

$$0.70 < I_{mw}/f_w < 0.80 \quad (1-9")$$

Only the upper limit or the lower limit of conditional expression (1-9) may be replaced by the upper limit or the lower limit of conditional expression (1-9') or (1-9").

By using an image pickup element that converts an image formed by the zoom lens into an electrical signal, there can be provided an electronic image pickup apparatus that is advantageous in reducing the size and in achieving a high zoom ratio and a wide angle of field while maintaining good image quality of picked-up images without difficulty.

Furthermore, it is preferred that the image pickup apparatus be provided with an image transformation section that transforms, by image processing, an electrical signal representing an image containing distortion attributed to the zoom lens into an image signal in which distortion is corrected. Thus, distortion is allowed to be left in images formed by the zoom lens. This provides further advantages in reducing the number of lens elements in the zoom lens and in making the size of the zoom lens smaller.

To meet the users' demand for a wider variety of photographing area than before, the present invention can provide, according to the first aspect thereof, a zoom lens and an apparatus that are advantageous in achieving a higher zoom ratio and a wider angle of field and suitable for use with an electronic image pickup element such as a CCD or CMOS sensor, and can provide images having good image quality without difficulty.

A zoom lens according to a second aspect of the present invention includes, in order from the object side thereof, a first lens unit having a positive refracting power, a second lens unit having a negative refracting power, and a third lens unit having a positive refracting power, wherein zooming is performed by changing the distances between the lens units, the first lens unit is composed of one negative lens element and at least one positive lens element, and the zoom lens satisfies the following conditional expressions:

$$2.00 < nd_{1n} < 2.30 \quad (2-1)$$

$$13.0 < vd_{1n} < 30.0 \quad (2-2)$$

where $nd_{1n}$ is the refractive index for the d-line of the negative lens element in the first lens unit, and $vd_{1n}$ is the Abbe number of the negative lens element in the first lens unit.

In the following, the reason why the above described configuration is adopted and advantages thereof will be described.

In the configuration adopted by the second aspect of the present invention, the zoom lens includes, in order from the object side, a first lens unit having a positive refracting power, a second lens unit having a negative refracting power and a third lens unit having a positive refracting power, and zooming is performed by changing the distances between the lens units. By this configuration, the magnification change is efficiently distributed (or divided) among the lens units, whereby variations in aberrations during zooming are made small. In addition, the amounts of movement of the respective lens units are prevented from becoming large, which makes the optical system compact. Furthermore, having one negative lens element and one positive lens element in the first lens unit enables good aberration correction.

In the case of the zoom lens configuration including, in order from the object side, a first lens unit having a positive refracting power, a second lens unit having a negative refracting power and a third lens unit having a positive refracting power, if the size of the zoom lens is to be made small, the first lens unit is required to have a strong refracting power. In order to correct aberrations associated with the positive power, it is necessary to make the power of the negative lens element large to some extent. For this reason, the negative lens element tends to have a small paraxial radius of curvature. In the first lens unit having a positive power, the negative lens element is generally designed to have a relatively high degree of dispersion to meet requirement of correction of chromatic aberration. If the paraxial radius of curvature of the negative lens element is small, higher order aberrations are likely to occur. In particular, higher order chromatic aberration of magnification tends to occur due to the effect of the high dispersion. The amount of chromatic aberration thus generated will exceed the amount of chromatic aberration generated by the positive lens element, leading to significant deterioration of the image quality of picked up images. The amount of chromatic aberration increases away from the optical axis, and detrimental effects thereof increase with an increase in the angle of field at the wide angle end. Thus, it becomes difficult to achieve a good balance in chromatic aberration of magnification between the wide angle end and the telephoto end.

In view of the above, it is very important to appropriately select the glass material of the negative lens element in the first lens unit. Specifically, it is preferred that the glass material of the negative lens element be selected in such a way that conditional expressions (2-1) and (2-2) be satisfied.

If the upper limit of conditional expression (2-1) is not exceeded, some appropriate glass materials are available. If the upper limit of conditional expression (2-1) is exceeded, glass materials will be hardly available, because, for example, it will be difficult to find a glass material that meet the required condition. If the lower limit of conditional expression (2-1) is not exceeded, it is not necessary to make the paraxial radius of curvature of the negative lens element excessively small in order to obtain adequate negative refracting power. This is advantageous in reducing aberrations such as off-axis chromatic aberration of magnification. In addition, the negative lens element can have an adequate negative refracting power, which is advantageous in correcting various aberrations such as spherical aberration and coma generated by the positive lens element.

Designing the negative lens element in such a way that upper limit of conditional expression (2-2) is not exceeded is advantageous in correcting on-axis chromatic aberration. If the lower limit of conditional expression (2-2) is not exceeded, the partial dispersion ratio (or relative partial dispersion) of the glass material does not become unduly large, and the amount of chromatic aberration generated in the relatively short wavelength range can be made small. This is advantageous in correcting secondary spectrum of chromatic aberration. For the above described reasons, if conditional expressions (2-1) and (2-2) are satisfied, a small-size optical system that has a wide angle of field, a high zoom ratio and good optical performance can be realized without difficulty.

It is more preferred that conditional expression (2-1) presented above be modified into the following conditional expression (2-1') and this modified conditional expression (2-1') be satisfied:

$$2.04 < nd_{1n} < 2.25 \quad (2-1')$$

Furthermore, it is still more preferred that conditional expression (2-1) be modified into the following conditional expression (2-1") and this further modified conditional expression (2-1") be satisfied:

$$2.08 < nd_{1n} < 2.20 \qquad (2\text{-}1").$$

Only the upper limit or the lower limit of conditional expression (2-1) may be replaced by the upper limit or the lower limit of conditional expression (2-1') or (2-1").

It is more preferred that conditional expression (2-2) presented above be modified into the following conditional expression (2-2') and this modified conditional expression (2-2') be satisfied:

$$14.0 < vd_{1n} < 25.0 \qquad (2\text{-}2').$$

Furthermore, it is still more preferred that conditional expression (2-2) be modified into the following conditional expression (2-2") and this further modified conditional expression (2-2") be satisfied:

$$15.0 < vd_{1n} < 20.0 \qquad (2\text{-}2").$$

Only the upper limit or the lower limit of conditional expression (2-2) may be replaced by the upper limit or the lower limit of conditional expression (2-2') or (2-2").

It is preferred that the negative lens element in the first lens unit have a meniscus shape with a convex surface directed toward the object side. By this feature, the angle of incidence of off-axis rays on the lens surface thereof is made smaller, whereby generation of aberrations can be reduced. In this case, it is preferred that the following conditional expression be satisfied:

$$1.0 < SF_{1n} < 15.0 \qquad (2\text{-}3)$$

where $SF_{1n}$ is defined by $SF_{1n} = (R_{1nf} + R_{1nr})/(R_{1nf} - R_{1nr})$, $R_{1nf}$ is the paraxial radius of curvature of the object side surface of the negative lens element in the second lens unit, and $R_{1nr}$ is the paraxial radius of curvature of the image side surface of the negative lens element in the first lens unit.

If the upper limit of the conditional expression (2-3) is not exceeded, it is not necessary to make the paraxial radius of curvature of both surfaces of the lens small in order to achieve an appropriate negative power. This is advantageous in reducing higher order chromatic aberration. If the lower limit of the conditional expression (2-3) is not exceeded, the negative lens element has an adequate refracting power. This is advantageous in canceling aberrations generated by the positive lens element in this lens unit.

It is more preferred that conditional expression (2-3) presented above be modified into the following conditional expression (2-3') and this modified conditional expression (2-3') be satisfied:

$$4.0 < SF_{1n} < 12.0 \qquad (2\text{-}3').$$

Furthermore, it is still more preferred that conditional expression (2-3) be modified into the following conditional expression (2-3") and this further modified conditional expression (2-3") be satisfied:

$$7.5 < SF_1 < 9.3 \qquad (2\text{-}3").$$

Only the upper limit or the lower limit of conditional expression (2-3) may be replaced by the upper limit or the lower limit of conditional expression (2-3') or (2-3").

It is preferred that the thickness of the first lens unit be made as small as possible within an appropriate range. This enables a reduction in the size of zoom lens with respect to the thickness direction in the state in which the lens barrel is collapsed. Furthermore, this also enables a reduction in the height of rays incident on the zoom lens, which leads to a reduction in the size with respect to the diametrical direction. Specifically, it is preferred that the following conditional expression be satisfied:

$$0.40 < \Sigma d_{1G}/I_{mw} < 3.00 \qquad (2\text{-}4)$$

where $\Sigma d_{1G}$ is the thickness of the first lens unit on the optical axis, $I_{mw}$ is the maximum image height at the wide angle end of the zoom lens.

Designing the zoom lens in such a way that the upper limit of conditional expression (2-4) is not exceeded is advantageous in reducing the thickness of the lens frame (or lens barrel) in the state in which the lens barrel is collapsed and the diameter thereof. If the upper limit of conditional expression (2-4) is not exceeded, each of the lens elements that constitute the first lens unit can easily be designed to have an adequate refracting power. In addition, the thickness of each lens element on the optical axis and the thickness thereof at its edge can be prevented from becoming small. This advantageously facilitate ease of machining (or manufacturing) of the lens elements.

It is more preferred that conditional expression (2-4) presented above be modified into the following conditional expression (2-4') and this modified conditional expression (2-4') be satisfied:

$$0.70 < \Sigma d_{1G}/I_{mw} < 2.10 \qquad (2\text{-}4').$$

Furthermore, it is still more preferred that conditional expression (2-4) be modified into the following conditional expression (2-4") and this further modified conditional expression (2-4") be satisfied:

$$1.05 < \Sigma d_{1G}/I_{mw} < 1.25 \qquad (2\text{-}4").$$

Only the upper limit or the lower limit of conditional expression (2-4) may be replaced by the upper limit or the lower limit of conditional expression (2-4') or (2-4").

The first lens unit may be composed of two or fewer including one negative lens element and one positive lens element. By constituting the first lens unit by such a small number of lenses, the size can be made small with respect to the optical axis direction and the diametrical direction. In this case, it is preferred that the first lens unit be configured to include a negative lens element and a positive lens element. Thus, aberrations generated by the positive lens element can be satisfactorily corrected by the negative lens element.

The negative lens element and the positive lens element in the first lens unit may be cemented to each other. Use of such a cemented lens enables effective correction of on-axis chromatic aberration, which aberration can be detrimental when the focal length at the telephoto end is increased with an increase in the zoom ratio. In addition, use of the cemented lens enables a reduction of deterioration in the optical performance due to relative decentering of the lens elements caused by assembly error, and therefore contributes to improvement in the throughput and cost reduction.

The negative lens element and the positive lens element in the first lens unit may be independent (or separate) lens components that are not cemented to each other. This configuration enables more effective correction of distortion and coma at the wide angle end and coma at the telephoto end.

In a case where the first lens unit is composed of two lens elements, in order to reduce monochromatic aberration and chromatic aberration to achieve good aberration performance while designing first lens unit to have a relatively strong positive refracting power, it is preferred that the refractive indices of the negative lens element and the positive lens element be made as large as possible and the Abbe number of these lens elements be made as large as possible. On the other hand, the larger the Abbe number of glass materials is, the smaller the refractive index thereof tends to be.

In view of this, it is preferred that the glass materials of the negative lens element and the positive lens element satisfy the following conditional expressions (2-5) and (2-6):

$$0.20 < nd_{1n} - nd_{1p} < 0.55 \qquad (2\text{-}5)$$

$$20.0 < vd_{1p} - vd_{1n} < 55.0 \qquad (2\text{-}6)$$

where $nd_{1n}$ is the refractive index for the d-line of the negative lens element in the first lens unit, $vd_{1p}$ is the Abbe number of the positive lens element in the first lens unit, $nd_{1p}$ is the refractive index for the d-line of the positive lens element in the first lens unit, and $vd_{1n}$ is the Abbe number of the negative lens element in the first lens unit.

If the upper limit of conditional expression (2-5) is exceeded, while the refractive index of the positive lens element in the first lens unit becomes high, the Abbe number thereof becomes small correspondingly. In this case, the positive lens element and the negative lens element cannot have an adequate difference in the Abbe number between each other, and correction of chromatic aberration cannot be achieved satisfactorily. If the lower limit of conditional expression (2-5) is exceeded, the refractive index of the positive lens element becomes low, and therefore the radii of curvature of the lens surfaces are required to be made small. In this case, an unduly large amount of coma is generated, in particular, at the telephoto end.

If the upper limit of conditional expression (2-6) is exceeded, while the Abbe number of the positive lens element in the first lens unit becomes large, the refractive index thereof becomes low correspondingly. Thus, the radii of curvature of the lens surfaces are required to be made small. In this case, an unduly large amount of coma is generated, in particular, at the telephoto end. If the lower limit of conditional expression (2-6) is exceeded, chromatic aberration in the first lens unit becomes insufficient.

It is more preferred that conditional expression (2-5) presented above be modified into the following conditional expression (2-5') and this modified conditional expression (2-5') be satisfied:

$$0.25 < nd_{1n} - nd_{1p} < 0.50 \qquad (2\text{-}5').$$

Furthermore, it is still more preferred that conditional expression (2-5) be modified into the following conditional expression (2-5") and this further modified conditional expression (2-5") be satisfied:

$$0.30 < nd_{1n} - nd_{1p} < 0.45 \qquad (2\text{-}5'').$$

Only the upper limit or the lower limit of conditional expression (2-5) may be replaced by the upper limit or the lower limit of conditional expression (2-5') or (2-5").

It is more preferred that conditional expression (2-6) presented above be modified into the following conditional expression (2-6') and this modified conditional expression (2-6') be satisfied:

$$25.0 < *vd_{1p} - vd_{1n} < 47.0 \qquad (2\text{-}6').$$

Furthermore, it is still more preferred that conditional expression (2-6) be modified into the following conditional expression (2-6") and this further modified conditional expression (2-6") be satisfied:

$$31.0 < vd_{1p} - vd_{1n} < 38.0 \qquad (2\text{-}6'').$$

Only the upper limit or the lower limit of conditional expression (2-6) may be replaced by the upper limit or the lower limit of conditional expression (2-6') or (2-6").

It is preferred that the refracting power of the first lens unit be selected in such a way that the following conditional expression is satisfied:

$$0.2 < f_1/f_t < 1.0 \qquad (2\text{-}7)$$

where $f_1$ is the focal length of the first lens unit, and $f_t$ is the focal length of the entire zoom lens system at the telephoto end.

If the upper limit of conditional expression (2-7) is not exceeded, the refracting power of the first lens unit is prevented from becoming unduly weak, which is advantageous in making the entire length of the entire zoom lens system short and in making the size of the lens barrel small. If the lower limit of conditional expression (2-7) is not exceeded, the refracting power of the first lens unit is prevented from becoming unduly strong, which is advantageous in correcting spherical aberration and coma at the telephoto end and in achieving good optical performance.

It is more preferred that conditional expression (2-7) presented above be modified into the following conditional expression (2-7') and this modified conditional expression (2-7') be satisfied:

$$0.40 < f_1/f_t < 0.75 \qquad (2\text{-}7').$$

Furthermore, it is still more preferred that conditional expression (2-7) be modified into the following conditional expression (2-7") and this further modified conditional expression (2-7") be satisfied:

$$0.62 < f_1/f_t < 0.68 \qquad (2\text{-}7'').$$

Only the upper limit or the lower limit of conditional expression (2-7) may be replaced by the upper limit or the lower limit of conditional expression (2-7') or (2-7").

It is preferred that the focal length of the second lens unit be selected in such a way that the following conditional expression is satisfied:

$$0.02 < |f_2/f_t| < 0.50 \qquad (2\text{-}8)$$

where $f_2$ is the focal length of the second lens unit, and $f_t$ is the focal length of the entire zoom lens system at the telephoto end.

Conditional expression (2-8) relates to a balance between size reduction and aberration performance. If the upper limit of conditional expression (2-8) is not exceeded, the refracting power of the second lens unit is prevented from becoming unduly weak, which is advantageous in reducing the size of the entire lens system. If the lower limit of conditional expression (2-8) is not exceeded, the refracting power of the second lens unit is prevented from becoming unduly strong, which is advantageous in reducing off-axis aberrations at the wide angle end and spherical aberration at the telephoto end.

It is more preferred that conditional expression (2-8) presented above be modified into the following conditional expression (2-8') and this modified conditional expression (2-8') be satisfied:

$$0.08 < |f_2/f_t| < 0.36 \qquad (2\text{-}8').$$

Furthermore, it is still more preferred that conditional expression (2-8) be modified into the following conditional expression (2-8") and this further modified conditional expression (2-8") be satisfied:

$$0.12 < |f_2/f_t| < 0.16 \qquad (2\text{-}8'').$$

Only the upper limit or the lower limit of conditional expression (2-8) may be replaced by the upper limit or the lower limit of conditional expression (2-8') or (2-8").

The zoom lens according to the second aspect of the present invention may be composed of the following four lens units arranged in order from the object side; a first lens unit having a positive refracting power, a second lens unit having a negative refracting power, a third lens unit having a positive refracting power, and a fourth lens unit having a positive refracting power. In this case, it is preferred that an aperture stop be provided in the zoom lens optical system, and during zooming from the wide angle end to the telephoto end, the first lens unit move in such a way that it is located closer to the object side at the telephoto end than at the wide angle end, the second lens unit move, the third lens unit move in such a way that it is located closer to the object side at the telephoto end than at the wide angle end, the fourth lens unit move, and the aperture stop move. During movement, the first lens unit may move only toward the object side, or it may move along a locus that is convex toward the object side or the image side. The second lens unit may move only toward the object side, or it may move along a locus that is convex toward the object side or the image side. The third lens unit may move only toward the object side, or it may move along a locus that is convex toward the object side. The fourth lens unit may move in such a way that it is located closer to the object side at the telephoto end than at the wide angle end, or it may move in such a way that it is located closer to the image side at the telephoto end than at the wide angle end. The fourth lens unit may move monotonously, or it may move along a locus that is convex toward the object side or the image side.

The zoom lens according to the second aspect of the present invention may be composed of the following five lens units arranged in order from the object side; a first lens unit having a positive refracting power, a second lens unit having a negative refracting power, a third lens unit having a positive refracting power, a fourth lens unit having a negative refracting power, and a fifth lens unit having a positive refracting power. In this case, it is preferred that an aperture stop be provided in the zoom lens optical system, and during zooming from the wide angle end to the telephoto end, the first lens unit move in such a way that it is located closer to the object side at the telephoto end than at the wide angle end, the second lens unit move, the third lens unit move in such a way that it is located closer to the object side at the telephoto end than at the wide angle end, the fourth lens unit move, the fifth lens unit move, and the aperture stop move. During movement, the first lens unit may move only toward the object side, or it may move along a locus that is convex toward the object side or the image side. The second lens unit may move only toward the object side, or it may move along a locus that is convex toward the object side or the image side. The third lens unit may move only toward the object side, or it may move along a locus that is convex toward the object side. The fourth lens unit may move only toward the object side, or it may move along a locus that is convex toward the object side or the image side. The fifth lens unit may move in such a way that it is located closer to the object side at the telephoto end than at the wide angle end, or it may move in such a way that it is located closer to the image side at the telephoto end than at the wide angle end. The fifth lens unit may move monotonously, or it may move along a locus that is convex toward the object side or the image side.

It is preferred that the aperture stop be disposed between the second lens unit and the third lens unit, and the aperture stop be moved integrally with the third lens unit during zooming. By this feature, the position of the entrance pupil can be made closer to the object side, and the position of the exit pupil can be made farther from the image plane. Since the aperture stop is disposed at a position at which the height of off-axis rays is low, the size of the aperture stop is not required to be made large, and the dead space in moving the aperture stop can be made small. The aperture stop may be replaced by a shutter unit.

By moving all the lens units as described above, it is possible to effectively provide each lens unit with a magnification changing function, and therefore excellent performance can be achieved even when the angle of field and the zoom ratio are increased. Moving the aperture stop enables not only effective correction of chromatic aberration of magnification and distortion to provide advantages with respect to the performance but also appropriate control of the position of the entrance pupil and the position of the exit pupil. This means that a good balance between the ray height of off-axis beams at the wide angle end and the ray height of off-axis beams at the telephoto end can be achieved, and the outer diameter of the first lens unit and the outer diameter of the lens unit closest to the image side can be made small with a good balance. In particular at the wide angle end, a reduction in the outer diameter of the first lens unit advantageously leads to a reduction in the size of the lens with respect to the thickness direction (i.e. the direction along the optical axis). Furthermore, since variations in the position of the exit pupil during zooming (i.e. magnification change) can be controlled or made small, the angle of incidence of rays on the CCD or CMOS sensor or the like can be maintained within an appropriate range, whereby brightness falloff (or shading) in the peripheral region of the picture area can be prevented from occurring. Therefore, the zoom lens is suitable for use with an electronic image pickup element.

It is preferred that the zoom lens according to the second aspect the present invention be composed of nine or fewer lens elements. Increases in the number of lens elements will lead to increases in the cost and the size of the zoom lens.

It is preferred that the zoom lens according to the second aspect of the present invention satisfy the following conditional expression:

$$4.0 < f_t/f_w < 20.0 \tag{2-9}$$

where $f_t$ is the focal length of the entire zoom lens system at the telephoto end, and $f_w$ is the focal length of the entire zoom lens system at the wide angle end.

If the upper limit of conditional expression (2-9) is exceeded, it is difficult to achieve adequate optical performance by adopting the configuration according to the second aspect of the present invention. If the lower limit of conditional expression (2-9) is exceeded, the object of the present invention can be achieved with a simpler configuration, and therefore advantages in terms of the size and cost associated with this configuration according to the second aspect of the present invention cannot be enjoyed.

It is more preferred that conditional expression (2-9) presented above be modified into the following conditional expression (2-9') and this modified conditional expression (2-9') be satisfied:

$$6.5 < f_t/f_w < 15.0 \tag{2-9'}$$

Furthermore, it is still more preferred that conditional expression (2-9) be modified into the following conditional expression (2-9") and this further modified conditional expression (2-9") be satisfied:

$$9.5 < f_t/f_w < 12.0 \tag{2-9"}$$

Only the upper limit or the lower limit of conditional expression (2-9) may be replaced by the upper limit or the lower limit of conditional expression (2-9') or (2-9").

It is preferred that the zoom lens according to the second aspect of the present invention satisfy the following conditional expression:

$$0.50 < I_{mw}/f_w < 1.00 \tag{2-10}$$

where $I_{mw}$ is the maximum image height at the wide angle end of the zoom lens, and $f_w$ is the focal length of the entire zoom lens system at the wide angle end.

If the upper limit of conditional expression (2-10) is exceeded, it is difficult to achieve adequate optical performance by adopting the configuration according to the second aspect of the present invention. If the lower limit of conditional expression (2-10) is exceeded, the object of the present invention can be achieved with a simpler configuration, and therefore advantages in terms of size and cost associated with the configuration according to the second aspect of the present invention cannot be enjoyed.

It is more preferred that conditional expression (2-10) presented above be modified into the following conditional expression (2-10') and this modified conditional expression (2-10') be satisfied:

$$0.60 < I_{mw}/f_w < 0.95 \tag{2-10'}$$

Furthermore, it is still more preferred that conditional expression (2-10) be modified into the following conditional expression (2-10") and this further modified conditional expression (2-10") be satisfied:

$$0.70 < I_{mw}/f_w < 0.80 \tag{2-10''}$$

Only the upper limit or the lower limit of conditional expression (2-10) may be replaced by the upper limit or the lower limit of conditional expression (2-10') or (2-10").

It is preferred that the entire length of the zoom lens be determined in such a way that the following conditional expression be satisfied:

$$5.0 < L_t/I_{mw} < 17.5 \tag{2-11}$$

where $L_t$ is the entire length of the entire zoom lens system at the telephoto end, and $I_{mw}$ is the maximum image height at the wide angle end of the zoom lens.

If the upper limit of conditional expression (2-11) is not exceeded, the entire length of the zoom lens system can be made short, which is advantageous in reducing the size of the lens frame in the state in which the lens barrel is collapsed. If the lower limit of conditional expression (2-11) is not exceeded, the refracting powers of the respective lens units are prevented from becoming unduly strong, which is advantageous in reducing the amount of aberrations generated by them.

It is more preferred that conditional expression (2-11) presented above be modified into the following conditional expression (2-11') and this modified conditional expression (2-11') be satisfied:

$$8.0 < L_t/I_{mw} < 16.8 \tag{2-11'}$$

Furthermore, it is still more preferred that conditional expression (2-11) be modified into the following conditional expression (2-11") and this further modified conditional expression (2-11") be satisfied:

$$14.0 < L_t/I_{mw} < 16.0 \tag{2-11''}$$

Only the upper limit or the lower limit of conditional expression (2-11) may be replaced by the upper limit or the lower limit of conditional expression (2-11') or (2-11").

By using an image pickup element that converts an image formed by the zoom lens into an electrical signal, there can be provided an electronic image pickup apparatus that is advantageous in reducing the size and in achieving a high zoom ratio and a wide angle of field while maintaining good image quality of picked-up images without difficulty.

Furthermore, it is preferred that the image pickup apparatus be provided with an image transformation section that transforms, by image processing, an electrical signal representing an image containing distortion attributed to the zoom lens into an image signal in which distortion is corrected. Thus, distortion is allowed to be left in images formed by the zoom lens. This provides further advantages in reducing the number of lens elements in the zoom lens and in making the size of the zoom lens smaller.

It is also preferred that the image pickup apparatus be provided with an image transformation section that transforms, by image processing, an electric signal representing an image formed by the zoom lens into an image signal in which color misregistration caused by chromatic aberration of magnification is corrected. By correcting chromatic aberration of magnification of the zoom lens electrically, excellent images can be obtained.

As will be clearly understood from the above description, according to the second aspect of the present invention, there can be provided a zoom lens and an apparatus that are advantageous in achieving reduction in the size of the camera, a higher zoom ratio and a wider angle of field and suitable for use with an electronic image pickup element such as a CCD or CMOS sensor, and can provide images having good image quality without difficulty. As such, the zoom lens and apparatus meet the users' demand for a wider variety of photographing area than before without impairment of portability.

A zoom lens according to a third aspect of the present invention includes, in order from the object side thereof, a first lens unit having a positive refracting power, a second lens unit having a negative refracting power, and a third lens unit having a positive refracting power, wherein zooming is performed by changing the distances between the lens units, and the second lens unit includes at least one positive lens element that satisfies the following conditional expressions:

$$-0.50 < f_2/f_t < -0.03 \tag{3-1}$$

$$2.00 < nd_{2p} < 2.30 \tag{3-2}$$

$$13.0 < vd_{2p} < 30.0 \tag{3-3}$$

where $f_2$ is the focal length of the second lens unit, $f_t$ is the focal length of the entire zoom lens system at the telephoto end, $nd_{2p}$ is the refractive index for the d-line of the positive lens element in the second lens unit, and $vd_{2p}$ is the Abbe number of the positive lens element in the second lens unit.

In the configuration adopted by the third aspect of the present invention, the zoom lens includes, in order from the object side, a first lens unit having a positive refracting power, a second lens unit having a negative refracting power and a third lens unit having a positive refracting power, and zooming is performed by changing the distances between the lens units. By this configuration, the magnification change is efficiently distributed (or divided) among the lens units, whereby variations in aberrations during zooming are made small. In addition, the amounts of movement of the respective lens units are prevented from becoming large, which makes the optical system compact.

If the angle of field is to be made wide while making the size of the zoom lens small, the first lens unit and the second lens unit tend to be required to have a strong refracting power.

Since the second lens unit, in particular, is the lens unit that provides a principal amount of the magnification change, it is necessary to reduce aberrations of the second lens unit as much as possible in order to achieve good optical performance throughout the zoom range. To achieve this, it is preferred that the refracting power of the second lens unit be selected in such a way that conditional expression (3-1) is satisfied. This conditional expression concerns a balance (or compromise) between the size reduction and the aberration performance. If the upper limit of conditional expression (3-1) is not exceeded, the refracting power of the second lens unit is prevented from becoming unduly strong, which is advantageous in reducing off-axis aberrations generated at the wide angle end and spherical aberration generated at the telephoto end. If the lower limit of conditional expression (3-1) is not exceeded, the refracting power of the second lens unit is prevented from becoming unduly weak, which is advantageous in preventing the size of the entire lens system from becoming large and in achieving an adequate angle of field.

It is more preferred that conditional expression (3-1) presented above be modified into the following conditional expression (3-1') and this modified conditional expression (3-1') be satisfied:

$$-0.30 < f_2/f_t < -0.07 \quad (3-1').$$

Furthermore, it is still more preferred that conditional expression (3-1) be modified into the following conditional expression (3-1") and this further modified conditional expression (3-1") be satisfied:

$$-0.16 < f_2/f_t < -0.12 \quad (3-1'').$$

Only the upper limit or the lower limit of conditional expression (3-1) may be replaced by the upper limit or the lower limit of conditional expression (3-1') or (3-1").

Conditional expressions (3-2) and (3-3) concern the glass material of the positive lens element in the second lens unit.

As described above, the second lens unit has a relatively strong negative refracting power. Therefore, a large amount of aberrations is likely to be generated by a negative lens element(s). In order to cancel the aberrations generated by the negative lens element(s) to achieve effective aberration correction, it is preferred to provide a positive lens element in the second lens unit and select the glass material of this positive lens element appropriately. Specifically, it is preferred that conditional expression (3-2) be satisfied.

If the upper limit of conditional expression (3-2) is not exceeded, availability of the glass material is ensured, an increase in the cost is prevented, and mass production thereof is facilitated. If the lower limit of conditional expression (3-2) is not exceeded, the lens element is not required to be made thick in order to provide a required power, whereby an increase in the size of the lens system is prevented. Furthermore, off-axis aberrations such as coma and curvature of field at the wide angle end and spherical aberration at the telephoto end can be made small, and good optical performance can be achieved.

Conditional expression (3-3) concerns correction of chromatic aberration. If the upper limit of conditional expression (3-3) is not exceeded, chromatic aberration for the C-line and F-line can be corrected effectively. If the lower limit of conditional expression (3-3) is not exceeded, partial dispersion ratio in the relatively short wavelength range can be made small, whereby residual secondary spectrum can be reduced.

It is more preferred that conditional expression (3-2) presented above be modified into the following conditional expression (3-2') and this modified conditional expression (3-2') be satisfied:

$$2.05 < nd_{2p} < 2.25 \quad (3-2').$$

Furthermore, it is still more preferred that conditional expression (3-2) be modified into the following conditional expression (3-2") and this further modified conditional expression (3-2") be satisfied:

$$2.08 < nd_{2p} < 2.15 \quad (3-2'').$$

Only the upper limit or the lower limit of conditional expression (3-2) may be replaced by the upper limit or the lower limit of conditional expression (3-2') or (3-2").

It is more preferred that conditional expression (3-3) presented above be modified into the following conditional expression (3-3') and this modified conditional expression (3-3') be satisfied:

$$14.0 < vd_{2p} < 25.0 \quad (3-3').$$

Furthermore, it is still more preferred that conditional expression (3-3) be modified into the following conditional expression (3-3") and this further modified conditional expression (3-3") be satisfied:

$$15.0 < vd_{2p} < 20.0 \quad (3-3'').$$

Only the upper limit or the lower limit of conditional expression (3-3) may be replaced by the upper limit or the lower limit of conditional expression (3-3') or (3-3").

Furthermore, in the zoom lens according to the third aspect of the present invention described above, it is preferred that any one of the following features be adopted.

It is preferred that the second lens unit be composed of three or fewer lens elements including two negative lens elements and one positive lens element. By distributing the negative power of the second lens unit to the two negative lens elements, the radius of curvature of each of these lens elements is prevented from becoming unduly small, whereby generation of an unduly large amount of aberrations can be prevented. The number of lens elements as small as or smaller than three facilitates a reduction in the size of the zoom lens system.

The second lens unit may be composed of, in order from the object side, a first negative lens element, a positive lens element, and a second negative lens element. By this arrangement, symmetry of the lens configuration is improved, whereby efficient aberration correction can be achieved in the second lens unit.

In this case, in order to further decrease aberrations generated in the second lens unit, it is preferred that the shape of the positive lens element in the second lens unit be designed in such a way that the following conditional expression is satisfied:

$$0.2 < SF_{2p1} < 3.50 \quad (3-4)$$

where $SF_{2p1}$ is defined by $SF_{2p1} = (R_{2pf1} + R_{2pr1})/(R_{2pf1} - R_{2pr1})$ r $R_{2pf1}$ is the paraxial radius of curvature of the object side surface of the positive lens element disposed between the first negative lens element and the second negative lens element in the second lens unit, and $R_{2pr1}$ is the paraxial radius of curvature of the image side surface of the positive lens element disposed between the first negative lens element and the second negative lens element in the second lens unit.

If the upper limit of conditional expression (3-4) is not exceeded, the positive lens surfaces have adequate refracting powers, which is advantageous in correcting spherical aberration and coma generated by the negative lens elements. If the lower limit of conditional expression (3-4) is not exceeded, the curvature of both the surfaces of the positive lens element is prevented from becoming high, whereby the amount of spherical aberration and coma generated by the positive lens element is prevented from becoming large conversely. Designing the positive lens element in such a way that both the upper and lower limits of conditional expression (3-4) are not exceeded is advantageous in improving the optical performance.

It is more preferred that conditional expression (3-4) presented above be modified into the following conditional expression (3-4') and this modified conditional expression (3-4') be satisfied:

$$0.50 < SF_{2p1} < 2.50 \quad (3\text{-}4').$$

Furthermore, it is still more preferred that conditional expression (3-4) be modified into the following conditional expression (3-4") be satisfied:

$$0.80 < SF_{2p1} < 1.40 \quad (3\text{-}4'').$$

Only the upper limit or the lower limit of conditional expression (3-4) may be replaced by the upper limit or the lower limit of conditional expression (3-4') or (3-4").

The second lens unit may be composed, in order from the object side, of a first negative lens element, a second negative lens element, and a positive lens element. This configuration facilitates increasing the zoom ratio and thinning the thickness of the second lens unit along the optical axis direction while maintaining an appropriate refracting power to thereby provide an adequate space for performing the magnification change.

In this case, in order to further reduce the amount of aberrations generated in the second lens unit, it is preferred that the shape of the second lens unit be designed in such a way that the following conditional expression is satisfied:

$$-4.5 < SF_{2p2} < -0.5 \quad (3\text{-}5)$$

where $SF_{2p2}$ is defined by $SF_{2p2} = (R_{2pf2} + R_{2pr2})/(R_{2pf2} - R_{2pr2})$, $R_{2pf2}$ is the paraxial radius of curvature of the object side surface of the positive lens element disposed closest to the image side in the second lens unit, and $R_{2pr2}$ is the paraxial radius of curvature of the image side surface of the positive lens element disposed closest to the image side in the second lens unit.

If the upper limit of conditional expression (3-5) is not exceeded, the curvature of both the surfaces of the positive lens element is prevented from becoming high, whereby the amount of spherical aberration and coma is prevented from becoming large. If the lower limit of conditional expression (3-5) is not exceeded, the positive lens surfaces have adequate refracting powers, which is advantageous in correcting spherical aberration and coma generated by the negative lens elements. Designing the positive lens element in such a way that both the upper and lower limits of conditional expression (3-5) are not exceeded is advantageous in improving the optical performance.

It is more preferred that conditional expression (3-5) presented above be modified into the following conditional expression (3-5') and this modified conditional expression (3-5') be satisfied:

$$-3.0 < SF_{2p2} < -0.7 \quad (3\text{-}5').$$

Furthermore, it is still more preferred that conditional expression (3-5) be modified into the following conditional expression (3-5") be satisfied:

$$-1.7 < SF_{2p2} < -0.9 \quad (3\text{-}5'').$$

Only the upper limit or the lower limit of conditional expression (3-5) may be replaced by the upper limit or the lower limit of conditional expression (3-5') or (3-5").

The zoom lens according to the third aspect of the present invention may be composed of the following four lens units arranged in order from the object side; a positive first lens unit, a negative second lens unit, a positive third lens unit, and a positive fourth lens unit. In this case, it is preferred that an aperture stop be provided in the zoom lens optical system, and during zooming from the wide angle end to the telephoto end, the first lens unit move in such a way that it is located closer to the object side at the telephoto end than at the wide angle end, the second lens unit move, the third lens unit move in such a way that it is located closer to the object side at the telephoto end than at the wide angle end, the fourth lens unit move, and the aperture stop move. During movement, the first lens unit may move only toward the object side, or it may move along a locus that is convex toward the object side or the image side. The second lens unit may move only toward the object side, or it may move along a locus that is convex toward the object side or the image side. The third lens unit may move only toward the object side, or it may move along a locus that is convex toward the object side. The fourth lens unit may move in such a way that it is located closer to the object side at the telephoto end than at the wide angle end, or it may move in such a way that it is located closer to the image side at the telephoto end than at the wide angle end. The fourth lens unit may move monotonously, or it may move along a locus that is convex toward the object side or the image side.

The zoom lens according to the third aspect of the present invention may be composed of the following five lens units arranged in order from the object side; a positive first lens unit, a negative second lens unit, a positive third lens unit, a negative fourth lens unit, and a positive fifth lens unit. In this case, it is preferred that an aperture stop be provided in the zoom lens optical system, and during zooming from the wide angle end to the telephoto end, the first lens unit move in such a way that it is located closer to the object side at the telephoto end than at the wide angle end, the second lens unit move, the third lens unit move in such a way that it is located closer to the object side at the telephoto end than at the wide angle end, the fourth lens unit move, the fifth lens unit move, and the aperture stop move. During movement, the first lens unit may move only toward the object side, or it may move along a locus that is convex toward the object side or the image side. The second lens unit may move only toward the object side, or it may move along a locus that is convex toward the object side or the image side. The third lens unit may move only toward the object side, or it may move along a locus that is convex toward the object side. The fourth lens unit may move only toward the object side, or it may move along a locus that is convex toward the object side or the image side. The fifth lens unit may move in such a way that it is located closer to the object side at the telephoto end than at the wide angle end, or it may move in such a way that it is located closer to the image side at the telephoto end than at the wide angle end. The fifth lens unit may move monotonously, or it may move along a locus that is convex toward the object side or the image side.

It is preferred that the aperture stop be disposed between the second lens unit and the third lens unit, and the aperture stop be moved integrally with the third lens unit during zooming. By this feature, the position of the entrance pupil can be made closer to the object side, and the position of the exit pupil can be made farther from the image plane. Since the aperture stop is disposed at a position at which the height of off-axis rays is low, the size of the aperture stop is not required to be made large, and the dead space in moving the aperture stop can be made small. The aperture stop may be replaced by a shutter unit.

By moving all the lens units as described above, it is possible to effectively provide each lens unit with a magnification changing function, and therefore excellent performance can be achieved even when the angle of field and the zoom ratio are increased. Moving the aperture stop enables not only effective correction of chromatic aberration of magnification and distortion to provide advantages with respect to the performance but also appropriate control of the position of the entrance pupil and the position of the exit pupil.

This means that a good balance between the ray height of off-axis beams at the wide angle end and the ray height of off-axis beams at the telephoto end can be achieved, and the outer diameter of the first lens unit and the outer diameter of the lens unit closest to the image side can be made small with a good balance. In particular at the wide angle end, a reduction in the outer diameter of the first lens unit advantageously leads to a reduction in the size of the lens with respect to the thickness direction (i.e. the direction along the optical axis). Furthermore, since variations in the position of the exit pupil during zooming (i.e. magnification change) can be controlled or made small, the angle of incidence of rays on the CCD or CMOS sensor or the like can be maintained within an appropriate range, whereby brightness falloff (or shading) in the peripheral region of the picture area can be prevented easily. Therefore, the zoom lens is suitable for use with an electronic image pickup element.

It is preferred that the zoom lens according to the third aspect of the present invention satisfy the following conditional expression:

$$4.0 < f_t/f_w < 20.0 \tag{3-6}$$

where $f_w$ is the focal length of the entire zoom lens system at the wide angle end, and $f_t$ is the focal length of the entire zoom lens system at the telephoto end.

If the upper limit of conditional expression (3-6) is not exceeded, adequate optical performance can easily be achieved by adopting the configuration according to the third aspect of the present invention. If the lower limit of conditional expression (3-6) is exceeded, the object of the present invention can be achieved with a simpler configuration, and therefore advantages in terms of the size and cost associated with this configuration according to the third aspect of the present invention cannot be enjoyed.

It is more preferred that conditional expression (3-6) presented above be modified into the following conditional expression (3-6') and this modified conditional expression (3-6') be satisfied:

$$5.5 < f_t/f_w < 15.0 \tag{3-6'}$$

Furthermore, it is still more preferred that conditional expression (3-6) be modified into the following conditional expression (3-6"), and this further modified conditional expression (3-6") be satisfied:

$$7.0 < f_t/f_w < 12.0 \tag{3-6"}$$

Only the upper limit or the lower limit of conditional expression (3-6) may be replaced by the upper limit or the lower limit of conditional expression (3-6') or (3-6").

It is preferred that the zoom lens according to the third aspect of the present invention satisfy the following conditional expression:

$$0.50 < I_{mw}/f_w < 1.00 \tag{3-7}$$

where $I_{mw}$ is the maximum image height at the wide angle end of the zoom lens, and $f_w$ is the focal length of the entire zoom lens system at the wide angle end.

If the upper limit of conditional expression (3-7) is not exceeded, adequate optical performance can easily be achieved by adopting the configuration according to the third aspect of the present invention. If the lower limit of conditional expression (3-7) is exceeded, the object of the present invention can be achieved with a simpler configuration, and therefore advantages in terms of the size and cost associated with this configuration according to the third aspect of the present invention cannot be enjoyed.

It is more preferred that conditional expression (3-7) presented above be modified into the following conditional expression (3-7') and this modified conditional expression (3-7') be satisfied:

$$0.60 < I_{mw}/f_w < 0.95 \tag{3-7'}$$

Furthermore, it is still more preferred that conditional expression (3-7) be modified into the following conditional expression (3-7") and this further modified conditional expression (3-7") be satisfied:

$$0.70 < I_{mw}/f_w < 0.80 \tag{3-7"}$$

Only the upper limit or the lower limit of conditional expression (3-7) may be replaced by the upper limit or the lower limit of conditional expression (3-7') or (3-7").

It is preferred that the first lens unit be composed of two or fewer lens elements. By constituting the first lens unit by such a small number of lens elements, compactness in the optical axis direction and the diametrical direction can be achieved.

It is preferred that the first lens unit have a negative lens element and a positive lens element.

The negative lens element and the positive lens element in the first lens unit may be cemented to each other. Use of such a cemented lens enables effective correction of on-axis chromatic aberration, which aberration can be detrimental when the focal length at the telephoto end is increased with an increase in the zoom ratio. In addition, use of the cemented lens enables a reduction of deterioration in the optical performance due to relative decentering of the lens elements caused by assembly error, and therefore contributes to improvement in the throughput and cost reduction.

The negative lens element and the positive lens element in the first lens unit may be independent (or separate) lens elements that are not cemented to each other. This configuration enables more effective correction of distortion and coma at the wide angle end and coma at the telephoto end.

In order to strike a balance between compactness and optical performance, it is preferred that the refracting power of the first lens unit be selected in such a way that the following conditional expression is satisfied:

$$0.40 < f_1/f_t < 1.30 \tag{3-8}$$

where $f_1$ is the focal length of the first lens unit, and $f_t$ is the focal length of the entire zoom lens system at the telephoto end.

If the upper limit of conditional expression (3-8) is not exceeded, the refracting power of the first lens unit is prevented from becoming unduly weak, and the entire length of the entire zoom lens system is prevented from becoming large. This facilitates a reduction in the size of the lens barrel.

If the lower limit of conditional expression (3-8) is not exceeded, the refracting power of the first lens unit is prevented from becoming strong, and spherical aberration and coma at the telephoto end can be reduced. This is advantageous in achieving good optical performance.

It is more preferred that conditional expression (3-8) presented above be modified into the following conditional expression (3-8') and this modified conditional expression (3-8') be satisfied:

$$0.50 < f_1/f_t < 1.00 \quad (3\text{-}8').$$

Furthermore, it is still more preferred that conditional expression (3-8) be modified into the following conditional expression (3-8") and this further modified conditional expression (3-8") be satisfied:

$$0.60 < f_1/f_t < 0.70 \quad (3\text{-}8'').$$

Only the upper limit or the lower limit of conditional expression (3-8) may be replaced by the upper limit or the lower limit of conditional expression (3-8') or (3-8").

The refracting power of the third lens unit be selected in such a way that the following conditional expression is satisfied:

$$0.10 < f_3/f_t < 0.75 \quad (3\text{-}9)$$

where $f_3$ is the focal length of the third lens unit, and $f_t$ is the focal length of the entire zoom lens system at the telephoto end.

If the upper limit of conditional expression (3-9) is not exceeded, the refracting power of the third lens unit is prevented from becoming weak, and the amount of movement for the magnification change can be made small. If the lower limit of conditional expression (3-9) is not exceeded, the paraxial image magnification is prevented from becoming unduly small, whereby the amount of movement for the magnification change is prevented from becoming unduly large. This facilitates correction of aberrations.

It is more preferred that conditional expression (3-9) presented above be modified into the following conditional expression (3-9') and this modified conditional expression (3-9') be satisfied:

$$0.15 < f_3/f_t < 0.50 \quad (3\text{-}9').$$

Furthermore, it is still more preferred that conditional expression (3-9) be modified into the following conditional expression (3-9") and this further modified conditional expression (3-9") be satisfied:

$$0.20 < f_3/f_t < 0.25 \quad (3\text{-}9'').$$

Only the upper limit or the lower limit of conditional expression (3-9) may be replaced by the upper limit or the lower limit of conditional expression (3-9') or (3-9").

It is preferred that a lens unit GR having a positive refracting power be disposed closest to the image side in the zoom lens. By this feature, the position of the exit pupil can be controlled appropriately, whereby it is made possible to cause rays to be incident on an electronic image pickup element such as a CCD or CMOS sensor efficiently.

It is preferred that the refracting power of this lens unit GR be selected in such a way that the following conditional expression is satisfied:

$$0.10 < f_R/f_t < 0.50 \quad (3\text{-}10)$$

where $f_R$ is the focal length of the lens unit located closest to the image side in the entire zoom lens system, and $f_t$ is the focal length of the entire zoom lens system at the telephoto end.

If the upper limit of conditional expression (3-10) is not exceeded, the refracting power of the lens unit GR is prevented from becoming weak, which facilitates correction of astigmatism and distortion throughout the zoom range. If the lower limit of conditional expression (3-10) is not exceeded, the refracting power of the lens unit GR is prevented from becoming strong, whereby overcorrection of astigmatism or distortion is prevented from occurring throughout the zoom position.

It is more preferred that conditional expression (3-10) presented above be modified into the following conditional expression (3-10') and this modified conditional expression (3-10') be satisfied:

$$0.15 < f_R/f_t < 0.40 \quad (3\text{-}10').$$

Furthermore, it is still more preferred that conditional expression (3-10) be modified into the following conditional expression (3-10") and this further modified conditional expression (3-10") be satisfied:

$$0.20 < f_R/f_t < 0.30 \quad (3\text{-}10'').$$

Only the upper limit or the lower limit of conditional expression (3-10) may be replaced by the upper limit or the lower limit of conditional expression (3-10') or (3-10").

In the above-described modes according to the third aspect of the invention, it is more preferred that some of the conditions and features, which may be selected arbitrarily, be adopted at the same time. In the modification (or further restriction) to the numerical range for each of the conditional expressions, the modification to only the upper limit value or the lower limit value may be made. Furthermore, the various features described above may be adopted in any possible combination.

By using an image pickup element that converts an image formed by the zoom lens into an electrical signal, there can be provided an electronic image pickup apparatus that is advantageous in reducing the size and in achieving a high zoom ratio and a wide angle of field while maintaining good image quality of picked-up images without difficulty.

Furthermore, it is preferred that the image pickup apparatus be provided with an image transformation section that transforms, by image processing, an electrical signal representing an image containing distortion attributed to the zoom lens into an image signal in which distortion is corrected. Thus, distortion is allowed to be left in images formed by the zoom lens. This provides further advantages in reducing the number of lens elements in the zoom lens and in making the size of the zoom lens smaller.

To meet the users' demand for a wider variety of photographing area than before without impairment of portability, the present invention can provide, according to the third aspect thereof, a zoom lens and an apparatus that are advantageous in achieving reduction in the size of the camera, a higher zoom ratio and a wider angle of field and suitable for use with an electronic image pickup element such as a CCD or CMOS sensor, and can provide images having good image quality without difficulty.

A zoom lens according to a fourth aspect of the present invention includes, in order from the object side thereof, a first lens unit having a positive refracting power, a second lens unit having a negative refracting power, and a third lens unit having a positive refracting power, wherein zooming is performed by changing the distances between the lens units, the first lens unit has one negative lens element and one positive lens element and the zoom lens satisfies the following conditional expressions:

$$0.1 < f_1/f_t < 1.05 \quad (4\text{-}1)$$

$$1.70 < nd_{1p} < 2.20 \quad (4\text{-}2)$$

where $f_1$ is the focal length of the first lens unit, $f_t$ is the focal length of the entire zoom lens system at the telephoto end, and $nd_{1p}$ is the refractive index for the d-line of a positive lens element in the first lens unit.

In the following, the reason why the above described configuration is adopted and advantages thereof will be described.

In the configuration adopted by the fourth aspect of the present invention, the zoom lens includes, in order from the object side, a first lens unit having a positive refracting power, a second lens unit having a negative refracting power and a third lens unit having a positive refracting power, and zooming is performed by changing the distances between the lens units. By this configuration, the magnification change is efficiently distributed (or divided) among the lens units, whereby variations in aberrations during zooming are made small. In addition, the amounts of movement of the respective lens units are prevented from becoming large, which makes the optical system compact. Furthermore, having one negative lens element and one positive lens element in the first lens unit enables good aberration correction.

The first lens unit is composed of two lens elements, or one negative lens and one positive lens. By constituting the first lens unit by such a small number of lens elements, the thickness along the optical axis direction can be made small, and the lens frame in the state in which the lens barrel is collapsed can be made small. Since in this case the position of the entrance pupil is made closer to the object side, the ray height on the first lens surface can be made lower, which facilitates a reduction in the size with respect to the diametrical direction.

In the case of the zoom lens configuration including, in order from the object side, a first lens unit having a positive refracting power, a second lens unit having a negative refracting power and a third lens unit having a positive refracting power, if the size of the zoom lens is to be made small, the first lens unit is required to have a strong refracting power. In order to strike a balance between the size reduction and aberration performance, it is preferred that the focal length of the first lens unit satisfy the following conditional expression:

$$0.1 < f_1/f_t < 1.05 \quad (4\text{-}1)$$

where $f_1$ is the focal length of the first lens unit, and $f_t$ is the focal length of the entire zoom lens system at the telephoto end.

If the upper limit of conditional expression (4-1) is not exceeded, the refracting power of the first lens unit is prevented from becoming unduly weak, which is advantageous in making the entire length of the entire zoom lens system short and in reducing the size of the lens barrel. If the lower limit of conditional expression (4-1) is not exceeded, the refracting power of the first lens unit is prevented from becoming unduly strong, which is advantageous in reducing spherical aberration and coma generated at the telephoto end and in achieving good optical performance.

It is more preferred that conditional expression (4-1) presented above be modified into the following conditional expression (4-1') and this modified conditional expression (4-1') be satisfied:

$$0.3 < f_1/f_t < 0.8 \quad (4\text{-}1').$$

Furthermore, it is still more preferred that conditional expression (4-1) be modified into the following conditional expression (4-1") and this further modified conditional expression (4-1") be satisfied:

$$0.4 < f_1/f_t < 0.68 \quad (4\text{-}1").$$

Only the upper limit or the lower limit of conditional expression (4-1) may be replaced by the upper limit or the lower limit of conditional expression (4-1') or (4-1").

Since a size reduction is aimed at by the present invention, the refracting power of the positive lens element in the first lens unit tends to be strong as described above, and therefore aberrations are likely to be large. In such cases, it is advantageous in achieving adequate aberration performance to make the refractive index of the lens as high as possible. This makes the curvature of the lens surfaces smaller and enables to provide a required refracting power while suppressing generation of aberrations to minimum.

Specifically, it is preferred that the following conditional expression (4-2) be satisfied:

$$1.70 < nd_{1p} < 2.20 \quad (4\text{-}2)$$

where $nd_{1p}$ is the refractive index for the d-line of a positive lens element in the first lens unit.

If the upper limit of conditional expression (4-2) is not exceeded, the cost of the glass material can be made low, and the availability of the glass material can be made higher. If the lower limit of conditional expression (4-2) is not exceeded, the refractive index of the positive lens element in the first lens unit is prevented from becoming unduly low, and the curvature of the lens surfaces of this positive lens element is prevented from becoming unduly high. This is advantageous in reducing aberrations, in particular spherical aberration and coma generated at the telephoto end.

It is more preferred that conditional expression (4-2) presented above be modified into the following conditional expression (4-2') and this modified conditional expression (4-2') be satisfied:

$$1.71 < nd_{1p} < 1.90 \quad (4\text{-}2').$$

Furthermore, it is still more preferred that conditional expression (4-2) be modified into the following conditional expression (4-2") and this further modified conditional expression (4-2") be satisfied:

$$1.74 < nd_{1p} < 1.78 \quad (4\text{-}2").$$

Only the upper limit or the lower limit of conditional expression (4-2) may be replaced by the upper limit or the lower limit of conditional expression (4-2') or (4-2").

Furthermore, in the above described zoom lens according to the fourth aspect of the present invention, it is more preferred that one or some of the following features be adopted.

In order to achieve adequate aberration performance, it is preferred that the lens elements in the first lens unit be designed to have shapes as specified below. It is preferred that the negative lens element in the first lens unit have a concave surface directed toward the image side, and the positive lens element have a convex surface directed toward the object side. By these features, the angle of incidence of rays on the positive lens element can be made small, and therefore off-axis aberrations such as coma and curvature of field at the wide angle end and spherical aberration and coma at the telephoto end can be made small. In this case, it is preferred that the following conditional expressions (4-3) and (4-4) be satisfied:

$$0.5 < R_{1pf}/f_{1p} < 10.0 \quad (4\text{-}3)$$

$$-2.0 < R_{1nr}/f_{1n} < -0.10 \quad (4\text{-}4)$$

where $R_{1pf}$ is the paraxial radius of curvature of the object side surface of the positive lens element in the first lens unit, and $f_{1p}$ is the focal length of the positive lens element in the first lens unit, $R_{1nr}$ is the paraxial radius of curvature of the image side surface of the negative lens element in the first lens unit, and $f_{1n}$ is the focal length of the negative lens element in the first lens unit.

If the upper limit of conditional expression (4-3) is not exceeded, the curvature of the object side surface of the positive lens element is prevented from becoming low, and it can have an adequate positive refracting power, which is advantageous in reducing the entire length of the zoom lens. If the lower limit of conditional expression (4-3) is not exceeded, the curvature is prevented from becoming high, which is advantageous in reducing off-axis aberrations such as coma and curvature of field at the wide angle end and spherical aberration and coma at the telephoto end.

If the upper limit of conditional expression (4-4) is not exceeded, the curvature of the image side surface of the negative lens element in the first lens unit is prevented from becoming low. This is advantageous in preventing the amount of aberrations generated by the negative lens element from becoming larger than needed for cancellation of aberrations generated by the positive lens element. If the lower limit of conditional expression (4-4) is not exceeded, the negative lens element can have an adequate negative refracting power. This is advantageous in satisfactorily canceling aberrations generated by the positive lens element in the first lens unit.

It is more preferred that conditional expression (4-3) presented above be modified into the following conditional expression (4-3') and this modified conditional expression (4-3') be satisfied:

$$0.65 < R_{1pf}/f_{1p} < 6.0 \quad (4\text{-}3').$$

Furthermore, it is still more preferred that conditional expression (4-3) be modified into the following conditional expression (4-3") and this further modified conditional expression (4-3") be satisfied:

$$0.77 < R_{1pf}/f_{1p} < 1.6 \quad (4\text{-}3").$$

Only the upper limit or the lower limit of conditional expression (4-3) may be replaced by the upper limit or the lower limit of conditional expression (4-3') or (4-3").

It is more preferred that conditional expression (4-4) presented above be modified into the following conditional expression (4-4') and this modified conditional expression (4-4') be satisfied:

$$-1.00 < R_{1nr}/f_{1n} < -0.19 \quad (4\text{-}4')$$

Furthermore, it is still more preferred that conditional expression (4-4) be modified into the following conditional expression (4-4") and this further modified conditional expression (4-4") be satisfied:

$$-0.32 < R_{1nr}/f_{1n} < -0.22 \quad (4\text{-}4").$$

Only the upper limit or the lower limit of conditional expression (4-4) may be replaced by the upper limit or the lower limit of conditional expression (4-4') or (4-4").

The negative lens element and the positive lens element in the first lens unit may be cemented to each other to constitute a cemented lens. Use of such a cemented lens enables effective correction of on-axis chromatic aberration, which aberration can be detrimental when the focal length at the telephoto end is increased with an increase in the zoom ratio. In addition, use of the cemented lens enables a reduction of deterioration in the optical performance due to relative decentering of the lens elements caused by assembly error, and therefore contributes to improvement in the throughput and cost reduction.

The negative lens element and the positive lens element in the first lens unit may be independent (or separate) lens elements that are not cemented to each other. This configuration enables more effective correction of distortion and coma at the wide angle end and coma at the telephoto end by making use of an air lens formed between the two lenses.

The zoom lens according to the fourth aspect of the present invention may be composed of the following four lens units arranged in order from the object side; a first lens unit having a positive refracting power, a second lens unit having a negative refracting power, a third lens unit having a positive refracting power, and a fourth lens unit having a positive refracting power. In this case, it is preferred that an aperture stop be provided in the zoom lens optical system, and during zooming from the wide angle end to the telephoto end, the first lens unit move in such a way that it is located closer to the object side at the telephoto end than at the wide angle end, the second lens unit move, the third lens unit move in such a way that it is located closer to the object side at the telephoto end than at the wide angle end, the fourth lens unit move, and the aperture stop move.

The zoom lens according to the fourth aspect of the present invention may be composed of the following five lens units arranged in order from the object side; a first lens unit having a positive refracting power, a second lens unit having a negative refracting power, a third lens unit having a positive refracting power, a fourth lens unit having a negative refracting power, and a fifth lens unit having a positive refracting power. In this case, it is preferred that an aperture stop be provided in the zoom lens optical system, and during zooming from the wide angle end to the telephoto end, the first lens unit move in such a way that it is located closer to the object side at the telephoto end than at the wide angle end, the second lens unit move, the third lens unit move in such a way that it is located closer to the object side at the telephoto end than at the wide angle end, the fourth lens unit move, the fifth lens unit move, and the aperture stop move.

By moving all the lens units as described above, it is possible to effectively provide each lens unit with a magnification changing function, and therefore excellent performance can be achieved even when the angle of field and the zoom ratio are increased. Moving the aperture stop enables not only effective correction of chromatic aberration of magnification and distortion to provide advantages with respect to the performance but also appropriate control of the position of the entrance pupil and the position of the exit pupil. This means that a good balance between the ray height of off-axis beams at the wide angle end and the ray height of off-axis beams at the telephoto end can be achieved, and the outer diameter of the first lens unit and the outer diameter of the lens unit closest to the image side can be made small with a good balance. In particular at the wide angle end, a reduction in the outer diameter of the first lens unit advantageously leads to a reduction in the size of the lens with respect to the thickness direction (i.e. the direction along the optical axis). Furthermore, since variations in the position of the exit pupil during zooming (i.e. magnification change) can be controlled or made small, the angle of incidence of rays on the CCD or CMOS sensor or the like can be maintained within an appropriate range, whereby brightness falloff (or shading) in the peripheral region of the picture area can be prevented from occurring. Therefore, the zoom lens is suitable for use with an electronic image pickup element.

In order to strike a balance between size reduction and aberration performance, it is preferred that the second lens unit satisfy the following conditional expression:

$$0.02<|f_2/f_t|<0.50 \tag{4-5}$$

where $f_2$ is the focal length of the second lens unit, and $f_t$ is the focal length of the entire zoom lens system at the telephoto end.

If the upper limit of conditional expression (4-5) is not exceeded, the refracting power of the second lens unit is prevented from becoming unduly weak, which is advantageous in reducing the size of the entire lens system. If the lower limit of conditional expression (4-5) is not exceeded, the refracting power of the second lens unit is prevented from becoming unduly strong, which is advantageous in reducing off-axis aberrations at the wide angle end and spherical aberration at the telephoto end.

It is more preferred that conditional expression (4-5) presented above be modified into the following conditional expression (4-5') and this modified conditional expression (4-5') be satisfied:

$$0.08<|f_2/f_t|<0.36 \tag{4-5'}$$

Furthermore, it is still more preferred that conditional expression (4-5) be modified into the following conditional expression (4-5") and this further modified conditional expression (4-5") be satisfied:

$$0.10<|f_2/f_t|<0.16 \tag{4-5"}$$

Only the upper limit or the lower limit of conditional expression (4-5) may be replaced by the upper limit or the lower limit of conditional expression (4-5') or (4-5").

It is preferred that the zoom lens according to the fourth aspect of the present invention be composed of nine or fewer lens elements. Increases in the number of lens elements will lead to increases in the cost and the size of the zoom lens.

It is preferred that the zoom lens according to the fourth aspect of the present invention satisfy the following conditional expression:

$$5.0<f_t/f_w<30.0 \tag{4-6}$$

where $f_w$ is the focal length of the entire zoom lens system at the wide angle end, and $f_t$ is the focal length of the entire zoom lens system at the telephoto end.

If the upper limit of conditional expression (4-6) is exceeded, it is difficult to achieve adequate optical performance by adopting the configuration according to the fourth aspect of the present invention. If the lower limit of conditional expression (4-6) is exceeded, the object of the present invention can be achieved with a simpler configuration, and therefore advantages in terms of the size and cost associated with the configuration according to the fourth aspect of the present invention cannot be enjoyed.

It is more preferred that conditional expression (4-6) presented above be modified into the following conditional expression (4-6') and this modified conditional expression (4-6') be satisfied:

$$6.5<f_t/f_w<20.0 \tag{4-6'}$$

Furthermore, it is still more preferred that conditional expression (4-6) be modified into the following conditional expression (4-6") and this further modified conditional expression (4-6") be satisfied:

$$9.0<f_t/f_w<15.0 \tag{4-6"}$$

Only the upper limit or the lower limit of conditional expression (4-6) may be replaced by the upper limit or the lower limit of conditional expression (4-6') or (4-6").

It is preferred that the zoom lens according to the fourth aspect of the present invention satisfy the following conditional expression:

$$0.50<I_{mw}/f_w<1.00 \tag{4-7}$$

where $I_{mw}$ is the maximum image height at the wide angle end of the zoom lens, and $f_w$ is the focal length of the zoom lens at the wide angle end.

If the upper limit of conditional expression (4-7) is exceeded, it is difficult to achieve adequate optical performance by adopting the configuration according to the fourth aspect of the present invention. If the lower limit of conditional expression (4-7) is exceeded, the object of the present invention can be achieved with a simpler configuration, and therefore advantages in terms of size and cost associated with the configuration according to the fourth aspect of the present invention cannot be enjoyed.

It is more preferred that conditional expression (4-7) presented above be modified into the following conditional expression (4-7') and this modified conditional expression (4-7') be satisfied:

$$0.60<I_{mw}/f_w<0.95 \tag{4-7'}$$

Furthermore, it is still more preferred that conditional expression (4-7) be modified into the following conditional expression (4-7") and this further modified conditional expression (4-7") be satisfied:

$$0.70<I_{mw}/f_w<0.80 \tag{4-7"}$$

Only the upper limit or the lower limit of conditional expression (4-7) may be replaced by the upper limit or the lower limit of conditional expression (4-7') or (4-7").

In order to achieve size reduction and good aberration performance, it is preferred that the zoom lens according to the fourth aspect of the present invention satisfy the following conditional expression:

$$5.0<L_t/I_{mw}<22.5 \tag{4-8}$$

where $L_t$ is the entire length of the entire zoom lens system at the telephoto end, and $I_{mw}$ is the maximum image height at the wide angle end of the zoom lens.

If the upper limit of conditional expression (4-8) is not exceeded, the entire length of the zoom lens system prevented from becoming unduly long, which is advantageous in reducing the size of the lens frame in the state in which the lens barrel is collapsed. If the lower limit of conditional expression (4-8) is not exceeded, the refracting powers of the respective lens units are prevented from becoming unduly strong, which is advantageous in achieving good correction of aberrations.

It is more preferred that the following conditional expression be satisfied:

$$8.0<L_t/I_{mw}<17.5 \tag{4-8'}$$

It is still more preferred that the following conditional expression be satisfied:

$$11.5<L_t/I_{mw}<14.5 \tag{4-8"}$$

Only the upper limit or the lower limit of conditional expression (4-8) may be replaced by the upper limit or the lower limit of conditional expression (4-8') or (4-8").

By using an image pickup element that converts an image formed by the zoom lens according to the fourth aspect of the present invention into an electrical signal, there can be provided an electronic image pickup apparatus that is advantageous in reducing the size and in achieving a high zoom ratio and a wide angle of field while maintaining good image quality of picked-up images without difficulty.

In a case where the positive lens elements in the first lens unit include only one positive lens element that has a relatively strong refracting power like in the case of the zoom lens according to the fourth aspect of the present invention, it is preferred that a glass material having a high refractive index be used for this positive lens element in order to make the amount of monochromatic aberration small, as described before.

On the other hand, from the viewpoint of correction of chromatic aberration, use of a glass material having a high refractive index tends to be disadvantageous. This is because in the existing glass materials, there is a tendency that the higher the refractive index of a glass material is, the smaller the Abbe number thereof is, and it is difficult to provide an adequate difference in the Abbe number between the positive lens element and the negative lens element in the first lens unit. In order to provide an adequate difference in the Abbe number between the positive lens element and the negative lens element in the first lens unit, a glass material having a further smaller Abbe number may be used in the negative lens element. However, the smaller the Abbe number of a glass material is, the higher the partial dispersion ratio thereof tends to be. Thus, use of such a glass material leads to an increase in chromatic aberration in the relatively short wavelength range generated by the negative lens element. For example, even if chromatic aberration for the c-line and f-line relative to the d-line is made small, chromatic aberration for the g-line will become large.

In particular, chromatic aberration of magnification can be a significant problem, and its detrimental effects increase with an increase in the angle of field at the wide angle end to thereby make it difficult to achieve a good balance of chromatic aberration of magnification at the wide angle end and that at the telephoto end.

In view of this, to obtain images having improved image quality, it is preferred to provide an image transformation section that transforms an electrical signal representing an image formed by the zoom lens into an image signal in which color misregistration caused by chromatic aberration of magnification is corrected by image processing. Such electrical correction of chromatic aberration of the zoom lens enables a reduction of color blur in picked up images and improvement in the resolution.

In typical electronic still cameras, an image of an object is separated into images of three primary colors or the first, the second, and the third primary colors, and a color image is reproduced by superimposing the respective output signals by computation. In a case where the zoom lens has chromatic aberration of magnification, if the image of the first primary color light is taken as a reference, then the positions at which the images of the second primary color light and the third primary color light are formed will be displaced from the position at the image of the first primary color light is formed.

To electrically correct chromatic aberration of magnification of an image, the amounts of displacement of the image positions with the second primary color light and the third primary color light relative to the image position with the first primary color light may be obtained in advance for each pixel of the image pickup element based on information on the aberration of the zoom lens. And coordinate transformation may be performed for each pixel of a picked up image in such a way that the displacement relative to the image position with the first primary color light is corrected. In a case, for example, where an image is composed of three output signals of a red (R) channel, a green (G) channel and a blue (B) channel, displacements in the image positions in the R and B channels from the image position in the G channel may be obtained for each pixel in advance, and coordinate transformation may performed on the picked up image to correct displacement from the image position in the G channel, and R and B signals after correction may be output.

Since chromatic aberration of magnification changes depending on the zoom position, the focus position and the stop value, it is preferred that displacement amounts of the image positions with the second and the third primary colors relative to the image position with the first primary color for every lens position (i.e. zoom position, focus position and stop value) be stored as correction data in a memory device. Such correction data may be referred to in accordance with the zoom position. Thus, the second and third primary color signals that have been corrected in terms of displacement relative to the first primary color signal can be output.

It is efficient to use optical aberration correction in the zoom lens and electronic aberration correction in the camera in cooperation in the following way. A glass material having a high refractive index may be used in a positive lens element to make monochromatic aberration small. Use of the glass material having a high refractive power in this lens element results in a small Abbe number. To compensate a decrease in the difference in the Abbe number between the positive lens element and a negative lens element, a glass material having a smaller Abbe number may be used in the negative lens element to thereby provide an adequate difference in the Abbe number relative to the positive lens element. Thus, chromatic aberration of magnification in the wave length range approximately from the c-line to the f-line can be corrected excellently in the zoom lens. Chromatic aberration of magnification in the wavelength range near and shorter than the g-line, in which a large amount of chromatic aberration of magnification will be generated due to an increase in the partial dispersion ratio with the use of the glass material having a small Abbe number in the negative lens element, may be mainly corrected electrically. Thus, it is possible to achieve good optical performance while reducing the size and increasing the zoom ratio.

Each channel of the image pickup element has sensitivity in a wavelength range extending over a certain width. For example, in the case of a CCD with a primary color filter, the R channel has sensitivity in a wavelength range approximately from 550 to 700 nm, the G channel has sensitivity in a wavelength range approximately from 450 to 600 nm, and the B channel has sensitivity in a wavelength range approximately from 400 to 500 nm. If chromatic aberration is not corrected optically to some extent in these wavelength ranges, reduction of color blur or improvement in resolution cannot be achieved as desired even if electrical correction is performed. In view of this, it is preferred that optical correction of chromatic aberration of magnification be performed in the zoom lens in such a way that the following conditional expression be satisfied:

$$2.0 < |\Delta c_{07} - \Delta f_{07}|/p < 15.0 \quad (4\text{-}9)$$

$$2.0 < |\Delta g_{10}|/p < 15.0 \quad (4\text{-}10)$$

where $\Delta c_{07}$, $\Delta g_{07}$, and $\Delta g_{07}$ are the amounts of chromatic aberration of magnification for the c-line, the f-line and the g-line respectively relative to the d-line at an image height equal to 70% of the maximum diagonal image height, $\Delta g_{10}$ is the amount of chromatic aberration of magnification for the g-line relative to the d-line at the maximum diagonal image height, and p is the pixel pitch of the image pickup element.

If the upper limits of conditional expressions (4-9) and (4-10) are not exceeded adequate correction of chromatic aberration is achieved in each channel, which is preferable in enjoying advantages of reduction in color blur and improvement in resolution achieved by electrical correction. If the lower limits of conditional expressions (4-9) and (4-10) are exceeded, electrical correction of chromatic aberration of magnification need not be performed.

It is more preferred that conditional expression (4-9) presented above be modified into the following conditional expression (4-9') and this modified conditional expression (4-') be satisfied:

$$2.5<|\Delta c_{07}-\Delta f_{07}|/p<12.0 \qquad (4-9').$$

Furthermore, it is still more preferred that conditional expression (4-9) be modified into the following conditional expression (4-9") be satisfied:

$$3.0<|\Delta c_{07}-\Delta f_{07}|/p<5.0 \qquad (4-9").$$

Only the upper limit or the lower limit of conditional expression (4-9) may be replaced by the upper limit or the lower limit of conditional expression (4-9') or (4-9").

It is more preferred that conditional expression (4-10) presented above be modified into the following conditional expression (4-10') and this modified conditional expression (4-10') be satisfied:

$$2.5<|\Delta g_{10}|/p<12.0 \qquad (4-10').$$

Furthermore, it is still more preferred that conditional expression (4-1) be modified into the following conditional expression (4-1") be satisfied:

$$3.0<|\Delta g_{10}|/p7.0 \qquad (4-10").$$

Only the upper limit or the lower limit of conditional expression (4-10) may be replaced by the upper limit or the lower limit of conditional expression (4-10') or (4-10").

In the relatively short wavelength range, the amount of chromatic aberration of magnification tends to increase drastically as the position changes away from the optical axis. In order to achieve correction of chromatic aberration of magnification with a good balance between that at image heights near the middle image height and that at image heights near the maximum image height by a simple algorithm, it is preferred that variations in the amount of chromatic aberration of magnification among different image heights be made as small as possible. Specifically, it is preferred that chromatic aberration of magnification be corrected in such a way that the following conditional expression be satisfied in the zoom lens:

$$|\Delta g_{10} \Delta g_{07}|/p<12.0 \qquad (4-11)$$

where $\Delta g_{07}$ is the amount of chromatic aberration of magnification for the g-line relative to the d-line at an image height equal to 70% of the maximum diagonal image height, $\Delta g_{10}$ is the amount of chromatic aberration of magnification for the g-line relative to the d-line at the maximum diagonal image height, and p is the pixel pitch of the image pickup element.

If the upper limit of conditional expression (4-11) is not exceeded, the difference between chromatic aberration of magnification at image heights near the middle image height and that at image heights near the maximum image height can be made small. This is advantageous in simplifying the algorithm for obtaining electrical correction amounts. This is also advantageous in reducing the size of the circuit for correction, in reducing load on computation process and in improving process speed.

It is more preferred that conditional expression (4-11) presented above be modified into the following conditional expression (4-11') and this modified conditional expression (4-11') be satisfied:

$$|\Delta g_{10}-\Delta g_{07}|/p<8.0 \qquad (4-11').$$

Furthermore, it is still more preferred that conditional expression (4-11) be modified into the following conditional expression (4-11") and this further modified conditional expression be satisfied:

$$|\Delta g_{10} \Delta g_{07}|/p21\ 5.0 \qquad (4-11").$$

Only the upper limit or the lower limit of conditional expression (4-11) may be replaced by the upper limit or the lower limit of conditional expression (4-11') or (4-11").

Furthermore, it is preferred that there be provided an image transformation section that transforms, by image processing, an electrical signal representing an image containing distortion attributed to the zoom lens according to the fourth aspect of the present invention into an image signal in which distortion is corrected. Thus, distortion is allowed to be left in images formed by the zoom lens. This provides further advantages in reducing the number of lens elements in the zoom lens and in making the size of the zoom lens smaller.

To meet the users' demand for a wider variety of photographing area than before, the present invention can provide, according to the fourth aspect thereof, a zoom lens and an apparatus that are advantageous in achieving reduction in the size of the camera, a higher zoom ratio and a wider angle of field and suitable for use with an electronic image pickup element such as a CCD or CMOS sensor, and can provide images having good image quality without difficulty.

In the following, embodiments of the zoom lens and the image pickup apparatus according to the present invention will be described in detail with reference to the drawings. It should be understood, however, that the present invention is not limited by the embodiments.

In the following, first to fifteenth embodiments of the zoom lens according to the present invention will be described. FIGS. 1A, 1B, 1C, 1D and 1E to 15A, 15B, 15C, 15D and 15E are cross sectional views of the zoom lenses according to the first to the fifteenth embodiments respectively at the wide angle end (FIGS. 1A to 15A), in a first intermediate focal length state (FIGS. 1B to 15B), in a second intermediate focal length state (FIGS. 1C to 15C), in a third intermediate focal length state (FIGS. 1D to 15D), and at the telephoto end (FIGS. 1E to 15E) in the state in which the zoom lenses are focused on an object point at infinity. In FIGS. 1A through 15E, a first lens unit is denoted by G1, a second lens unit is denoted by G2, an aperture stop is denoted by S, a third lens unit is denoted by G3, a fourth lens unit is denoted by G4, a plane parallel plate having wavelength range restriction coating applied thereon that blocks or reduces infrared light to constitute a low pass filter is denoted by F, a plane parallel plate constituting a cover glass for an electronic image pickup element is denoted by C, and the image plane is denoted by I. The cover glass C may have multi-layer coating for wavelength range restriction applied on its surface. The cover glass C may be designed to have a function of a low pass filter.

All the numerical data presented below are for the state in which the zoom lens is focused on an object at infinity. In the numerical data, dimensions are in mm (millimeters) and angles are in degrees. In all the embodiments, focusing is performed by moving the lens unit located closest to the image side. In all of the first to the ninth embodiments, the image height IH is 3.88 mm. Zoom data will be presented for the states at the wide angle end (WE), in the first to third intermediate focal length states (ST1, ST2 and ST3 respectively), and at the telephoto end (TE).

As shown in FIGS. 1A to 1E, the zoom lens according to the first embodiment has a first lens unit G1 having a positive refracting power, a second lens unit G2 having a negative refracting power, an aperture stop S, a third lens unit G3 having a positive refracting power, and a fourth lens unit G4 having a positive refracting power, which are arranged in the mentioned order from the object side.

During zooming from the wide angle end to the telephoto end, the first lens unit G1 moves only toward the object side, the second lens unit G2 moves along a locus that is convex toward the object side, and the third lens unit G3 moves only toward the object side. During zooming from the wide angle end to a certain intermediate zoom position, the fourth lens unit G4 moves along a locus that is convex toward the image side, and during zooming from this intermediate zoom position to the telephoto end, it moves along a locus that is convex toward the object side.

The first lens unit G1 is composed of a cemented lens composed, in order from the object side, of a negative meniscus lens having a convex surface directed toward the object side and a biconvex positive lens. The second lens unit G2 is composed, in order from the object side, of a biconcave negative lens and a cemented lens composed of a positive meniscus lens having a convex surface directed toward the image side and a biconcave negative lens. The third lens unit G3 is composed, in order from the object side, of a biconvex positive lens and a cemented lens composed of a positive meniscus lens having a convex surface directed toward the object side and a negative meniscus lens having a convex surface directed toward the object side. The fourth lens unit G4 is composed of a biconvex positive lens.

Aspheric surfaces are used in the image side surface of the biconvex positive lens in the first lens unit G1, both surfaces of the biconcave negative lens in the second lens unit G2, the image side surface of the biconcave negative lens located closest to the image side in the second lens unit G2, both surfaces of the biconvex positive lens in the third lens unit G3, and both surfaces of the biconvex positive lens in the fourth lens unit G4, namely there are eight aspheric surfaces.

As shown in FIGS. 2A to 2E, the zoom lens according to the second embodiment has a first lens unit G1 having a positive refracting power, a second lens unit G2 having a negative refracting power, an aperture stop S, a third lens unit G3 having a positive refracting power, and a fourth lens unit G4 having a positive refracting power, which are arranged in the mentioned order from the object side.

During zooming from the wide angle end to the telephoto end, the first lens unit G1 moves only toward the object side, the second lens unit G2 moves along a locus that is convex toward the object side, and the third lens unit G3 moves only toward the object side. During zooming from the wide angle end to a certain intermediate zoom position, the fourth lens unit G4 moves along a locus that is convex toward the image side, and during zooming from this intermediate zoom position to the telephoto end, it moves along a locus that is convex toward the object side.

The first lens unit G1 is composed of a cemented lens composed, in order from the object side, of a negative meniscus lens having a convex surface directed toward the object side and a biconvex positive lens. The second lens unit G2 is composed, in order from the object side, of a biconcave negative lens and a cemented lens composed of a positive meniscus lens having a convex surface directed toward the image side and a biconcave negative lens. The third lens unit G3 is composed, in order from the object side, of a biconvex positive lens and a cemented lens composed of a positive meniscus lens having a convex surface directed toward the object side and a negative meniscus lens having a convex surface directed toward the object side. The fourth lens unit G4 is composed of a biconvex positive lens.

Aspheric surfaces are used in the image side surface of the biconvex positive lens in the first lens unit G1, both surfaces of the biconcave negative lens in the second lens unit G2, the image side surface of the biconcave negative lens located closest to the image side in the second lens unit G2, both surfaces of the biconvex positive lens in the third lens unit G3, and both surfaces of the biconvex positive lens in the fourth lens unit G4, namely there are eight aspheric surfaces.

As shown in FIGS. 3A to 3E, the zoom lens according to the third embodiment has a first lens unit G1 having a positive refracting power, a second lens unit G2 having a negative refracting power, an aperture stop S, a third lens unit G3 having a positive refracting power, and a fourth lens unit G4 having a positive refracting power, which are arranged in the mentioned order from the object side.

During zooming from the wide angle end to the telephoto end, the first lens unit G1 moves only toward the object side, the second lens unit G2 moves along a locus that is convex toward the object side, and the third lens unit G3 moves only toward the object side. During zooming from the wide angle end to a certain intermediate zoom position, the fourth lens unit G4 moves along a locus that is convex toward the image side, and during zooming from this intermediate zoom position to the telephoto end, it moves along a locus that is convex toward the object side.

The first lens unit G1 is composed, in order from the object side, of a negative meniscus lens having a convex surface directed toward the object side and a biconvex positive lens. The second lens unit G2 is composed, in order from the object side, of a biconcave negative lens, a positive meniscus lens having a convex surface directed toward the image side and a biconcave negative lens. The third lens unit G3 is composed, in order from the object side, of a biconvex positive lens and a cemented lens composed of a positive meniscus lens having a convex surface directed toward the object side and a negative meniscus lens having a convex surface directed toward the object side. The fourth lens unit G4 is composed of a biconvex positive lens.

Aspheric surfaces are used in the image side surface of the biconvex positive lens in the first lens unit G1, both surfaces of the biconcave negative lens in the second lens unit G2, the image side surface of the biconcave negative lens located closest to the image side in the second lens unit G2, both surfaces of the biconvex positive lens in the third lens unit G3, and both surfaces of the biconvex positive lens in the fourth lens unit G4, namely there are eight aspheric surfaces.

As shown in FIGS. 4A to 4E, the zoom lens according to the fourth embodiment has a first lens unit G1 having a positive refracting power, a second lens unit G2 having a negative refracting power, an aperture stop S, a third lens unit G3 having a positive refracting power, and a fourth lens unit G4 having a positive refracting power, which are arranged in the mentioned order from the object side.

During zooming from the wide angle end to the telephoto end, the first lens unit G1 moves only toward the object side, the second lens unit G2 moves along a locus that is convex toward the object side, and the third lens unit G3 moves only toward the object side. During zooming from the wide angle end to a certain intermediate zoom position, the fourth lens unit G4 moves along a locus that is convex toward the image side, and during zooming from this intermediate zoom position to the telephoto end, it moves along a locus that is convex toward the object side.

The first lens unit G1 is composed of a cemented lens composed, in order from the object side, of a negative meniscus lens having a convex surface directed toward the object side and a biconvex positive lens. The second lens unit G2 is composed, in order from the object side, of a biconcave negative lens and a cemented lens composed of a positive meniscus lens having a convex surface directed toward the image side and a biconcave negative lens. The third lens unit G3 is composed, in order from the object side, of a biconvex positive lens and a cemented lens composed of a positive meniscus lens having a convex surface directed toward the object side and a negative meniscus lens having a convex surface directed toward the object side. The fourth lens unit G4 is composed of a biconvex positive lens.

Aspheric surfaces are used in the image side surface of the biconvex positive lens in the first lens unit G1, both surfaces of the biconcave negative lens located closest to the object side in the second lens unit G2, the image side surface of the biconcave negative lens located closest to the image side in the second lens unit G2, both surfaces of the biconvex positive lens in the third lens unit G3, and both surfaces of the biconvex positive lens in the fourth lens unit G4, namely there are eight aspheric surfaces.

As shown in FIGS. 5A to 5E, the zoom lens according to the fifth embodiment has a first lens unit G1 having a positive refracting power, a second lens unit G2 having a negative refracting power, an aperture stop S, a third lens unit G3 having a positive refracting power, and a fourth lens unit G4 having a positive refracting power, which are arranged in the mentioned order from the object side.

During zooming from the wide angle end to the telephoto end, the first lens unit G1 moves only toward the object side, the second lens unit G2 moves along a locus that is convex toward the object side, and the third lens unit G3 moves only toward the object side. During zooming from the wide angle end to a certain intermediate zoom position, the fourth lens unit G4 moves along a locus that is convex toward the image side, and during zooming from this intermediate zoom position to the telephoto end, it moves along a locus that is convex toward the object side.

The first lens unit G1 is composed of a cemented lens composed, in order from the object side, of a negative meniscus lens having a convex surface directed toward the object side and a biconvex positive lens. The second lens unit G2 is composed, in order from the object side, of a biconcave negative lens and a cemented lens composed of a positive meniscus lens having a convex surface directed toward the image side and a biconcave negative lens. The third lens unit G3 is composed, in order from the object side, of a biconvex positive lens and a cemented lens composed of a positive meniscus lens having a convex surface directed toward the object side and a negative meniscus lens having a convex surface directed toward the object side. The fourth lens unit G4 is composed of a biconvex positive lens.

Aspheric surfaces are used in the image side surface of the biconvex positive lens in the first lens unit G1, both surfaces of the biconcave negative lens located closest to the object side in the second lens unit G2, the image side surface of the biconcave negative lens located closest to the image side in the second lens unit G2, both surfaces of the biconvex positive lens in the third lens unit G3, and both surfaces of the biconvex positive lens in the fourth lens unit G4, namely there are eight aspheric surfaces.

As shown in FIGS. 6A to 6E, the zoom lens according to the sixth embodiment has a first lens unit G1 having a positive refracting power, a second lens unit G2 having a negative refracting power, an aperture stop S, a third lens unit G3 having a positive refracting power, and a fourth lens unit G4 having a positive refracting power, which are arranged in the mentioned order from the object side.

During zooming from the wide angle end to the telephoto end, the first lens unit G1 moves only toward the object side, the second lens unit G2 moves along a locus that is convex toward the object side, and the third lens unit G3 moves only toward the object side. During zooming from the wide angle end to a certain intermediate zoom position, the fourth lens unit G4 moves along a locus that is convex toward the image side, and during zooming from this intermediate zoom position to the telephoto end, it moves along a locus that is convex toward the object side.

The first lens unit G1 is composed of a cemented lens composed, on order from the object side, of a negative meniscus lens having a convex surface directed toward the object side and a biconvex positive lens. The second lens unit G2 is composed, in order from the object side, of a cemented lens composed of a biconcave negative lens and a positive meniscus lens having a convex surface directed toward the object side, and a cemented lens composed of a positive meniscus lens having a convex surface directed toward the image side and biconcave negative lens. The third lens unit G3 is composed, in order from the object side, of a biconvex positive lens and a cemented lens composed of a positive meniscus lens having a convex surface directed toward the object side and a negative meniscus lens having a convex surface directed toward to the object side. The fourth lens unit G4 is composed of a biconvex positive lens.

Aspheric surfaces are used in the image side surface of the biconvex positive lens in the first lens unit G1, the image side surface of the positive meniscus lens having a convex surface directed toward to the object side in the second lens unit G2, the image side surfaces of the biconcave negative lens located closest to the image side in the second lens unit G2, both surfaces of the biconvex positive lens in the third lens unit G3, and both surfaces of the biconvex positive lens in the fourth lens unit G4, namely there are seven aspheric surfaces.

As shown in FIGS. 7A to 7E, the zoom lens according to the seventh embodiment has a first lens unit G1 having a positive refracting power, a second lens unit G2 having a negative refracting power, an aperture stop S, a third lens unit G3 having a positive refracting power, and a fourth lens unit G4 having a positive refracting power, which are arranged in the mentioned order from the object side.

During zooming from the wide angle end to the telephoto end, the first lens unit G1 moves only toward the object side, the second lens unit G2 moves along a locus that is convex toward the object side, and the third lens unit G3 moves only toward the object side. During zooming from the wide angle end to a certain intermediate zoom position, the fourth lens unit G4 moves along a locus that is convex toward the image side, and during zooming from this intermediate zoom position to the telephoto end, it moves along a locus that is convex toward the object side.

The ways of movement of the respective lens units are not limited to those described above.

The first lens unit G1 is composed of a cemented lens composed, in order from the object side, of a negative meniscus lens having a convex surface directed toward the object side and a biconvex positive lens. The second lens unit G2 is composed, in order from the object side, of a biconcave negative lens and a cemented lens composed of a positive meniscus lens having a convex surface directed toward the image side and a biconcave negative lens. The third lens unit G3 is composed, in order from the object side, of a biconvex positive lens and a cemented lens composed of a positive meniscus lens having a convex surface directed toward the object side and a negative meniscus lens having a convex surface directed toward the object side. The fourth lens unit G4 is composed of a biconvex positive lens.

Aspheric surfaces are used in the image side surface of the biconvex positive lens in the first lens unit G1, both surfaces of the biconcave negative lens located closest to the object side in the second lens unit G2, the image side surface of the biconcave negative lens located closest to the image side in the second lens unit G2, both surfaces of the biconvex positive lens in the third lens unit G3, and both surfaces of the biconvex positive lens in the fourth lens unit G4, namely there are eight aspheric surfaces.

As shown in FIGS. 8A to 8E, the zoom lens according to the eighth embodiment has a first lens unit G1 having a positive refracting power, a second lens unit G2 having a negative refracting power, an aperture stop S, a third lens unit G3 having a positive refracting power, and a fourth lens unit G4 having a positive refracting power, which are arranged in the mentioned order from the object side.

During zooming from the wide angle end to the telephoto end, the first lens unit G1 moves only toward the object side, the second lens unit G2 moves only toward the object side, and the third lens unit G3 moves only toward the object side. During zooming from the wide angle end to a certain intermediate zoom position, the fourth lens unit G4 moves along a locus that is convex toward the image side, and during zooming from this intermediate zoom position to the telephoto end, it moves along a locus that is convex toward the object side.

The ways of movement of the respective lens units are not limited to those described above.

The first lens unit G1 is composed of a cemented lens composed, in order from the object side, of a negative meniscus lens having a convex surface directed toward the object side and a biconvex positive lens. The second lens unit G2 is composed, in order from the object side, of a biconcave negative lens and a cemented lens composed of a biconvex positive lens and a biconcave negative lens. The third lens unit G3 is composed, in order from the object side, of a biconvex positive lens and a negative meniscus lens having a convex surface directed toward the object side. The fourth lens unit G4 is composed of a positive meniscus lens having a convex surface directed toward the image side.

Aspheric surfaces are used in the image side surface of the biconvex positive lens in the first lens unit G1, both surfaces of the biconcave negative lens in the second lens unit G2, the image side surface of the biconcave negative lens located closest to the image side in the second lens unit G2, both surfaces of the biconvex positive lens in the third lens unit G3, the image side surface of the negative meniscus lens having a convex surface directed toward the object side in the third lens unit G3, and the image side surface of the positive meniscus lens having a convex surface directed toward the image side in the fourth lens unit G4, namely there are eight aspheric surfaces.

As shown in FIGS. 9A to 9E, the zoom lens according to the ninth embodiment has a first lens unit G1 having a positive refracting power, a second lens unit G2 having a negative refracting power, an aperture stop S, a third lens unit G3 having a positive refracting power, and a fourth lens unit G4 having a positive refracting power, which are arranged in the mentioned order from the object side.

During zooming from the wide angle end to the telephoto end, the first lens unit G1 moves only toward the object side, the second lens unit G2 moves along a locus that is convex toward the object side, the third lens unit G3 moves only toward the object side, and the fourth lens unit G4 moves only toward the image side.

The first lens unit G1 is composed of a cemented lens composed, in order from the object side, of a negative meniscus lens having a convex surface directed toward the object side and a biconvex positive lens. The second lens unit G2 is composed, in order from the object side, of a biconcave negative lens and a cemented lens composed of a biconcave negative lens and a positive meniscus lens having a convex surface directed toward the object side. The third lens unit G3 is composed, in order from the object side, of a biconvex positive lens and a cemented lens composed of a positive meniscus lens having a convex surface directed toward the object side and a negative meniscus lens having a convex surface directed toward the object side. The fourth lens unit G4 is composed of a biconvex positive lens.

Aspheric surfaces are used in the image side surface of the biconvex positive lens in the first lens unit G1, both surfaces of the biconcave negative lens located closest to the object side in the second lens unit G2, the image side surface of the positive meniscus lens in the second lens unit G2, both surfaces of the biconvex positive lens in the third lens unit G3, and both surfaces of the biconvex positive lens in the fourth lens unit G4, namely there are eight aspheric surfaces.

As shown in FIGS. 10A to 10E, the zoom lens according to the tenth embodiment has a first lens unit G1 having a positive refracting power, a second lens unit G2 having a negative refracting power, an aperture stop S, a third lens unit G3 having a positive refracting power, and a fourth lens unit G4 having a positive refracting power, which are arranged in the mentioned order from the object side.

During zooming from the wide angle end to the telephoto end, the first lens unit G1 moves only toward the object side, the second lens unit G2 moves along a locus that is convex toward the object side, and the third lens G3 unit moves only toward the object side. During zooming from the wide angle end to a certain intermediate zoom position, the fourth lens unit G4 moves along a locus that is convex toward the image side, and during zooming from this intermediate zoom position to the telephoto end, it moves along a locus that is convex toward the object side.

The first lens unit G1 is composed of a cemented lens composed, in order from the object side, of a negative meniscus lens having a convex surface directed toward the object side and a biconvex positive lens. The second lens unit G2 is composed, in order from the object side, of a biconcave negative lens and a cemented lens composed of a positive meniscus lens having a convex surface directed toward the image side and a negative meniscus lens having a convex surface directed toward the image side. The third lens unit G3 is composed, in order from the object side, of a biconvex positive lens and a cemented lens composed of a biconvex positive lens and a biconcave negative lens. The fourth lens unit G4 is composed of a biconvex positive lens.

Aspheric surfaces are used in the image side surface of the biconvex positive lens in the first lens unit G1, both surfaces of the biconcave negative lens in the second lens unit G2, the image side surface of the negative meniscus lens having a convex surface directed toward the image side in the second lens unit G2, both surfaces of the biconvex positive lens in the third lens unit G3, and both surfaces of the biconvex positive lens in the fourth lens unit G4, namely there are eight aspheric surfaces.

As shown in FIGS. 11A to 11E, the zoom lens according to the eleventh embodiment has a first lens unit G1 having a positive refracting power, a second lens unit G2 having a negative refracting power, an aperture stop S, a third lens unit G3 having a positive refracting power, and a fourth lens unit G4 having a positive refracting power, which are arranged in the mentioned order from the object side.

During zooming from the wide angle end to the telephoto end, the first lens unit G1 moves only toward the object side, the second lens unit G2 moves along a locus that is convex toward the object side, and the third lens unit G3 moves only toward the object side. During zooming from the wide angle end to a certain intermediate zoom position, the fourth lens unit G4 moves along a locus that is convex toward the image side, and during zooming from this intermediate zoom position to the telephoto end, it moves along a locus that is convex toward the object side.

The first lens unit G1 is composed of a cemented lens composed, in order from the object side, of a negative meniscus lens having a convex surface directed toward the object side and a biconvex positive lens. The second lens unit G2 is composed, in order from the object side, of a biconcave negative lens and a cemented lens composed of a positive meniscus lens having a convex surface directed toward the image side and a biconcave negative lens. The third lens unit G3 is composed, in order from the object side, of a biconvex positive lens and a cemented lens composed of a positive meniscus lens having a convex surface directed toward the object side and a negative meniscus lens having a convex surface directed toward the object side. The fourth lens unit G4 is composed of a biconvex positive lens.

Aspheric surfaces are used in the image side surface of the biconvex positive lens in the first lens unit G1, both surfaces of the biconcave negative lens in the second lens unit G2, the image side surface of the biconcave negative lens located closest to the image side in the second lens unit G2, both surfaces of the biconvex positive lens in the third lens unit G3, and both surfaces of the biconvex positive lens in the fourth lens unit G4, namely there are eight aspheric surfaces.

As shown in FIGS. 12A to 12E, the zoom lens according to the twelfth embodiment has a first lens unit G1 having a positive refracting power, a second lens unit G2 having a negative refracting power, an aperture stop S, a third lens unit G3 having a positive refracting power, a fourth lens unit G4 having a negative refracting power, and a fifth lens unit G5 having a positive refracting power, which are arranged in the mentioned order from the object side.

During zooming from the wide angle end to the telephoto end, the first lens unit G1 moves only toward the object side, the second lens unit G2 moves along a locus that is convex toward the object side, the third lens unit G3 moves only toward the object side, and the fourth lens unit G4 moves only toward the object side. During zooming from the wide angle end to a certain intermediate zoom position, the fifth lens unit moves along a locus that is convex toward the image side, and during zooming from this intermediate zoom position to the telephoto end, it moves along a locus that is convex toward the object side.

The first lens unit G1 is composed of a cemented lens composed, in order from the object side, of a negative meniscus lens having a convex surface directed toward the object side and a biconvex positive lens. The second lens unit G2 is composed, in order from the object side, of a biconcave negative lens and a cemented lens composed of a positive meniscus lens having a convex surface directed toward the image side and a biconcave negative lens. The third lens unit G3 is composed of a biconvex positive lens. The fourth lens unit G4 is composed of a cemented lens composed of a positive meniscus lens having a convex surface directed toward the object side and a negative meniscus lens having a convex surface directed toward the object side. The fifth lens unit G5 is composed of a biconvex positive lens.

Aspheric surfaces are used in the image side surface of the biconvex positive lens in the first lens unit G1, both surfaces of the biconcave negative lens in the second lens unit G2, the image side surface of the biconcave negative lens located closest to the image side in the second lens unit G2, both surfaces of the biconvex positive lens in the third lens unit G3, and both surfaces of the biconvex positive lens in the fifth lens unit G5, namely there are eight aspheric surfaces.

As shown in FIGS. 13A to 13E, the zoom lens according to the thirteenth embodiment has a first lens unit G1 having a positive refracting power, a second lens unit G2 having a negative refracting power, an aperture stop S, a third lens unit G3 having a positive refracting power, and a fourth lens unit G4 having a positive refracting power, which are arranged in the mentioned order from the object side.

During zooming from the wide angle end to the telephoto end, the first lens unit G1 moves only toward the object side, the second lens unit G2 moves along a locus that is convex toward the object side, and the third lens unit G3 moves only toward the object side. During zooming from the wide angle end to a certain intermediate zoom position, the fourth lens unit G4 moves along a locus that is convex toward the image side, and during zooming from this intermediate zoom position to the telephoto end, it moves along a locus that is convex toward the object side.

The first lens unit G1 is composed of a cemented lens composed, in order from the object side, of a negative meniscus lens having a convex surface directed toward the object side and a biconvex positive lens. The second lens unit G2 is composed, in order from the object side, of a biconcave negative lens and a cemented lens composed of a positive meniscus lens having a convex surface directed toward the image side and a biconcave negative lens. The third lens unit G3 is composed, in order from the object side, of a biconvex positive lens and a cemented lens composed of a positive meniscus lens having a convex surface directed toward the object side and a negative meniscus lens having a convex surface directed toward the object side. The fourth lens unit G4 is composed of a biconvex positive lens.

Aspheric surfaces are used in the image side surface of the biconvex positive lens in the first lens unit G1, both surfaces of the biconcave negative lens located closest to the object side in the second lens unit G2, the image side surface of the biconcave negative lens located closest to the image side in the second lens unit G2, both surfaces of the biconvex positive lens in the third lens unit G3, and both surfaces of the biconvex positive lens in the fourth lens unit G4, namely there are eight aspheric surfaces.

As shown in FIGS. 14A to 14E, the zoom lens according to the fourteenth embodiment has a first lens unit G1 having a positive refracting power, a second lens unit G2 having a negative refracting power, an aperture stop S, a third lens unit G3 having a positive refracting power, and a fourth lens unit G4 having a positive refracting power, which are arranged in the mentioned order from the object side.

During zooming from the wide angle end to the telephoto end, the first lens unit G1 moves only toward the object side, the second lens unit G2 moves along a locus that is convex toward the object side, and the third lens unit G3 moves only toward the object side. During zooming from the wide angle end to a certain intermediate zoom position, the fourth lens unit G4 moves along a locus that is convex toward the image side, and during zooming from this intermediate zoom position to the telephoto end, it moves along a locus that is convex toward the object side.

The first lens unit G1 is composed of a cemented lens composed, in order from the object side, of a negative meniscus lens having a convex surface directed toward the object side and a biconvex positive lens. The second lens unit G2 is composed, in order from the object side, of a negative meniscus lens having a convex surface directed to the object side and a cemented lens composed of a positive meniscus lens having a convex surface directed toward the image side and a biconcave negative lens. The third lens unit G3 is composed, in order from the object side, of a biconvex positive lens and a cemented lens composed of a negative meniscus lens having a convex surface directed toward to the object side and a negative meniscus lens having a convex surface directed toward the object side. The fourth lens unit G4 is composed of a biconvex positive lens.

Aspheric surfaces are used in the image side surface of the biconvex positive lens in the first lens unit G1, both surfaces of a negative meniscus lens having a convex surface directed toward the object side in the second lens unit G2, the image side surface of the biconcave negative lens in the second lens unit G2, both surfaces of the biconvex positive lens in the third lens unit G3, and both surfaces of the biconvex positive lens in the fourth lens unit G4, namely there are eight aspheric surfaces.

As shown in FIGS. 15A to 15E, the zoom lens according to the fifteenth embodiment has a first lens unit G1 having a positive refracting power, a second lens unit G2 having a negative refracting power, an aperture stop S, a third lens unit G3 having a positive refracting power, and a fourth lens unit G4 having a positive refracting power, which are arranged in the mentioned order from the object side.

During zooming from the wide angle end to the telephoto end, the first lens unit G1 moves only toward the object side, the second lens unit G2 moves along a locus that is convex toward the object side, and the third lens unit G3 moves only toward the object side. During zooming from the wide angle end to a certain intermediate zoom position, the fourth lens unit G4 moves along a locus that is convex toward the image side, and during zooming from this intermediate zoom position to the telephoto end, it moves along a locus that is convex toward the object side.

The first lens unit G1 is composed of a cemented lens composed, in order from the object side, of a negative meniscus lens having a convex surface directed toward the object side and a biconvex positive lens. The second lens unit G2 is composed, in order from the object side, of a biconcave negative lens and a cemented lens composed of a biconcave negative lens and a positive meniscus lens having a convex surface directed toward the object side. The third lens unit G3 is composed, in order from the object side, of a biconvex positive lens and a cemented lens composed of a positive meniscus lens having a convex surface directed toward the object side and a negative meniscus lens having a convex surface directed toward the object side. The fourth lens unit G4 is composed of a biconvex positive lens.

Aspheric surfaces are used in the image side surface of the biconvex positive lens in the first lens unit G1, both surfaces of the biconcave negative lens located closest to the object side in the second lens unit G2, the object side surface of the other (or adjacent) biconcave negative lens in the second lens unit G2, the image side surface of the positive meniscus lens having a convex surface directed toward the object side located closest to the image side in the second lens unit G2, both surfaces of the biconvex positive lens in the third lens unit G3, and both surfaces of the biconvex positive lens in the fourth lens unit G4, namely there are nine aspheric surfaces.

Numerical data of each embodiment described above is shown below. Apart from symbols described above, f denotes a focal length of the entire zoom lens system, $F_{NO}$ denotes an F number, ω denotes a half image angle, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of νd1, νd2, . . . denotes an Abbe's number for each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4 y^4+A_6 y^6+A_8 y^8+A_{10} y^{10}+A_{12} y^{12}$$

where, r denotes a paraxial radius of curvature, K denotes a conical coefficient, $A_4$, $A_6$, $A_8$, $A_{10}$, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Furthermore, in order to cut or block unwanted light that may cause ghost images, lens flare or the like, a flare stop may be provided in addition to the aperture stop.

The flare stop may be disposed on the object side of the first lens unit, between the first lens unit and the second lens unit, between the second lens unit and the third lens unit, between the third lens unit and the fourth lens unit, between the fourth lens unit and the fifth lens unit, or between the lens unit closest to the image side and the image plane. A frame member may be adapted to cut flare rays. Alternatively, a separate member may be provided for this purpose. The flare stop may be provided on a component of the optical system by direct printing, coating or by sticking a sheet. The aperture of the flare stop may have various shapes such as circular, elliptical, rectangular, or polygonal shape, or the shape of the aperture may be defined by a curve specified by a mathematical function. The flare stop may cut not only detrimental beams but also beams that may cause coma flare in the peripheral region of the picture area.

It is desirable that focusing for adjusting the focus position be performed by moving the lens unit located closest to the image side. Since the lens unit closest to the image side is light in weight, performing focusing by this lens unit makes the load on the motor smaller. In addition, performing focusing by this lens unit is advantageous in making the lens frame compact, since the entire length of the zoom lens does not change during focusing and the driving motor can be disposed inside the lens frame. Although it is preferred that focusing be performed by the lens unit located closest to the image side as described above, focusing may be performed by the first, the second, the third or the fourth lens unit. Alternatively, focusing may be performed by moving a plurality of lens units. Alternatively, focusing may be performed by advancing the entire lens system. Alternatively, focusing may be performed by shifting a part of the lenses forward or backward.

Brightness falloff (or shading) in the peripheral region of the image may be decreased by shifting microlenses in the CCD sensor. For example, the design of the microlenses in the CCD sensor may be varied in accordance with the angle of incidence of rays at the corresponding image height.

The falloff of brightness in the peripheral region of the image may be corrected by image processing.

In the sixteenth to the thirtieth embodiments, the zoom lenses according to the first to the fifteenth embodiments are respectively used in image pickup apparatuses that have a function of correcting distortion electrically, wherein the shape of the effective image pickup area is changed during zooming. Therefore, in the sixteenth to the thirtieth embodiments, the image height and the angle of field at a zoom position are different from those in the respective corresponding embodiments. Each image pickup apparatus is equipped with a zoom lens having half angle of field ω larger than 34 degrees at the wide angle end. In the sixteenth to the thirtieth embodiments, barrel distortion that appears at wide angle zoom positions is corrected electrically, and a thus corrected image is recorded or displayed.

In the zoom lenses according to the embodiments, barrel distortion appears on the rectangular photoelectric conversion surface, at the wide angle end. Whereas, at the telephoto end and at zoom positions near the intermediate focal length state, distortion is suppressed. To correct distortion electrically, the effective image pickup area is designed to have a barrel shape at the wide angle end and a rectangular shape in the intermediate focal length state and at the telephoto end. In addition, the effective image pickup area, which has been set in advance, is transformed into rectangular image information with decreased distortion by image transformation using image processing. The image height $IH_w$ at the wide angle end is designed to be smaller than the image height $IH_s$ in the intermediate focal length state and the image height $IH_t$ at the telephoto end.

In the sixteenth to thirtieth embodiments, the effective image pickup area is designed in such a way that the effective image pickup area at the wide angle end has a dimension in the shorter side direction equal to the dimension in the shorter side direction of the photoelectric conversion surface, and a distortion of approximately −3% remains after image processing. As a matter of course, a barrel shaped area smaller than that described above may be set as the effective image pickup area, and image resulting from transformation of this area into a rectangular area may be recorded/reproduced.

Anti-reflection coating may be applied to each of the lens elements to reduce ghost and flare. It is preferable to apply multi-coating, since it can reduce ghost and flare effectively. Furthermore, infrared cut coating may be applied on a lens surface or on a surface of a cover glass etc.

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

EXAMPLE 1

| Unit mm | | | | |
|---|---|---|---|---|
| Surface data | | | | |
| Surface no. | r | d | nd | vd |
| 1 | 24.448 | 0.80 | 2.00170 | 20.64 |
| 2 | 17.142 | 3.62 | 1.77250 | 49.60 |
| 3* | −205.108 | Variable | | |
| 4* | −255.591 | 0.80 | 1.83481 | 42.71 |
| 5* | 6.840 | 2.60 | | |
| 6 | −173.737 | 1.63 | 2.10225 | 16.79 |
| 7 | −18.519 | 0.80 | 1.83481 | 42.71 |
| 8* | 49.763 | Variable | | |
| 9(S) | ∞ | 0.30 | | |
| 10* | 5.805 | 2.49 | 1.69350 | 53.21 |
| 11* | −19.622 | 0.13 | | |
| 12 | 5.459 | 1.46 | 1.49700 | 81.54 |
| 13 | 37.187 | 0.78 | 2.00330 | 28.27 |
| 14 | 3.624 | Variable | | |
| 15* | 31.175 | 2.98 | 1.74330 | 49.33 |
| 16* | −14.538 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.37 | | |
| Image plane (Light receiving surface) | | | | |

-continued

Unit mm

Aspherical Surface data

3rd surface k = 0.000, A4 = 6.81891e−06, A6 = 2.74618e−09, A8 = −2.00369e−10, A10 = 1.08689e−12
4th surface k = 9.661, A4 = −1.41838e−05, A6 = −5.59393e−07, A8 = 1.82188e−08, A10 = −1.50719e−10
5th surface k = 0.420, A4 = 3.41139e−05, A6 = 5.52480e−06, A8 = −3.10379e−07, A10 = 2.53040e−09
8th surface k = −1.493, A4 = −3.62339e−04, A6 = −2.34270e−06, A8 = 1.00616e−07, A10 = −6.28966e−09
10th surface k = 1.006, A4 = −1.09878e−03, A6 = −2.81148e−05, A8 = −2.28722e−06, A10 = 5.34921e−10
11th surface k = −5.208, A4 = 3.43986e−04, A6 = 9.45047e−06, A8 = −2.32836e−06, A10 = 2.56249e−07
15th surface k = 0.000, A4 = 5.71049e−05, A6 = −2.81592e−06
16th surface k = 0.000, A4 = 1.31030e−04, A6 = −5.22363e−06, A8 = 4.69431e−08

Unit focal length

| f1 = 31.94 | f2 = −7.24 | f3 = 10.92 | f4 = 13.72 |
|---|---|---|---|

Zoom data

| | WE | ST1 | ST2 | ST3 | TE |
|---|---|---|---|---|---|
| f(mm) | 5.09 | 8.84 | 15.85 | 28.34 | 49.20 |
| FNO. | 3.22 | 4.16 | 4.92 | 5.67 | 6.00 |
| 2ω(°) | 81.22 | 47.23 | 26.86 | 15.39 | 8.96 |
| BF | 5.43 | 4.79 | 5.10 | 4.78 | 4.65 |
| Total length | 42.84 | 46.75 | 52.04 | 56.78 | 57.56 |
| d3 | 0.18 | 3.42 | 8.37 | 12.73 | 16.17 |
| d8 | 16.03 | 12.14 | 8.57 | 5.70 | 1.75 |
| d14 | 2.81 | 8.01 | 11.62 | 15.18 | 16.59 |
| d16 | 3.98 | 3.33 | 3.64 | 3.32 | 3.19 |

EXAMPLE 2

Unit mm

Surface data

| Surface no. | r | d | nd | νd |
|---|---|---|---|---|
| 1 | 24.750 | 0.80 | 2.10225 | 16.79 |
| 2 | 19.118 | 3.62 | 1.76802 | 49.24 |
| 3* | −178.118 | Variable | | |
| 4* | −285.349 | 0.80 | 1.83481 | 42.71 |
| 5* | 6.941 | 2.47 | | |
| 6 | −267.977 | 1.78 | 2.10225 | 16.79 |
| 7 | −18.223 | 0.80 | 1.83481 | 42.71 |
| 8* | 40.283 | Variable | | |
| 9(S) | ∞ | 0.30 | | |
| 10* | 5.411 | 2.57 | 1.69350 | 53.21 |
| 11* | −22.837 | 0.02 | | |
| 12 | 5.448 | 1.46 | 1.49700 | 81.54 |
| 13 | 34.274 | 0.62 | 2.00330 | 28.27 |
| 14 | 3.582 | Variable | | |
| 15* | 36.560 | 3.31 | 1.76802 | 49.24 |
| 16* | −14.197 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.37 | | |
| Image plane (Light receiving surface) | | | | |

Aspherical Surface data

3rd surface k = 0.000, A4 = 7.60141e−06, A6 = −6.14494e−10, A8 = −1.66413e−10, A10 = 9.96800e−13
4th surface k = 9.661, A4 = −6.41121e−05, A6 = −3.75130e−07, A8 = 3.89598e−08, A10 = −3.76958e−10
5th surface k = 0.420, A4 = −2.06875e−05, A6 = 4.78893e−06, A8 = −5.64122e−07, A10 = 1.10339e−08
8th surface k = −1.493, A4 = −3.76904e−04, A6 = 7.91618e−07, A8 = 1.71181e−08, A10 = −5.12772e−09
10th surface k = 0.971, A4 = −1.16819e−03, A6 = −2.45336e−05, A8 = −3.08002e−06, A10 = 2.76241e−08
11th surface k = −4.177, A4 = 6.64728e−04, A6 = 3.58772e−05, A8 = −4.27344e−06, A10 = 6.89037e−07
15th surface k = 0.000, A4 = 4.94926e−05, A6 = −3.22056e−06
16th surface k = 0.000, A4 = 1.33322e−04, A6 = −5.96091e−06, A8 = 5.14652e−08

Unit focal length

| f1 = 31.90 | f2 = −7.23 | f3 = 10.90 | f4 = 13.70 |
|---|---|---|---|

Zoom data

| | WE | ST1 | ST2 | ST3 | TE |
|---|---|---|---|---|---|
| f(mm) | 5.09 | 8.86 | 15.82 | 28.26 | 49.13 |
| FNO. | 3.22 | 4.13 | 4.89 | 5.54 | 6.00 |
| 2ω(°) | 81.16 | 47.13 | 26.91 | 15.41 | 8.99 |
| BF | 5.48 | 4.97 | 5.21 | 4.97 | 4.65 |
| Total length | 42.76 | 46.51 | 51.93 | 56.47 | 57.47 |
| d3 | 0.18 | 3.38 | 8.35 | 12.85 | 16.11 |
| d8 | 15.93 | 11.89 | 8.46 | 5.56 | 1.74 |
| d14 | 2.63 | 7.72 | 11.35 | 14.54 | 16.42 |
| d16 | 4.02 | 3.52 | 3.76 | 3.52 | 3.19 |

EXAMPLE 3

Unit mm

Surface data

| Surface no. | r | d | nd | νd |
|---|---|---|---|---|
| 1 | 24.863 | 0.80 | 2.00170 | 20.64 |
| 2 | 17.312 | 0.10 | | |

-continued

| Unit mm | | | | |
|---|---|---|---|---|
| 3 | 17.210 | 3.62 | 1.77250 | 49.60 |
| 4* | −191.434 | Variable | | |
| 5* | −246.633 | 0.80 | 1.83481 | 42.71 |
| 6* | 6.889 | 2.58 | | |
| 7 | −335.277 | 1.62 | 2.10225 | 16.79 |
| 8 | −19.220 | 0.10 | | |
| 9 | −17.266 | 0.80 | 1.83481 | 42.71 |
| 10* | 57.203 | Variable | | |
| 11(S) | ∞ | 0.30 | | |
| 12* | 5.805 | 2.49 | 1.69350 | 53.21 |
| 13* | −19.580 | 0.12 | | |
| 14 | 5.460 | 1.46 | 1.49700 | 81.54 |
| 15 | 36.680 | 0.78 | 2.00330 | 28.27 |
| 16 | 3.621 | Variable | | |
| 17* | 30.856 | 2.96 | 1.74330 | 49.33 |
| 18* | −14.638 | Variable | | |
| 19 | ∞ | 0.40 | 1.54771 | 62.84 |
| 20 | ∞ | 0.50 | | |
| 21 | ∞ | 0.50 | 1.51633 | 64.14 |
| 22 | ∞ | 0.37 | | |
| Image plane (Light receiving surface) | | | | |

Aspherical Surface data

4th surface $k = 0.000, A4 = 7.34610e{-}06, A6 = 3.10401e{-}09, A8 = -2.13114e{-}10,$
$A10 = 1.21240e{-}12$ 5th surface $k = 9.661, A4 = 1.06284e{-}05, A6 = -1.57115e{-}06, A8 = 3.70202e{-}08,$
$A10 = -2.77466e{-}10$ 6th surface $k = 0.420, A4 = 2.60126e{-}05, A6 = 4.72986e{-}06, A8 = -4.04118e{-}07,$
$A10 = 3.41610e{-}09$ 10th surface $k = -1.493, A4 = -3.50300e{-}04, A6 = -1.64241e{-}06,$
$A8 = 1.22037e{-}07, A10 = -6.35735e{-}09$ 12th surface $k = 1.007, A4 = -1.10618e{-}03, A6 = -2.77540e{-}05,$
$A8 = -2.42568e{-}06, A10 = 9.10635e{-}09$ 13th surface $k = -5.208, A4 = 3.37105e{-}04, A6 = 9.77823e{-}06, A8 = -2.56919e{-}06,$
$A10 = 2.74290e{-}07$ 17th surface $k = 0.000, A4 = 6.21981e{-}05, A6 = -2.54082e{-}06$ 18th surface $k = 0.000, A4 = 1.38383e{-}04, A6 = -5.28746e{-}06, A8 = 5.23493e{-}08$ Unit focal length

| f1 = 31.90 | f2 = −7.24 | f3 = 10.92 | f4 = 13.74 |
|---|---|---|---|

Zoom data

| | WE | ST1 | ST2 | ST3 | TE |
|---|---|---|---|---|---|
| f(mm) | 5.09 | 8.83 | 15.82 | 28.27 | 49.16 |
| FNO. | 3.23 | 4.16 | 4.93 | 5.67 | 6.00 |
| 2ω(°) | 80.92 | 47.17 | 26.89 | 15.43 | 8.98 |
| BF | 5.45 | 4.81 | 5.13 | 4.82 | 4.68 |
| Total length | 42.97 | 46.89 | 52.18 | 56.91 | 57.69 |
| d4 | 0.18 | 3.42 | 8.36 | 12.73 | 16.17 |
| d10 | 16.03 | 12.14 | 8.57 | 5.70 | 1.75 |
| d16 | 2.80 | 7.98 | 11.59 | 15.14 | 16.56 |
| d18 | 3.99 | 3.36 | 3.67 | 3.36 | 3.22 |

EXAMPLE 4

| Unit mm | | | | |
|---|---|---|---|---|
| Surface data | | | | |
| Surface no. | r | d | nd | νd |
| 1 | 24.339 | 0.80 | 2.00170 | 20.64 |
| 2 | 17.110 | 3.62 | 1.77250 | 49.60 |
| 3* | −202.575 | Variable | | |
| 4* | −177.740 | 0.80 | 1.83481 | 42.71 |
| 5* | 6.950 | 2.59 | | |
| 6 | −163.766 | 1.61 | 2.10225 | 16.79 |
| 7 | −18.781 | 0.80 | 1.83481 | 42.71 |
| 8* | 50.365 | Variable | | |
| 9(S) | ∞ | 0.30 | | |
| 10* | 5.888 | 2.49 | 1.69350 | 53.21 |
| 11* | −20.595 | 0.13 | | |
| 12 | 5.424 | 1.46 | 1.49700 | 81.54 |
| 13 | 32.252 | 0.78 | 2.00330 | 28.27 |
| 14 | 3.641 | Variable | | |
| 15* | 27.021 | 2.98 | 1.74330 | 49.33 |
| 16* | −14.981 | 0.00 | | |
| 17 | ∞ | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.37 | | |
| Image plane (Light receiving surface) | | | | |

Aspherical Surface data

3rd surface $k = 0.000, A4 = 6.92624e{-}06, A6 = -4.15511e{-}09, A8 = -1.07707e{-}10,$
$A10 = 6.92597e{-}13$ 4th surface $k = 9.661, A4 = -5.69038e{-}06, A6 = -7.03182e{-}07, A8 = 2.57624e{-}08,$
$A10 = -2.53661e{-}10$ 5th surface $k = 0.420, A4 = 7.71420e{-}05, A6 = 6.38529e{-}06, A8 = -3.31172e{-}07,$
$A10 = 4.46651e{-}09$ 8th surface $k = -1.493, A4 = -3.79273e{-}04, A6 = -4.05713e{-}06,$
$A8 = 2.48706e{-}07, A10 = -9.23062e{-}09$ 10th surface $k = 1.109, A4 = -1.12706e{-}03, A6 = -3.54246e{-}05,$
$A8 = -1.41383e{-}06, A10 = -7.53254e{-}08$ 11th surface $k = -6.647, A4 = 3.14775e{-}04, A6 = -7.34049e{-}06, A8 = 8.54655e{-}07,$
$A10 = 3.16244e{-}08$ 15th surface $k = 0.000, A4 = 7.18255e{-}05, A6 = -2.29705e{-}06$ 16th surface $k = 0.000, A4 = 1.37632e{-}04, A6 = -3.98775e{-}06, A8 = 3.38066e{-}08$ Unit focal length

| f1 = 31.73 | f2 = −7.24 | f3 = 11.12 | f4 = 13.37 |
|---|---|---|---|

Zoom data

| | WE | ST1 | ST2 | ST3 | TE |
|---|---|---|---|---|---|
| f(mm) | 5.08 | 8.75 | 16.50 | 28.17 | 49.11 |
| FNO. | 3.26 | 4.19 | 5.21 | 5.68 | 6.00 |
| 2ω(°) | 81.52 | 47.76 | 25.91 | 15.46 | 8.96 |
| BF | 5.52 | 4.92 | 4.27 | 4.86 | 4.65 |
| Total length | 42.88 | 46.89 | 51.74 | 56.92 | 57.54 |

-continued

| Unit mm | | | | | |
|---|---|---|---|---|---|
| d3 | 0.18 | 3.43 | 8.19 | 12.76 | 16.17 |
| d8 | 16.03 | 12.20 | 8.42 | 5.75 | 1.75 |
| d14 | 2.80 | 7.97 | 12.29 | 15.17 | 16.59 |
| d17 | 4.06 | 3.46 | 2.81 | 3.40 | 3.19 |

EXAMPLE 5

| Unit mm | | | | |
|---|---|---|---|---|
| Surface data | | | | |
| Surface no. | r | d | nd | vd |
| 1 | 26.484 | 0.80 | 1.94595 | 17.98 |
| 2 | 19.039 | 3.57 | 1.76802 | 49.24 |
| 3* | −142.037 | Variable | | |
| 4* | −83.779 | 0.80 | 1.85135 | 40.10 |
| 5* | 7.043 | 2.45 | | |
| 6 | −209.901 | 1.82 | 1.94595 | 17.98 |
| 7 | −14.409 | 0.70 | 1.76802 | 49.24 |
| 8* | 59.068 | Variable | | |
| 9(S) | ∞ | 0.30 | | |
| 10* | 5.492 | 2.38 | 1.69350 | 53.21 |
| 11* | −18.302 | 0.10 | | |
| 12 | 5.217 | 1.46 | 1.49700 | 81.54 |
| 13 | 34.074 | 0.51 | 2.00330 | 28.27 |
| 14 | 3.421 | Variable | | |
| 15* | 25.754 | 2.63 | 1.76802 | 49.24 |
| 16* | −16.836 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.37 | | |
| Image plane (Light receiving surface) | | | | |

Aspherical Surface data

3rd surface k = 0.000, A4 = 7.85007e−06, A6 = 6.48772e−10, A8 = −1.78686e−10,
A10 = 9.92964e−13
4th surface k = 9.661, A4 = 3.86707e−05, A6 = −9.71266e−07, A8 = 4.00322e−08,
A10 = −4.59818e−10
5th surface k = 0.487, A4 = 3.15015e−05, A6 = 6.21890e−06, A8 = −5.15861e−07,
A10 = 1.52931e−08
8th surface k = −1.686, A4 = −3.65583e−04, A6 = −2.14376e−06,
A8 = 9.39262e−08, A10 = −8.53029e−09
10th surface k = 1.266, A4 = −1.65072e−03, A6 = −5.88005e−05,
A8 = −5.46088e−06, A10 = −2.59951e−07
11th surface k = −6.076, A4 = 1.19118e−04, A6 = 4.57799e−06, A8 = −7.41918e−06,
A10 = 5.32189e−07
15th surface k = 0.000, A4 = 7.57492e−05, A6 = −5.18922e−07
16th surface k = 0.000, A4 = 1.02405e−04, A6 = −1.89883e−06, A8 = 2.69622e−08

-continued

| Unit mm | | | | |
|---|---|---|---|---|
| Unit focal length | | | | |
| f1 = 31.70 | f2 = −7.19 | f3 = 10.94 | f4 = 13.62 | |
| Zoom data | | | | |
| | WE | ST1 | ST2 | ST3 | TE |
| f(mm) | 5.12 | 8.76 | 15.93 | 28.29 | 48.96 |
| FNO. | 3.30 | 4.23 | 5.00 | 5.62 | 6.01 |
| 2ω(°) | 80.52 | 47.40 | 26.73 | 15.35 | 9.02 |
| BF | 5.40 | 4.85 | 5.16 | 4.86 | 4.82 |
| Total length | 42.12 | 46.19 | 51.75 | 56.15 | 56.94 |
| d3 | 0.22 | 3.62 | 8.54 | 13.19 | 16.42 |
| d8 | 15.50 | 11.82 | 8.18 | 5.41 | 1.39 |
| d14 | 3.49 | 8.39 | 12.35 | 15.18 | 16.80 |
| d16 | 3.94 | 3.40 | 3.71 | 3.40 | 3.36 |

EXAMPLE 6

| Unit mm | | | | |
|---|---|---|---|---|
| Surface data | | | | |
| Surface no. | r | d | nd | vd |
| 1 | 26.198 | 0.80 | 2.00170 | 20.64 |
| 2 | 17.942 | 3.62 | 1.77250 | 49.60 |
| 3* | −154.362 | Variable | | |
| 4 | −144.967 | 0.60 | 1.81600 | 46.62 |
| 5 | 5.980 | 0.30 | 1.63494 | 23.22 |
| 6* | 7.011 | 2.75 | | |
| 7 | −89.617 | 1.36 | 2.10225 | 16.79 |
| 8 | −20.683 | 0.70 | 1.83481 | 42.71 |
| 9* | 148.535 | Variable | | |
| 10(S) | ∞ | 0.30 | | |
| 11* | 5.462 | 2.38 | 1.69350 | 53.21 |
| 12* | −20.953 | 0.10 | | |
| 13 | 5.602 | 1.46 | 1.49700 | 81.54 |
| 14 | 39.362 | 0.70 | 2.00330 | 28.27 |
| 15 | 3.555 | Variable | | |
| 16* | 22.339 | 2.63 | 1.76802 | 49.24 |
| 17* | −18.692 | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.37 | | |
| Image plane (Light receiving surface) | | | | |

Aspherical Surface data

3rd surface k = 0.000, A4 = 6.47947e−06, A6 = −1.14895e−10, A8 = −7.34270e−11,
A10 = 2.62802e−13
6th surface
k = 0.487, A4 = 6.04053e−05, A6 = 7.39262e−06, A8 = −3.44043e−07,
A10 = 2.04347e−09
9th surface
k = −2.956, A4 = −3.38640e−04, A6 = −8.97078e−07,
A8 = 6.18615e−08, A10 = −5.19623e−09
11th surface
k = 0.983, A4 = −1.18677e−03, A6 = −3.05018e−05,
A8 = −3.05952e−06, A10 = 5.76584e−08
12th surface
k = −9.993, A4 = 4.92954e−04, A6 = 2.24028e−05, A8 = −3.36465e−06,
A10 = 5.75191e−07

-continued

Unit mm

16th surface k = 0.000, A4 = 6.91126e−05, A6 = −1.44097e−06
17th surface k = 0.000, A4 = 9.80410e−05, A6 = −3.86622e−06, A8 = 4.27893e−08

Unit focal length

| f1 = 32.98 | f2 = −7.48 | f3 = 11.03 | f4 = 13.63 |
|---|---|---|---|

Zoom data

| | WE | ST1 | ST2 | ST3 | TE |
|---|---|---|---|---|---|
| f(mm) | 5.12 | 8.82 | 15.93 | 28.29 | 49.12 |
| FNO. | 3.31 | 4.22 | 5.07 | 5.81 | 6.00 |
| 2ω(°) | 80.02 | 47.02 | 26.78 | 15.44 | 8.97 |
| BF | 5.15 | 4.76 | 4.95 | 4.80 | 4.71 |
| Total length | 42.77 | 46.29 | 51.85 | 56.78 | 57.16 |
| d3 | 0.20 | 3.69 | 8.52 | 13.20 | 17.05 |
| d9 | 16.21 | 12.00 | 8.32 | 5.37 | 1.25 |
| d15 | 3.53 | 8.15 | 12.37 | 15.72 | 16.45 |
| d17 | 3.69 | 3.30 | 3.49 | 3.34 | 3.25 |

EXAMPLE 7

Unit mm

Surface data

| Surface no. | r | d | nd | vd |
|---|---|---|---|---|
| 1 | 25.246 | 0.80 | 2.00170 | 20.64 |
| 2 | 17.504 | 3.62 | 1.77250 | 49.60 |
| 3* | −153.282 | Variable | | |
| 4* | −305.214 | 0.80 | 1.83481 | 42.71 |
| 5* | 6.969 | 2.49 | | |
| 6 | −113.524 | 1.41 | 2.10225 | 16.79 |
| 7 | −17.342 | 0.80 | 1.83481 | 42.71 |
| 8* | 47.705 | Variable | | |
| 9(S) | ∞ | 0.30 | | |
| 10* | 5.785 | 2.49 | 1.69350 | 53.21 |
| 11* | −18.928 | Variable | | |
| 12 | 5.454 | 1.46 | 1.49700 | 81.54 |
| 13 | 39.519 | 0.75 | 2.00330 | 28.27 |
| 14 | 3.569 | Variable | | |
| 15* | 23.547 | 2.89 | 1.74330 | 49.33 |
| 16* | −15.630 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.37 | | |
| Image plane (Light receiving surface) | | | | |

Aspherical Surface data

3rd surface k = 0.000, A4 = 7.44440e−06, A6 = −8.33092e−09, A8 = −3.71821e−11, A10 = 2.91551e−13
4th surface k = 9.661, A4 = −4.32718e−05, A6 = −6.38714e−07, A8 = 1.71954e−08, A10 = −9.58527e−11
5th surface k = 0.420, A4 = 4.73224e−05, A6 = 4.90359e−06, A8 = −3.23846e−07, A10 = −8.16179e−09

-continued

Unit mm

8th surface k = −1.493, A4 = −3.78547e−04, A6 = −4.88735e−06, A8 = 4.57516e−07, A10 = −1.06817e−08
10th surface k = 1.107, A4 = −1.22603e−03, A6 = −4.54873e−05, A8 = −1.89979e−06, A10 = −8.94718e−08
11th surface k = −5.742, A4 = 2.69445e−04, A6 = −1.08481e−05, A8 = −9.14413e−07, A10 = 1.47216e−07
15th surface k = 0.000, A4 = 7.97694e−05, A6 = −1.04934e−06
16th surface k = 0.000, A4 = 1.25993e−04, A6 = −1.93046e−06, A8 = 1.76452e−08

Unit focal length

| f1 = 31.77 | f2 = −7.19 | f3 = 6.66 | f4 = −7.01 | f5 = 13.05 |
|---|---|---|---|---|

Zoom data

| | WE | ST1 | ST2 | ST3 | TE |
|---|---|---|---|---|---|
| f(mm) | 5.11 | 8.74 | 15.91 | 28.38 | 49.06 |
| FNO. | 3.27 | 4.16 | 5.05 | 5.70 | 6.00 |
| 2ω(°) | 80.17 | 47.41 | 26.71 | 15.33 | 8.98 |
| BF | 5.47 | 4.86 | 4.80 | 4.62 | 4.72 |
| Total length | 42.62 | 46.19 | 51.27 | 56.36 | 57.18 |
| d3 | 0.18 | 3.42 | 8.11 | 12.68 | 16.18 |
| d8 | 16.03 | 12.06 | 8.40 | 5.72 | 1.74 |
| d11 | 0.11 | 0.21 | 0.32 | 0.28 | 0.26 |
| d14 | 3.03 | 7.84 | 11.83 | 15.27 | 16.48 |
| d16 | 4.01 | 3.40 | 3.34 | 3.16 | 3.26 |

EXAMPLE 8

Unit mm

Surface data

| Surface no. | r | d | nd | vd |
|---|---|---|---|---|
| 1 | 21.904 | 0.80 | 1.92286 | 18.90 |
| 2 | 15.598 | 3.50 | 1.74320 | 49.34 |
| 3* | −364.392 | Variable | | |
| 4* | −65.692 | 0.80 | 1.83481 | 42.71 |
| 5* | 4.791 | 2.33 | | |
| 6 | 29.098 | 1.54 | 1.94595 | 17.98 |
| 7 | −17.375 | 0.60 | 1.83481 | 42.71 |
| 8* | 23.863 | Variable | | |
| 9 (S) | ∞ | 0.30 | | |
| 10* | 4.239 | 2.70 | 1.49700 | 81.54 |
| 11* | −11.441 | 0.10 | | |
| 12 | 6.648 | 0.70 | 2.00170 | 20.64 |
| 13* | 4.236 | Variable | | |
| 14 | −33.457 | 1.50 | 1.74320 | 49.34 |
| 15* | −12.642 | 0.00 | | |
| 16 | ∞ | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | | | |
| Image plane (Light receiving surface) | | | | |

-continued

Unit mm

Aspherical surface data

3rd surface k = 0.000, A4 = 8.76629e−06, A6 = −1.37971e−08

4th surface k = 0.000, A4 = 1.11297e−03, A6 = −5.43425e−05, A8 = 1.17052e−06, A10 = −1.01620e−08

5th surface k = 0.000, A4 = 1.54233e−03, A6 = 5.60992e−05, A8 = −3.36931e−06, A10 = −1.08279e−08

8th surface k = 0.000, A4 = −7.67930e−04, A6 = −1.87891e−05, A8 = −1.16081e−07, A10 = −8.50836e−10

10th surface k = 0.000, A4 = −1.24286e−03, A6 = −7.89741e−05, A8 = −3.23347e−06, A10 = −7.17385e−08

11th surface k = 0.000, A4 = −3.26412e−04, A6 = −1.72582e−05, A8 = 1.59265e−06, A10 = −3.09326e−08

13th surface k = 0.000, A4 = 1.41264e−03, A6 = 9.83944e−05

15th surface k = 0.000, A4 = 3.00000e−05

Unit focal length

| f1 = 30.55 | f2 = −5.35 | f3 = 9.32 | f4 = 26.40 |
|---|---|---|---|

Zoom data

| | WE | ST1 | ST2 | ST3 | TE |
|---|---|---|---|---|---|
| f (mm) | 4.94 | 8.39 | 14.40 | 26.69 | 47.06 |
| FNO. | 3.50 | 4.47 | 5.15 | 4.73 | 6.00 |
| 2ω (°) | 82.28 | 49.93 | 29.25 | 16.04 | 9.36 |
| FB | 8.12 | 7.65 | 7.28 | 6.45 | 5.64 |
| Total length | 36.78 | 40.30 | 47.08 | 52.79 | 58.36 |
| d3 | 0.36 | 2.69 | 8.20 | 13.65 | 15.58 |
| d8 | 10.46 | 7.06 | 5.31 | 3.56 | 1.37 |
| d13 | 2.98 | 8.03 | 11.42 | 14.25 | 20.90 |
| d16 | 7.04 | 6.58 | 6.21 | 5.39 | 4.58 |

EXAMPLE 9

Unit mm

Surface data

| Surface no. | r | d | nd | vd |
|---|---|---|---|---|
| 1 | 26.824 | 0.80 | 1.94595 | 17.98 |
| 2 | 19.346 | 3.57 | 1.76802 | 49.24 |
| 3* | −154.401 | Variable | | |
| 4* | −128.260 | 0.80 | 1.85135 | 40.10 |
| 5* | 6.303 | 2.50 | | |
| 6 | −279.380 | 0.70 | 1.72916 | 54.68 |
| 7 | 18.472 | 1.06 | 2.10225 | 16.79 |
| 8* | 76.616 | Variable | | |

-continued

Unit mm

| 9 (S) | ∞ | 0.30 | | |
|---|---|---|---|---|
| 10* | 5.755 | 2.38 | 1.69350 | 53.21 |
| 11* | −18.998 | 0.10 | | |
| 12 | 5.340 | 1.46 | 1.49700 | 81.54 |
| 13 | 22.667 | 0.51 | 2.00330 | 28.27 |
| 14 | 3.587 | Variable | | |
| 15* | 22.674 | 2.63 | 1.76802 | 49.24 |
| 16* | −20.422 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.37 | | |
| Image plane (Light receiving surface) | | | | |

Aspherical surface data

3rd surface k = 0.000, A4 = 7.12229e−06, A6 = 9.11239e−09, A8 = −2.77095e−10, A10 = 1.37494e−12

4th surface k = 0.000, A4 = −1.91222e−05, A6 = −8.95933e−07, A8 = 3.48869e−08, A10 = −3.07714e−10

5th surface k = 0.000, A4 = 1.45289e−04, A6 = 1.20898e−05, A8 = −5.45063e−07, A10 = 5.13417e−09

8th surface k = 0.000, A4 = −2.92513e−04, A6 = −2.92168e−06, A8 = 1.95347e−07, A10 = −4.02860e−09

10th surface k = 0.000, A4 = −5.66147e−04, A6 = −5.92936e−06, A8 = −1.97982e−06, A10 = 1.47438e−07

11th surface k = 0.000, A4 = 3.01744e−04, A6 = 4.10563e−06, A8 = −3.64960e−06, A10 = 3.09816e−07

15th surface k = 0.000, A4 = 4.35091e−05, A6 = −2.12004e−06

16th surface k = 0.000, A4 = 5.32277e−05, A6 = −4.48825e−06, A8 = 4.83770e−08

Unit focal length

| f1 = 32.43 | f2 = −7.23 | f3 = 11.02 | f4 = 14.37 |
|---|---|---|---|

Zoom data

| | WE | ST1 | ST2 | ST3 | TE |
|---|---|---|---|---|---|
| f (mm) | 5.11 | 8.76 | 15.96 | 28.39 | 49.04 |
| FNO. | 3.35 | 4.30 | 5.16 | 5.72 | 6.00 |
| 2ω (°) | 81.05 | 47.66 | 26.67 | 15.26 | 8.96 |
| BF | 5.49 | 4.89 | 4.57 | 4.61 | 4.67 |
| Total length | 41.64 | 45.80 | 51.92 | 56.19 | 56.76 |
| d3 | 0.24 | 3.70 | 8.89 | 13.71 | 17.14 |
| d8 | 15.50 | 11.75 | 8.65 | 5.56 | 1.48 |
| d14 | 3.60 | 8.64 | 12.99 | 15.50 | 16.66 |
| d16 | 4.03 | 3.43 | 3.11 | 3.16 | 3.21 |

EXAMPLE 10

Unit mm

Surface data

| Surface no. | r | d | nd | νd |
|---|---|---|---|---|
| object plane | ∞ | ∞ | | |
| 1 | 26.057 | 0.90 | 1.92286 | 20.88 |
| 2 | 20.324 | 3.80 | 1.58913 | 61.14 |
| 3* | −90.043 | Variable | | |
| 4* | −228.052 | 0.80 | 1.85135 | 40.10 |
| 5* | 6.471 | 3.38 | | |
| 6 | −49.444 | 1.78 | 1.94595 | 17.98 |
| 7 | −13.033 | 0.70 | 1.74320 | 49.34 |
| 8* | −200.000 | Variable | | |
| 9 (S) | ∞ | 0.00 | | |
| 10* | 6.084 | 3.32 | 1.59201 | 67.02 |
| 11* | −14.229 | 0.14 | | |
| 12 | 8.776 | 1.88 | 1.49700 | 81.54 |
| 13 | −6.821 | 0.39 | 1.61293 | 37.00 |
| 14 | 4.070 | Variable | | |
| 15* | 22.340 | 2.72 | 1.52542 | 55.78 |
| 16* | −16.652 | 0.00 | | |
| 17 | ∞ | Variable | | |
| 18 | ∞ | 0.40 | 1.51633 | 64.14 |
| 19 | ∞ | 0.50 | | |
| 20 | ∞ | 0.50 | 1.51633 | 64.14 |
| 21 | ∞ | 0.37 | | |
| Image plane (Light receiving surface) | | | | |

Aspherical surface data

3rd surface

K = 0.000
A4 = 7.76723e−06, A6 = −5.17775e−09, A8 = −3.05628e−11,
A10 = 3.05364e−13, A12 = −1.22198e−15

4th surface

K = 0.000
A4 = 5.91800e−05, A6 = −2.71411e−06, A8 = 2.98672e−08,
A10 = −2.27323e−10

5th surface

K = 0.000
A4 = 2.01000e−04, A6 = 7.54437e−06, A8 = −3.08734e−07,
A10 = 1.56410e−08, A12 = −8.56105e−10

8th surface

K = 0.000
A4 = −2.82631e−04, A6 = −6.23538e−06, A8 = 4.00871e−07,
A10 = −1.47767e−08, A12 = 2.95296e−10

10th surface

K = 0.000
A4 = −4.86039e−04, A6 = −8.24264e−06, A8 = 6.61180e−07,
A10 = −7.89566e−08, A12 = 2.77593e−09

11th surface

K = 0.000
A4 = 3.02859e−04, A6 = −7.10097e−06, A8 = 1.24832e−06,
A10 = −1.31994e−07, A12 = 5.25802e−09

15th surface

K = 0.000
A4 = 5.85000e−05, A6 = −1.20206e−06, A8 = −7.74180e−28

16th surface

K = 0.000
A4 = 2.70961e−05, A6 = −2.27806e−06, A8 = 3.88946e−28

Unit mm

Unit focal length

| f1 = 39.37 | f2 = −7.56 | f3 = 11.52 | f4 = 18.60 |
|---|---|---|---|

Zoom data

| | WE | ST1 | ST2 | ST3 | TE |
|---|---|---|---|---|---|
| f (mm) | 5.09 | 8.84 | 15.45 | 28.06 | 49.11 |
| FNO. | 3.24 | 4.30 | 5.17 | 5.65 | 6.02 |
| 2ω (°) | 81.12 | 47.49 | 27.60 | 15.37 | 8.88 |
| Image height | 3.88 | 3.83 | 3.83 | 3.83 | 3.83 |
| BF | 6.12 | 4.96 | 5.51 | 5.74 | 5.43 |
| Total length | 44.97 | 48.88 | 55.42 | 62.74 | 65.89 |
| d3 | 0.30 | 3.56 | 9.14 | 16.53 | 21.35 |
| d8 | 15.75 | 11.28 | 7.52 | 4.79 | 1.64 |
| d14 | 2.98 | 9.27 | 13.44 | 15.87 | 17.67 |
| d17 | 4.59 | 3.47 | 4.02 | 4.24 | 3.91 |

EXAMPLE 11

Unit mm

Surface data

| Surface no. | r | d | nd | νd |
|---|---|---|---|---|
| 1 | 23.150 | 0.80 | 2.10225 | 16.79 |
| 2 | 18.554 | 3.50 | 1.69350 | 53.21 |
| 3* | −123.339 | Variable | | |
| 4* | −90.927 | 0.80 | 1.83481 | 42.71 |
| 5* | 7.048 | 2.48 | | |
| 6 | −1266.286 | 1.64 | 2.10225 | 16.79 |
| 7 | −20.159 | 0.80 | 1.83481 | 42.71 |
| 8* | 45.980 | Variable | | |
| 9 (S) | ∞ | 0.30 | | |
| 10* | 5.509 | 2.74 | 1.69350 | 53.21 |
| 11* | −20.746 | 0.02 | | |
| 12 | 5.150 | 1.46 | 1.49700 | 81.54 |
| 13 | 21.650 | 0.40 | 2.00330 | 28.27 |
| 14 | 3.456 | Variable | | |
| 15* | 46.848 | 3.28 | 1.76802 | 49.24 |
| 16* | −14.048 | 0.00 | | |
| 17 | ∞ | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.37 | | |
| Image plane (Light receiving surface) | | | | |

Aspherical surface data

3rd surface k = 0.000, A4 = 9.42966e−06, A6 = −1.39631e−09, A8 = −1.83250e−10,
A10 = 1.09250e−12

4th surface k = 0.000, A4 = 1.82511e−05, A6 = 1.01175e−07, A8 = −2.98947e−09

5th surface k = 0.420, A4 = 5.25802e−05, A6 = 6.14527e−06, A8 = −3.73155e−07,
A10 = 9.45056e−09

8th surface k = 0.000, A4 = −3.62054e−04, A6 = 1.24874e−07, A8 = −1.06766e−07,
A10 = −2.94196e−09

-continued

Unit mm

10th surface k = 0.000, A4 = −5.73729e−04, A6 = −4.44838e−06,
A8 = −2.33375e−06, A10 = 1.73331e−07
11th surface k = 0.000, A4 = 3.93312e−04, A6 = 3.45965e−06, A8 = −3.57062e−06,
A10 = 3.52884e−07
15th surface k = 0.000, A4 = 4.51650e−05, A6 = −3.05790e−06
16 surface k = 0.000, A4 = 1.02788e−04, A6 = −5.60166e−06, A8 = 5.10869e−08

Unit focal length

| f1 = 32.05 | f2 = −7.30 | f3 = 11.00 | f4 = 14.41 |

Zoom data

|  | WE | ST1 | ST2 | ST3 | TE |
|---|---|---|---|---|---|
| f (mm) | 5.10 | 8.85 | 15.85 | 28.27 | 49.16 |
| FNO. | 3.21 | 4.14 | 4.88 | 5.58 | 6.00 |
| 2ω (°) | 80.70 | 47.19 | 26.94 | 15.48 | 9.03 |
| BF | 5.67 | 4.91 | 5.27 | 4.94 | 4.67 |
| Total length | 42.89 | 46.71 | 51.83 | 56.40 | 57.43 |
| d3 | 0.18 | 3.40 | 8.39 | 12.86 | 16.21 |
| d8 | 16.12 | 12.18 | 8.48 | 5.59 | 1.72 |
| d14 | 2.71 | 8.00 | 11.47 | 14.80 | 16.62 |
| d17 | 4.21 | 3.45 | 3.82 | 3.48 | 3.21 |

EXAMPLE 12

Unit mm

Surface data

| Surface no. | r | d | nd | vd |
|---|---|---|---|---|
| 1 | 24.764 | 0.80 | 2.10225 | 16.79 |
| 2 | 19.124 | 3.62 | 1.76802 | 49.24 |
| 3* | −179.186 | Variable | | |
| 4* | −285.754 | 0.80 | 1.83481 | 42.71 |
| 5* | 7.075 | 2.43 | | |
| 6 | −181.865 | 1.66 | 2.10225 | 16.79 |
| 7 | −18.046 | 0.80 | 1.83481 | 42.71 |
| 8* | 37.195 | Variable | | |
| 9 (S) | ∞ | 0.30 | | |
| 10* | 5.451 | 2.54 | 1.69350 | 53.21 |
| 11* | −22.369 | Variable | | |
| 12 | 5.367 | 1.46 | 1.49700 | 81.54 |
| 13 | 44.307 | 0.59 | 2.00330 | 28.27 |
| 14 | 3.586 | Variable | | |
| 15* | 27.914 | 3.24 | 1.76802 | 49.24 |
| 16* | −15.386 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.37 | | |
| Image plane (Light receiving surface) | | | | |

-continued

Unit mm

Aspherical surface data

3rd surface k = 0.000, A4 = 7.40763e−06, A6 = −4.51297e−09, A8 = −1.21322e−10,
A10 = 8.60726e−13
4th surface k = 9.661, A4 = −9.35774e−05, A6 = 1.71199e−06, A8 = 2.91403e−09,
A10 = −1.86109e−10
5th surface k = 0.420, A4 = −2.83857e−05, A6 = 4.80878e−06, A8 = −5.87642e−07,
A10 = 1.52660e−08
8th surface k = −1.493, A4 = −3.69280e−04, A6 = 2.24600e−06, A8 = 1.60947e−08,
A10 = −6.38051e−09
10th surface k = 1.063, A4 = −1.24122e−03, A6 = −3.06956e−05,
A8 = −3.12274e−06, A10 = −4.08825e−08
11th surface k = −4.382, A4 = 6.02183e−04, A6 = 2.88488e−05, A8 = −4.06429e−06,
A10 = 6.22236e−07
15th surface k = 0.000, A4 = 7.41118e−05, A6 = −2.05696e−06
16th surface k = 0.000, A4 = 1.27914e−04, A6 = −3.62263e−06, A8 = 2.93175e−08

Unit focal length

| f1 = 31.95 | f2 = −7.11 | f3 = 6.57 | f4 = −6.99 | f5 = 13.35 |

Zoom data

|  | WE | ST1 | ST2 | ST3 | TE |
|---|---|---|---|---|---|
| f (mm) | 5.10 | 8.74 | 15.79 | 28.13 | 49.31 |
| FNO. | 3.25 | 4.10 | 4.89 | 5.55 | 6.00 |
| 2ω (°) | 80.48 | 47.63 | 26.96 | 15.47 | 8.95 |
| BF | 5.60 | 5.08 | 5.08 | 4.91 | 4.65 |
| Total length | 42.89 | 46.13 | 51.35 | 56.24 | 57.49 |
| d3 | 0.18 | 3.38 | 8.19 | 12.78 | 16.12 |
| d8 | 16.00 | 11.81 | 8.28 | 5.55 | 1.80 |
| d11 | 0.04 | 0.16 | 0.26 | 0.25 | 0.27 |
| d14 | 2.84 | 7.46 | 11.29 | 14.52 | 16.42 |
| d16 | 4.14 | 3.62 | 3.63 | 3.45 | 3.19 |

EXAMPLE 13

Unit mm

Surface data

| Surface no. | r | d | nd | vd |
|---|---|---|---|---|
| 1 | 24.090 | 0.80 | 2.00170 | 20.64 |
| 2 | 16.881 | 3.62 | 1.77250 | 49.60 |
| 3* | −237.720 | Variable | | |
| 4* | 19139.546 | 0.80 | 1.83481 | 42.71 |
| 5* | 7.022 | 2.48 | | |
| 6 | −246.009 | 1.43 | 2.10225 | 16.79 |

-continued

Unit mm

| | | | | |
|---|---|---|---|---|
| 7 | −18.939 | 0.80 | 1.83481 | 42.71 |
| 8* | 36.202 | Variable | | |
| 9 (S) | ∞ | 0.30 | | |
| 10* | 5.737 | 2.49 | 1.69350 | 53.21 |
| 11* | −75.021 | 0.37 | | |
| 12 | 7.276 | 1.46 | 1.65160 | 58.55 |
| 13 | 6.906 | 0.79 | 2.10225 | 16.79 |
| 14 | 3.848 | Variable | | |
| 15* | 33.027 | 2.99 | 1.74330 | 49.33 |
| 16* | −13.749 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.37 | | |
| Image plane (Light receiving surface) | | | | |

Aspherical surface data

3rd surface k = 0.000, A4 = 6.30333e−06, A6 = 2.48277e−09, A8 = −1.15085e−10, A10 = 5.00853e−13

4th surface k = 9.661, A4 = −6.45703e−05, A6 = −3.41266e−07, A8 = 2.96809e−08, A10 = −2.94996e−10

5th surface k = 0.420, A4 = 2.39561e−05, A6 = 4.75914e−06, A8 = −4.61329e−07, A10 = 1.26489e−08

8th surface k = −1.493, A4 = −3.85138e−04, A6 = −1.26117e−06, A8 = 6.50838e−09, A10 = −5.27597e−09

10th surface k = 1.007, A4 = −7.28139e−04, A6 = −8.13409e−06, A8 = −1.80592e−06, A10 = 1.36333e−07

11th surface k = −10.317, A4 = 9.53729e−04, A6 = 4.31457e−05, A8 = −1.37217e−06, A10 = 6.57763e−07

15th surface k = 0.000, A4 = 4.17738e−05, A6 = −1.04874e−06

16th surface k = 0.000, A4 = 1.13058e−04, A6 = −2.39178e−06, A8 = 2.38835e−08

Unit focal length

| f1 = 32.01 | f2 = −7.24 | f3 = 11.03 | f4 = 13.43 |
|---|---|---|---|

Zoom data

| | WE | ST1 | ST2 | ST3 | TE |
|---|---|---|---|---|---|
| f (mm) | 5.10 | 8.78 | 15.75 | 28.21 | 49.21 |
| FNO. | 3.27 | 4.19 | 4.94 | 5.67 | 6.00 |
| 2ω (°) | 81.26 | 47.58 | 27.12 | 15.52 | 8.99 |
| BF | 5.44 | 4.88 | 5.26 | 4.84 | 4.54 |
| Total length | 43.00 | 46.88 | 52.10 | 56.83 | 57.45 |
| d3 | 0.18 | 3.45 | 8.37 | 12.76 | 16.18 |
| d8 | 16.03 | 12.17 | 8.49 | 5.69 | 1.76 |
| d14 | 3.02 | 8.04 | 11.65 | 15.20 | 16.64 |
| d16 | 3.98 | 3.42 | 3.80 | 3.38 | 3.09 |

EXAMPLE 14

Unit mm

Surface data

| Surface no. | r | d | nd | vd |
|---|---|---|---|---|
| 1 | 24.090 | 0.80 | 2.00170 | 20.64 |
| 2 | 16.881 | 3.62 | 1.77250 | 49.60 |
| 3* | −237.720 | Variable | | |
| 4* | 19139.546 | 0.80 | 1.83481 | 42.71 |
| 5* | 7.022 | 2.48 | | |
| 6 | −246.009 | 1.43 | 2.10225 | 16.79 |
| 7 | −18.939 | 0.80 | 1.83481 | 42.71 |
| 8* | 36.202 | Variable | | |
| 9 (S) | ∞ | 0.30 | | |
| 10* | 5.737 | 2.49 | 1.69350 | 53.21 |
| 11* | −75.021 | 0.37 | | |
| 12 | 7.276 | 1.46 | 1.65160 | 58.55 |
| 13 | 6.906 | 0.79 | 2.10225 | 16.79 |
| 14 | 3.848 | Variable | | |
| 15* | 33.027 | 2.99 | 1.74330 | 49.33 |
| 16* | −13.749 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.37 | | |
| Image plane (Light receiving surface) | | | | |

Aspherical surface data

3rd surface k = 0.000, A4 = 6.30333e−06, A6 = 2.48277e−09, A8 = −1.15085e−10, A10 = 5.00853e−13

4th surface k = 9.661, A4 = −6.45703e−05, A6 = −3.41266e−07, A8 = 2.96809e−08, A10 = −2.94996e−10

5th surface k = 0.420, A4 = 2.39561e−05, A6 = 4.75914e−06, A8 = −4.61329e−07, A10 = 1.26489e−08

8th surface k = −1.493, A4 = −3.85138e−04, A6 = −1.26117e−06, A8 = 6.50838e−09, A10 = −5.27597e−09

10th surface k = 1.007, A4 = −7.28139e−04, A6 = −8.13409e−06, A8 = −1.80592e−06, A10 = 1.36333e−07

11th surface k = −10.317, A4 = 9.53729e−04, A6 = 4.31457e−05, A8 = −1.37217e−06, A10 = 6.57763e−07

15th surface k = 0.000, A4 = 4.17738e−05, A6 = −1.04874e−06

16th surface k = 0.000, A4 = 1.13058e−04, A6 = −2.39178e−06, A8 = 2.38835e−08

Unit focal length

| f1 = 32.01 | f2 = −7.24 | f3 = 11.03 | f4 = 13.43 |
|---|---|---|---|

Zoom data

| | WE | ST1 | ST2 | ST3 | TE |
|---|---|---|---|---|---|
| f (mm) | 5.10 | 8.78 | 15.75 | 28.21 | 49.21 |
| FNO. | 3.27 | 4.19 | 4.94 | 5.67 | 6.00 |
| 2ω (°) | 81.26 | 47.58 | 27.12 | 15.52 | 8.99 |
| BF | 5.44 | 4.88 | 5.26 | 4.84 | 4.54 |

-continued

Unit mm

| | | | | | |
|---|---|---|---|---|---|
| Total length | 43.00 | 46.88 | 52.10 | 56.83 | 57.45 |
| d3 | 0.18 | 3.45 | 8.37 | 12.76 | 16.18 |
| d8 | 16.03 | 12.17 | 8.49 | 5.69 | 1.76 |
| d14 | 3.02 | 8.04 | 11.65 | 15.20 | 16.64 |
| d16 | 3.98 | 3.42 | 3.80 | 3.38 | 3.09 |

EXAMPLE 15

Unit mm

Surface data

| Surface no. | r | d | nd | νd |
|---|---|---|---|---|
| 1 | 26.649 | 0.80 | 1.94595 | 17.98 |
| 2 | 19.024 | 3.57 | 1.76802 | 49.24 |
| 3* | −131.627 | Variable | | |
| 4* | −76.902 | 0.80 | 1.85135 | 40.10 |
| 5* | 6.873 | 2.45 | | |
| 6* | −49.076 | 0.70 | 1.76802 | 49.24 |
| 7 | 18.933 | 1.76 | 2.10225 | 16.79 |
| 8* | 226.488 | Variable | | |
| 9 (S) | ∞ | 0.30 | | |
| 10* | 5.456 | 2.38 | 1.69350 | 53.21 |
| 11* | −19.210 | 0.10 | | |
| 12 | 5.302 | 1.46 | 1.49700 | 81.54 |
| 13 | 27.733 | 0.51 | 2.00330 | 28.27 |
| 14 | 3.419 | Variable | | |
| 15* | 25.975 | 2.63 | 1.76802 | 49.24 |
| 16* | −16.829 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.37 | | |
| Image plane (Light receiving surface) | | | | |

Aspherical surface data

3rd surface k = 0.000, A4 = 7.94392e−06, A6 = 5.89517e−09, A8 = −2.47525e−10, A10 = 1.30153e−12

4th surface k = 0.000, A4 = 9.88808e−06, A6 = −2.28574e−06, A8 = 7.63451e−08, A10 = −6.47994e−10

5th surface k = 0.000, A4 = 2.28618e−04, A6 = 1.24535e−05, A8 = −5.66191e−07, A10 = 4.27110e−08

6th surface k = 0.000, A4 = 3.04014e−04, A6 = −7.11000e−07, A8 = 8.93657e−07, A10 = −1.62614e−08

8th surface k = 0.000, A4 = −9.92982e−05, A6 = −2.54438e−06, A8 = 4.71636e−07, A10 = −1.99720e−08

10th surface k = 0.000, A4 = −6.50584e−04, A6 = −1.72392e−05, A8 = −1.40723e−06, A10 = 4.91904e−08

11th surface k = 0.000, A4 = 3.18580e−04, A6 = −1.69612e−05, A8 = −1.30044e−06, A10 = 1.11576e−07

-continued

Unit mm

15th surface k = 0.000, A4 = 6.38253e−05, A6 = −1.25797e−06

16th surface k = 0.000, A4 = 8.12873e−05, A6 = −2.41254e−06, A8 = 2.35806e−08

Unit focal length

| f1 = 31.53 | f2 = −7.19 | f3 = 10.99 | f4 = 13.66 |
|---|---|---|---|

Zoom data

| | WE | ST1 | ST2 | ST3 | TE |
|---|---|---|---|---|---|
| f (mm) | 5.11 | 8.70 | 15.87 | 28.19 | 49.05 |
| FNO. | 3.29 | 4.22 | 4.99 | 5.61 | 6.00 |
| 2ω (°) | 81.29 | 47.79 | 26.84 | 15.41 | 9.00 |
| BF | 5.46 | 4.92 | 5.21 | 4.89 | 4.74 |
| Total length | 42.11 | 46.17 | 51.75 | 56.11 | 56.88 |
| d3 | 0.25 | 3.62 | 8.56 | 13.20 | 16.42 |
| d8 | 15.50 | 11.83 | 8.20 | 5.41 | 1.40 |
| d14 | 3.44 | 8.35 | 12.33 | 15.15 | 16.86 |
| d16 | 4.00 | 3.46 | 3.75 | 3.43 | 3.29 |

The zoom lens used in the sixteenth embodiment is the same as the zoom lens according to the first embodiment.

The zoom lens used in the seventeenth embodiment is the same as the zoom lens according to the second embodiment.

The zoom lens used in the eighteenth embodiment is the same as the zoom lens according to the third embodiment.

The zoom lens used in the nineteenth embodiment is the same as the zoom lens according to the fourth embodiment.

The zoom lens used in the twentieth embodiment is the same as the zoom lens according to the fifth embodiment.

The zoom lens used in the twenty-first embodiment is the same as the zoom lens according to the sixth embodiment.

The zoom lens used in the twenty-second embodiment is the same as the zoom lens according to the seventh embodiment.

The zoom lens used in the twenty-third embodiment is the same as the zoom lens according to the eighth embodiment.

The zoom lens used in the twenty-fourth embodiment is the same as the zoom lens according to the ninth embodiment.

The zoom lens used in the twenty-fifth embodiment is the same as the zoom lens according to the tenth embodiment.

The zoom lens used in the twenty-sixth embodiment is the same as the zoom lens according to the eleventh embodiment.

The zoom lens used in the twenty-seventh embodiment is the same as the zoom lens according to the twelfth embodiment.

The zoom lens used in the twenty-eighth embodiment is the same as the zoom lens according to the thirteenth embodiment.

The zoom lens used in the twenty-ninth embodiment is the same as the zoom lens according to the fourteenth embodiment.

The zoom lens used in the thirtieth embodiment is the same as the zoom lens according to the fifteenth embodiment.

Data of image height and total image angle in sixteenth embodiment are as shown below.

| Zoom data | | | | | |
|---|---|---|---|---|---|
| | WE | ST1 | ST2 | ST3 | TE |
| f (mm) | 5.09 | 8.84 | 15.85 | 28.34 | 49.20 |
| FNO. | 3.22 | 4.16 | 4.92 | 5.67 | 6.00 |
| 2ω (°) | 78.29 | 47.23 | 26.86 | 15.39 | 8.96 |
| Image height | 3.70 | 3.88 | 3.88 | 3.88 | 3.88 |

Data of image height and total image angle in seventeenth embodiment are as shown below.

| Zoom data | | | | | |
|---|---|---|---|---|---|
| | WE | ST1 | ST2 | ST3 | TE |
| f (mm) | 5.09 | 8.86 | 15.82 | 28.26 | 49.13 |
| FNO. | 3.22 | 4.13 | 4.89 | 5.54 | 6.00 |
| 2ω (°) | 78.23 | 47.13 | 26.91 | 15.41 | 8.99 |
| Image height | 3.70 | 3.88 | 3.88 | 3.88 | 3.88 |

Data of image height and total image angle in eighteenth embodiment are as shown below.

| Zoom data | | | | | |
|---|---|---|---|---|---|
| | WE | ST1 | ST2 | ST3 | TE |
| f (mm) | 5.09 | 8.83 | 15.82 | 28.27 | 49.16 |
| FNO. | 3.23 | 4.16 | 4.93 | 5.67 | 6.00 |
| 2ω (°) | 78.19 | 47.17 | 26.89 | 15.43 | 8.98 |
| Image height | 3.71 | 3.88 | 3.88 | 3.88 | 3.88 |

Data of image height and total image angle in nineteenth embodiment are as shown below.

| Zoom data | | | | | |
|---|---|---|---|---|---|
| | WE | ST1 | ST2 | ST3 | TE |
| f (mm) | 5.08 | 8.75 | 16.50 | 28.17 | 49.11 |
| FNO. | 3.26 | 4.19 | 5.21 | 5.68 | 6.00 |
| 2ω (°) | 78.59 | 47.76 | 25.91 | 15.46 | 8.96 |
| Image height | 3.70 | 3.88 | 3.88 | 3.88 | 3.88 |

Data of image height and total image angle in twentieth embodiment are as shown below.

| Zoom data | | | | | |
|---|---|---|---|---|---|
| | WE | ST1 | ST2 | ST3 | TE |
| f (mm) | 5.12 | 8.76 | 15.93 | 28.29 | 48.96 |
| FNO. | 3.30 | 4.23 | 5.00 | 5.62 | 6.01 |
| 2ω (°) | 77.87 | 47.40 | 26.73 | 15.35 | 9.02 |
| Image height | 3.71 | 3.88 | 3.88 | 3.88 | 3.88 |

Data of image height and total image angle in twenty-first embodiment are as shown below.

| Zoom data | | | | | |
|---|---|---|---|---|---|
| | WE | ST1 | ST2 | ST3 | TE |
| f (mm) | 5.12 | 8.82 | 15.93 | 28.29 | 49.12 |
| FNO. | 3.31 | 4.22 | 5.07 | 5.81 | 6.00 |
| 2ω (°) | 77.71 | 47.02 | 26.78 | 15.44 | 8.97 |
| Image height | 3.73 | 3.88 | 3.88 | 3.88 | 3.88 |

Data of image height and total image angle in twenty-second embodiment are as shown below.

| Zoom data | | | | | |
|---|---|---|---|---|---|
| | WE | ST1 | ST2 | ST3 | TE |
| f (mm) | 5.11 | 8.74 | 15.91 | 28.38 | 49.06 |
| FNO. | 3.27 | 4.16 | 5.05 | 5.70 | 6.00 |
| 2ω (°) | 77.93 | 47.41 | 26.71 | 15.33 | 8.98 |
| Image height | 3.74 | 3.88 | 3.88 | 3.88 | 3.88 |

Data of image height and total image angle in twenty-third embodiment are as shown below.

| Zoom data | | | | | |
|---|---|---|---|---|---|
| | WE | ST1 | ST2 | ST3 | TE |
| f (mm) | 4.94 | 8.39 | 14.40 | 26.69 | 47.06 |
| FNO. | 3.50 | 4.47 | 5.15 | 4.73 | 6.00 |
| 2ω (°) | 79.88 | 49.93 | 29.25 | 16.04 | 9.36 |
| Image height | 3.73 | 3.88 | 3.88 | 3.88 | 3.88 |

Data of image height and total image angle in twenty-fourth embodiment are as shown below.

| Zoom data | | | | | |
|---|---|---|---|---|---|
| | WE | ST1 | ST2 | ST3 | TE |
| f (mm) | 5.11 | 8.76 | 15.96 | 28.39 | 49.04 |
| FNO. | 3.35 | 4.30 | 5.16 | 5.72 | 6.00 |
| 2ω (°) | 78.14 | 47.66 | 26.67 | 15.26 | 8.96 |
| Image height | 3.70 | 3.88 | 3.88 | 3.88 | 3.88 |

Data of image height and total image angle in twenty-fifth embodiment are as shown below.

| Zoom data | | | | | |
|---|---|---|---|---|---|
| | WE | ST1 | ST2 | ST3 | TE |
| f (mm) | 5.09 | 8.84 | 15.45 | 28.06 | 49.11 |
| FNO. | 3.24 | 4.30 | 5.17 | 5.65 | 6.02 |
| 2ω (°) | 75.59 | 47.47 | 27.59 | 15.36 | 8.88 |
| Image height | 3.52 | 3.83 | 3.83 | 3.83 | 3.83 |

Data of image height and total image angle in twenty-sixth embodiment are as shown below.

| Zoom data | | | | | |
|---|---|---|---|---|---|
| | WE | ST1 | ST2 | ST3 | TE |
| f (mm) | 5.10 | 8.85 | 15.85 | 28.27 | 49.16 |
| FNO. | 3.21 | 4.14 | 4.88 | 5.58 | 6.00 |
| 2ω (°) | 78.05 | 47.19 | 26.94 | 15.48 | 9.03 |
| Image height | 3.72 | 3.88 | 3.88 | 3.88 | 3.88 |

Data of image height and total image angle in twenty-seventh embodiment are as shown below.

| Zoom data | | | | | |
|---|---|---|---|---|---|
| | WE | ST1 | ST2 | ST3 | TE |
| f (mm) | 5.10 | 8.74 | 15.79 | 28.13 | 49.31 |
| FNO. | 3.25 | 4.10 | 4.89 | 5.55 | 6.00 |
| 2ω (°) | 78.00 | 47.63 | 26.96 | 15.47 | 8.95 |
| Image height | 3.72 | 3.88 | 3.88 | 3.88 | 3.88 |

Data of image height and total image angle in twenty-eighth embodiment are as shown below.

| Zoom data | | | | | |
|---|---|---|---|---|---|
| | WE | ST1 | ST2 | ST3 | TE |
| f (mm) | 5.10 | 8.78 | 15.75 | 28.21 | 49.21 |
| FNO. | 3.27 | 4.19 | 4.94 | 5.67 | 6.00 |
| 2ω (°) | 78.14 | 47.58 | 27.12 | 15.52 | 8.99 |
| Image height | 3.69 | 3.88 | 3.88 | 3.88 | 3.88 |

Data of image height and total image angle in twenty-ninth embodiment are as shown below.

| Zoom data | | | | | |
|---|---|---|---|---|---|
| | WE | ST1 | ST2 | ST3 | TE |
| f (mm) | 5.10 | 8.78 | 15.75 | 28.21 | 49.21 |
| FNO. | 3.27 | 4.19 | 4.94 | 5.67 | 6.00 |
| 2ω (°) | 78.14 | 47.58 | 27.12 | 15.52 | 8.99 |
| Image height | 3.69 | 3.88 | 3.88 | 3.88 | 3.88 |

Data of image height and total image angle in thirtieth embodiment are as shown below.

| Zoom data | | | | | |
|---|---|---|---|---|---|
| | WE | ST1 | ST2 | ST3 | TE |
| f (mm) | 5.11 | 8.70 | 15.87 | 28.19 | 49.05 |
| FNO. | 3.29 | 4.22 | 4.99 | 5.61 | 6.00 |
| 2ω (°) | 78.19 | 47.79 | 26.84 | 15.41 | 9.00 |
| Image height | 3.68 | 3.88 | 3.88 | 3.88 | 3.88 |

FIGS. 16A through 45E are aberration diagrams of the zoom lenses according to the first to the fifteenth embodiments in the state in which the zoom lenses are focused on an object point at infinity. These aberration diagrams show spherical aberration (SA), astigmatism (AS), distortion (DT) and chromatic aberration of magnification (CC) at the wide angle end in FIGS. 16A to 44A numbered with suffix "A", in a first intermediate focal length state in FIGS. 16B to 44B numbered with suffix "B", in a second intermediate focal length state in FIGS. 16C to 44C numbered with suffix "C", in a third intermediate focal length state in FIGS. 17D to 45D numbered with suffix "D", and at the telephoto end in FIGS. 17E to 45E numbered with suffix "E". In these diagrams, the sign "ω" represents half angle of field.

Values conditional expressions (1-1) to (1-9) are as shown below.

| | | Example 1 | Example 2 | Example 3 | Example 4 | Example 5 |
|---|---|---|---|---|---|---|
| (1-1) | $\Sigma d2G/I_{mw}$ | 1.503 | 1.508 | 1.519 | 1.494 | 1.486 |
| (1-2) | $N_{2ave}$ | 1.924 | 1.924 | 1.924 | 1.924 | 1.855 |
| (1-3) | $f_2/f_t$ | 0.147 | 0.147 | 0.147 | 0.147 | 0.147 |
| (1-4) | $f_2/R_{22f}$ | 0.042 | 0.027 | 0.022 | 0.044 | 0.034 |
| (1-5) | $f_2/R_{23r}$ | −0.146 | −0.180 | −0.127 | −0.144 | −0.122 |
| (1-6) | $SF_{21}$ | 0.948 | 0.953 | 0.946 | 0.925 | 0.845 |
| (1-7) | $f_1/f_t$ | 0.649 | 0.649 | 0.649 | 0.646 | 0.647 |
| (1-8) | $f_t/f_w$ | 9.664 | 9.648 | 9.661 | 9.675 | 9.564 |
| (1-9) | $I_{mw}/f_w$ | 0.762 | 0.762 | 0.763 | 0.764 | 0.758 |

| | | Example 6 | Example 7 | Example 8 | Example 9 | Example 10 |
|---|---|---|---|---|---|---|
| (1-1) | $\Sigma d2G/I_{mw}$ | 1.471 | 1.417 | 1.359 | 1.306 | 1.742 |
| (1-2) | $N_{2ave}$ | 1.918 | 1.924 | 1.879 | 1.894 | 1.847 |
| (1-3) | $f_2/f_t$ | 0.152 | 0.147 | 0.114 | 0.147 | 0.154 |
| (1-4) | $f_2/R_{22f}$ | −1.251 | 0.063 | −0.184 | 0.026 | 0.153 |
| (1-5) | $f_2/R_{23r}$ | 0.362 | −0.151 | −0.224 | −0.094 | 0.038 |
| (1-6) | $SF_{21}$ | 0.921 | 0.955 | 0.864 | 0.906 | 0.945 |
| (1-7) | $f_1/f_t$ | 0.671 | 0.648 | 0.649 | 0.661 | 0.801 |
| (1-8) | $f_t/f_w$ | 9.596 | 9.606 | 9.524 | 9.596 | 9.654 |
| (1-9) | $I_{mw}/f_w$ | 0.758 | 0.760 | 0.785 | 0.759 | 0.752 |

| | | Example 16 | Example 17 | Example 18 | Example 19 | Example 20 |
|---|---|---|---|---|---|---|
| (1-1) | $\Sigma d2G/I_{mw}$ | 1.576 | 1.581 | 1.588 | 1.567 | 1.553 |
| (1-2) | $N_{2ave}$ | 1.924 | 1.924 | 1.924 | 1.924 | 1.855 |
| (1-3) | $f_2/f_t$ | 0.147 | 0.147 | 0.147 | 0.147 | 0.147 |
| (1-4) | $f_2/R_{22f}$ | 0.042 | 0.027 | 0.022 | 0.044 | 0.034 |
| (1-5) | $f_2/R_{23r}$ | −0.146 | −0.180 | −0.127 | −0.144 | −0.122 |
| (1-6) | $SF_{21}$ | 0.948 | 0.953 | 0.946 | 0.925 | 0.845 |
| (1-7) | $f_1/f_t$ | 0.649 | 0.649 | 0.649 | 0.646 | 0.647 |
| (1-8) | $f_t/f_w$ | 9.664 | 9.648 | 9.661 | 9.675 | 9.564 |
| (1-9) | $I_{mw}/f_w$ | 0.727 | 0.726 | 0.729 | 0.729 | 0.725 |

| | | Example 21 | Example 22 | Example 23 | Example 24 | Example 25 |
|---|---|---|---|---|---|---|
| (1-1) | $\Sigma d2G/I_{mw}$ | 1.529 | 1.471 | 1.414 | 1.370 | 1.742 |
| (1-2) | $N_{2ave}$ | 1.918 | 1.924 | 1.879 | 1.894 | 1.847 |
| (1-3) | $f_2/f_t$ | 0.152 | 0.147 | 0.114 | 0.147 | 0.154 |
| (1-4) | $f_2/R_{22f}$ | −1.251 | 0.063 | −0.184 | 0.026 | 0.153 |
| (1-5) | $f_2/R_{23r}$ | 0.362 | −0.151 | −0.224 | −0.094 | 0.038 |
| (1-6) | $SF_{21}$ | 0.921 | 0.955 | 0.864 | 0.906 | 0.945 |
| (1-7) | $f_1/f_t$ | 0.671 | 0.648 | 0.649 | 0.661 | 0.801 |
| (1-8) | $f_t/f_w$ | 9.596 | 9.606 | 9.524 | 9.596 | 9.654 |
| (1-9) | $I_{mw}/f_w$ | 0.729 | 0.732 | 0.755 | 0.724 | 0.691 |

Values conditional expressions (2-1) to (2-11) are as shown below. Hereinafter, "Ex." means "example"

|        |                    | Ex. 2  | Ex. 11 | Ex. 12 | Ex. 17 | Ex. 26 | Ex. 27 |
|--------|--------------------|--------|--------|--------|--------|--------|--------|
| (2-1)  | $nd_{1n}$          | 2.102  | 2.102  | 2.102  | 2.102  | 2.102  | 2.102  |
| (2-2)  | $vd_{1n}$          | 16.79  | 16.79  | 16.79  | 16.79  | 16.79  | 6.79   |
| (2-3)  | $SF_{1n}$          | 7.79   | 9.07   | 7.78   | 7.79   | 9.07   | 7.78   |
| (2-4)  | $\Sigma d_{1G}/I_{mw}$ | 1.139 | 1.108 | 1.139 | 1.195 | 1.157 | 1.187 |
| (2-5)  | $nd_{1n} - nd_{1p}$ | 0.334 | 0.409 | 0.334 | 0.334 | 0.409 | 0.334 |
| (2-6)  | $vd_{1p} - vd_{1n}$ | 32.45 | 36.42 | 32.45 | 32.45 | 36.42 | 32.45 |
| (2-7)  | $f_1/f_t$          | 0.649  | 0.652  | 0.648  | 0.649  | 0.652  | 0.648  |
| (2-8)  | $|f_2/f_t|$        | 0.147  | 0.148  | 0.144  | 0.147  | 0.148  | 0.144  |
| (2-9)  | $f_t/f_w$          | 9.648  | 9.644  | 9.660  | 9.648  | 9.644  | 9.660  |
| (2-10) | $I_{mw}/f_w$       | 0.762  | 0.761  | 0.760  | 0.726  | 0.729  | 0.729  |
| (2-11) | $L_t/I_{mw}$       | 14.893 | 14.883 | 14.899 | 15.622 | 15.535 | 15.528 |

15

Values conditional expressions (3-1) to (3-10) are as shown below.

|        |            | Example 1 | Example 2 | Example 3 | Example 4 | Example 13 |
|--------|------------|-----------|-----------|-----------|-----------|------------|
| (3-1)  | $f_2/f_t$  | 0.147     | −0.147    | −0.147    | −0.147    | −0.147     |
| (3-2)  | $nd_{2p}$  | 2.10225   | 2.10225   | 2.10225   | 2.10225   | 2.10225    |
| (3-3)  | $vd_{2p}$  | 16.79     | 16.79     | 16.79     | 16.79     | 16.79      |
| (3-4)  | $SF_{2p1}$ | 1.239     | 1.146     | 1.122     | 1.259     | 1.167      |
| (3-5)  | $SF_{2p2}$ | —         | —         | —         | —         | —          |
| (3-6)  | $f_t/f_w$  | 9.664     | 9.648     | 9.661     | 9.646     | 9.650      |
| (3-7)  | $I_{mw}/f_w$ | 0.762   | 0.762     | 0.763     | 0.764     | 0.760      |
| (3-8)  | $f_1/f_t$  | 0.649     | 0.649     | 0.649     | 0.646     | 0.650      |
| (3-9)  | $f_3/f_t$  | 0.222     | 0.222     | 0.222     | 0.226     | 0.224      |
| (3-10) | $f_R/f_t$  | 0.279     | 0.279     | 0.279     | 0.272     | 0.273      |

|        |            | Example 14 | Example 9 | Example 15 | Example 7 |
|--------|------------|------------|-----------|------------|-----------|
| (3-1)  | $f_2/f_t$  | −0.147     | −0.147    | −0.147     | −0.147    |
| (3-2)  | $nd_{2p}$  | 2.10225    | 2.10225   | 2.10225    | 2.10225   |
| (3-3)  | $vd_{2p}$  | 16.79      | 16.79     | 16.79      | 16.79     |
| (3-4)  | $SF_{2p1}$ | 1.167      | —         | —          | 1.361     |
| (3-5)  | $SF_{2p2}$ | —          | −1.635    | −1.182     | —         |
| (3-6)  | $f_t/f_w$  | 9.642      | 9.596     | 9.607      | 9.606     |
| (3-7)  | $I_{mw}/f_w$ | 0.760    | 0.759     | 0.760      | 0.760     |
| (3-8)  | $f_1/f_t$  | 0.650      | 0.661     | 0.643      | 0.648     |
| (3-9)  | $f_3/f_t$  | 0.224      | 0.225     | 0.224      | 0.136     |
| (3-10) | $f_R/f_t$  | 0.273      | 0.293     | 0.279      | 0.266     |

|        |            | Example 16 | Example 17 | Example 18 | Example 19 | Example 28 |
|--------|------------|------------|------------|------------|------------|------------|
| (3-1)  | $f_2/f_t$  | −0.147     | −0.147     | −0.147     | −0.147     | −0.147     |
| (3-2)  | $nd_{2p}$  | 2.10225    | 2.10225    | 2.10225    | 2.10225    | 2.10225    |
| (3-3)  | $vd_{2p}$  | 16.79      | 16.79      | 16.79      | 16.79      | 16.79      |
| (3-4)  | $SF_{2p1}$ | 1.239      | 1.146      | 1.122      | 1.259      | 1.167      |
| (3-5)  | $SF_{2p2}$ | —          | —          | —          | —          | —          |
| (3-6)  | $f_t/f_w$  | 9.664      | 9.648      | 9.661      | 9.675      | 9.642      |
| (3-7)  | $I_{mw}/f_w$ | 0.727    | 0.726      | 0.729      | 0.729      | 0.723      |
| (3-8)  | $f_1/f_t$  | 0.649      | 0.649      | 0.649      | 0.646      | 0.650      |
| (3-9)  | $f_3/f_t$  | 0.222      | 0.222      | 0.222      | 0.226      | 0.224      |
| (3-10) | $f_R/f_t$  | 0.279      | 0.279      | 0.279      | 0.272      | 0.273      |

|        |            | Example 29 | Example 24 | Example 30 | Example 22 |
|--------|------------|------------|------------|------------|------------|
| (3-1)  | $f_2/f_t$  | −0.147     | −0.147     | −0.147     | −0.147     |
| (3-2)  | $nd_{2p}$  | 2.10225    | 2.10225    | 2.10225    | 2.10225    |
| (3-3)  | $vd_{2p}$  | 16.79      | 16.79      | 16.79      | 16.79      |
| (3-4)  | $SF_{2p1}$ | 1.167      | —          | —          | 1.361      |
| (3-5)  | $SF_{2p2}$ | —          | −1.635     | −1.182     | —          |
| (3-6)  | $f_t/f_w$  | 9.642      | 9.596      | 9.607      | 9.606      |
| (3-7)  | $I_{mw}/f_w$ | 0.723    | 0.724      | 0.722      | 0.732      |
| (3-8)  | $f_1/f_t$  | 0.650      | 0.661      | 0.643      | 0.648      |
| (9)    | $f_3/f_t$  | 0.224      | 0.225      | 0.224      | 0.136      |
| (3-10) | $f_R/f_t$  | 0.273      | 0.293      | 0.279      | 0.266      |

Values conditional expressions (4-1) to (4-11) are as shown below.

|  |  | Example 1 | Example 2 | Example 3 | Example 4 | Example 5 |
|---|---|---|---|---|---|---|
| (4-1) | $f_1/f_t$ | 0.649 | 0.649 | 0.649 | 0.646 | 0.647 |
| (4-2) | $nd_{1p}$ | 1.773 | 1.768 | 1.773 | 1.773 | 1.768 |
| (4-3) | $R_{1p}/f_{1p}$ | 0.83 | 0.84 | 0.84 | 0.83 | 0.86 |
| (4-4) | $R_{1n}/f_{1n}$ | −0.28 | −0.23 | −0.29 | −0.28 | −0.25 |
| (4-5) | $|f_2/f_t|$ | 0.147 | 0.147 | 0.147 | 0.147 | 0.147 |
| (4-6) | $f_t/f_w$ | 9.664 | 9.648 | 9.661 | 9.675 | 9.564 |
| (4-7) | $I_{mw}/f_w$ | 0.762 | 0.762 | 0.763 | 0.764 | 0.758 |
| (4-8) | $L_t/I_{mw}$ (in air) | 13.412 | 13.384 | 13.448 | 13.335 | 13.338 |
| (4-9) | $|\Delta c_{07} - \Delta f_{07}|/P$ | 4.35 | 4.95 | 4.40 | 4.30 | 4.20 |
| (4-10) | $|\Delta g_{10}|/p$ | 3.90 | 5.85 | 3.85 | 4.15 | 6.50 |
| (4-11) | $|\Delta g_{10} - \Delta g_{07}|/p$ | 3.65 | 4.30 | 3.65 | 3.65 | 4.55 |

|  |  | Example 6 | Example 7 | Example 8 | Example 9 |
|---|---|---|---|---|---|
| (4-1) | $f_1/f_t$ | 0.671 | 0.648 | 0.648 | 0.661 |
| (4-2) | $nd_{1p}$ | 1.773 | 1.773 | 1.747 | 1.768 |
| (4-3) | $R_{1p}/f_{1p}$ | 0.85 | 0.85 | 0.78 | 0.86 |
| (4-4) | $R_{1n}/f_{1n}$ | −0.30 | −0.29 | −0.25 | −0.25 |
| (4-5) | $|f_2/f_t|$ | 0.152 | 0.147 | 0.113 | 0.147 |
| (4-6) | $f_t/f_w$ | 9.596 | 9.606 | 9.540 | 9.596 |
| (4-7) | $I_{mw}/f_w$ | 0.758 | 0.760 | 0.785 | 0.759 |
| (4-8) | $L_t/I_{mw}$ (in air) | 13.363 | 13.214 | 12.134 | 13.381 |
| (4-9) | $|\Delta c_{07} - \Delta f_{07}|/p$ | 4.35 | 3.80 | 3.20 | 4.50 |
| (4-10) | $|\Delta g_{10}|/p$ | 4.75 | 5.55 | 6.35 | 5.35 |
| (4-11) | $|\Delta g_{10} - \Delta g_{07}|/p$ | 4.50 | 4.50 | 2.80 | 3.65 |

|  |  | Example 16 | Example 17 | Example 18 | Example 19 | Example 20 |
|---|---|---|---|---|---|---|
| (4-1) | $f_1/f_t$ | 0.649 | 0.649 | 0.649 | 0.647 | 0.645 |
| (4-2) | $nd_{1p}$ | 1.773 | 1.768 | 1.773 | 1.773 | 1.768 |
| (4-3) | $R_{1p}/f_{1p}$ | 0.83 | 0.84 | 0.84 | 0.83 | 0.86 |
| (4-4) | $R_{1n}/f_{1n}$ | −0.28 | −0.23 | −0.29 | −0.28 | −0.25 |
| (4-5) | $|f_2/f_t|$ | 0.147 | 0.147 | 0.147 | 0.148 | 0.146 |
| (4-6) | $f_t/f_w$ | 9.603 | 9.604 | 9.606 | 9.630 | 9.606 |
| (4-7) | $I_{mw}/f_w$ | 0.723 | 0.723 | 0.725 | 0.726 | 0.725 |
| (4-8) | $L_t/I_{mw}$ (in air) | 14.063 | 14.039 | 14.058 | 13.986 | 13.942 |
| (4-9) | $|\Delta c_{07} - \Delta f_{07}|/p$ | 4.35 | 4.95 | 4.40 | 4.30 | 4.20 |
| (4-10) | $|\Delta g_{10}|/p$ | 3.90 | 5.85 | 3.85 | 4.15 | 6.50 |
| (4-11) | $|\Delta g_{10} - \Delta g_{07}|/p$ | 3.65 | 4.30 | 3.65 | 3.65 | 4.55 |

|  |  | Example 21 | Example 22 | Example 23 | Example 24 |
|---|---|---|---|---|---|
| (4-1) | $f_1/f_t$ | 0.671 | 0.646 | 0.627 | 0.661 |
| (4-2) | $nd_{1p}$ | 1.773 | 1.773 | 1.747 | 1.768 |
| (4-3) | $R_{1p}/f_{1p}$ | 0.85 | 0.85 | 0.78 | 0.86 |
| (4-4) | $R_{1n}/f_{1n}$ | −0.30 | −0.29 | −0.25 | −0.25 |
| (4-5) | $|f_2/f_t|$ | 0.152 | 0.146 | 0.110 | 0.147 |
| (4-6) | $f_t/f_w$ | 9.607 | 9.612 | 9.625 | 9.593 |
| (4-7) | $I_{mw}/f_w$ | 0.729 | 0.730 | 0.736 | 0.723 |
| (4-8) | $L_t/I_{mw}$ (in air) | 13.898 | 13.715 | 12.626 | 14.038 |
| (4-9) | $|\Delta c_{07} - \Delta f_{07}|/p$ | 4.35 | 3.80 | 3.20 | 4.50 |
| (4-10) | $|\Delta g_{10}|/p$ | 4.75 | 5.55 | 6.35 | 5.35 |
| (4-11) | $|\Delta g_{10} - \Delta g_{07}|/p$ | 4.50 | 4.50 | 2.80 | 3.65 |

(Correction of Distortion)

Incidentally, when the zoom lens system of the present invention is used, a digital correction of distortion of an image is carried out electrically. A basic concept for the digital correction of the distortion of an image will be described below.

Figure 46:
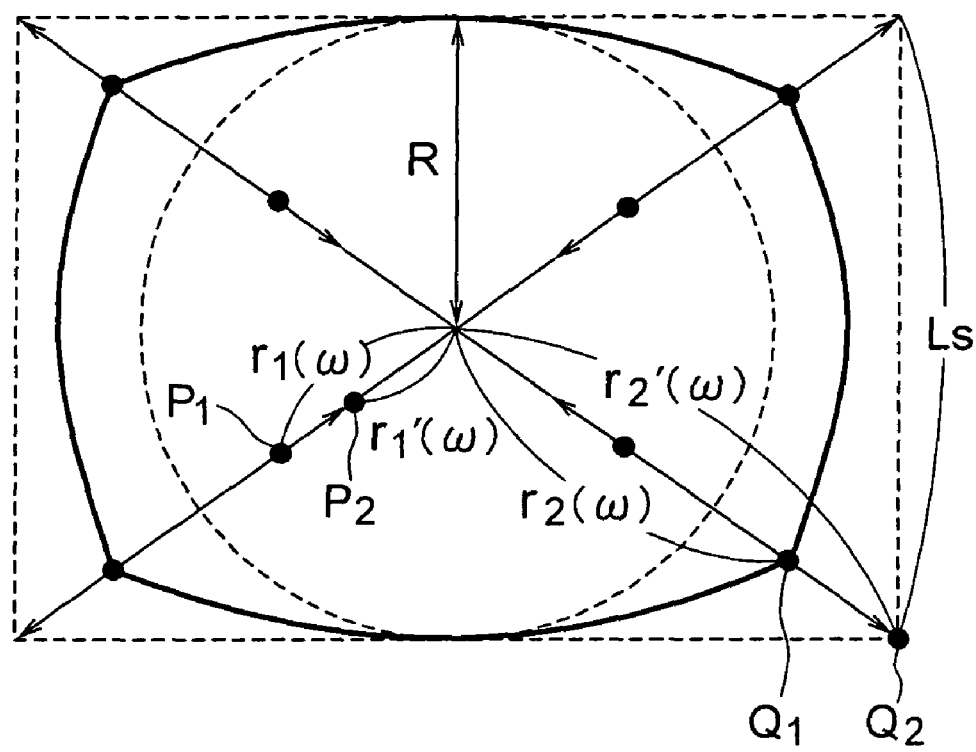
FIG. 46 is a diagram illustrating correction of distortion.

For example, as shown in FIG. 46, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 46, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, r'(ω) can be expressed as follows.

$$r'(\omega) = \alpha \cdot f \cdot \tan\omega \; (0 \leq \alpha \leq 1)$$

where, ω is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \cdot \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half image angle and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 Ls$$

where, Ls is a length of a short side of the effective image pickup surface.

It is preferable that the radius R satisfies the following conditional expression.

$$0.3 Ls \leq R \leq 0.6 Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of ω becomes large.

(Digital Camera)

Figure 47:
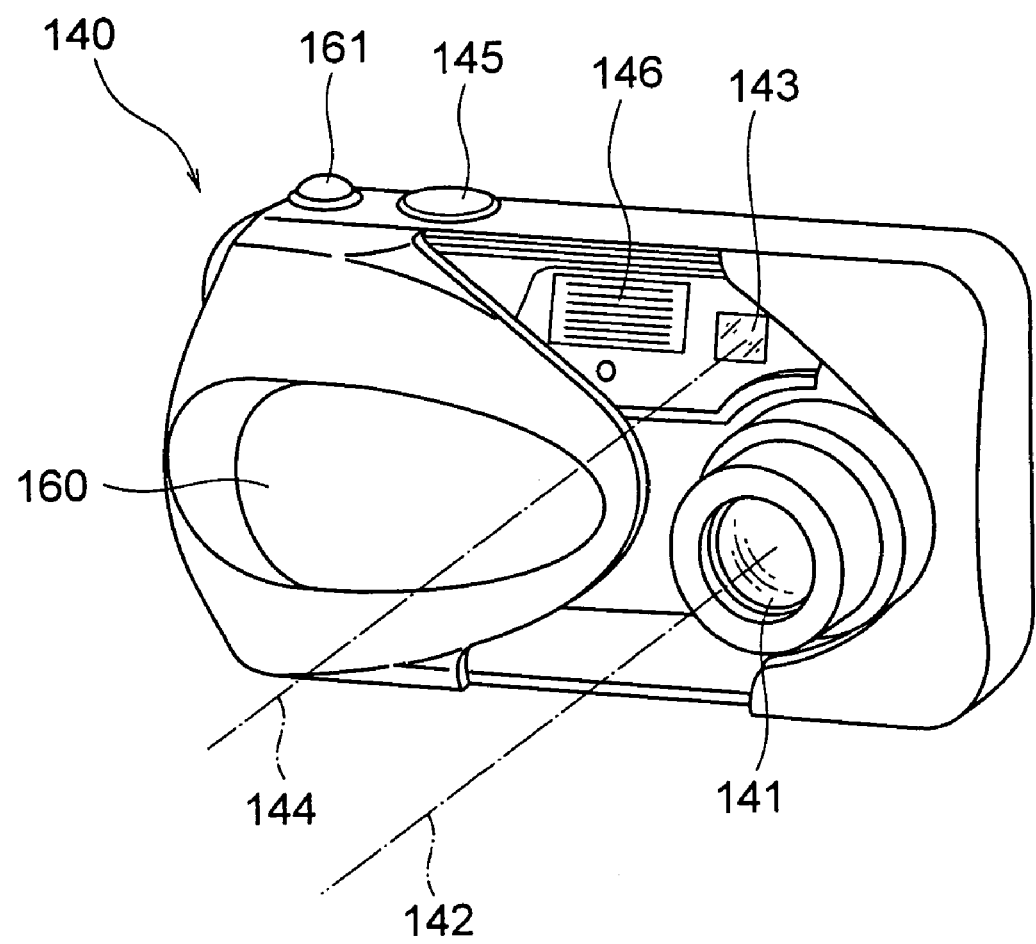
FIG. 47 is a front perspective view showing an outer appearance of a digital camera equipped with a zoom lens according to the present invention.
Figure 48:
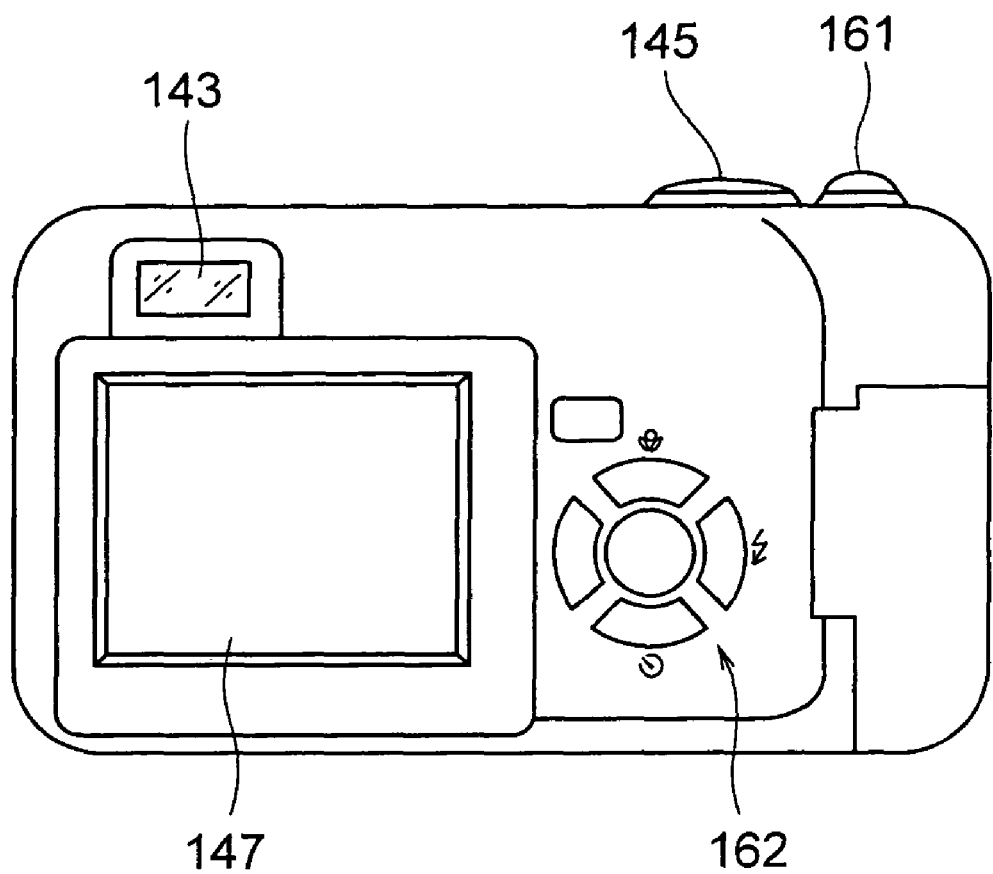
FIG. 48 is a rear perspective view of the digital camera.

FIG. 47 to FIG. 49 are conceptual diagrams of a structure of a digital camera according to the present invention in which a zoom lens system described above is incorporated in a taking optical system 141. FIG. 47 is a front perspective view showing an appearance of a digital camera 140, FIG. 48 is a rear perspective view of the same, and FIG. 49 is a schematic cross-sectional view showing a structure of the digital camera 140. In FIG. 47 and FIG. 49, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 47, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

FIG. 50 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 50, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

INDUSTRIAL APPLICABILITY

As will be understood from the foregoing, the zoom lens according to the present invention is advantageous in achieving a high zoom ratio and a wide angle of field to meet the users' demand for a wider variety of photographing area (shootable situations) than before. In addition, the zoom lens is suitable for use with an electronic image pickup element such as a CCD or CMOS sensor, because good image quality of picked-up images can be achieved without difficulty.

What is claimed is:

1. A zoom lens comprising, in order from an object side thereof:
a first lens unit having a positive refracting power;
a second lens unit having a negative refracting power; and
a third lens unit having a positive refracting power, wherein zooming is performed by changing distances between the lens units,
the second lens unit comprises two negative lens elements and one positive lens element, and the lens element closest to the object side in the second lens unit is a negative lens element, and
the zoom lens satisfies the following conditional expressions:

$$0.60 < \Sigma d_{2G}/I_{mw} < 1.95 \quad (1\text{-}1)$$

$$1.830 < N_{2ave} < 2.000 \quad (1\text{-}2)$$

where $\Sigma d_{2G}$ is a thickness of the second lens unit on the optical axis, $I_{mw}$ is a maximum image height at the wide angle end of the zoom lens, and $N_{2ave}$ is an average of refractive indices for the d-line of all the lens elements in the second lens unit, wherein the term "lens element" refers to an optical member that satisfies $0.1 < L/I_{mw}$, where L is a thickness of the optical member in the second lens unit on the optical axis.

2. The zoom lens according to claim 1, wherein the zoom lens satisfies the following conditional expression:

$$0.02 < |f_2/f_t| < 0.05 \quad (1\text{-}3)$$

where $f_2$ is a focal length of the second lens unit, and $f_t$ is a focal length of the entire zoom lens system at the telephoto end.

3. The zoom lens according to claim 1, wherein the zoom lens satisfies the following conditional expressions:

$$-0.65 < f_2/R_{22f} < 0.35 \quad (1\text{-}4)$$

$$-0.65 < f_2/R_{23r} < 0.35 \quad (1\text{-}5)$$

where is $f_2$ is a focal length of the second lens unit, $R_{22f}$ is a paraxial radius of curvature of an object side surface of a lens element located second closest to the object side in the second lens unit, and $R_{23r}$ is a paraxial radius of curvature of an image side surface of a lens element located third closest to the object side in the second lens unit.

4. The zoom lens according to claim 1, wherein the zoom lens satisfies the following conditional expression:

$$0.4 < SF_{21} < 1.5 \quad (1\text{-}6)$$

where $SF_{21}$ is defined by $SF_{21} = (R_{21f} + R_{21r})/(R_{21f} - R_{21r})$, $R_{21f}$ is a paraxial radius of curvature of an object side surface of a negative lens element located closest to the object side in the second lens unit, and $R_{21r}$ is a paraxial radius of curvature of an image side surface of the negative lens element located closest to the object side in the second lens unit.

5. The zoom lens according to claim 1, wherein an aspheric surface is used in at least one surface of a lens element in the second lens unit.

6. The zoom lens according to claim 1, wherein the second lens unit consists of three lens elements.

7. The zoom lens according to claim 1, wherein the first lens unit consists of two or fewer lens elements.

8. The zoom lens according to claim 1, wherein the zoom lens satisfies the following conditional expression:

$$0.2 < f_1/f_t < 1.6 \quad (1\text{-}7)$$

where $f_1$ is a focal length of the first lens unit, and $f_t$ is a focal length of the entire zoom lens system at the telephoto end.

9. The zoom lens according to claim 1, wherein the zoom lens consists, in order from the object side thereof, of:
a first lens unit having a positive refracting power;
a second lens unit having a negative refracting power;
a third lens unit having a positive refracting power; and
a fourth lens unit having a positive refracting power.

10. The zoom lens according to claim 9, wherein the zoom lens includes an aperture stop, and
during zooming from the wide angle end to the telephoto end, the first lens unit moves in such a way that it is located closer to the object side at the telephoto end than at the wide angle end, the second lens unit moves, the third lens unit moves in such a way that it is located closer to the object side at the telephoto end than at the wide angle end, the fourth lens unit moves, and the aperture stop moves.

11. The zoom lens according to claim 9, which consists of nine or fewer lens elements in total.

12. The zoom lens according to claim 9, wherein the zoom lens satisfies the following conditional expression:

$$4.0 < f_t/f_w < 20.0 \quad (1\text{-}8)$$

where $f_t$ is a focal length of the entire zoom lens system at the telephoto end, and $f_w$ is a focal length of the entire zoom lens system at the wide angle end.

13. The zoom lens according to claim 9, wherein the zoom lens satisfies the following conditional expression:

$$0.50 < I_{mw}/f_w < 1.00 \quad (1\text{-}9)$$

where $I_{mw}$ is a maximum image height at the wide angle end of the zoom lens, and $f_w$ is a focal length of the entire zoom lens system at the wide angle end.

14. An image pickup apparatus including:
a zoom lens as recited in claim 9; and
an image pickup element that converts an image formed by the zoom lens into an electrical signal.

15. An image pickup apparatus according to claim 14, further including an image transformation section that transforms, by image processing, an electrical signal containing distortion attributed to the zoom lens into an image signal in which the distortion is corrected.

16. The zoom lens according to claim 1, wherein the zoom lens consists, in order from the object side thereof, of:
a first lens unit having a positive refracting power;
a second lens unit having a negative refracting power;
a third lens unit having a positive refracting power;
a fourth lens unit having a negative refracting power; and
a fifth lens unit having a positive refracting power.

17. The zoom lens according to claim 16, wherein the zoom lens includes an aperture stop, and
during zooming from the wide angle end to the telephoto end, the first lens unit moves in such a way that it is located closer to the object side at the telephoto end than at the wide angle end, the second lens unit moves, the third lens unit moves in such a way that it is located closer to the object side at the telephoto end than at the wide angle end, the fourth lens unit moves, the fifth lens unit move, and the aperture stop moves.

18. The zoom lens according to claim 16, which consists of nine or fewer lens elements in total.

19. The zoom lens according to claim 16, wherein the zoom lens satisfies the following conditional expression:

$$4.0 < f_t/f_w < 20.0 \qquad (1\text{-}8)$$

where $f_t$ is a focal length of the entire zoom lens system at the telephoto end, and $f_w$ is a focal length of the entire zoom lens system at the wide angle end.

20. The zoom lens according to claim 16, wherein the zoom lens satisfies the following conditional expression:

$$0.50 < I_{mw}/f_w < 1.00 \qquad (1\text{-}9)$$

where $I_{mw}$ is a maximum image height at the wide angle end of the zoom lens, and $f_w$ is a focal length of the entire zoom lens system at the wide angle end.

21. An image pickup apparatus including:
a zoom lens as recited in claim 16; and
an image pickup element that converts an image formed by the zoom lens into an electrical signal.

22. An image pickup apparatus according to claim 21, further including an image transformation section that transforms, by image processing, an electrical signal containing distortion attributed to the zoom lens into an image signal in which the distortion is corrected.

23. The zoom lens according to claim 1, which consists of nine or fewer lens elements in total.

24. The zoom lens according to claim 1, wherein the zoom lens satisfies the following conditional expression:

$$4.0 < f_t/f_w < 20.0 \qquad (1\text{-}8)$$

where $f_t$ is a focal length of the entire zoom lens system at the telephoto end, and $f_w$ is a focal length of the entire zoom lens system at the wide angle end.

25. The zoom lens according to claim 1, wherein the zoom lens satisfies the following conditional expression:

$$0.50 < I_{mw}/f_w < 1.00 \qquad (1\text{-}9)$$

where $I_{mw}$ is a maximum image height at the wide angle end of the zoom lens, and $f_w$ is a focal length of the entire zoom lens system at the wide angle end.

26. An image pickup apparatus including:
a zoom lens as recited in claim 1; and
an image pickup element that converts an image formed by the zoom lens into an electrical signal.

27. An image pickup apparatus according to claim 26, further including an image transformation section that transforms, by image processing, an electrical signal containing distortion attributed to the zoom lens into an image signal in which the distortion is corrected.

28. A zoom lens comprising, in order from an object side thereof:
a first lens unit having a positive refracting power;
a second lens unit having a negative refracting power; and
a third lens unit having a positive refracting power, wherein zooming is performed by changing distances between the lens units,
the first lens unit comprises one negative lens element and at least one positive lens element, and
the zoom lens satisfies the following conditional expressions:

$$2.00 < nd_{1n} < 2.30 \qquad (2\text{-}1)$$

$$13.0 < vd_{1n} < 30.0 \qquad (2\text{-}2)$$

where $nd_{1n}$ is a refractive index for the d-line of the negative lens element in the first lens unit, and $vd_{1n}$ is an Abbe number of the negative lens element in the first lens unit.

29. The zoom lens according to claim 28, wherein the negative lens element in the first lens unit has a meniscus shape with a convex surface directed toward the object side and satisfies the following conditional expression:

$$1.0 < SF_{1n} < 15.0 \qquad (2\text{-}3)$$

where $SF_{1n}$ is defined by $SF_{1n} = (R_{1nf} + R_{1nr})/(R_{1nf} - R_{1nr})$, $R_{1nf}$ is a paraxial radius of curvature of an object side surface of the negative lens element in the second lens unit, and $R_{1nr}$ is a paraxial radius of curvature of an image side surface of the negative lens element in the first lens unit.

30. The zoom lens according to claim 28, wherein the zoom lens satisfies the following conditional expression:

$$0.40 < \Sigma d_{1G}/I_{mw} < 3.00 \qquad (2\text{-}4)$$

where $\Sigma d_{1G}$ is a thickness of the first lens unit on the optical axis, $I_{mw}$ is a maximum image height at the wide angle end of the zoom lens.

31. The zoom lens according to claim 28, wherein the first lens unit consists of one negative lens element and one positive lens element.

32. The zoom lens according to claim 31, wherein the zoom lens satisfies the following conditional expressions:

$$0.20 < nd_{1n} - nd_{1p} < 0.55 \qquad (2\text{-}5)$$

$$20.0 < vd_{1p} - vd_{1n} < 55.0 \qquad (2\text{-}6)$$

where $nd_{1n}$ is a refractive index for the d-line of the negative lens element in the first lens unit, $vd_{1p}$ is an Abbe number of the positive lens element in the first lens unit, $nd_{1p}$ is a refractive index for the d-line of the positive lens element in the first lens unit, and $vd_{1n}$ is an Abbe number of the negative lens element in the first lens unit.

33. The zoom lens according to claim 28, wherein the zoom lens satisfies the following conditional expressions:

$$0.2 < f_1/f_t < 1.0 \qquad (2\text{-}7)$$

where $f_1$ is a focal length of the first lens unit, and $f_t$ is a focal length of the entire zoom lens system at the telephoto end.

34. The zoom lens according to claim 28, wherein the zoom lens satisfies the following conditional expressions:

$$0.02 < |f_2/f_t| < 0.50 \qquad (2\text{-}8)$$

where $f_2$ is a focal length of the second lens unit, and $f_t$ is a focal length of the entire zoom lens system at the telephoto end.

35. The zoom lens according to claim 28, wherein the zoom lens consists, in order from the object side, of:
a first lens unit having a positive refracting power;
a second lens unit having a negative refracting power;
a third lens unit having a positive refracting power; and
a fourth lens unit having a positive refracting power.

36. The zoom lens according to claim 35, wherein the zoom lens includes an aperture stop, and
during zooming from the wide angle end to the telephoto end, the first lens unit moves in such a way that it is located closer to the object side at the telephoto end than at the wide angle end, the second lens unit moves, the third lens unit moves in such a way that it is located closer to the object side at the telephoto end than at the wide angle end, the fourth lens unit moves, and the aperture stop moves.

37. The zoom lens according to claim 35, wherein the zoom lens consists of nine or fewer lens elements.

38. The zoom lens according to claim 35, wherein the zoom lens satisfies the following conditional expression:

$$4.0 < f_t/f_w < 20.0 \tag{2-9}$$

where $f_t$ is a focal length of the entire zoom lens system at the telephoto end, and $f_w$ is a focal length of the entire zoom lens system at the wide angle end.

39. The zoom lens according to claim 35, wherein the zoom lens satisfies the following conditional expression:

$$0.50 < I_{mw}/f_w < 1.00 \tag{2-10}$$

where $I_{mw}$ is a maximum image height at the wide angle end of the zoom lens, and $f_w$ is a focal length of the entire zoom lens system at the wide angle end.

40. The zoom lens according to claim 35, wherein the zoom lens satisfies the following conditional expression:

$$5.0 < L_t/I_{mw} < 17.5 \tag{2-11}$$

where $L_t$ is an entire length of the entire zoom lens system at the telephoto end, and $I_{mw}$ is a maximum image height at the wide angle end of the zoom lens.

41. An image pickup apparatus including:
a zoom lens as recited in claim 35; and
an image pickup element that converts an image formed by the zoom lens into an electrical signal.

42. The image pickup apparatus according to claim 41, further including an image transformation section that transforms, by image processing, an electrical signal representing an image containing distortion attributed to the zoom lens into an image signal in which the distortion is corrected.

43. The image pickup apparatus according to claim 41, further including an image transformation section that transforms, by image processing, an electric signal representing an image formed by the zoom lens into an image signal in which color misregistration caused by chromatic aberration of magnification is corrected.

44. The zoom lens according to claim 28, wherein the zoom lens comprises, in order from the object side:
a first lens unit having a positive refracting power;
a second lens unit having a negative refracting power;
a third lens unit having a positive refracting power;
a fourth lens unit having a negative refracting power; and
a fifth lens unit having a positive refracting power.

45. The zoom lens according to claim 44, wherein the zoom lens includes an aperture stop, and
during zooming from the wide angle end to the telephoto end, the first lens unit moves in such a way that it is located closer to the object side at the telephoto end than at the wide angle end, the second lens unit moves, the third lens unit moves in such a way that it is located closer to the object side at the telephoto end than at the wide angle end, the fourth lens unit moves, the fifth lens unit moves, and the aperture stop moves.

46. The zoom lens according to claim 44, wherein the zoom lens consists of nine or fewer lens elements.

47. The zoom lens according to claim 44, wherein the zoom lens satisfies the following conditional expression:

$$4.0 < f_t/f_w < 20.0 \tag{2-9}$$

where $f_t$ is a focal length of the entire zoom lens system at the telephoto end, and $f_w$ is a focal length of the entire zoom lens system at the wide angle end.

48. The zoom lens according to claim 44, wherein the zoom lens satisfies the following conditional expression:

$$0.50 < I_{mw}/f_w < 1.00 \tag{2-10}$$

where $I_{mw}$ is a maximum image height at the wide angle end of the zoom lens, and $f_w$ is a focal length of the entire zoom lens system at the wide angle end.

49. The zoom lens according to claim 44, wherein the zoom lens satisfies the following conditional expression:

$$5.0 < L_t/I_{mw} < 17.5 \tag{2-11}$$

where $L_t$ is an entire length of the entire zoom lens system at the telephoto end, and $I_{mw}$ is a maximum image height at the wide angle end of the zoom lens.

50. An image pickup apparatus including:
a zoom lens as recited in claim 44; and
an image pickup element that converts an image formed by the zoom lens into an electrical signal.

51. The image pickup apparatus according to claim 50, further including an image transformation section that transforms, by image processing, an electrical signal representing an image containing distortion attributed to the zoom lens into an image signal in which the distortion is corrected.

52. The image pickup apparatus according to claim 50, further including an image transformation section that transforms, by image processing, an electric signal representing an image formed by the zoom lens into an image signal in which color misregistration caused by chromatic aberration of magnification is corrected.

53. The zoom lens according to claim 28, wherein the zoom lens consists of nine or fewer lens elements.

54. The zoom lens according to claim 28, wherein the zoom lens satisfies the following conditional expression:

$$4.0 < f_t/f_w < 20.0 \tag{2-9}$$

where $f_t$ is a focal length of the entire zoom lens system at the telephoto end, and $f_w$ is a focal length of the entire zoom lens system at the wide angle end.

55. The zoom lens according to claim 28, wherein the zoom lens satisfies the following conditional expression:

$$0.50 < I_{mw}/f_w < 1.00 \tag{2-10}$$

where $I_{mw}$ is a maximum image height at the wide angle end of the zoom lens, and $f_w$ is a focal length of the entire zoom lens system at the wide angle end.

56. The zoom lens according to claim 28, wherein the zoom lens satisfies the following conditional expression:

$$5.0 < L_t/I_{mw} < 17.5 \tag{2-11}$$

where $L_t$ is an entire length of the entire zoom lens system at the telephoto end, and $I_{mw}$ is a maximum image height at the wide angle end of the zoom lens.

57. An image pickup apparatus including:
a zoom lens as recited in claim 28; and
an image pickup element that converts an image formed by the zoom lens into an electrical signal.

58. The image pickup apparatus according to claim 57, further including an image transformation section that transforms, by image processing, an electrical signal representing an image containing distortion attributed to the zoom lens into an image signal in which the distortion is corrected.

59. The image pickup apparatus according to claim 57, further including an image transformation section that transforms, by image processing, an electric signal representing an image formed by the zoom lens into an image signal in which color misregistration caused by chromatic aberration of magnification is corrected.

60. A zoom lens comprising, in order from an object side thereof:
  a first lens unit having a positive refracting power;
  a second lens unit having a negative refracting power; and
  a third lens unit having a positive refracting power, wherein zooming is performed by changing distances between the lens units, and
  the second lens unit includes at least one positive lens elements that satisfies the following conditional expressions:

$$-0.50 < f_2/f_t < -0.03 \quad (3\text{-}1)$$

$$2.00 < nd_{2p} < 2.30 \quad (3\text{-}2)$$

$$13.0 < vd_{2p} < 30.0 \quad (3\text{-}3)$$

where $f_2$ is a focal length of the second lens unit, $f_t$ is a focal length of the entire zoom lens system at the telephoto end, $nd_{2p}$ is a refractive index for the d-line of the positive lens element in the second lens unit, and $vd_{2p}$ is an Abbe number of the positive lens element in the second lens unit.

61. The zoom lens according to claim 60, wherein the second lens unit consists of two or fewer negative lens elements and one positive lens element.

62. The zoom lens according to claim 61, wherein the second lens unit consists, in order from the object side, of a first negative lens element, a positive lens element, and a second negative lens element.

63. The zoom lens according to claim 62, wherein the zoom lens satisfies the following conditional expression:

$$0.2 < SF_{2p1} < 3.50 \quad (3\text{-}4)$$

where $SF_{2p1}$ is defined by $SF_{2p1} = (R_{2pf1} + R_{2pr1})/(R_{2pf1} - R_{2pr1})$, $R_{2pf1}$ is a paraxial radius of curvature of an object side surface of the positive lens element disposed between the first negative lens element and the second negative lens element in the second lens unit, and $R_{2pr1}$ is a paraxial radius of curvature of an image side surface of the positive lens element disposed between the first negative lens element and the second negative lens element in the second lens unit.

64. The zoom lens according to claim 61, wherein the second lens unit consists, in order from the object side, of a first negative lens element, a second negative lens element, and a positive lens element.

65. The zoom lens according to claim 64, wherein the zoom lens satisfies the following conditional expression:

$$-4.5 < SF_{2p2} < -0.5 \quad (3\text{-}5)$$

where $SF_{2p2}$ is defined by $SF_{2p2} = (R_{2pf2} + R_{2pr2})/(R_{2pf2} - R_{2pr2})$, $R_{2pf2}$ is a paraxial radius of curvature of an object side surface of the positive lens element disposed closest to the image side in the second lens unit, and $R_{2pr2}$ is a paraxial radius of curvature of an image side surface of the positive lens element disposed closest to the image side in the second lens unit.

66. The zoom lens according to claim 60, wherein the zoom lens consists, in order from the object side, of:
  a first lens unit having a positive refracting power;
  a second lens unit having a negative refracting power;
  a third lens unit having a positive refracting power; and
  a fourth lens unit having a positive refracting power.

67. The zoom lens according to claim 66, wherein the zoom lens includes an aperture stop, and
  during zooming from the wide angle end to the telephoto end, the first lens unit moves in such a way that it is located closer to the object side at the telephoto end than at the wide angle end, the second lens unit moves, the third lens unit moves in such a way that it is located closer to the object side at the telephoto end than at the wide angle end, the fourth lens unit moves, and the aperture stop moves.

68. The zoom lens according to claim 66, wherein the zoom lens satisfies the following conditional expression:

$$4.0 < f_t/f_w < 20.0 \quad (3\text{-}6)$$

where $f_w$ is a focal length of the entire zoom lens system at the wide angle end, and $f_t$ is a focal length of the entire zoom lens system at the telephoto end.

69. The zoom lens according to claim 66, wherein the zoom lens satisfies the following conditional expression:

$$0.50 < I_{mw}/f_w < 1.00 \quad (3\text{-}7)$$

where $I_{mw}$ is a maximum image height at the wide angle end of the zoom lens, and $f_w$ is a focal length of the entire zoom lens system at the wide angle end.

70. An image pickup apparatus including:
  a zoom lens as recited in claim 66; and
  an image pickup element that converts an image formed by the zoom lens into an electrical signal.

71. The image pickup apparatus according to claim 70, further including an image transformation section that transforms, by image processing, an electrical signal representing an image containing distortion attributed to the zoom lens into an image signal in which the distortion is corrected.

72. The zoom lens according to claim 60, wherein the zoom lens consists, in order from the object side, of:
  a first lens unit having a positive refracting power;
  a second lens unit having a negative refracting power;
  a third lens unit having a positive refracting power;
  a fourth lens unit having a negative refracting power; and
  a fifth lens unit having a positive refracting power.

73. The zoom lens according to claim 72, wherein the zoom lens includes an aperture stop, and
  during zooming from the wide angle end to the telephoto end, the first lens unit moves in such a way that it is located closer to the object side at the telephoto end than at the wide angle end, the second lens unit moves, the third lens unit move in such a way that it is located closer to the object side at the telephoto end than at the wide angle end, the fourth lens unit moves, the fifth lens unit moves, and the aperture stop moves.

74. The zoom lens according to claim 72, wherein the zoom lens satisfies the following conditional expression:

$$0.50 < I_{mw}/f_w < 1.00 \quad (3\text{-}7)$$

where $I_{mw}$ is a maximum image height at the wide angle end of the zoom lens, and $f_w$ is a focal length of the entire zoom lens system at the wide angle end.

75. An image pickup apparatus including:
  a zoom lens as recited in claim 72; and
  an image pickup element that converts an image formed by the zoom lens into an electrical signal.

76. The image pickup apparatus according to claim 75, further including an image transformation section that transforms, by image processing, an electrical signal representing an image containing distortion attributed to the zoom lens into an image signal in which the distortion is corrected.

77. The zoom lens according to claim 60, wherein the zoom lens satisfies the following conditional expression:

$$4.0 < f_t/f_w < 20.0 \quad (3\text{-}6)$$

where $f_w$ is a focal length of the entire zoom lens system at the wide angle end, and $f_t$ is a focal length of the entire zoom lens system at the telephoto end.

78. The zoom lens according to claim 72, wherein the zoom lens satisfies the following conditional expression:

$$4.0 < f_t/f_w < 20.0 \quad (3\text{-}6)$$

where $f_w$ is a focal length of the entire zoom lens system at the wide angle end, and $f_t$ is a focal length of the entire zoom lens system at the telephoto end.

79. The zoom lens according to claim 60, wherein the zoom lens satisfies the following conditional expression:

$$0.50 < I_{mw}/f_w < 1.00 \quad (3\text{-}7)$$

where $I_{mw}$ is a maximum image height at the wide angle end of the zoom lens, and $f_w$ is a focal length of the entire zoom lens system at the wide angle end.

80. An image pickup apparatus including:
a zoom lens as recited in claim 60; and
an image pickup element that converts an image formed by the zoom lens into an electrical signal.

81. The image pickup apparatus according to claim 80, further including an image transformation section that transforms, by image processing, an electrical signal representing an image containing distortion attributed to the zoom lens into an image signal in which the distortion is corrected.

82. A zoom lens comprising, in order from an object side thereof:
a first lens unit having a positive refracting power;
a second lens unit having a negative refracting power; and
a third lens unit having a positive refracting power, wherein
zooming is performed by changing distances between the lens units,
the first lens unit consists of one negative lens element and one positive lens element, and
the zoom lens satisfies the following conditional expressions:

$$0.1 < f_1/f_t < 1.05 \quad (4\text{-}1)$$

$$1.70 < nd_{1p} < 2.20 \quad (4\text{-}2)$$

where $f_1$ is a focal length of the first lens unit, $f_t$ is a focal length of the entire zoom lens system at the telephoto end, and $nd_{1p}$ is a refractive index for the d-line of the positive lens element in the first lens unit.

83. The zoom lens according to claim 82, wherein the first lens unit consists, in order from the object side, of a negative lens elements having a concave surface directed toward to the image side and a positive lens element having a convex surface directed toward to the object side, and the zoom lens satisfies the following conditional expressions:

$$0.5 < R_{1pf}/f_{1p} < 10.0 \quad (4\text{-}3)$$

$$-0.2 < R_{1nr}/f_{1n} < -0.10 \quad (4\text{-}4)$$

where $R_{1pf}$ is a paraxial radius of curvature of the object side surface of the positive lens element in the first lens unit, and $f_{1p}$ is a focal length of the positive lens element in the first lens unit, $R_{1nr}$ is a paraxial radius of curvature of the image side surface of the negative lens element in the first lens unit, and $f_{1n}$ is a focal length of the negative lens element in the first lens unit.

84. The zoom lens according to claim 82, wherein the negative lens element and the positive lens element in the first lens unit constitute a cemented lens.

85. The zoom lens according to claim 82, wherein the negative lens element and the positive lens element in the first lens unit are independent lens elements that are not cemented to each other.

86. The zoom lens according to claim 82, wherein the zoom lens consists, in order from the object side, of:
a first lens unit having a positive refracting power;
a second lens unit having a negative refracting power;
a third lens unit having a positive refracting power; and
a fourth lens unit having a positive refracting power.

87. The zoom lens according to claim 86, wherein the zoom lens includes an aperture stop, and
during zooming from the wide angle end to the telephoto end, the first lens unit moves in such a way that it is located closer to the object side at the telephoto end than at the wide angle end, the second lens unit moves, the third lens unit moves in such a way that it is located closer to the object side at the telephoto end than at the wide angle end, the fourth lens unit moves, and the aperture stop moves.

88. The zoom lens according to claim 86, wherein the zoom lens satisfies the following conditional expression:

$$0.02 < |f_2/f_t| < 0.50 \quad (4\text{-}5)$$

where $f_2$ is a focal length of the second lens unit, and $f_t$ is a focal length of the entire zoom lens system at the telephoto end.

89. The zoom lens according to claim 86, wherein the zoom lens consists of nine or fewer lens elements.

90. The zoom lens according to claim 86, wherein the zoom lens satisfies the following conditional expression:

$$5.0 < f_t/f_w < 30.0 \quad (4\text{-}6)$$

where $f_w$ is a focal length of the entire zoom lens system at the wide angle end, and $f_t$ is a focal length of the entire zoom lens system at the telephoto end.

91. The zoom lens according to claim 86, wherein the zoom lens satisfies the following conditional expression:

$$0.50 < I_{mw}/f_w < 1.00 \quad (4\text{-}7)$$

where $I_{mw}$ is a maximum image height at the wide angle end of the zoom lens, and $f_w$ is a focal length of the zoom lens at the wide angle end.

92. An image pickup apparatus including:
a zoom lens as recited in claim 86; and
an image pickup element that converts an image formed by the zoom lens into an electrical signal.

93. The image pickup apparatus according to claim 92, further comprising an image transformation section that transforms, by image processing, an electric signal representing an image formed by the zoom lens into an image signal in which color misregistration caused by chromatic aberration of magnification is corrected.

94. The image pickup apparatus according to claim 93, wherein the image pickup apparatus satisfies the following conditional expression throughout the zoom range:

$$2.0 < |\Delta c_{07} - \Delta f_{07}|/p < 15.0 \quad (4\text{-}9)$$

$$2.0 < |\Delta g_{10}|/p < 15.0 \quad (4\text{-}10)$$

$$|\Delta g_{10} - \Delta g_{07}|/p < 12.0 \quad (4\text{-}11)$$

where $\Delta c_{07}$, $\Delta f_{07}$, and $\Delta g_{07}$ are amounts of chromatic aberration of magnification for the c-line, the f-line and the g-line respectively relative to the d-line at an image height equal to 70% of a maximum diagonal image height, $\Delta g_{10}$ is an amount of chromatic aberration of magnification for the g-line relative to the d-line at the maximum diagonal image height, and p is a pixel pitch of the image pickup element.

95. The image pickup apparatus according to claim 92, further comprising an image transformation section that transforms, by image processing, an electrical signal representing an image containing distortion attributed to the zoom lens into an image signal in which the distortion is corrected.

96. The zoom lens according to claim 86, wherein the zoom lens satisfies the following conditional expression:

$$5.0 < L_t/I_{mw} < 22.5 \tag{4-8}$$

where $L_t$ is an entire length of the entire zoom lens system at the telephoto end, and $I_{mw}$ is a maximum image height at the wide angle end of the zoom lens.

97. The zoom lens according to claim 82, wherein the zoom lens consists, in order from the object side, of:
- a first lens unit having a positive refracting power;
- a second lens unit having a negative refracting power;
- a third lens unit having a positive refracting power;
- a fourth lens unit having a negative refracting power; and
- a fifth lens unit having a positive refracting power.

98. The zoom lens according to claim 97, wherein the zoom lens includes an aperture stop, and
during zooming from the wide angle end to the telephoto end, the first lens unit moves in such a way that it is located closer to the object side at the telephoto end than at the wide angle end, the second lens unit moves, the third lens unit moves in such a way that it is located closer to the object side at the telephoto end than at the wide angle end, the fourth lens unit moves, the fifth lens unit moves, and the aperture stop moves.

99. The zoom lens according to claim 97, wherein the zoom lens satisfies the following conditional expression:

$$0.02 < |f_2/f_t| < 0.50 \tag{4-5}$$

where $f_2$ is a focal length of the second lens unit, and $f_t$ is a focal length of the entire zoom lens system at the telephoto end.

100. The zoom lens according to claim 97, wherein the zoom lens consists of nine or fewer lens elements.

101. The zoom lens according to claim 97, wherein the zoom lens satisfies the following conditional expression:

$$5.0 < f_t/f_w < 30.0 \tag{4-6}$$

where $f_w$ is a focal length of the entire zoom lens system at the wide angle end, and $f_t$ is a focal length of the entire zoom lens system at the telephoto end.

102. The zoom lens according to claim 97, wherein the zoom lens satisfies the following conditional expression:

$$0.50 < I_{mw}/f_w < 1.00 \tag{4-7}$$

where $I_{mw}$ is a maximum image height at the wide angle end of the zoom lens, and $f_w$ is a focal length of the zoom lens at the wide angle end.

103. The zoom lens according to claim 97, wherein the zoom lens satisfies the following conditional expression:

$$5.0 < L_t/I_{mw} < 22.5 \tag{4-8}$$

where $L_t$ is an entire length of the entire zoom lens system at the telephoto end, and $I_{mw}$ is a maximum image height at the wide angle end of the zoom lens.

104. An image pickup apparatus including:
a zoom lens as recited in claim 97; and
an image pickup element that converts an image formed by the zoom lens into an electrical signal.

105. The image pickup apparatus according to claim 104, further comprising an image transformation section that transforms, by image processing, an electric signal representing an image formed by the zoom lens into an image signal in which color misregistration caused by chromatic aberration of magnification is corrected.

106. The image pickup apparatus according to claim 105, wherein the image pickup apparatus satisfies the following conditional expression throughout the zoom range:

$$2.0 < |\Delta c_{07} - \Delta f_{07}|/p < 15.0 \tag{4-9}$$

$$2.0 < |\Delta g_{10}|/p < 15.0 \tag{4-10}$$

$$|\Delta g_{10} - \Delta g_{07}|/p < 12.0 \tag{4-11}$$

where $\Delta c_{07}$, $\Delta f_{07}$, and $\Delta g_{07}$ are amounts of chromatic aberration of magnification for the c-line, the f-line and the g-line respectively relative to the d-line at an image height equal to 70% of a maximum diagonal image height, $\Delta g_{10}$ is an amount of chromatic aberration of magnification for the g-line relative to the d-line at the maximum diagonal image height, and p is a pixel pitch of the image pickup element.

107. The image pickup apparatus according to claim 104, further comprising an image transformation section that transforms, by image processing, an electrical signal representing an image containing distortion attributed to the zoom lens into an image signal in which the distortion is corrected.

108. The zoom lens according to claim 82, wherein the zoom lens satisfies the following conditional expression:

$$0.02 < |f_2/f_t| < 0.50 \tag{4-5}$$

where $f_2$ is a focal length of the second lens unit, and $f_t$ is a focal length of the entire zoom lens system at the telephoto end.

109. The zoom lens according to claim 82, wherein the zoom lens consists of nine or fewer lens elements.

110. The zoom lens according to claim 82, wherein the zoom lens satisfies the following conditional expression:

$$5.0 < f_t/f_w < 30.0 \tag{4-6}$$

where $f_w$ is a focal length of the entire zoom lens system at the wide angle end, and $f_t$ is a focal length of the entire zoom lens system at the telephoto end.

111. The zoom lens according to claim 82, wherein the zoom lens satisfies the following conditional expression:

$$0.50 < I_{mw}/f_w < 1.00 \tag{4-7}$$

where $I_{mw}$ is a maximum image height at the wide angle end of the zoom lens, and $f_w$ is a focal length of the zoom lens at the wide angle end.

112. The zoom lens according to claim 82, wherein the zoom lens satisfies the following conditional expression:

$$5.0 < L_t/I_{mw} < 22.5 \tag{4-8}$$

where $L_t$ is an entire length of the entire zoom lens system at the telephoto end, and $I_{mw}$ is a maximum image height at the wide angle end of the zoom lens.

113. An image pickup apparatus including:
a zoom lens as recited in claim 82; and
an image pickup element that converts an image formed by the zoom lens into an electrical signal.

114. The image pickup apparatus according to claim 113, further including an image transformation section that transforms, by image processing, an electric signal representing an image formed by the zoom lens into an image signal in which color misregistration caused by chromatic aberration of magnification is corrected.

115. The image pickup apparatus according to claim 114, wherein the image pickup apparatus satisfies the following conditional expression throughout the zoom range:

$$2.0 < |\Delta c_{07} - \Delta f_{07}|/p < 15.0 \quad (4\text{-}9)$$

$$2.0 < |\Delta g_{10}|/p < 15.0 \quad (4\text{-}10)$$

$$|\Delta g_{10} - \Delta g_{07}|/p < 12.0 \quad (4\text{-}11)$$

where $\Delta c_{07}$, $\Delta f_{07}$, and $\Delta g_{07}$ are amounts of chromatic aberration of magnification for the c-line, the f-line and the g-line respectively relative to the d-line at an image height equal to 70% of a maximum diagonal image height, $\Delta g_{10}$ is an amount of chromatic aberration of magnification for the g-line relative to the d-line at a maximum diagonal image height, and p is a pixel pitch of the image pickup element.

116. The image pickup apparatus according to claim 113, further comprising an image transformation section that transforms, by image processing, an electrical signal representing an image containing distortion attributed to the zoom lens into an image signal in which the distortion is corrected.

* * * * *